United States Patent [19]

Kasai et al.

[11] Patent Number: 5,503,516

[45] Date of Patent: Apr. 2, 1996

[54] AUTOMATIC ARTICLE FEEDING SYSTEM

[75] Inventors: Shozo Kasai; Takeo Tanita; Masateru Yasuhara, all of Kawasaki; Yusaku Azuma, Yokohama; Toshihiro Yamamoto, Kawasaki; Norio Nikaido, Tsuchiura; Ryohei Inaba, Kawasaki; Mitsuo Arai, Chichibu, all of Japan

[73] Assignee: Canon Kabushiki Kaisha, Tokyo, Japan

[21] Appl. No.: 276,755

[22] Filed: Jul. 18, 1994

Related U.S. Application Data

[60] Continuation of Ser. No. 968,303, Oct. 29, 1992, abandoned, which is a division of Ser. No. 668,912, Mar. 13, 1991, Pat. No. 5,232,331, which is a division of Ser. No. 227,307, Aug. 2, 1988, abandoned.

[30] Foreign Application Priority Data

| Aug. 7, 1987 | [JP] | Japan | 62-196469 |
| Aug. 7, 1987 | [JP] | Japan | 62-196473 |
| Aug. 7, 1987 | [JP] | Japan | 62-196482 |
| Aug. 7, 1987 | [JP] | Japan | 62-196483 |
| Oct. 29, 1987 | [JP] | Japan | 62-271722 |

[51] Int. Cl.⁶ .................................................... B65G 59/00
[52] U.S. Cl. ............................ 414/786; 221/134; 901/7
[58] Field of Search ........................ 221/134, 228, 221/233; 414/277, 281, 331, 411, 786, 929; 901/6, 7

[56] References Cited

U.S. PATENT DOCUMENTS

| 3,822,024 | 7/1974 | Endter et al. | |
| 4,588,341 | 5/1986 | Motoda | 414/331 |
| 4,604,718 | 8/1986 | Norman et al. | 364/578 |
| 4,611,967 | 9/1986 | Tsutsui | 414/411 |
| 4,651,863 | 3/1987 | Reuter et al. | 198/339.1 |
| 4,687,403 | 8/1987 | Motoda | 414/795.8 |
| 4,783,904 | 11/1988 | Kimura | 29/786 |
| 4,806,072 | 2/1989 | Karashima | 414/786 |
| 4,844,680 | 7/1989 | Kawata et al. | 414/331 |
| 4,928,245 | 5/1990 | Moy et al. | 364/513 |
| 4,932,828 | 6/1990 | Katae et al. | 414/286 |
| 5,024,593 | 6/1991 | Hehl | 425/556 |

FOREIGN PATENT DOCUMENTS

| 52-26391 | 7/1977 | Japan. |
| 55-28665 | 7/1980 | Japan. |
| 55-156132 | 12/1980 | Japan. |
| 59-114221 | 2/1984 | Japan. |
| 59-110524 | 6/1984 | Japan. |
| 60-122632 | 7/1985 | Japan. |
| 60-169899 | 9/1985 | Japan. |
| 60-228037 | 11/1985 | Japan. |
| 61-33423 | 2/1986 | Japan. |
| 61-168452 | 7/1986 | Japan. |
| 61-206709 | 9/1986 | Japan. |
| 61-206708 | 9/1986 | Japan. |
| 62-157735 | 7/1987 | Japan. |
| 63-18632 | 1/1988 | Japan. |
| 1-28962 | 1/1989 | Japan. |
| 1079167 | 8/1967 | United Kingdom. |

*Primary Examiner*—David A. Bucci
*Assistant Examiner*—Janice L. Krizek
*Attorney, Agent, or Firm*—Fitzpatrick, Cella, Haprer & Scinto

[57] ABSTRACT

A method for feeding articles to a robot comprises the steps of temporarily storing a plurality of containers in a temporary storing device including a rest on which the plurality of containers are stacked and a separator for simultaneously separating the stacked containers from each other, stocking a plurality of containers supplied from the temporary storing device in a stocker, and feeding the stocked containers to the robot one-by-one.

6 Claims, 70 Drawing Sheets

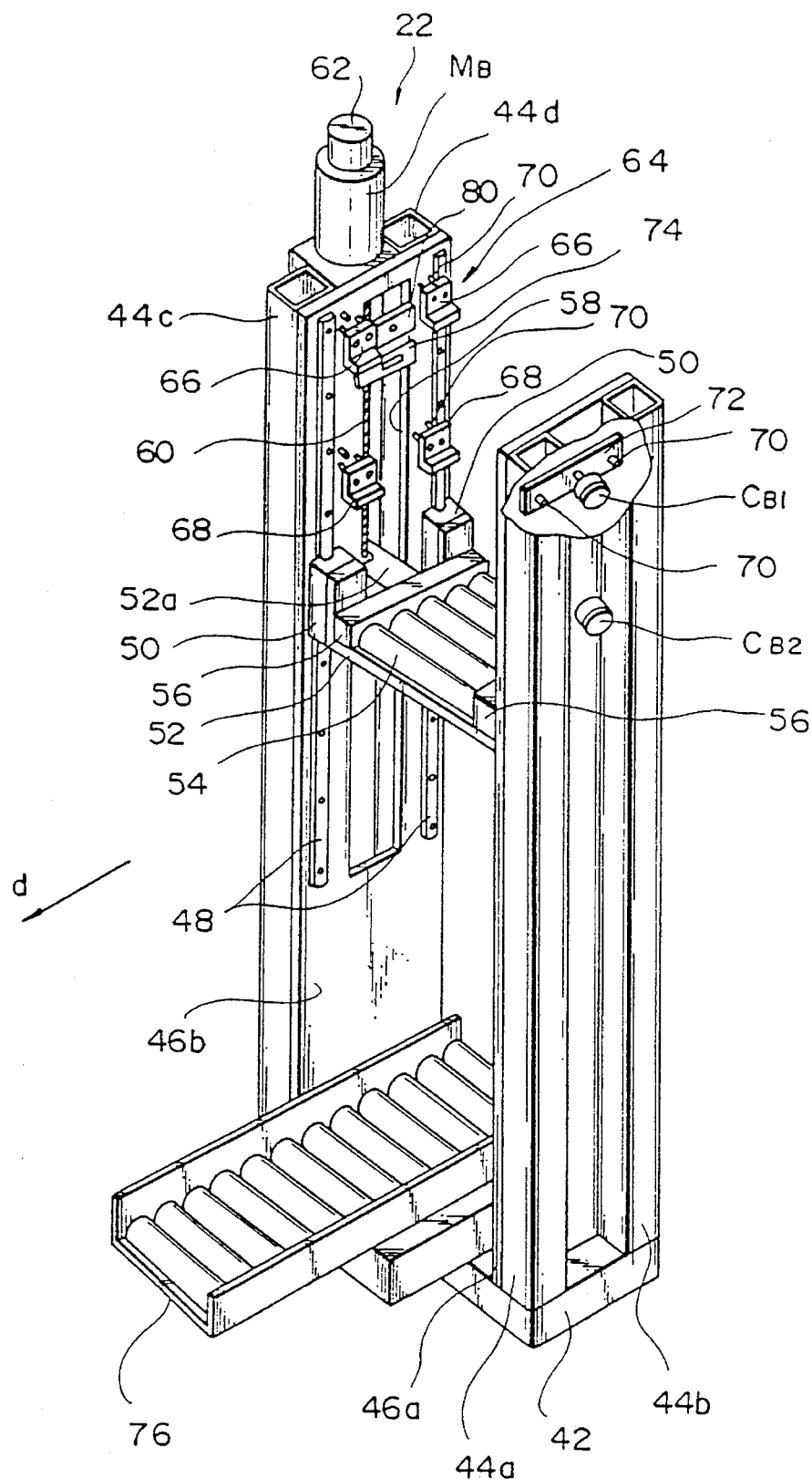
F I G. 6

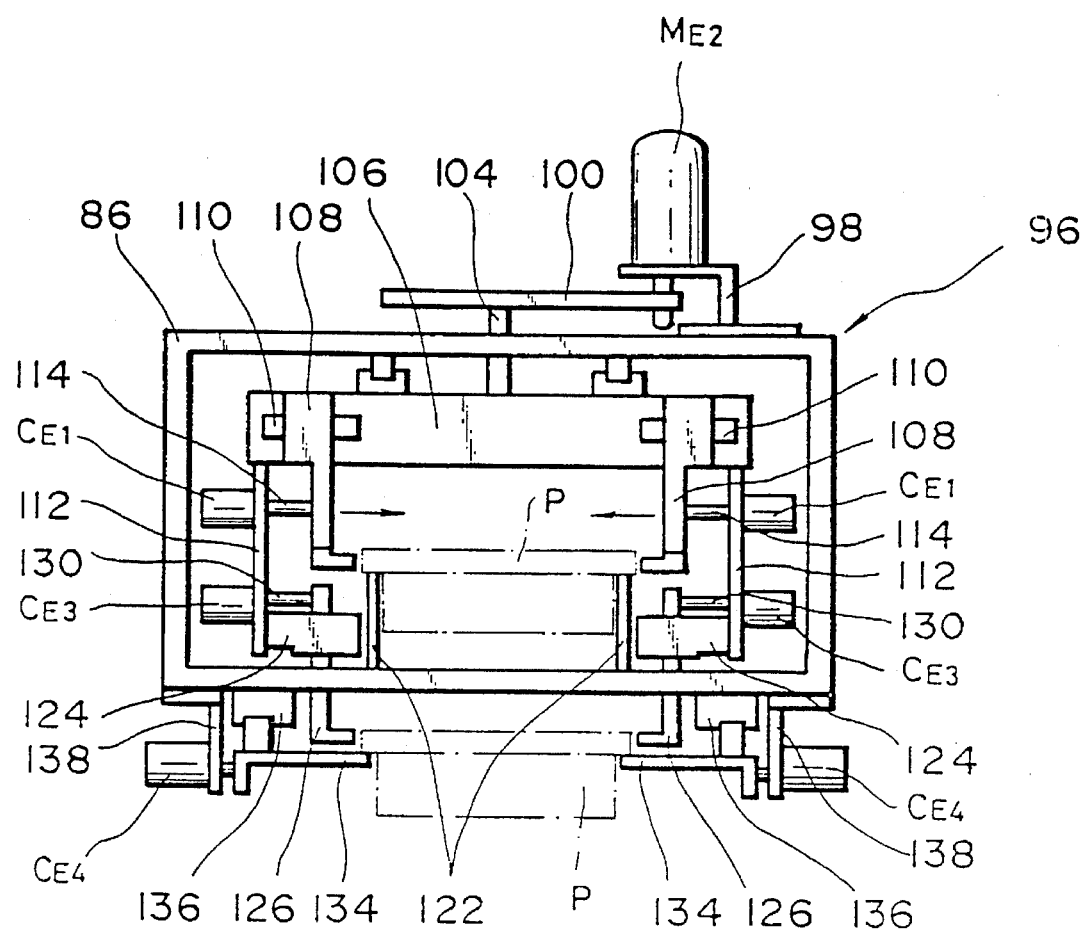
F I G. 10

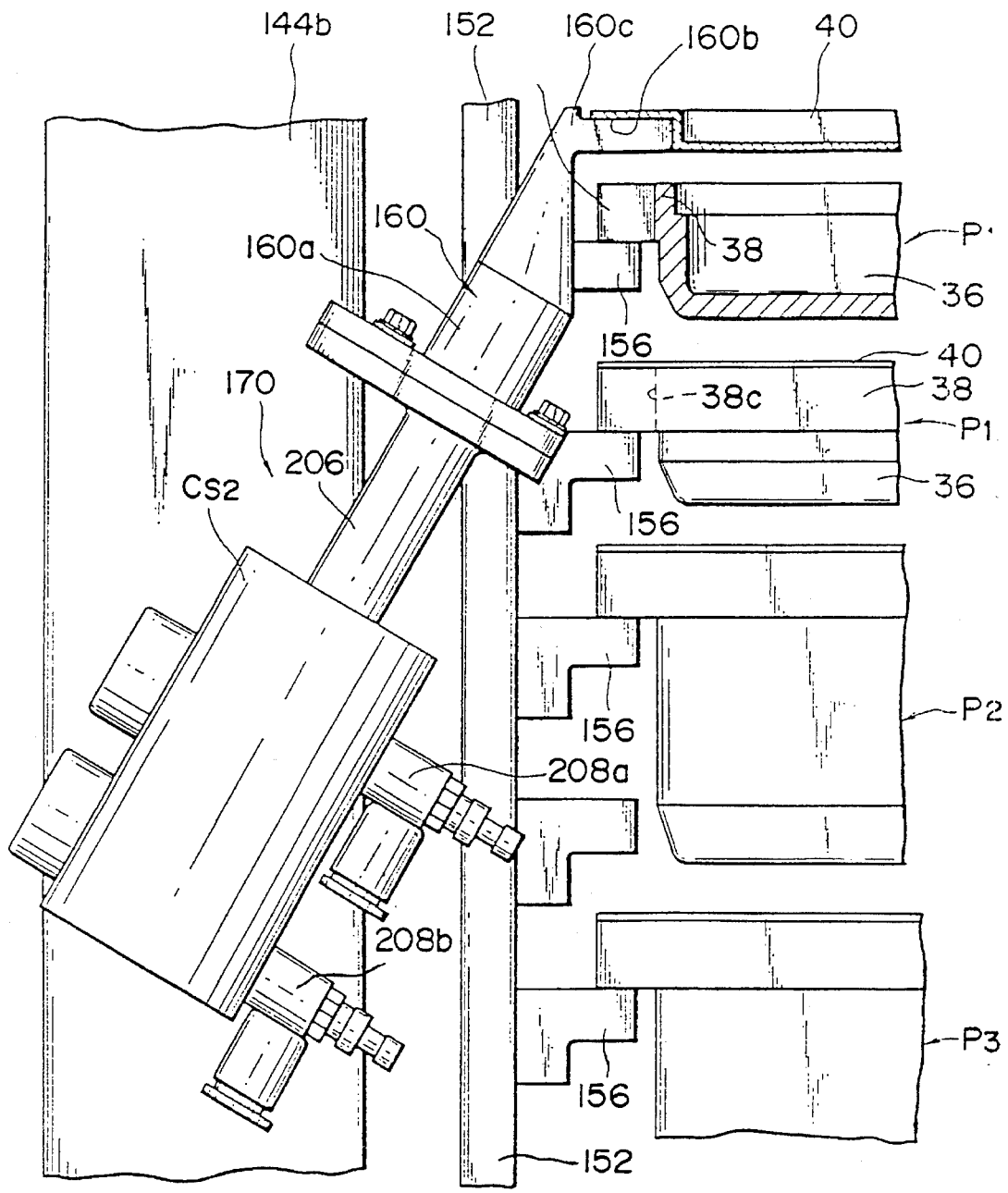
F I G. 16

| PARTS INDEX (IDX) | PARTS NAME | PROCESS ORDER (G) | TOTAL COUNT OF PARTS T | PALLET THICKNESS H | STOCKER SHELF POSITION S | BAR CODE B | FINGER F | PROGRAM NUMBER P | REMAINING PARTS COUNT Z |
|---|---|---|---|---|---|---|---|---|---|
| 1 | SCREW | 1 | 38 | 50 | S[1]=1 | | | 100 | |
| 2 | NUT | 3 | 13 | 25 | S[3]=7 | | | 200 | |
| 3 | WASHER | 2 | 54 | 100 | S[2]=3 | | | 300 | |
| 4 | | 4 | | | S[4]=8 | | | | |
| ------ | (INPUT) | | (INPUT) | (INPUT) | (INPUT) | (INPUT) | (INPUT) | (INPUT) | |

F I G. 19A

| PROCESS ORDER (G) | PARTS INDEX (IDX) | STOCKER POSITION | PROGRAM NUMBER | PARTS NAME |
|---|---|---|---|---|
| 1 | 1 | 1 | 100 | SCREW |
| 2 | 3 | 3 | 300 | WASHER |
| 3 | 2 | 7 | 200 | NUT |
| 4 | ⋮ | 8 | ⋮ | ⋮ |
| 5 | ⋮ | ⋮ | ⋮ | ⋮ |
F I G. 19B
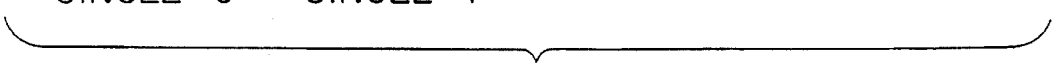
F I G. 19C

FIG. 21A

| G | PARTS INDEX IDX[G] | REMAINING PART COUNT Z[G] | TOTAL COUNT T[G] | REPLACING FLAG I[G] | STOCKER POSITION S[G] | PALLET THICKNESS H[G] | BAR CODE B[G] |
|---|---|---|---|---|---|---|---|
| 1 | ------- | ------- | ------- | ------- | ------- | ------- | ------- |
| 2 | | | | | | | |
| 3 | | | | | | | |
| 4 | | | | | | | |

FIG. 21B

QUEUE TABLE

| ELEVATOR | BUFFER |
|---|---|
| E1 | D1 |
| E2 | D2 |

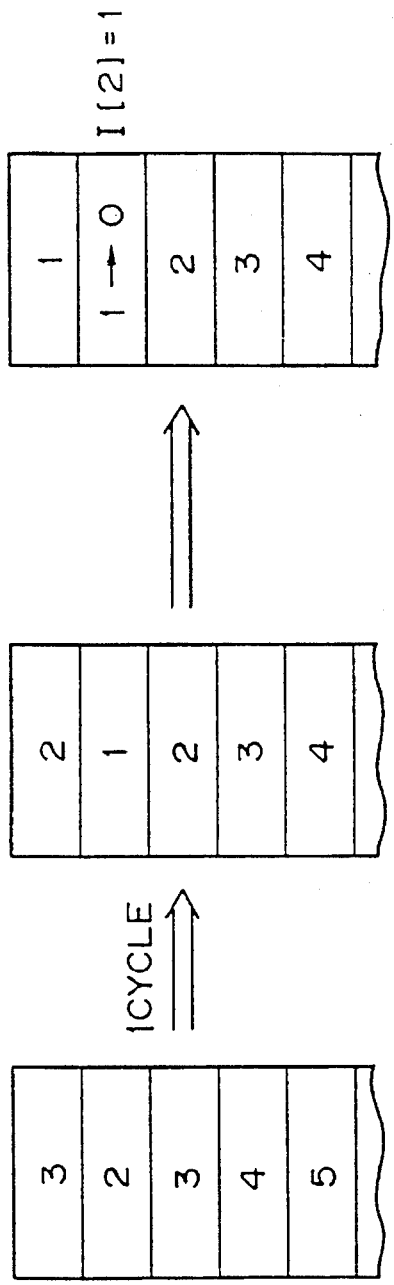

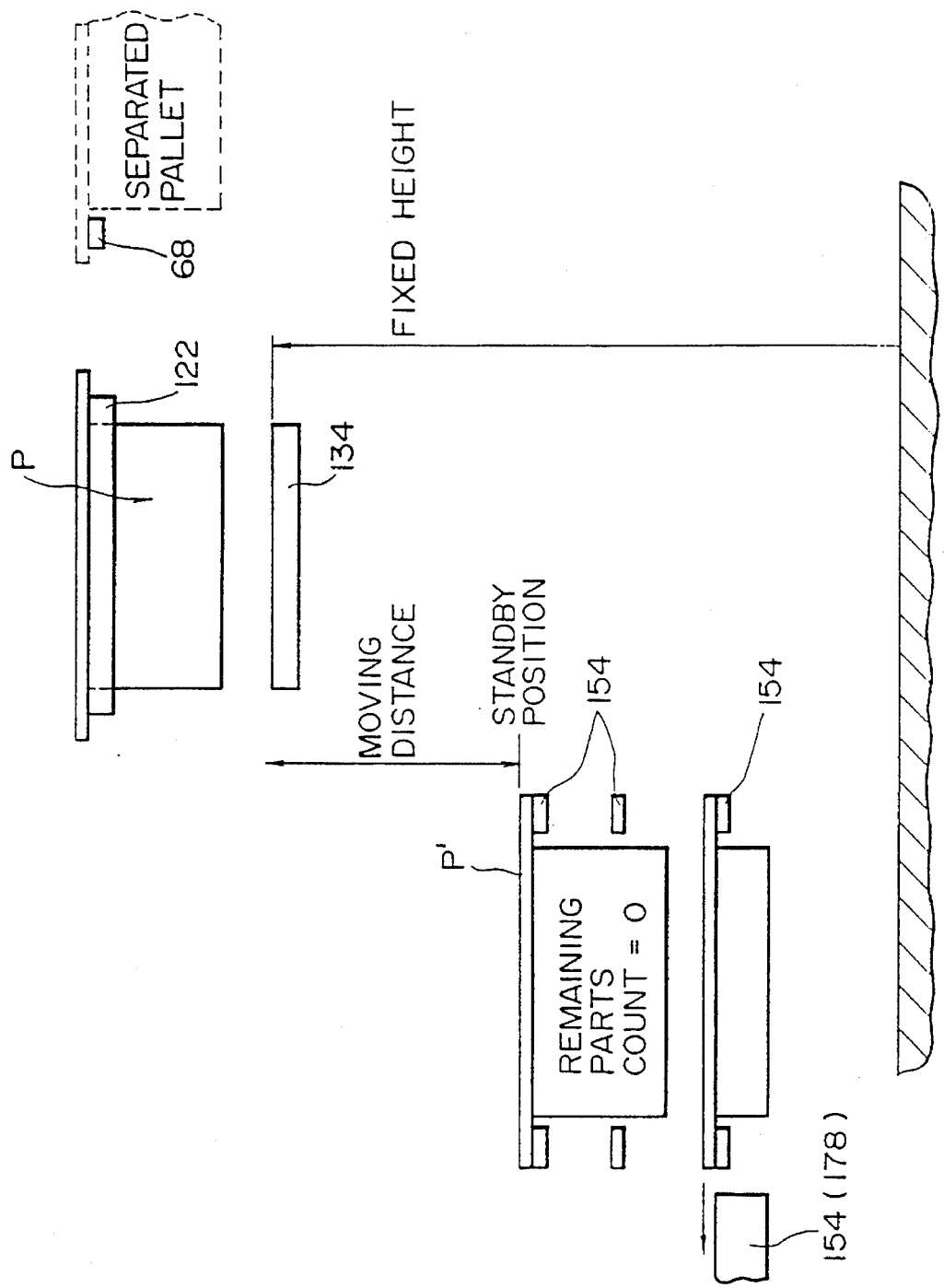
F I G. 27A

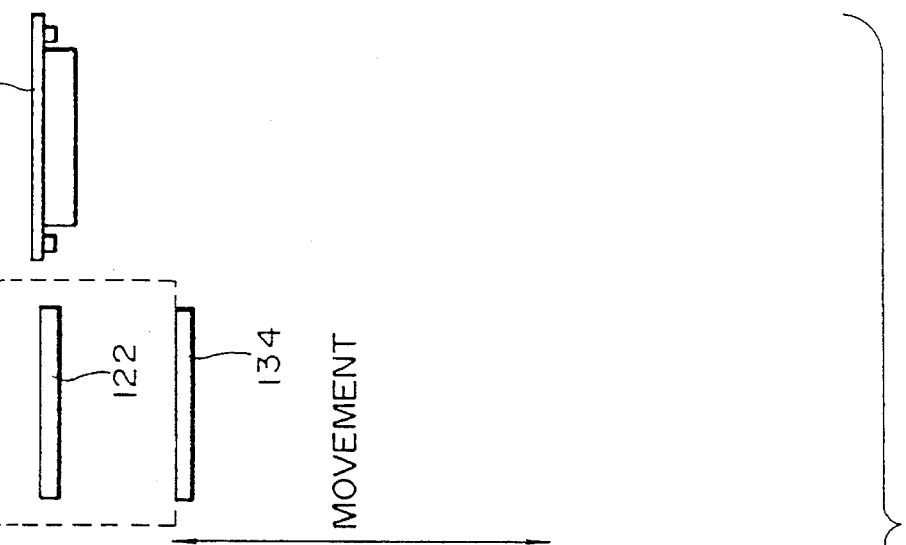
FIG. 27C
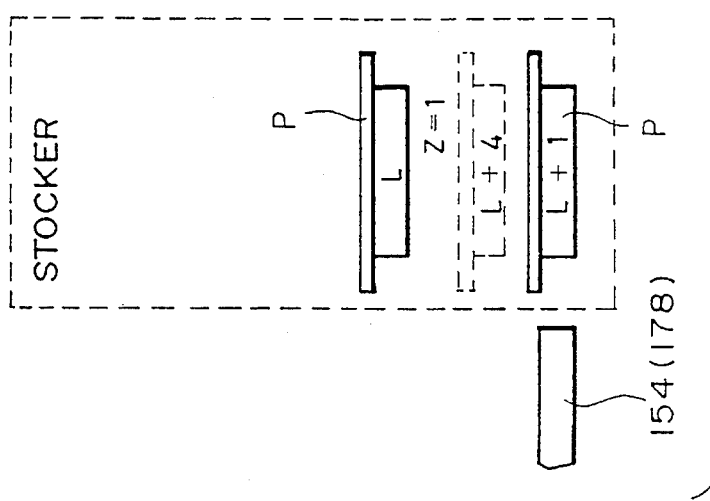
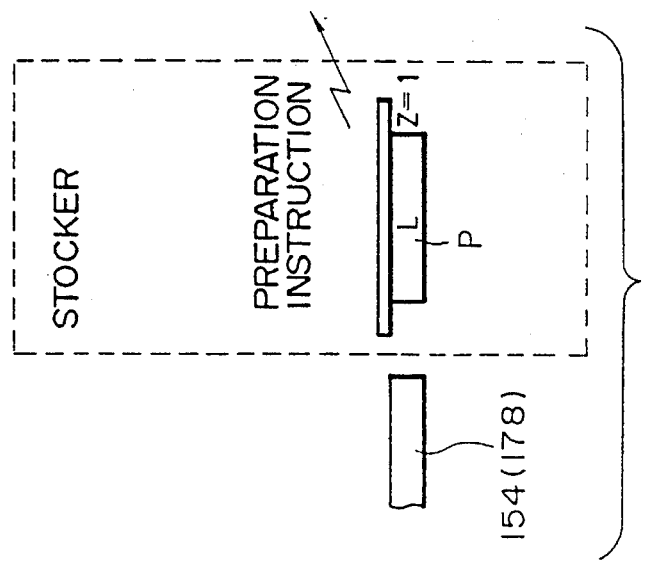
FIG. 27B

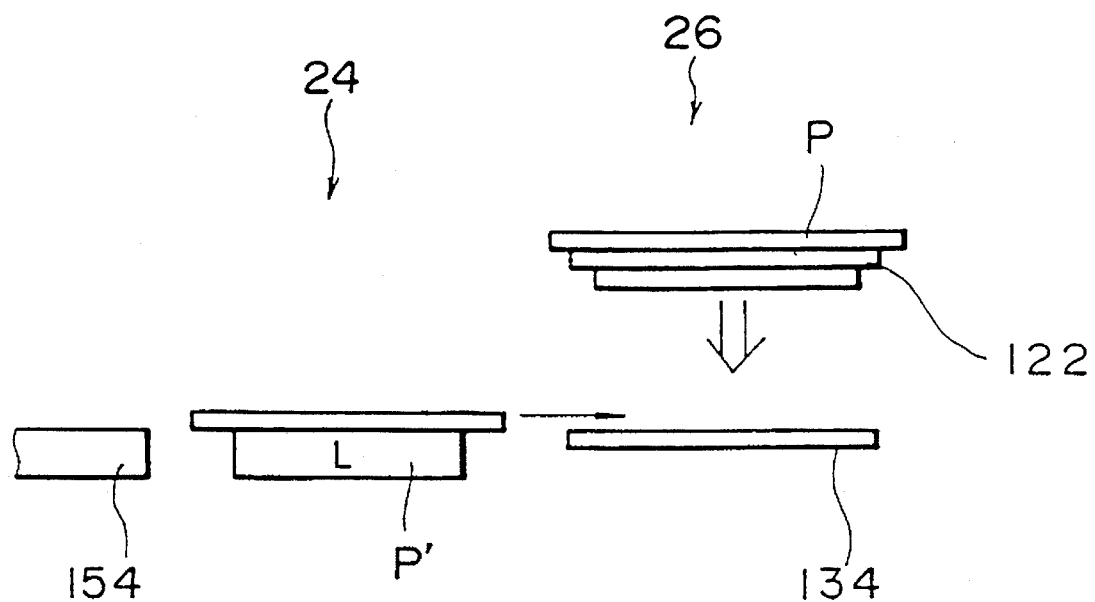
FIG. 27G

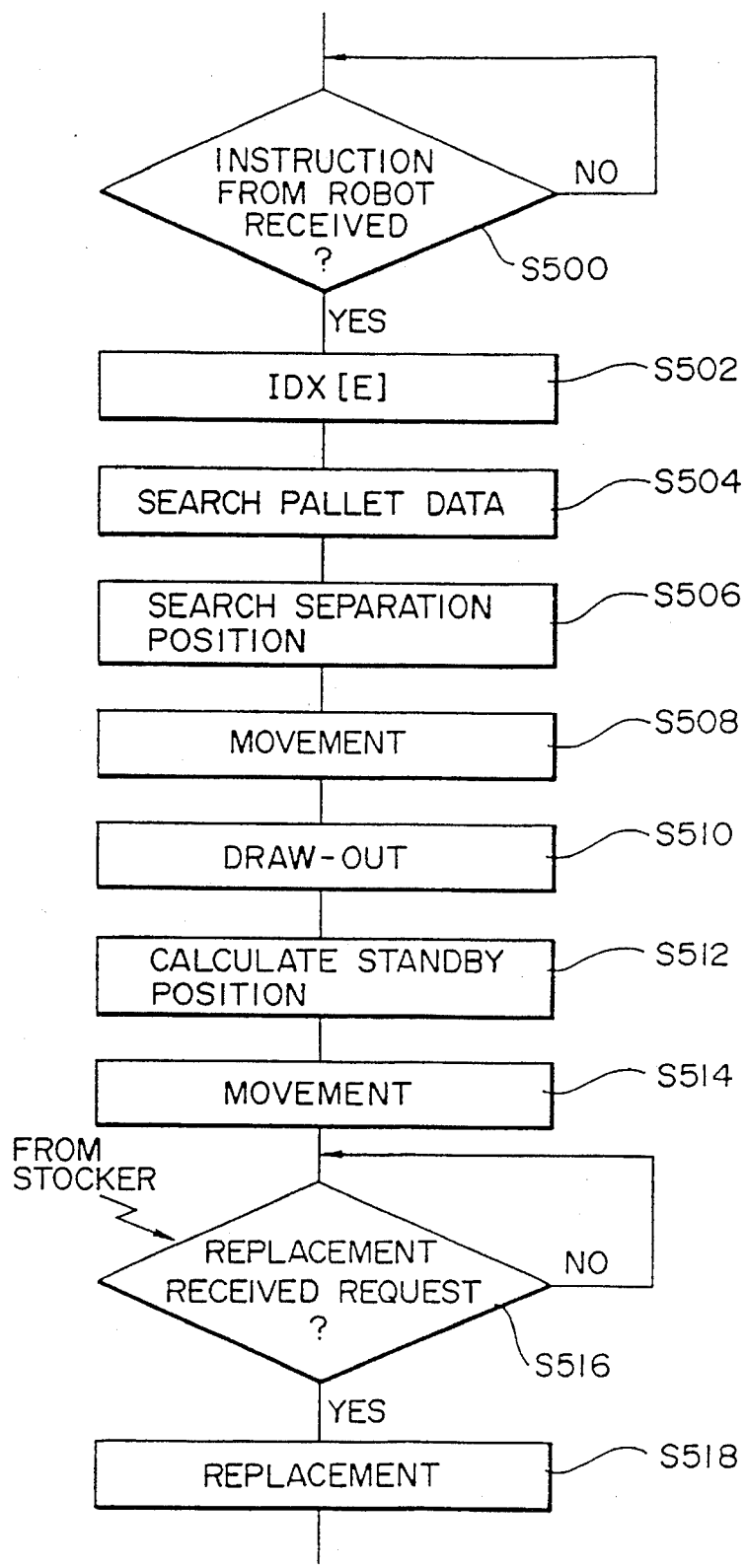
F I G. 30

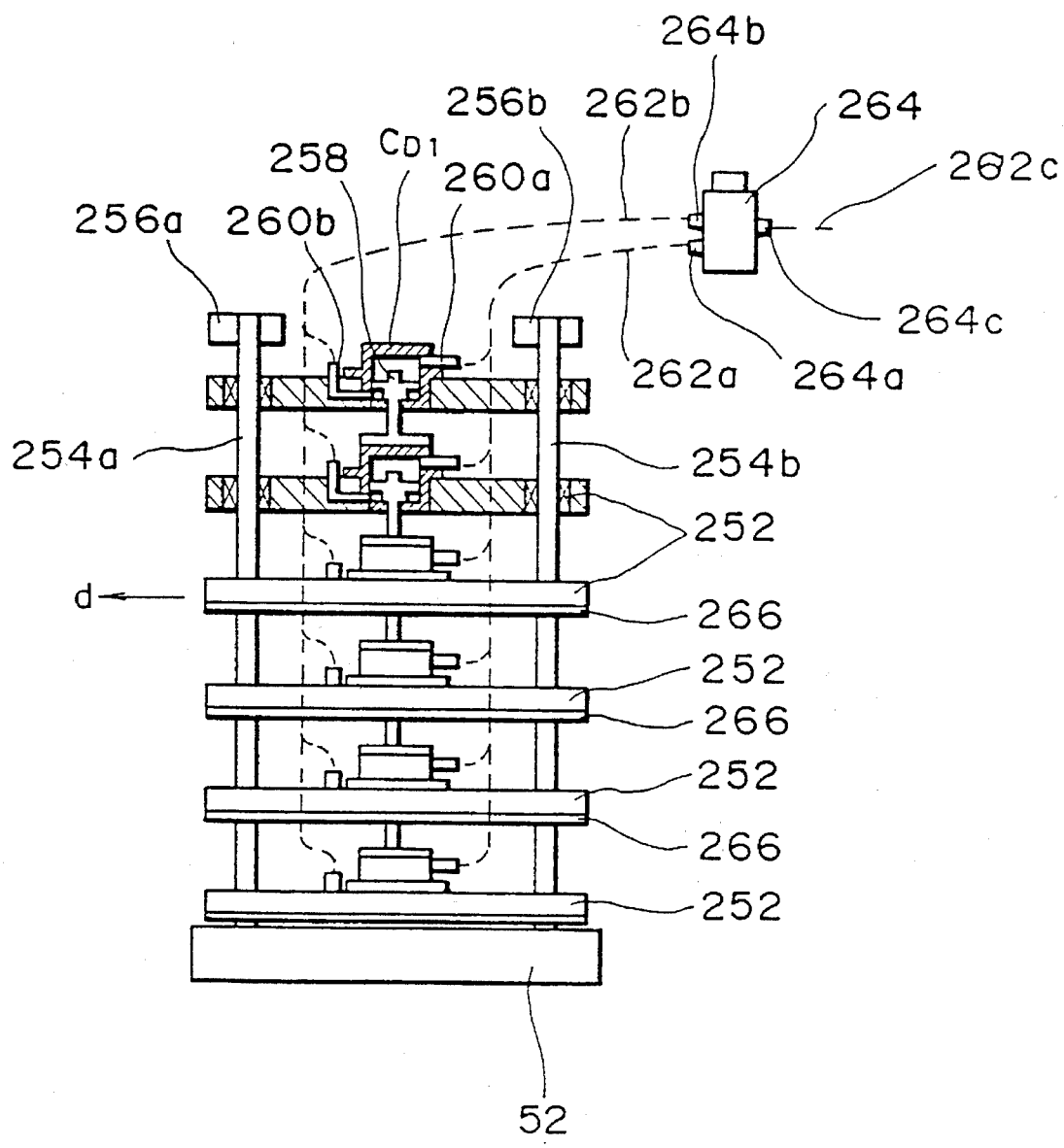
F I G. 32

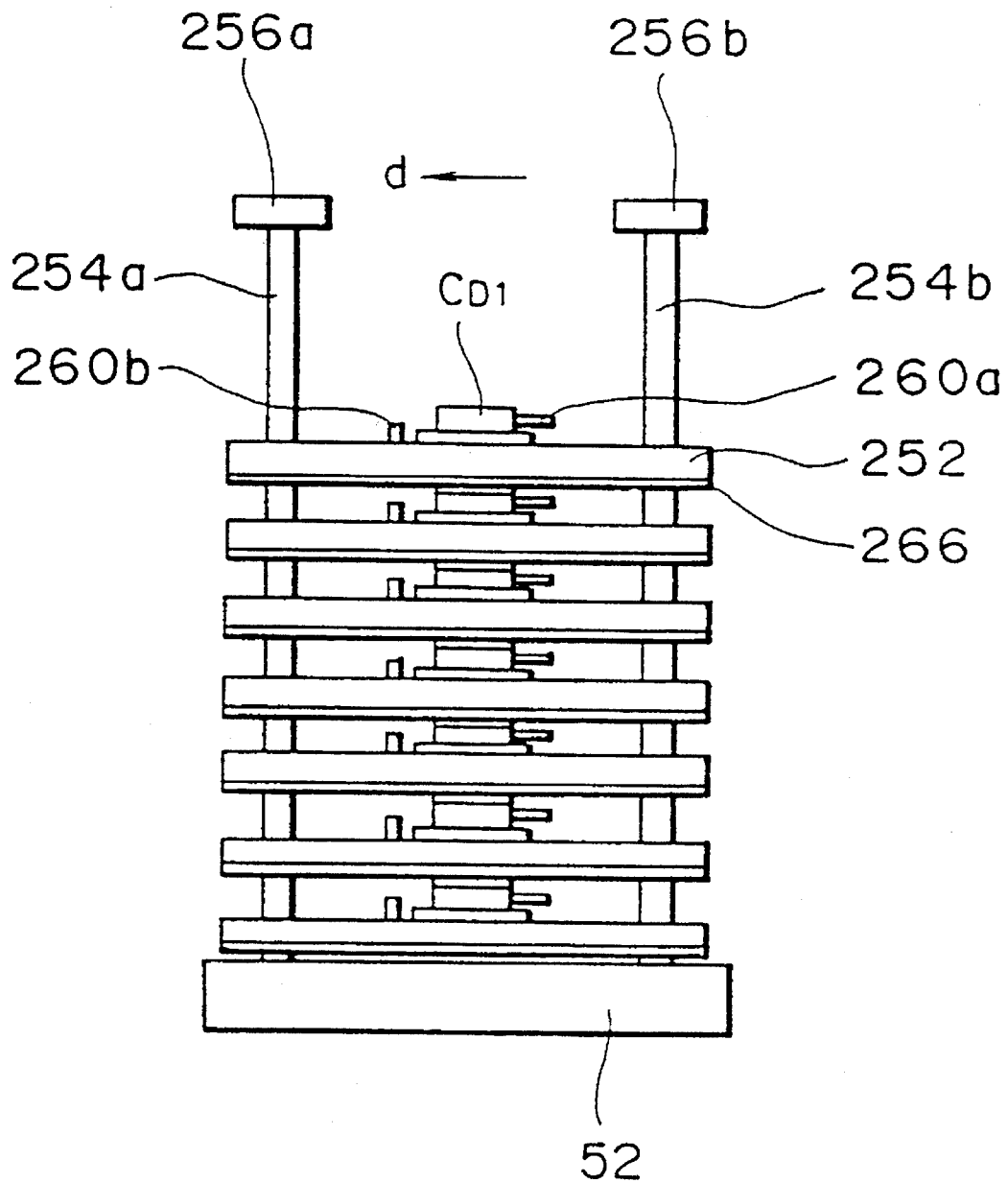
F I G. 33

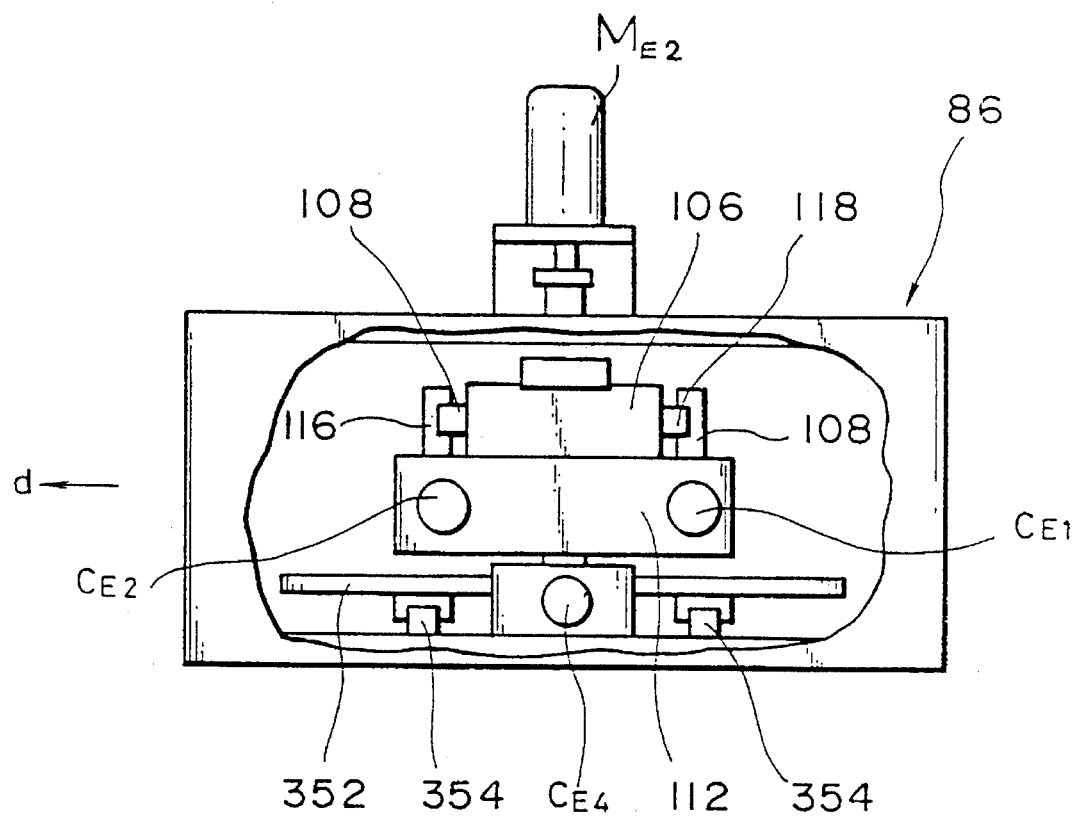
F I G. 41

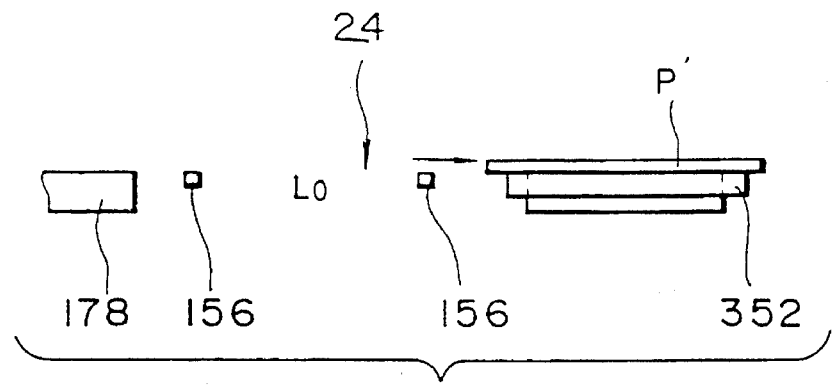
F I G. 42D
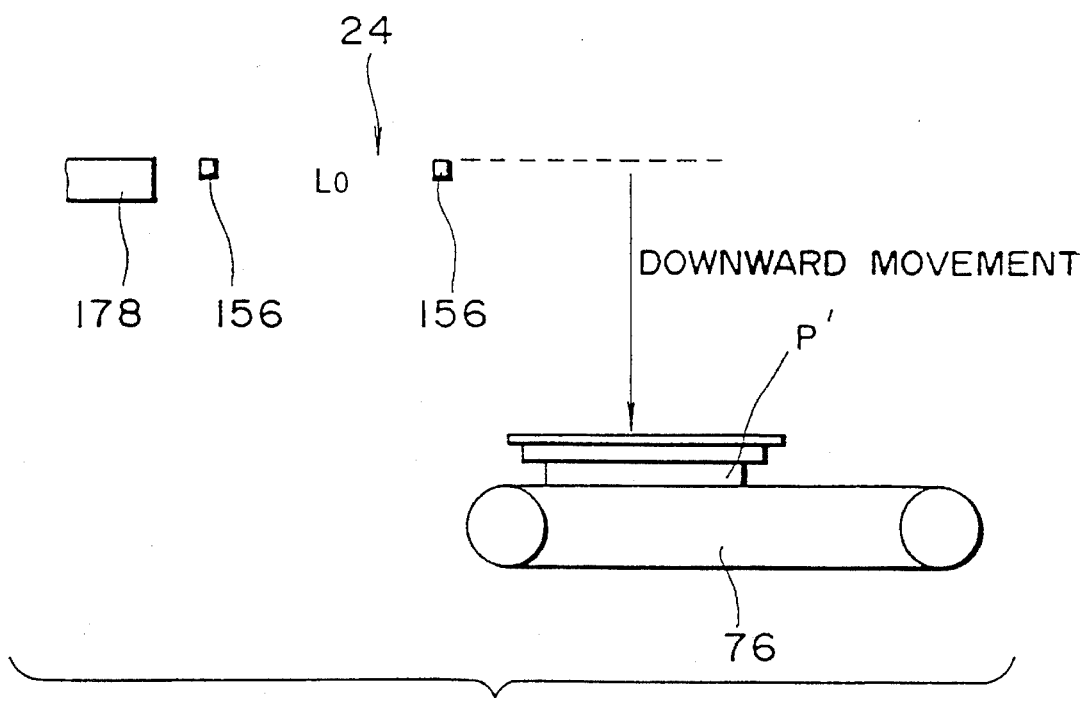
F I G. 42E

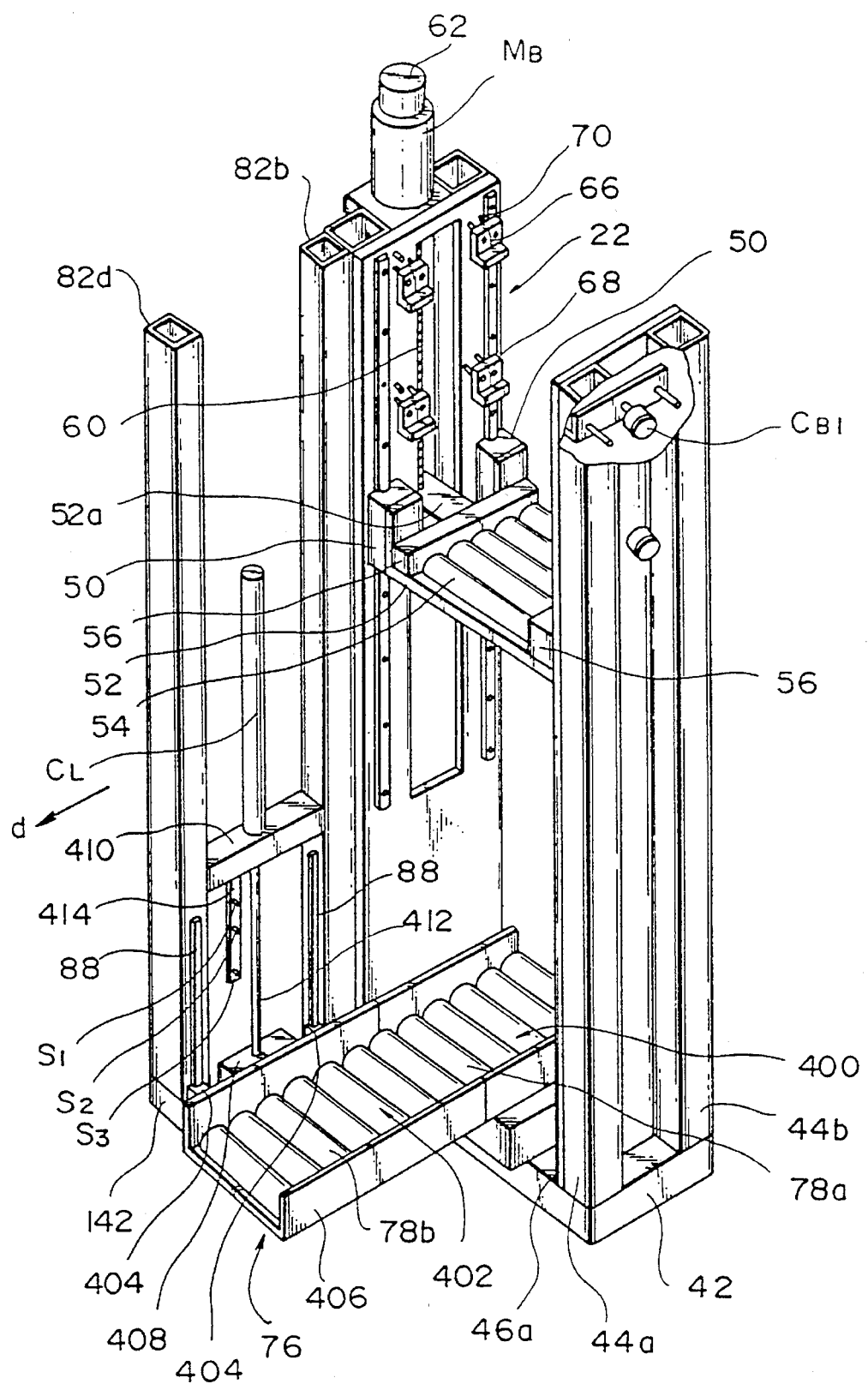
F I G. 43

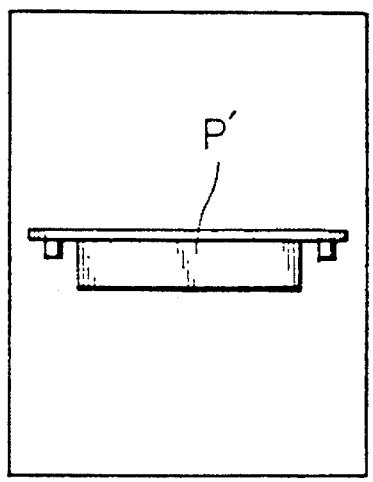 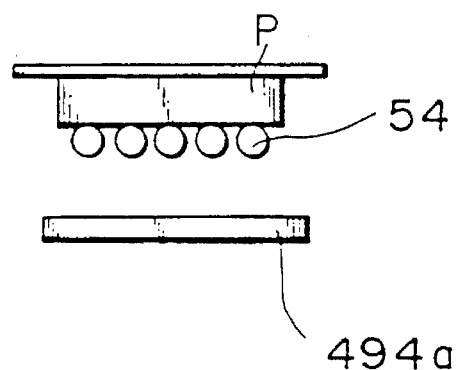
FIG. 50C
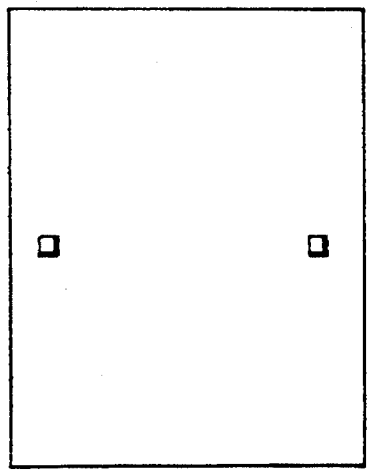 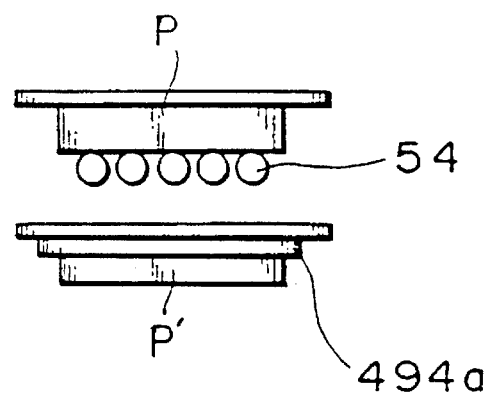
FIG. 50D

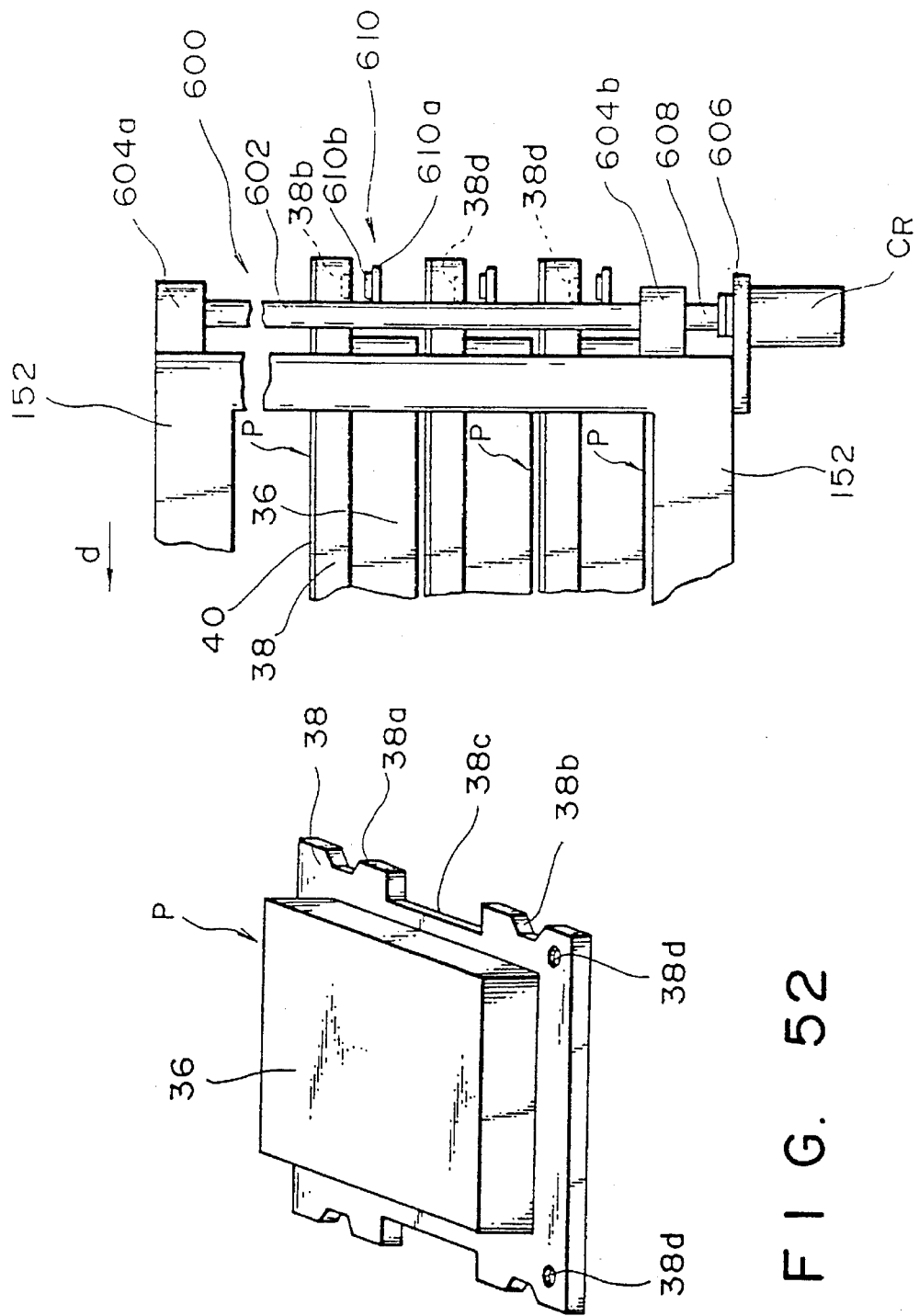

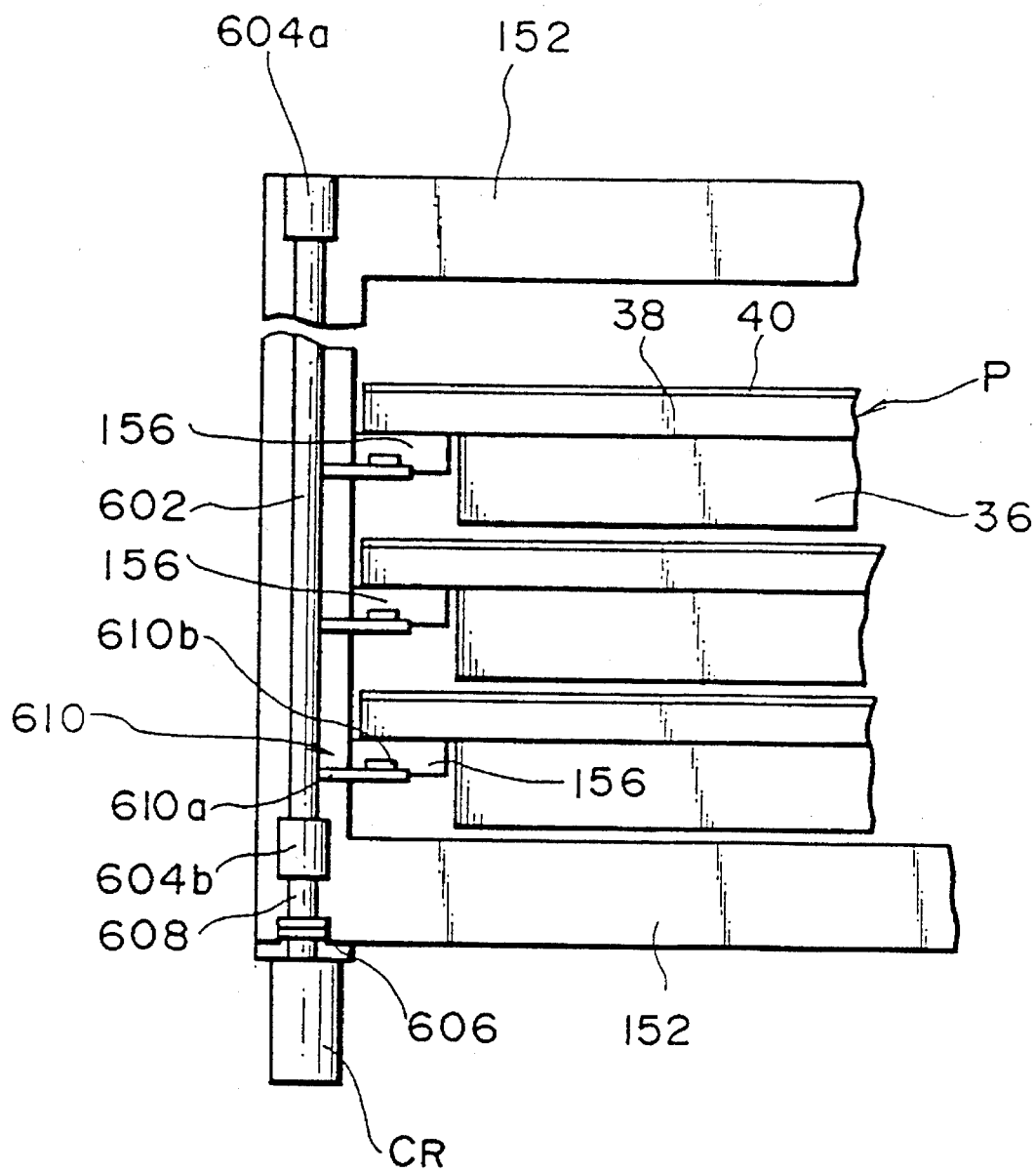
F I G. 54

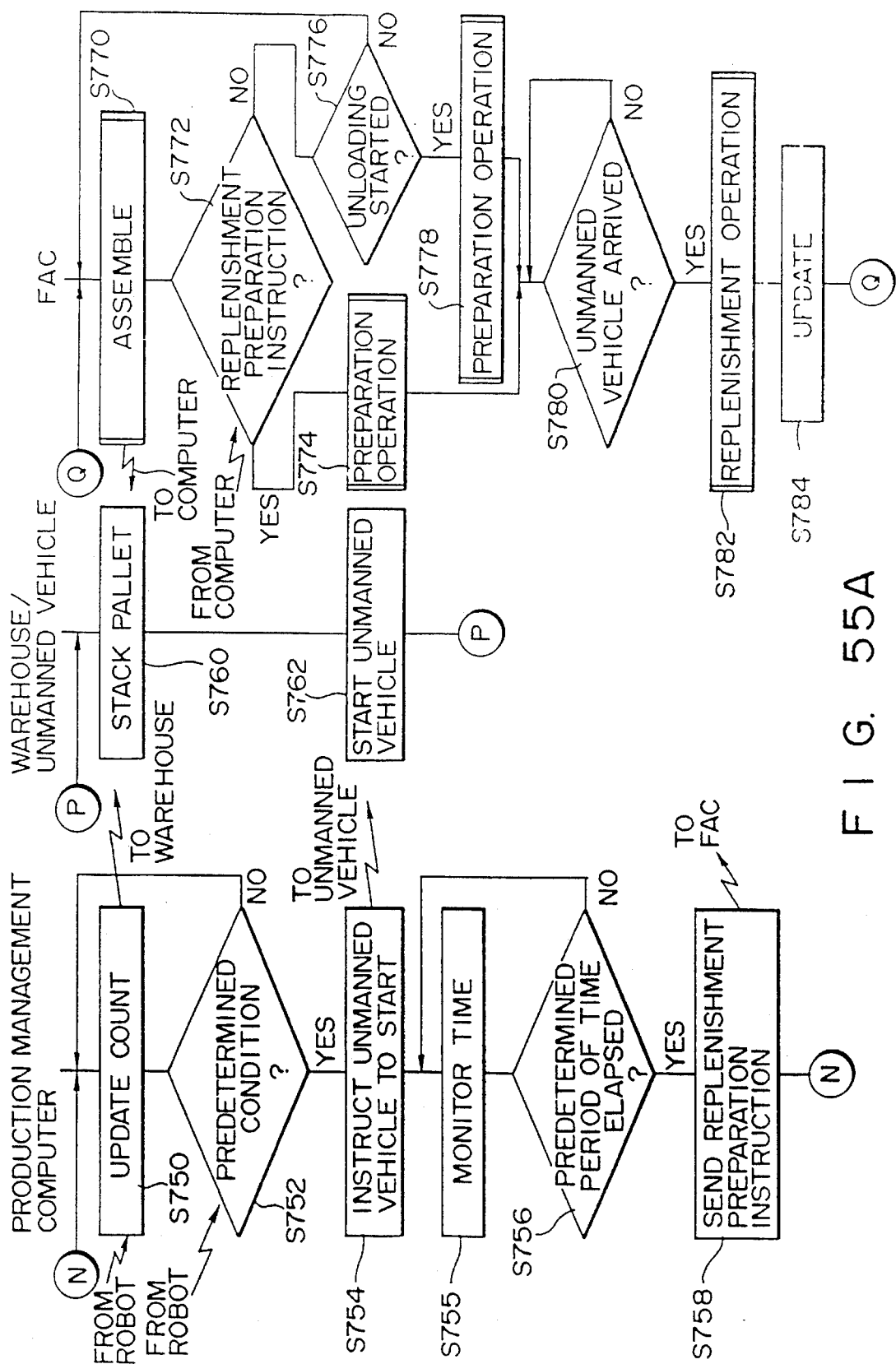
F I G. 55A

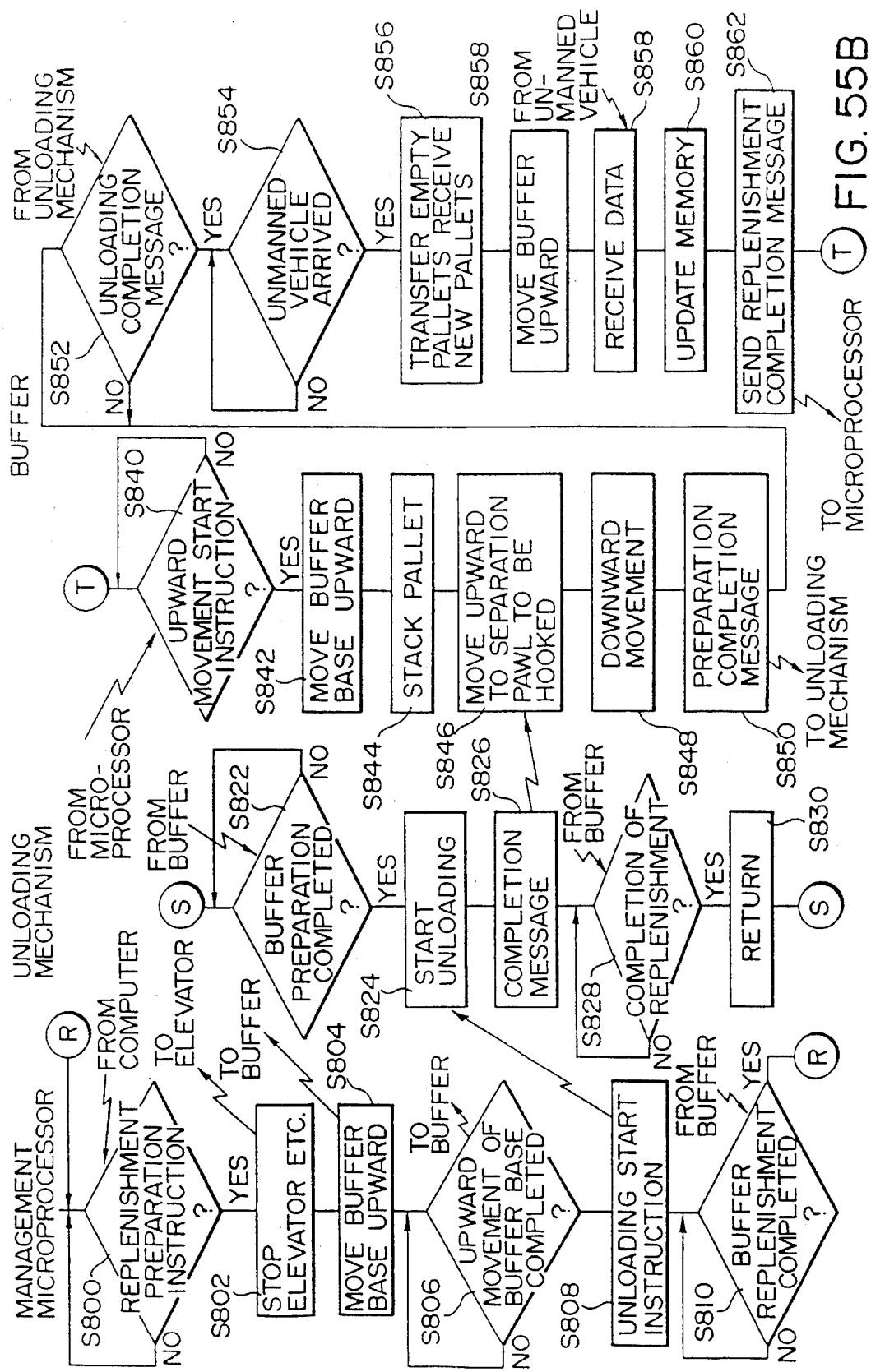

| ORDER | REQUESTED PARTS NAME | ORDER |
|---|---|---|
| 1 | PARTS NAME | |
| 2 | ///////// | //// |
| 3 | | |
| 4 | | |
| 5 | | |
| 6 | | |
| 7 | | |

F I G. 56A

| PALLET REPLENISHMENT | COMPLETION OF PREPRATION |
|---|---|

F I G. 56B

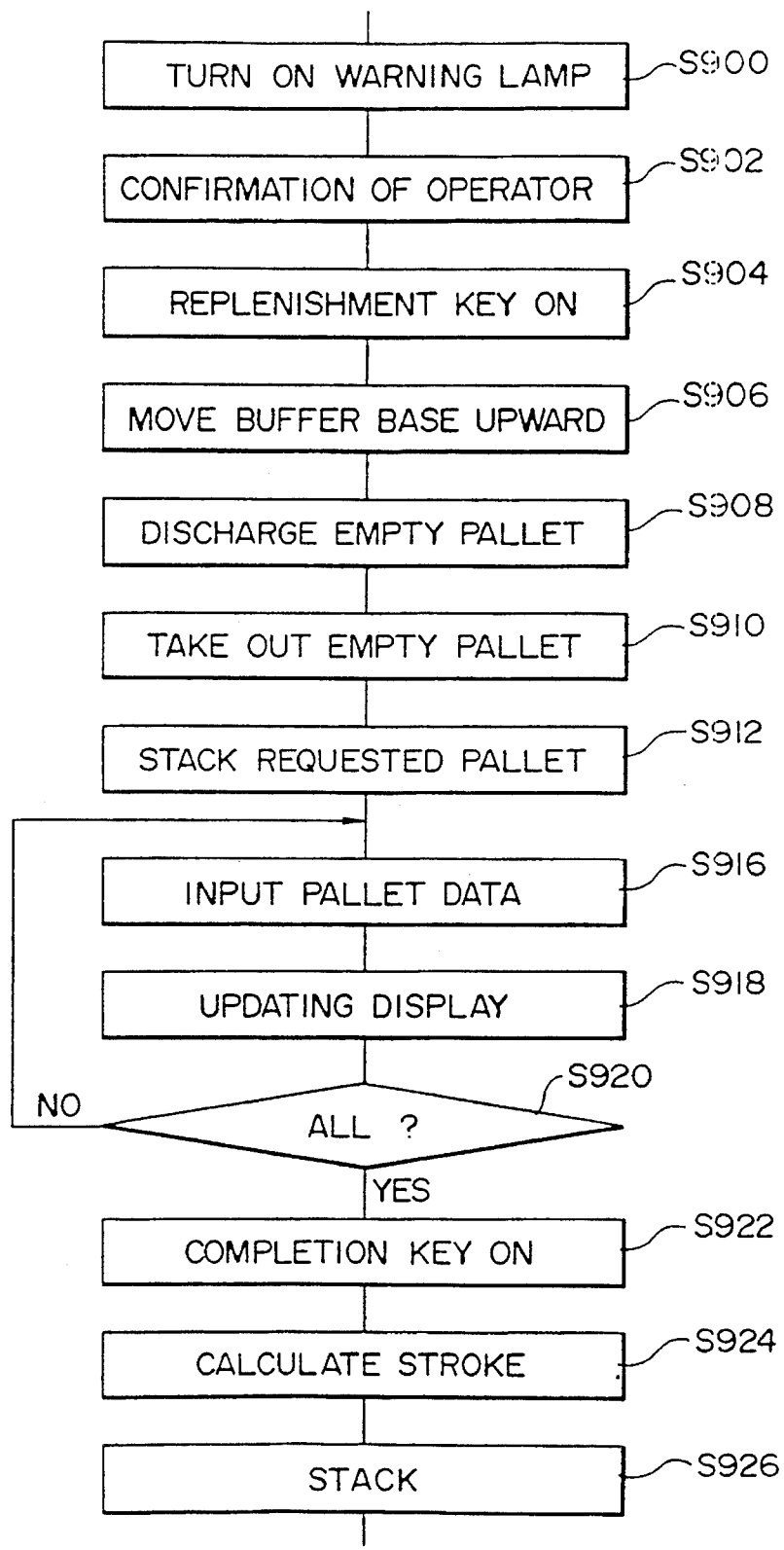
F I G. 56C

AUTOMATIC ARTICLE FEEDING SYSTEM

This application is a continuation of divisional application Ser. No. 07/968,303, filed Oct. 29, 1992, abandoned, which is a divisional of Ser. No. 668,912, filed Mar. 13, 1991, now U.S. Pat. No. 5,232,331, issued Aug. 3, 1993, which is a divisional application of Ser. No. 07/227,307, filed Aug. 2, 1988, abandoned.

BACKGROUND OF THE INVENTION

1. Technical Field of the Invention

The present invention relates to an automatic article feeding apparatus for feeding articles such as parts or units to an assembling/processing machine, and the like and, more particularly, to an article feeding apparatus capable of feeding a necessary number of articles required by the assembling/processing machine without delaying the feeding of articles.

2. Prior Art

The present applicant proposed article feeding apparatuses belonging to the same technical field as that of the present invention in Japanese Patent Application Nos. 60-195594 (filed on Sep. 4, 1985), 61-200949 (filed on Aug. 27, 1986), 61-200950 (filed on Aug. 27, 1986), and 60-159610 (filed on Jul. 19, 1985). The former three out of these four applications were consolidated and correspond to U.S. Pat. No. 4,932,828, and the last one corresponds to U.S. Pat. No. 4,844,680.

The article feeding apparatuses according to these four applications are ones for feeding, to an assembling machine, articles to be assembled therein. Each article feeding apparatus comprises a stocking means (stocker in one embodiment), adjacent to the assembling machine, capable of stocking a plurality of pallets upon feeding articles. The stocking meant is connected to a pallet feeding means and a pallet discharging means. The pallet feeding means has a function of simultaneously receiving a plurality of pallets from a pallet conveying vehicle, and separating one pallet from the plurality of pallets. The pallet discharging means has the function of discharging an empty pallet from the stocking means.

Each article feeding apparatus according to the previous applications employs an arrangement in which the stocking means, feeding means, and pallet discharging means are arranged two-dimensionally on a single plane. As a result, the article feeding apparatus requires a large installation area, and factory layout is made complicated and difficult.

Since the feeding means and the pallet discharging means are arranged two-dimensionally, different moving paths of conveying means must be prepared. The entire system of the article feeding apparatus including the conveying means is complicated.

Furthermore, each article feeding apparatus according to the previous applications does not have a function of separating and drawing out an arbitrary pallet from a plurality of pallets which are fed from a feed source and are stacked. In other words, each article feeding apparatus of the previous applications is suitable for one in which identical articles are fed to all the pallets and the identical articles are fed to a receiving portion.

As applications by others which belong to the same technical field as that of the present invention, Japanese Patent Laid-Open (Kokai) Nos. 60-122632 (Laid-Open date; Jul. 1, 1985), 61-206708 (Laid-Open date; Sep. 13, 1986), and 61-168452 (Laid-Open date; Jul. 30, 1986) are known.

Japanese Patent Laid-Open (Kokai) No. 60-122632 relates to an automatic parts array feeding apparatus for storing a variety of parts arrays in a predetermined container, sequentially taking out the stored parts arrays, and automatically feeding the taken-out parts array to an arbitrary position. This patent discloses the apparatus comprising a stack separating unit for stacking and storing containers and separating these containers, a pusher for pushing out the separated containers, an intermediate holding unit for moving an empty container downward to keep a stock space for the next full container, and holding the container, a lifter for stacking and discharging empty containers, and an unloading conveyor for unloading an empty container.

Japanese Patent Laid-Open (Kokai) No. 61-206708 relates to a tray transferring apparatus for automatically transferring a tray on which a large number of products or parts are placed in a working unit of a product working section in accordance with a work content so as to send and receive products or parts. This patent discloses the apparatus comprising a plurality of stages of stock units for loading/unloading and supporting a tray, a transfer machine for loading/unloading the tray to/from these stock units, an elevating member for placing the tray unloaded from the stock unit thereon, a driving device for driving the elevating member, and a control unit.

Japanese Patent Laid-Open (Kokai) No. 61-168452 relates to an automatic large work feeding/taking-out apparatus for automatically feeding/taking out parts constituting a frame, mainly, a box-like work, of a relatively large work, such as a radio receiver, a radio receiver with a cassette tape recorder, a video tape recorder, a television set, or the like. This patent discloses that a rack stocking works in a plurality of stages is transferred to the work take-out position of a robot by a feeding conveyor so that a work in each stage of the rack is taken out, and when the works in the rack are used up, the rack is sent back by a transfer conveyor and a new rack stocking works is fed to the feeding conveyor.

U.S. Pat. No. 4,651,863 U.S. Ser. No. 790,765 cited by the examiner in examination of U.S. Ser. No. 903,412 filed by the present applicant (now U.S. Pat. No. 4,932,828, date of patent; Mar. 24, 1988, filed on Oct. 23, 1985) discloses a system for assembling electronic component kits, which relates to automated systems and more specifically to automated systems for constructing component kits for electronic printed circuit boards. This U.S. Ser. No. 790,765 is the continuing application of U.S. Ser. No. 528,022. The Japanese counterpart of U.S. Ser. No. 528,022 was provisionally published under Japanese Patent Laid-Open (Kokai) No. 60-56702 (Laid-Open Date; Apr. 2, 1985). The system disclosed in U.S. Pat. No. 4,651,863 is a system for assembling component kits, comprising:

(A) a multi-level carousel means, each of said multi-levels of said carousel being selectively movable in at least a first direction along a first closed path independently of any other multi-level, each level of said carousel having a plurality of storage bins such that when a selected level of said carousel is rotated, a selected storage bin is selectively positioned with respect to the said first path along which said carousel is rotated;

(B) first and second elevators in a fixed, horizontally spaced-apart relation adjacent to said first path,
    each elevator including a vertically movable carriage for movement between selected heights corresponding to selected multi-levels,
    each carriage having a horizontal, rotatable turntable thereon and carrying, first and second retractable-extendable tray engaging means located on one and the opposite sides, respectively, of the axis of rotation of said turntable and equally spaced therefrom, said tray engaging means being in parallel and reversed relation to each other so that movements of retraction and extension are in 180° opposite directions, said rotatable turntables being operable to one and a 180° opposite position in which said movements are perpendicular to said first path;

(C) component handling robot apparatus including a first tray receiving area longitudinally aligned with one of said sides of one of said turntables, and a second tray receiving area longitudinally aligned with one of said sides of the other of said turntables, and further including a robot intermediate said first and second areas and having a working range extending thereto, said working range further including a component collection kit area having kits there located to which components obtained from said first and second areas are delivered by said robot;

(D) means controlling said carousel means, said elevator carriages and turntables, said tray engaging means and said robot, for positioning a first selected storage bin carried by said carousel at a selected position and for elevating said carriage to a position in which an empty side of said first turntable is aligned with said first selected tray from which components are to be obtained, and for operating one tray engaging means to draw said first selected tray onto said first turntable, and then rotating said first turntable 180° and operating the other tray engaging means on the other side of said first turntable to place a second, at least partly used tray in the location from which said first selected tray was removed, and then lower said first turntable and to align the empty side thereof with said first tray receiving area and drawing a third tray from said first tray receiving area onto the previously empty side of said first turntable, then rotating said first turntable 180° and placing said first tray on said first tray receiving area, and then repeating the operation beginning with positioning a selected storage bin at a selected position, operating said second elevator carriage and turntable and associated parts in the same sequence, but in alternating relation to the first carriage, and in connection with the second tray receiving area so at least one of the first and second tray receiving areas has a tray thereon at any given time, and operating said robot to remove components from said first and second trays alternately and to place them in said component collection kits.

SUMMARY OF THE INVENTION

The present invention has been made in consideration of the above situation, and has as its principal object to provide an article feeding apparatus in which, when articles are fed from a feed source such as a warehouse to a section to be subjected to feeding such as an assembling machine, processing machine, and the like, a feeding position to the section to be subjected to feeding is fixed, so that articles can be efficiently fed without being interrupted.

To attain the above-mentioned object, there is provided an article feeding apparatus which feeds articles from a feed source to a section to be subjected to feeding, comprising:

stocking means for stocking a plurality of containers retaining a plurality of articles in units of types of articles, the stocking means capable of moving one container to a predetermined position;

take-out means for taking the container moved to the predetermined position outside the stocking means in order to feed articles to the section to be subjected to feeding;

temporary storing means for temporarily storing the plurality of containers, upon receiving replenishment of the containers retaining the articles from external equipment; and replacing means for replacing a container in the stocking means with a container in the temporary storing means in accordance with a decrease in number of articles in the container in the stocking means to a predetermined value upon article feeding to the section to be subjected to feeding.

It is another object of the present invention to provide an article feeding apparatus with good work efficiency, which can quickly replace a full container with an empty container even if a stock order of containers in a stocking means is randomly set regardless of a feeding order.

To attain the above-mentioned object, there is provided an article feeding apparatus which feeds articles from a feed source to a section to be subjected to feeding, comprising:

stocking means for stocking a plurality of containers each retaining a plurality of articles;

moving means for reciprocally moving the stocking means so that one of the plurality of containers is located at a predetermined position;

feeding means for feeding the articles from one container located at the predetermined position of the stocking means to the section to be subjected to feeding;

memory means for storing a separation relationship between positions of the containers in the stocking means and the predetermined position; and control means for, when one container is moved to the predetermined position in accordance with a predetermined moving order, reading out the separation relationship between the position of the one container and the predetermined position and controlling the moving means to move the stocking means based on the separation relationship.

It is still another object of the present invention to provide an article feeding apparatus in which containers retaining articles are always stocked in a stocking means, and a wait time of article feeding to a section to be subjected to feeding can be minimized.

To attain the above-mentioned object, there is provided an article feeding apparatus which feeds articles from a feed source to a section to be subjected to feeding, comprising:

stocking means for stocking a plurality of containers each retaining a plurality of articles;

draw-out means for drawing out the container from said stocking means in order to feed articles to the section to be subjected to feeding;

discharging means for discharging an empty container with no articles from the plurality of containers stocked in the stocking means; and control means for controlling operations of the stocking means, the draw-out means, and the discharging means, the control means being arranged so as to complete a discharging operation for discharging the empty container by the discharging means within a draw-out operation time of the container to the section to be subjected to feeding by the draw-out means.

It is still another object of the present invention to provide an article feeding apparatus in which types and numbers of articles which are requested by a section to be subjected to feeding are prepared so as to efficiently feed articles.

To attain the above-mentioned object, there is provided an article feeding apparatus which feeds articles from a feed source to a section to be subjected to feeding, comprising:

temporary storing means for temporarily storing the plurality of containers, upon receiving replenishment of containers each retaining a plurality of articles from the feed source;

separating means for separating a predetermined container from the plurality of containers stored in the temporary storing means;

stocking means for stocking the plurality of containers supplied from the temporary storing means so as to feed articles to the section to be subjected to feeding in accordance with a predetermined feed order;

supply means for performing a preparation operation for separation by the separating means so as to supply a new container from the temporary storing means to the stocking means, and a supply operation for supplying the separated container to the stocking means;

first counter means for counting the number of articles remaining in each of the plurality of containers in the stocking means; and control means for causing the supply means to perform the preparation operation for supplying a new container in place of the container whose count value has reached a predetermined value when the count value held in the first counter means has reached the predetermined value.

It is still another object of the present invention to provide an article feeding apparatus capable of minimizing a wait time in response to a replacement request from a section to be subjected to feeding.

To attain the above-mentioned object, there is provided an article feeding apparatus which feeds articles from a feed source to a section to be subjected to feeding, comprising:

temporary storing means for temporarily storing the plurality of containers, upon receiving replenishment of containers each retaining a plurality of articles from the feed source;

memory means for storing correspondences between the plurality of containers in the temporary storing means and articles retained therein;

stocking means for stocking the containers supplied from the temporary storing means in order to feed articles to the section to be subjected to feeding in accordance with a predetermined feed order;

separating/supply means for separating a specific container from other containers in the temporary storing means and supplying the separated container to the stocking means; and control means for, when the number of articles in a container is decreased along with feeding of articles to the section to be subjected to-feeding, searching a storage position of a container retaining the corresponding articles in the temporary storing means based on the correspondence between the articles and the containers stored in the memory means, and causing the separating/supply means to separate/supply the searched container.

It is still another object of the present invention to provide an article feeding apparatus which can improve installation space efficiency, and can reliably cope with an increase in types of articles and number of containers.

To attain the above-mentioned object, there is provided an article feeding apparatus which feeds articles from a feed source to a section to be subjected to feeding, comprising:

temporary storing means for temporarily storing the plurality of containers, upon receiving replenishment of containers each retaining a plurality of articles from the feed source, the temporary storing means including:

a base on which the plurality of containers are stacked; and separating means for separating a predetermined container from other containers of the plurality of containers stacked on the base;

stocking means for storing the containers so as to feed articles to the section to be subjected to feeding;

signal generating means for generating a signal requesting a draw-in operation of a predetermined container to the stocking means from the plurality of containers stacked on the base;

drive means for vertically moving the base so that the predetermined container requested by the signal generating means opposes the separating means; and discriminating means for discriminating whether or not the container vertically moved to the position opposing the separating means by the drive means is a container requested by the signal generating means.

Other features and advantages of the present invention will be apparent from the following description taken in conjunction with the accompanying drawings, in which like reference characters designate the same or similar parts throughout the figers thereof.

BRIEF DESCRIPTION OF THE DRAWINGS

FIG. 6 is a perspective view showing an arrangement of a buffer;

FIG. 10 is a side view showing an elevator body in the elevator together with a replacing mechanism;

FIG. 16 is a side view of the lid opening mechanism in a state wherein a lid is lifted up;

FIGS. 19A to 19C are views showing an input menu for an input device and its display state;

FIG. 21A is a view for explaining variables commonly used in control modules;

FIG. 21B is a view for explaining a format of queues;

FIG. 24C is a view for explaining a transition state of a process number in stocker control;

FIG. 25A is a view for explaining a format of variables used in buffer control;

FIGS. 27A to 27G are views for explaining the pallet replacement operation sequence using the elevator as a major component;

FIG. 30 is a flow chart of a control program according to a first modification;

FIG. 32 is a front view showing a state wherein a maximum disposition pitch of separation pawls in a stack separating mechanism shown in FIG. 31 is set;

FIG. 33 is a front view showing a state wherein a minimum disposition pitch of separation pawls in the stack separating mechanism shown in FIG. 31 is set;

FIG. 41 is a partially cutaway front view of the replacing mechanism shown in FIG. 40;

FIGS. 42A to 42H are schematic front views sequentially showing the operation of the third modification;

FIG. 43 is a perspective view showing a buffer comprising a lift mechanism according to a fourth modification;

FIGS. 50C and 50D are views showing a pallet replacement operation sequence of the embodiment of FIG. 47;

FIG. 52 is a perspective view showing a case wherein an engaging hole is formed in the lower surface of a flange of a pallet;

FIG. 53 is a front view showing an arrangement of a lock mechanism for locking a supporting position of a pallet in the pallet;

FIG. 54 is a side view of the lock mechanism shown in FIG. 53;

FIGS. 55A and 55B are flow charts showing a control program associated with a replenishment operation of a pallet to a buffer through an unmanned vehicle;

FIGS. 56A and 56B are views showing input displays in an operation associated with manual replenishment of a pallet to the buffer; and FIG. 56C is a view showing an operation sequence associated with manual replenishment of a pallet to the buffer.

DETAILED DESCRIPTION OF THE PREFERRED EMBODIMENTS

Figure 1:
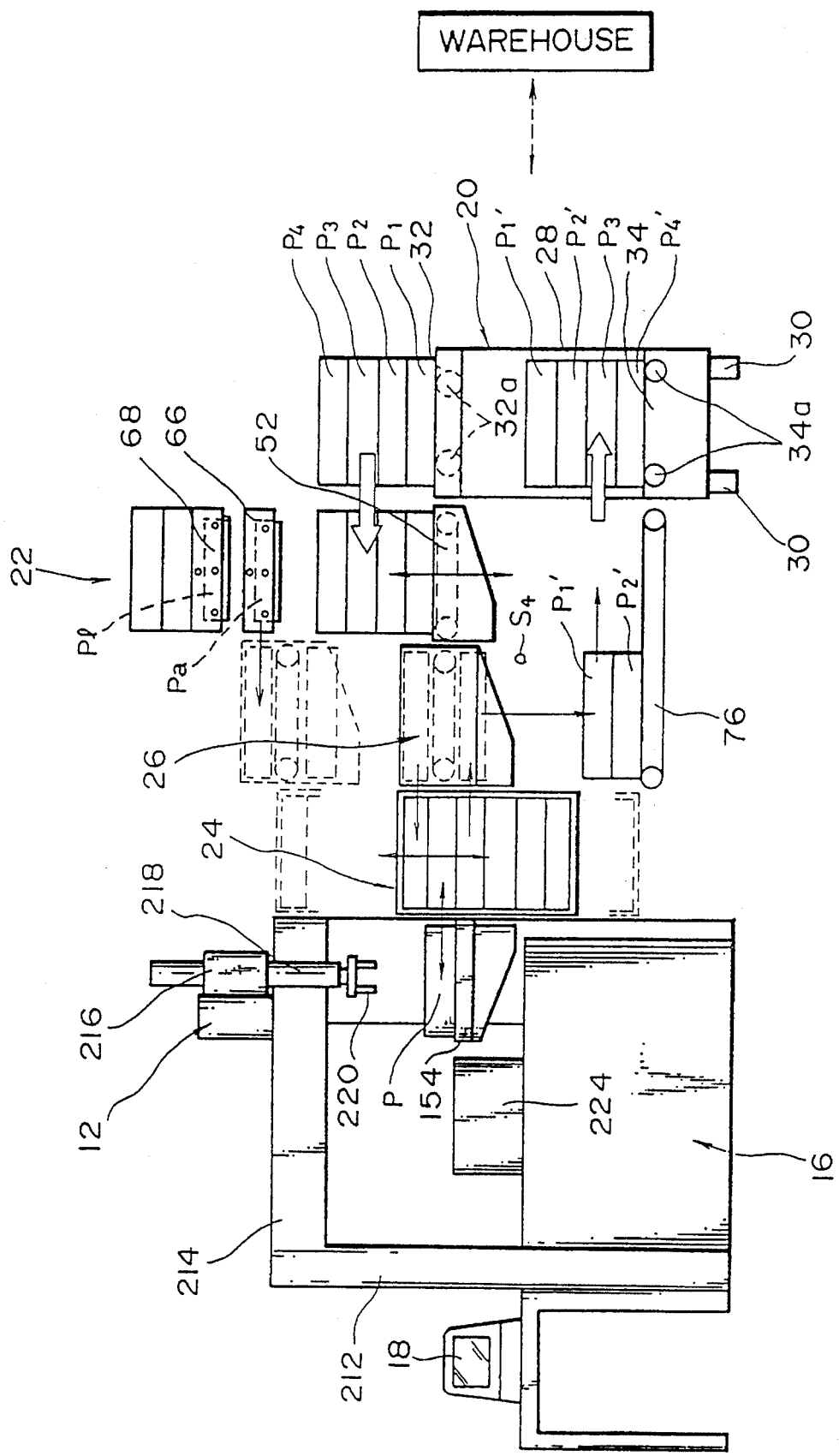
FIG. 1 is a schematic front view showing the overall arrangement of one embodiment of an FAC system according to the present invention.

An arrangement of an embodiment according to the present invention will be described hereinafter with reference to the accompanying drawings.

The following description is made in the order of contents below.

TABLE OF CONTENTS

Schematic Arrangement
Description of Unmanned Vehicle
Description of Pallet
   Arrangement of Pallet
   Size of Pallet
Description of Buffer
   Arrangement of Buffer Base
   Arrangement of Separation Mechanism Operation of Buffer
  Basic Separating Operation
  Position correction operation
Description of Elevator
  Arrangement of Elevator Body
  Arrangement of Replacing Mechanism
  Operation of Replacing Mechanism
    Take-in Operation from Buffer
    Draw-in Operation of Empty Pallet
    Push-out Operation of Pallet
    Unloading Operation of-Empty Pallet
Description of Stocker
  Arrangement of Stocker
  Arrangement of Draw-out Unit
  Arrangement of Lid Opening Mechanism
  Operation of Lid Opening Mechanism
  Operation of Draw-out Unit
Description of Robot
  Arrangement of Robot
  Operation of Robot
Operation of System
  Arrangement of Control Unit
  Inputting of Assembly Environment
  Variation Factors of Parts Feeding Efficiency
  Other Display Elements
  Variables used in Control
  Vertical Movement Range of Modules
  Summary of Operation of Pallet Replacement
  Detailed Description of each Module Control
Control of Robot and Stocker
  Until Remaining Parts Count Becomes 1
  When Remaining Parts Count Has Reached 1
Pallet Replacement
  Pallet Separation by Buffer
  Pallet Draw-out by Elevator
  Elevator Replacement Standby Position
  Movement to Standby Position
  Detection of Remaining Parts Count 0
  Stack of Empty Pallets
  Replacement of Final Shelf
Queuing of Replacement Preparation Instruction
Initial Operating State Setting
Description of Modifications
  Description of First Modification
    Arrangement of Stack Separating Mechanism
    Operation of Stack Separating Mechanism
  Description of Second Modification
    Description of Elevator
  Description of Third Modification
    Description of Replacing Mechanism
    Control
  Description of Fourth Modification
    Arrangement
    Control
 Another Embodiment
  Arrangement
  Control
  Modification of Another Embodiment
Others
  Locking of Pallets in Stocker Parts Replenishment to FAC
  Replenishment by Unmanned Vehicle
  Manual Replenishment
Effects of Embodiments

SCHEMATIC ARRANGEMENT

The schematic arrangement of a flexible assembling center (to be referred to as an FAC hereinafter) 10 of this embodiment will be described hereinafter with reference to FIGS. 1 and 2.

The FAC 10 comprises an automatic assembling device (to be referred to simply as a robot hereinafter) 12 for automatically assembling a predetermined product from a plurality of parts $x_1, x_2, x_3, \ldots$, a parts feeding system 14 for automatically feeding, to the robot 12 the necessary parts $x_1, x_2, x_3, \ldots$ according to the assembling order, a control unit 16, connected to both the robot 12 and the parts feeding system 14, for driving and controlling them so that an assembling operation of the robot 12 can be efficiently executed, and an input/output (I/O) device 18, connected to the control unit 16, with which assembling information data is input by an operator.

The parts feeding system 14 receives a variety of parts $x_1, x_2, x_3, \ldots$ stocked in an automated warehouse (not shown) through a plurality of unmanned vehicles 20 (FIG. 1). More specifically, the parts feeding system 14 basically includes a buffer 22, a stocker 24, and an elevator 26. Buffer 22 serves as a temporary storing means for receiving and temporarily retaining the parts $x_1, x_2, x_3, \ldots$ from the unmanned vehicles 20. Stocker 24, as means arranged adjacent to the robot 12, sequentially feeds parts necessary for assembly to the robot 12 according to the assembling order. Elevator 26, disposed between the buffer 22 and the stocker 24, as a specific form of transfer means, transfers the parts $x_1, x_2, x_3, \ldots$, which are short in the stocker 24, from the buffer 22 to the stocker 24.

DESCRIPTION OF UNMANNED VEHICLE

Unmanned vehicles 20 are equipped so as to selectively load, to the buffer 22, parts $x_1, x_2, x_3, \ldots$ to be subjected to assembly among a large number of parts $x_1, x_2, x_3, \ldots$ stocked in the unmanned warehouse. More specifically, each unmanned vehicle 20 comprises a rectangular parallel piped casing 28 constructed from frames, wheels 30 attached to the lower surface of the casing 28, and pallet table 32 mounted on the upper surface of casing 28, as schematically shown in FIG. 1. The wheels 30 are driven by a drive mechanism (not shown).

Each unmanned vehicle 20, upon driving of the wheels 30, travels between the unmanned warehouse and buffer 22 along a road surfaced travel path. This travel state is optimally controlled by a production management computer (to be described later). The selection operation of the parts $x_1, x_2, x_3, \ldots$ conveyed to buffer 22 and the placing operation onto each unmanned vehicle 20 are optimally controlled by the control unit 16 mentioned above.

A plurality of pallets $p_1, p_2, p_3, \ldots$ respectively retaining parts $x_1, x_2, x_3, \ldots$ are stacked on the above-mentioned pallet table 32. An empty pallet table 34 is provided on the lower surface of the casing 28 so that a plurality of empty pallets $p_1', p_2', p_3', \ldots$ are stacked thereon. In the following description, unless otherwise specified, pallets in which at least one part is retained are represented by "p" without suffixes, and empty pallets are represented by "p'" without suffixes.

The pallet table 32 has unloading rollers 32a for unloading the pallets $p_1$, $p_2$, $p_3$, stacked thereon and retaining the parts $x_1$, $x_2$, $x_3$, . . . The empty pallet table 34 has loading rollers 34a for loading empty pallets $p_1'$, $p_2'$, $p_3'$, . . . stacked thereon. These unloading and loading rollers 32a and 34a are rotated by a drive motor (not shown).

DESCRIPTION OF PALLET

Arrangement of Pallet

Figure 3:
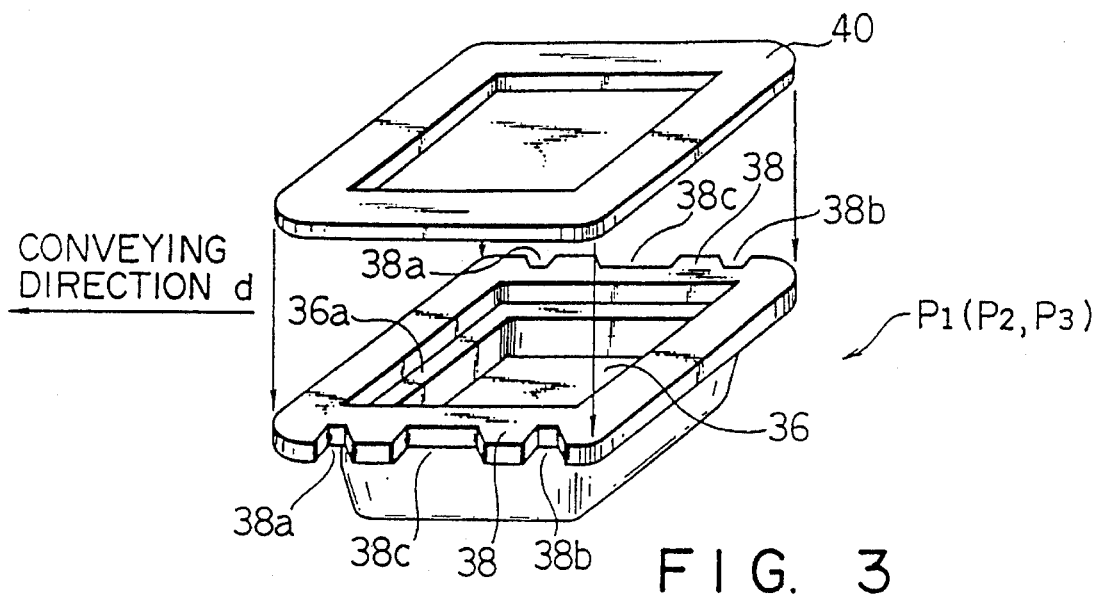
FIG. 3 is a perspective view showing an arrangement of a pallet retaining parts.

The parts $x_1$, $x_2$, $x_3$, . . . are retained in the corresponding pallets $p_1$, $p_2$, $p_3$, . . . The parts retained in the pallets $p_1$, $p_2$, $p_3$, . . . are stacked on each unmanned vehicle 20, and are temporarily stored in buffer 22, which are then stocked in the stocker 24 through the elevator 26. The parts $x_1$, $x_2$, $x_3$, . . . are then provided to the robot 12. More specifically, the pallets $p_1$, $p_2$, $p_3$, . . . retain identical types of parts $x_1$, $x_2$, $x_3$, . . . As shown in FIG. 3, each pallet p includes a pallet body 36 and flanges 38. Pallet body 36 with an open upper surface, retains and then loads/unloads in a vertical direction corresponding parts $x_1$, $x_2$, $x_3$, . . . Flanges 38 are integrally molded to extend outwardly at two side edges of the pallet body 36 along at least the conveying direction d of the pallets $p_1$, $p_2$, $p_3$, . . . As can be seen from an illustrated shape, the flanges 38 are actually formed around the overall periphery of the pallet body 36. A lid 40 for removably closing the upper open surface of the pallet body 36 is placed on the pallet body 36.

As shown in FIG. 3, first and second notches 38a and 38b are formed at both end portions of each flange 38. A third notch 38c is formed at the center thereof. The first and second notches 38a and 38b are formed to take out pallets $p_1$, $p_2$, $p_3$, . . . from the buffer 22 to the elevator 26 or to take them out or draw them in from the stocker 24 to the robot 12 or the elevator 26. The central third notches 38c are formed so that a lifting member (to be described later) is inserted therethrough to lift and then remove the lid 40 from pallet body 36. As a result, the pallet body 36 stocked in the stocker 24 can be taken out to the side of the robot 12 while the upper surface of the pallet body 36 is open.

Each of the first and second notches 38a and 38b is formed of a recess having a substantially isosceles trapezoidal shape in the plane, with the shorter base defining the bottom of the recess.

More specifically, the lid 40 covers the opening of the upper surface of the corresponding pallet $p_1$, $p_2$, $p_3$, . . . until the final stage where the robot 12 handles the parts $x_1$, $x_2$, $x_3$, . . . , i.e., in other words, until the pallets $p_1$, $p_2$, $p_3$, . . . are moved to a draw-out standby position (to be described later) in the stocker 24. Thus, the parts $x_1$, $x_2$, $x_3$, . . . can be prevented from being contaminated with dust or the like.

Size of Pallet

Figure 4:
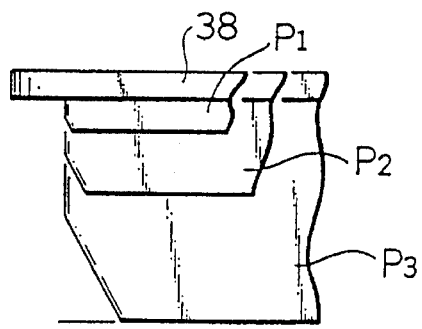
FIG. 4 is a front view showing shapes of pallets having three different heights.

These pallets $p_1$, $p_2$, $p_3$, . . . are of three-types having thicknesses, i.e., 25 mm, 50 mm, and 100 mm in accordance with the parts to be retained, as shown in FIG. 4. In the following description, for the sake of simplicity, small parts $x_1$, with a maximum number of 54, are retained in the pallet $p_1$ having a thickness of 25 mm, medium parts $x_2$, with a maximum number of 38, are retained in the pallet $p_2$ having a thickness of 50 mm, and large parts $x_3$, with a maximum number of 13, are retained in the pallet $p_3$ having a thickness of 100 mm.

Figure 5:
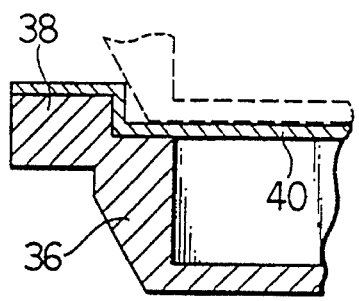
FIG. 5 is a sectional view showing a stacked state of pallets.

The thicknesses of the flanges 38 of the pallets $p_1$, $p_2$, $p_3$, are commonly set to be 12 mm. A recess 36a is formed in the entire inner periphery of each pallet body 36 to receive the lower portion of a pallet body 36 immediately thereabove (indicated by a broken line in FIG. 5), thereby preventing lateral position shifting. The depth of the recess 36a is set to be 7 mm. In this manner, when the three types of pallets $p_1$, $p_2$, and $p_3$ are stacked one by one, the height of this stack is set to be:

$$25+50+100-7 \times 2=1.61 \text{ mm}$$

Note that a bar code B, indicating data of the type or number of parts $x_1$, $x_2$, $x_3$, . . . retained in the corresponding one of the pallets $p_1$, $p_2$, $p_3$, . . . as well as the height data of the corresponding pallet, is printed on the side surface of the flange 38 of each of the pallets $p_1$, $p_2$, $p_3$, . . . , as shown in FIG. 3.

DESCRIPTION OF BUFFER

The buffer 22, for receiving and temporarily storing the pallets $p_1$, $p_2$, $p_3$, retaining the parts $x_1$, $x_2$, $x_3$, . . . from the pallet table 32 of the unmanned vehicle 20 arranged as described above, and for loading empty pallets $p_1$, $p_2$, $p_3$, . . . to the unmanned vehicle 20, will be described hereinafter with reference to FIG. 6.

Arrangement of Buffer Base

The buffer 22 has a base 42 fixed on a frame (not shown), columns 44a, 44b, 44c, and 44d standing at the four corners of the base 42, and standing plates 46a and 46b respectively standing and bridging the inner surfaces of the pair of columns 44a and 44b and the pair of columns 44c and 44d along the conveying direction d of the pallets $p_1$, $p_2$, $p_3$, . . . Guide members 48 are fixed along the vertical side edges of the opposing surfaces of the standing plates 46a and 46b. A slidable member 50 is arranged along each guide member 48 to be vertically slidable. A buffer base 52 is mounted to be supported by these four slidable members 50 at four corners.

The buffer base 52 receives the pallets $p_1$, $p_2$, $p_3$, . . . retaining the parts $x_1$, $x_2$, $x_3$, . . . from the above-mentioned unmanned vehicle 20. Loading rollers 54 for receiving the pallets $p_1$, $p_2$, $p_3$, . . . stacked thereon and retaining the parts $x_1$, $x_2$, $x_3$, . . . are disposed on the buffer base 52 so as to be rotatably supported by roller guides 56 at both their ends. These loading rollers 54 are rotated by a drive motor (not shown).

A slit 58 extending in the vertical direction is formed in a portion sandwiched between the guide members 48 of the left standing plate 46b in FIG. 6. A projection 52a is integrally formed on the buffer base 52 to extend through the slit 58.

The buffer base 52 is vertically movable to separate a pallet p in which the count of remaining parts x becomes 1 from the pallets $p_1$, $p_2$, $p_3$, . . . in the stocker 24, and to thereon replace p' with another pallet p so as to replenish the parts x.

More specifically, a servo motor $M_B$ for moving the buffer base 52 in the vertical direction along the guide members 48 is disposed between the upper ends of the pair of columns 44c and 44d to which the far-side standing plate 46b is attached. The servo motor $M_B$ comprises a rotating shaft extending along the vertical direction, and the rotating shaft is connected to rotate a ball screw 60 which is rotatably disposed between the columns 44c and 44d and extends along the vertical direction. A portion midway along the ball screw 60 is held in the threaded engagement with the above-mentioned projection 52a. In this manner, when the rotating shaft of the servo motor $M_B$ is rotated, the ball screw 60 is rotated, thereby moving the buffer base 52 in a vertical direction.

Note that an encoder 62 for detecting an angular position of the servo motor $M_B$, i.e., the vertical position of the buffer base 52 is attached to the servo motor $M_B$.

Arrangement of Separation Mechanism

With the above arrangement, the buffer base 52 can be vertically moved to an arbitrary vertical position. As described above, in order to separate a specific pallet p from the pallets $p_1, p_2, p_3, \ldots$ stacked on the buffer base 52, the buffer 22 comprises a separation mechanism 64.

The separation mechanism 64 comprises a pair of first separation pawls 66 arranged at the upper end of each of the standing plates 46a and 46b, and a pair of second separation pawls 68 disposed below the first separation pawls 66 at a predetermined interval. Note that the first and second separation pawls 66 and 68 are arranged at the identical vertical positions on both the standing plates 46a and 46b.

The first and second separation pawls 66 and 68 are arranged to be capable of hooking the flanges 38 of the pallets $p_1, p_2, p_3, \ldots$ stacked on the buffer table 52 from both sides. In other words, the first and second separation pawls 66 and 68 attached to the standing plates 46a and 46b are reciprocal between a projecting position at which the flanges 38 are hooked from below, and a retracted position at which the pawls are separated from the flanges 38.

More specifically, each pair of first separation pawls 66 integrally have supporting rods 70 extending through the corresponding standing plate 46a of 46b to the rear surface. The supporting rods 70 are integrally connected through a connecting plate 72 at the rear surface of the standing plate 46a or 46b, as shown in FIG. 6. The connecting plate 72 is connected to a first air cylinder $C_{B1}$ for reciprocating the first separation pawls 66. In this manner, the first separation pawls 66 are reciprocally driven between the projecting and retracted positions upon driving of the first air cylinder $C_{B1}$.

Since the structure for driving the second separation pawls 68 is substantially the same as that for driving the first separation pawl 66 (excepting that a second air cylinder $C_{B2}$ is arranged as a drive source), a detailed description thereof will be omitted.

The distance between the first and second separation pawls 66 and 68 described above is set to be 110 mm, which is slightly larger than 100 mm as the maximum height of the pallets $p_1, p_2, p_3, \ldots$ A bar code reader 74 for reading the bar code B printed on the pallet p is arranged beside the pallet p which is hooked by the first separation pawls 66. Since the arrangement of the bar code reader 74 is known to those who are skilled in the art, a description thereof will be omitted.

An unloading mechanism 76 is arranged on the base 42 to extend to the lower position of the elevator 26 (i.e., a position adjacent to the stocker 24). The unloading mechanism 76 is arranged to unload empty pallets $p_1', p_2', p_3', \ldots$ at the stocker 24 to the empty pallet table 34 of the unmanned vehicle 20 described above, and comprises a plurality of unloading rollers 78. These unloading rollers 78 are rotated by a drive motor (not shown).

The vertical position of the unloading mechanism 76 is set to be the same as that of the empty pallet table 34 of the unmanned vehicle 20. The standby position of the buffer base 52 is set to be the same as the vertical position of the pallet table 32 of the unmanned vehicle 20.

OPERATION OF BUFFER

Basic Separating Operation

An operation for separating a given pallet pa from the pallets $p_1, p_2, p_3, \ldots$ stacked on the buffer base 52 in accordance with a request from the robot 12 (to be described later) will be described with reference to FIGS. 7A to 7D.

Figure 7A:
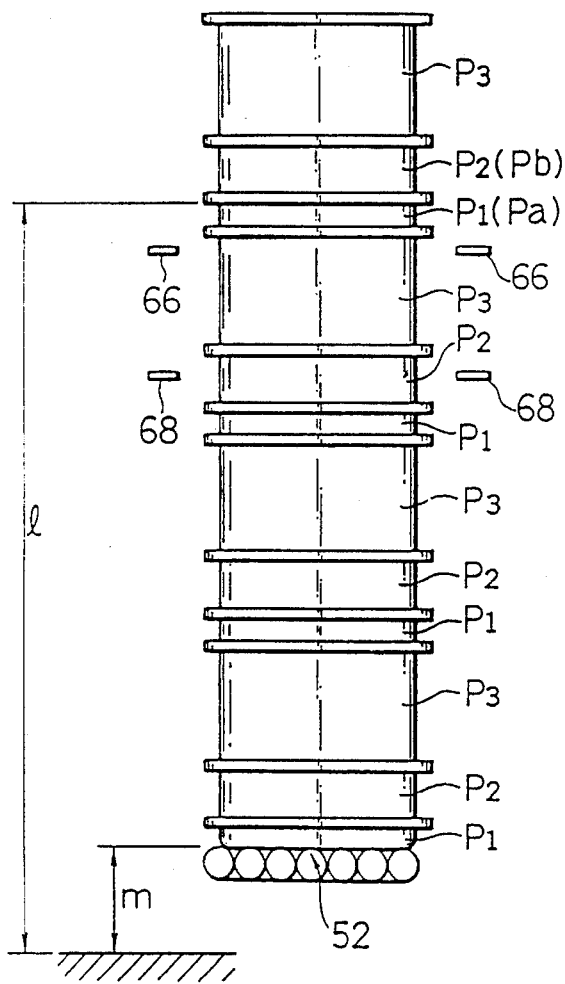
FIGS. 7A to 7D are front views sequentially showing a separation operation of a predetermined pallet pa in the buffer.

Assume that 12 pallets are stacked on the buffer base 52 in the order of $p_1, p_2, p_3, p_1, p_2, p_3, p_1, p_2, p_3, p_1, p_2,$ and $p_3$ from the lower direction, as shown in FIG. 7A. Note that pallets $p_1, p_2, p_3, \ldots$ having a total height of 800 mm can be stacked on the buffer base 52. In the above case, the 12 pallets have the total height of:

$$(25+50+100) \times 4 - 7 \times 11 = 623 \text{ mm}$$

In this state, when a request for separating the pallet $p_1$ retaining the parts $x_1$ is sent from the robot 12, an instruction is supplied to separate the third pallet $p_1$ from the top from the plurality of pallets $p_1$ stacked on the buffer base 52 according to the FIFO rule. In the following description, the third pallet $p_1$ from the top is denoted by reference symbol pa, and a pallet immediately thereabove, i.e., the second pallet from the top is denoted by reference symbol pb.

Figure 7B:
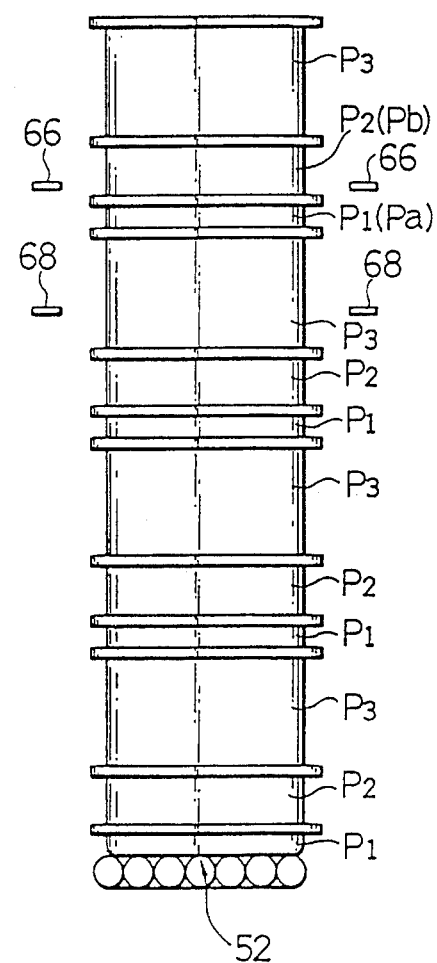

As described above, when the request for separating the pallet pa is sent from the robot 12, the buffer base 52 is moved (in this case, moved downward) until the pallet pb stacked immediately above the pallet pa to be separated is brought to a position where the pallet pb is hooked by the first separation pawls 66, as shown in FIG. 7B. Note that the first and second separation pawls 66 and 68 are moved to retracted positions in an initial state.

In the state illustrated in FIG. 7B, the first air cylinder $C_{B1}$ is actuated to bias and push out the first separation pawls 66 from the retrated position to the hooking position. Thus, the flanges 38 of the pallet pb can be hooked by the first separation pawls 66 from the lower direction.

Figure 7C:
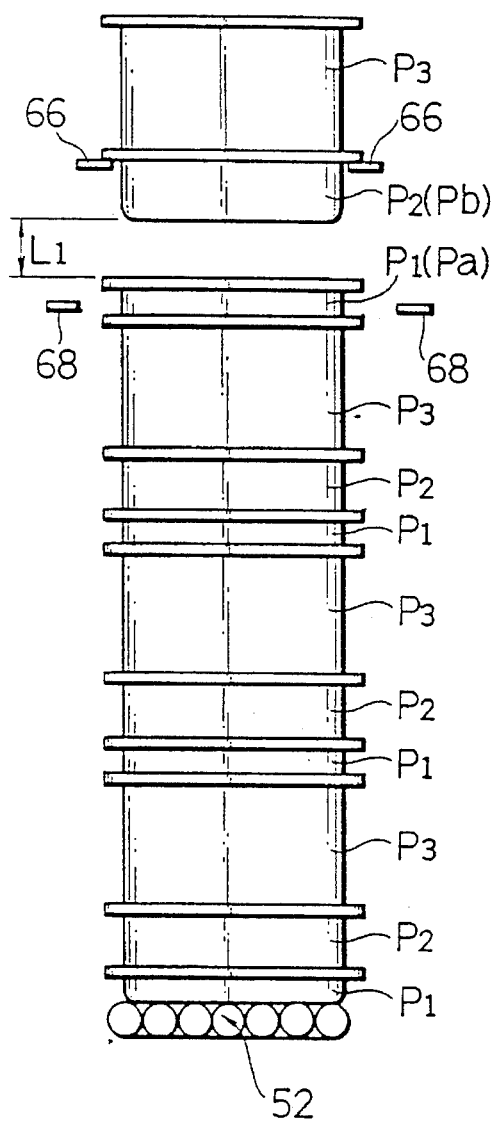

Thereafter, as shown in FIG. 7C, the servo motor $M_B$ is rotated so as to move the buffer base 52 downward by 94 mm from the state illustrated in FIG. 7B. As a result, the pallet pa is brought to the position where it can be hooked by the second separation pawls 68, and the pallet pb is hooked by the first separation pawls 66. More specifically, the pallet (or pallets) located above the pallet pb are hooked by the first separation pawls 66.

In the state illustrated in FIG. 7C, the second air cylinder $C_{B2}$ is actuated to bias and push out the second separation pawls 68 from the retracted position to the hooking position. Thus, the flanges 38 of the pallet pa can be hooked by the second separation pawls 68 from the lower direction.

Figure 7D:
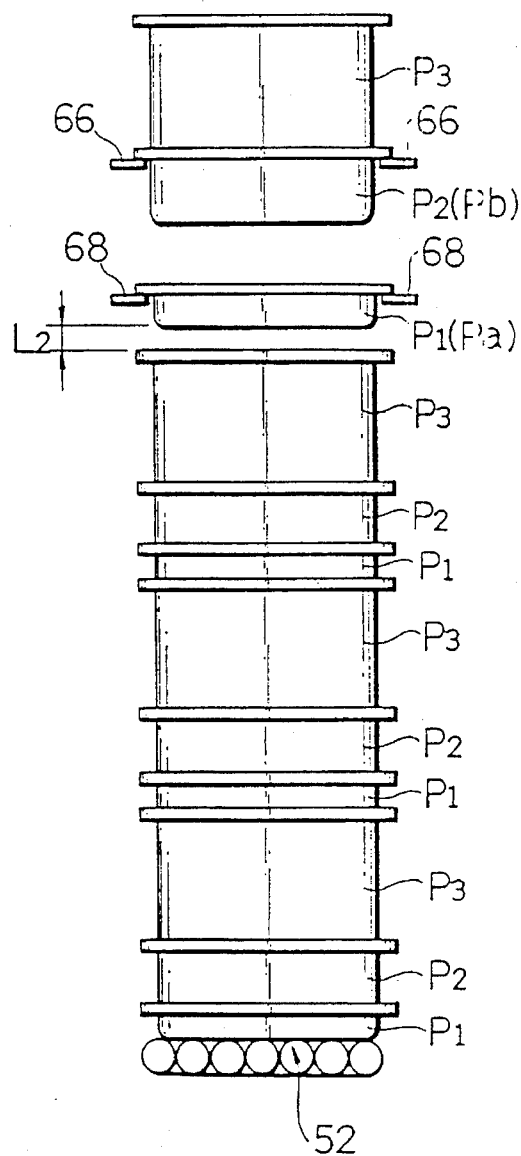

Thereafter, as shown in FIG. 7D, the servo motor $M_B$ is rotated to move the buffer base 52 downward by 15 mm from the state illustrated in FIG. 7C. As a result, only the pallet pa is hooked by the second separation pawls 68, and the pallets located therebelow are brought to a position separate from the pallet pa. In this manner, only the pallet pa, hooked by the second separation pawls 68 (to be simply referred to as a separation position hereinafter) and separated from other pallets, is set in a state wherein it can be removed.

After the pallet pa separated in this manner is taken out to the elevator 24 (to be described later), all the pallets are returned to be stacked on the buffer base 52 in the initial state such that any pallet can next be separated.

In this return operation, the second air cylinder $C_{B2}$ is operated to retract the second separation pawls 68 from the hooking position in a manner opposite to that described above. Thereafter, the servo motor $M_B$ is rotated to move the buffer base 52 upward by 134 mm (i.e., a value obtained by adding the thickness of the taken-out pallet pa, i.e., 25 mm to the stroke of the downward movement of the buffer base 52, i.e., 94+15= 109 mm). Upon this upward movement, the uppermost pallet of the pallets stacked on the buffer 52 is brought to a state wherein it carries and lifts the pallet pb hooked by the first separation pawls 66 thereon.

In this state, the first air cylinder $C_{B1}$ is operated to retract the first separation pawls 66 from the hooking position to the retracted position in a manner opposite to that described above. As a result, the pallet pb and the pallet (or pallets) above the pallet pb hooked by the first separation pawls 66 are stacked on the pallets already stacked on the buffer base 52, and thus, all the pallets are stacked on the buffer base 52. This position serves as a standby position, and a next separation instruction from the robot 12 is waited for at this position.

Position Correction Operation of Pallet in Separating Operation

The above-mentioned operation of the buffer 22 is a basic operation, excluding the case in which the manufacturing margin of error of the pallets overaccumulates. More specifically, each pallet is allowed to have a manufacturing margin of error of ±0.3 mm. Therefore, this manufacturing margin of error can accumulate when a large number of pallets are stacked on the buffer base 52, and the moving operation to the hooking position of the pallet pb by the first separation pawls 66 in the above-mentioned basic operation causes an error. Thus, the pallet pb often cannot be accurately moved to the hooking position by the first separation pawls 66.

More specifically, assuming the worst case, since all the pallets stacked are pallets $p_1$ having a minimum thickness of 25 mm and the maximum height of the stack is 800 mm as described above, the maximum accumulated margin of error is:

$$800 \div (25-7) \times 0.3 = 13.3 \text{ mm}$$

When the vertical position is changed by the maximum accumulated margin of error, even if the servo motor $M_B$ is rotated to move the predetermined pallet pb to the hooking position of the first separation pawls 66 according to the above-mentioned basic operation, the pallet pb cannot be actually located to the hooking position due to the presence of the margin of error described above.

For this reason, in this embodiment, a sensor 80 is attached to the standing plate 46b so as to be opposite to the side surface of the pallet body 36 which is brought to the correct hooking position (theoretical) by the first separation pawls 66. The sensor 80 comprises a known reflection-type photocoupler, i.e., a pair of light-emitting and light-receiving elements although a detailed description thereof will be omitted. When the side surface of the periphery of the flange 38 of a pallet is located opposite the sensor 80, the sensor 80 is turned on upon reception of light emitted from the light-emitting element. When the side surface of the pallet body 36 is located opposite the sensor 80, the sensor 80 cannot receive the light emitted from the light-emitting element, and is turned off.

Figure 8A:
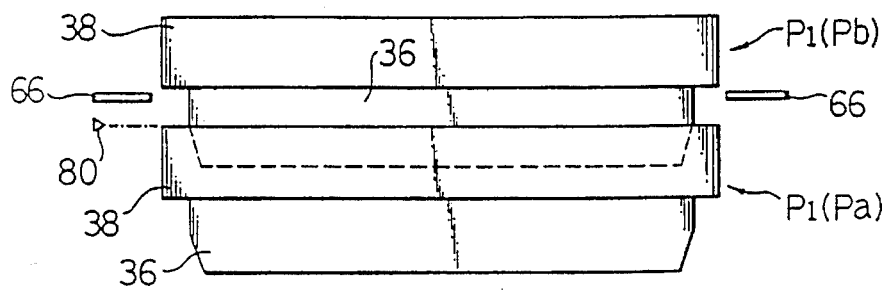
FIGS. 8A to 8E are front views sequentially showing a position correction operation in the separation operation of the buffer.

More specifically, as shown in FIG. 8A, the sensor 80 is arranged such that the pallet pb stacked on the pallet pa is brought to the hooking position by the first separation pawls 66 in a state wherein the sensor 80 detects the upper end face of the flange 38 of the pallet pa.

The movement control of the contents of the pallet pb to the hooking position by the first separation pawls 66 in consideration of the manufacturing margin of error of the pallets using the sensor 80 will be described hereinafter with reference to FIGS. 8A to 8E.

In the case of the pallet $p_1$ having a thickness of 25 mm, as shown in FIG. 8A, since the thickness of the flange 38 is 12 mm and a fitting margin of 7 mm to the fitting recess 36a of the pallet body 36 located below is taken into consideration, a range of appearance of the side surface of the pallet body 36 is given by:

$$25-12-7=6 \text{ mm}$$

Figure 8B:
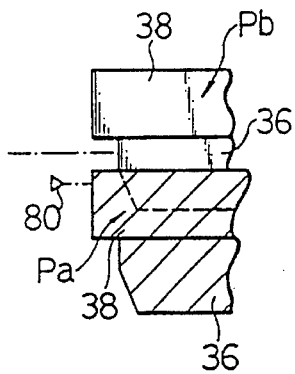
Figure 8C:
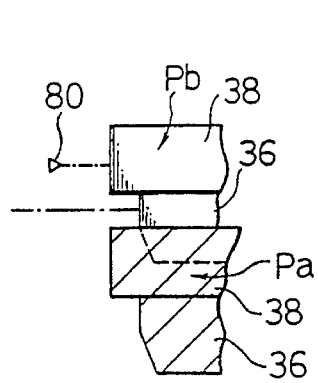
Figure 8D:
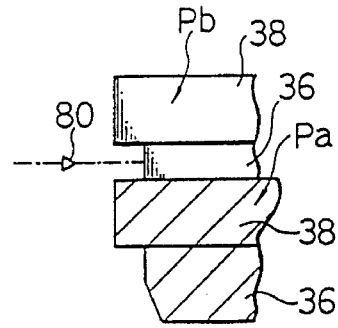

Therefore, regarding the maximum accumulated manufacturing margin of error described above, three theoretical relative positional relationships between the pallets pa and pb which are moved by the servo motor $M_B$ and the sensor 80 can be assumed as shown in FIGS. 8B, 8C, and 8D.

More specifically, three operational modes occur, including a first mode wherein the periphery of the flange 38 of the pallet pa to be separated (in other words, the pallet pa hooked by the second separation pawls 68) opposes the sensor 80, as shown in FIG. 8B, a second mode wherein the periphery of the flange 38 of the pallet pb to be hooked by the first separation pawls 66 opposes the sensor 80, as shown in FIG. 8C, and a third mode wherein the side surface of the pallet body 36 of the pallet pb to be hooked by the first separation pawls 66 opposes the sensor 80, as shown in FIG. 8D.

Figure 8E:
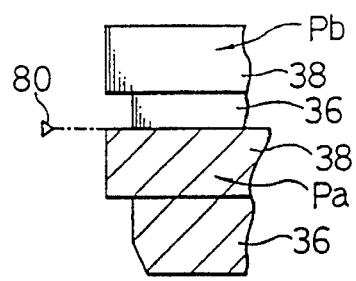

When the periphery of the flange 38 of the pallet is located adjacent to the sensor 80, the sensor 80 is turned on. In this ON state, the first and second modes shown in FIGS. 8B and 8C are considered. For this reason, the buffer base 52 is moved downward until the sensor 80 detects the upper end face of the flange 38, i.e., the sensor 80 is turned off, as shown in FIG. 8E.

When the sensor 80 is turned off, the bar code B which is printed to the pallet the upper surface of which is detected is read through the bar code reader 74. As a result, where the pallet is determined that it is the pallet pa which should be separated, upon reading the bar code B, the pallet pb which is disposed on the pallet pa which should be separated is brought to the hooking position of the first separation pawls 66, as mentioned before. In accordance with the aforementioned basic operation, the first air cylinder $C_{B1}$ is then actuated, so that the first separation pawls 66 are pushed out to the hooking position.

Upon reading the bar code B printed on the pallet whose upper end face is detected if it is determined that this pallet is not the pallet pa to be separated, it is automatically determined that this pallet whose bar code B is read is the pallet pb immediately above the pallet pa. Therefore, the servo motor $M_B$ is rotated so that the buffer base 52 is moved upward by the height of the pallet pb. In this manner, the sensor 80 detects again the upper end face of the flange 38, as shown in FIG. 8E. The pallet having the flange 38 whose upper end face is detected should be the pallet pa to be separated. After this fact is confirmed through the bar code reader 74, the first air cylinder $C_{B1}$ is actuated in accordance with the above-mentioned basic operation, so that the first separation pawls 66 are pushed out to the hooking position.

If upon reading the bar code B of the detected pallet which was moved upward it is determined that the pallet is not the pallet pa to be separated, a control error may occur or a pallet different from a requested pallet may be conveyed by the unmanned vehicle 50 from the unmanned warehouse. Thus, at this time, the control operation is stopped, and a predetermined warning operation is started.

When the side surface of the pallet body 36 is located opposite the sensor 80, i.e., the pallet is moved according to the calculated value, the sensor 80 is turned off. In this OFF state, only the third mode shown in FIG. 8C is considered. For this reason, the buffer base 52 is moved upward until the sensor 80 detects the upper end face of the flange 38, i.e., the sensor 80 is turned on, as shown in FIG. 8E.

When the sensor 80 is turned on, the bar code B printed on the pallet whose upper end face is detected is read through the bar code reader 74. When a pallet to be separated is confirmed as the pallet pa according to the read bar code B, the pallet pb stacked on the pallet pa to be separated has reached the hooking position of the first separation pawls 66. Therefore, the first air cylinder $C_{B1}$ is started and the first separation pawls 66 are pushed out to the hooking position in accordance with the basic operation described above.

When the above described position correction operation of the pallet is executed, even if accumulation of the manufacturing margin of error of the pallets occurs, a state wherein the pallet pb, stacked on the pallet pa to be separated, can be reliably hooked by the first separation pawls 66 can be achieved.

DESCRIPTION OF ELEVATOR

The arrangement of the elevator 26, disposed between the buffer 22 and the stocker 24 and used for replacing the empty pallets p' in the stocker 24 with the pallets p filled with parts x, will be described hereinafter with reference to FIGS. 9 to 13G.

Arrangement of Elevator Body

Figure 9:
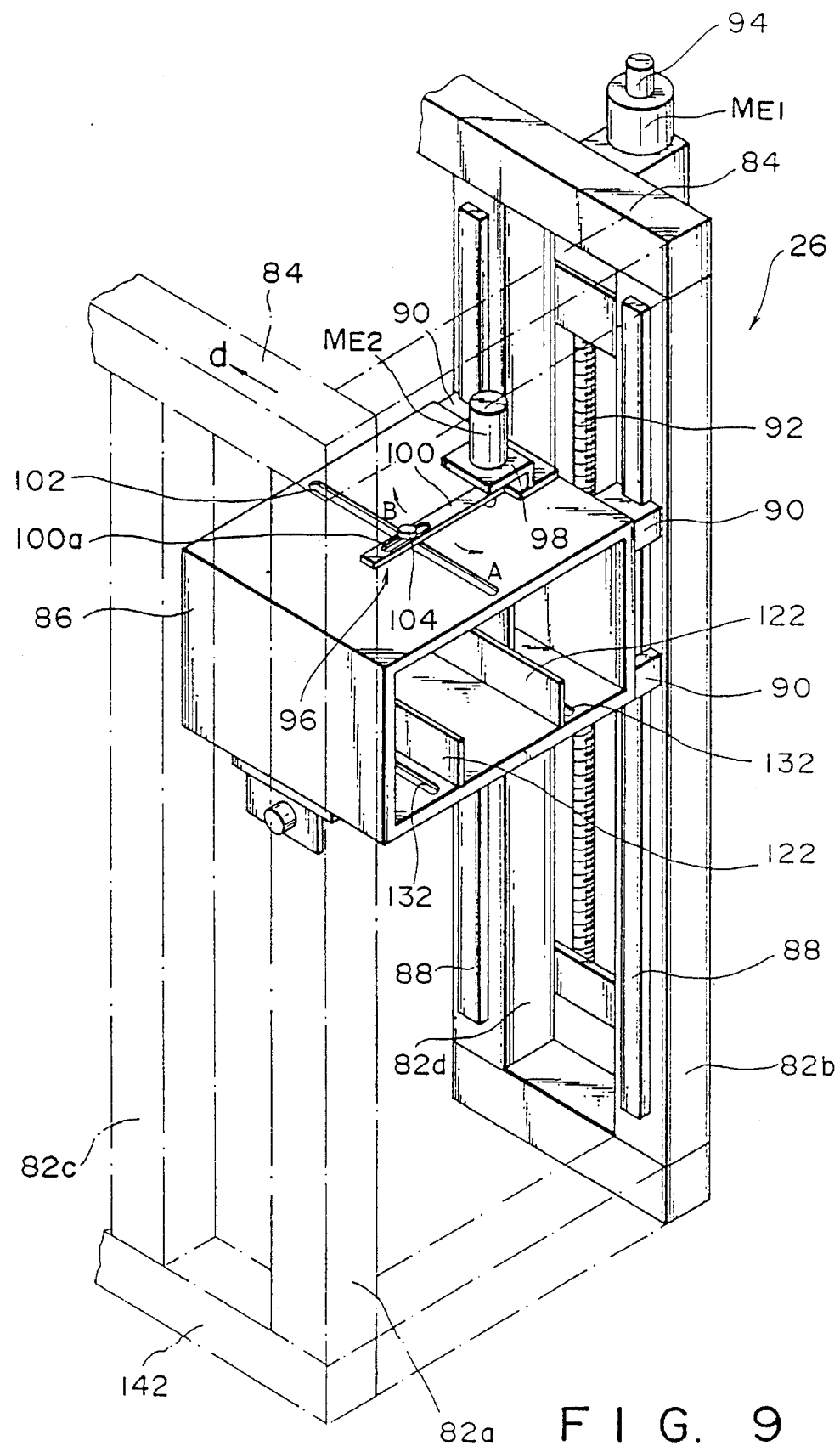
FIG. 9 is a perspective view showing an arrangement of an elevator.

As shown in FIG. 9, this elevator 26 is disposed on a base 142 common to the stocker 24 (to be described later). A pair of columns 82a and 82b are adjacent to the columns 44a and 44b of the buffer 22 on the side of the robot 12 (see FIG. 2) and a pair of columns 82c and 82d are separated by a predetermined distance from the robot 12 and provided on a portion of the base 142. The upper ends of these four columns 82a, 82b, 82c, and 82d are coupled to each other by coupling members 84. Note that the coupling members 84 are also arranged common to the stocker 24 (to be described later).

An elevator body 86 is provided to be vertically movable and positioned between the pair of columns 82a and 82c and the pair of columns 82b and 82d along the conveying direction d.

The elevator body 86 comprises a box-like member in which a pair of surfaces perpendicular to the conveying direction of the pallets $p_1, p_2, p_3, \ldots$ are open. The elevator body 86 receives the pallet pa separated at the separation position from the buffer 22 based on a request from the robot 12 (a request issued when the count of the parts remaining in a predetermined pallet becomes "1"), and holds the pallet pa therein. The elevator 86 transfers the held pallet pa to the stocker 24 in accordance with a request from the stocker 24 (a request issued when the last part described above is used for assembly, and hence, no parts are present). Guide members 88 are vertically fixed to the opposing surfaces of the pair of columns 82a and 82c and those of the pair of columns 82b and 82d along the conveying direction d of the pallets $p_1, p_2, p_3, \ldots$ A pair of slidable members 90 are attached to each of the guide members 88 to be movable in the vertical direction and to be separated in the vertical direction by a predetermined distance. The above-mentioned elevator body 86 is mounted to be supported at four corners by the four slidable members 90 present in the above horizontal plane and by the four slidable members 90 present in a horizontal plane therebelow.

A gap extending in the vertical direction is defined in a portion sandwiched between the far-side pair of columns 82b and 82d in FIG. 9. A projection (not shown) is integrally formed with the elevator body 86 so as to extend into the gap.

A servo motor $M_{E1}$ for moving the elevator body 86 in the vertical direction along the guide members 88 is disposed on a portion of the coupling member 84 for coupling the upper end of the far-side pair of columns 82b and 82d. The servo motor $M_{E1}$ comprises a rotating shaft extending in the vertical direction. The rotating shaft is connected to rotate a ball screw 92 which is rotatably disposed between the columns 82b and 82d and extends in the vertical direction. A portion midway along the ball screw 92 is threadably engaged with the projection described above. In this manner, upon rotation of the rotating shaft of the servo motor $M_{E1}$, the ball screw 92 is rotated, and hence, the elevator body 86 is moved in the vertical direction.

An encoder 94 for detecting the angular position of the servo motor $M_{E1}$, i.e., the vertical position of the elevator body 86, is attached to the servo motor $M_{E1}$. With this arrangement, the elevator body 86 can be vertically moved to an arbitrary vertical position.

Arrangement of Replacing Mechanism

The elevator body 86 which is vertically movable as described above comprises a replacing mechanism 96 for taking therein a pallet pa filled with parts and separated from the buffer 22, pushing out this pallet pa therefrom, and drawing an empty pallet p' therein from the stocker 24.

The replacing mechanism 96 includes a servo motor $M_{E2}$ as a drive source which is fixed on the upper surface of the elevator body 86 through a stay 98. The drive shaft of the servo motor $M_{E2}$ is fixed to one end of a swingable arm 100. Thus, upon rotation of the drive shaft, the swingable arm 100 is swung in the horizontal plane. An elongated groove 100a is formed at the mid point of the swingable arm 100 along its longitudinal direction. A guide groove 102 extending in the conveying direction d is formed in the upper surface portion of the elevator body 86 over a range corresponding to the swinging range of the swingable arm 100. The guide groove 102 is formed over the entire length of the elevator body 86 along the conveying direction d.

A guide pin 104 is arranged to be commonly inserted through the elongated groove 100a and the guide groove 102 in the vertical direction. The head portion of the guide pin 104 has a larger diameter than the other portions, and can be prevented from being disengaged from these grooves 100a and 102. With this structure, when the servo motor $M_{E2}$ is reciprocally pivoted, the swingable arm 100 is swung, and hence, the guide pin 104 is reciprocated along the guide groove 102, i.e., the conveying direction d.

Figure 11:
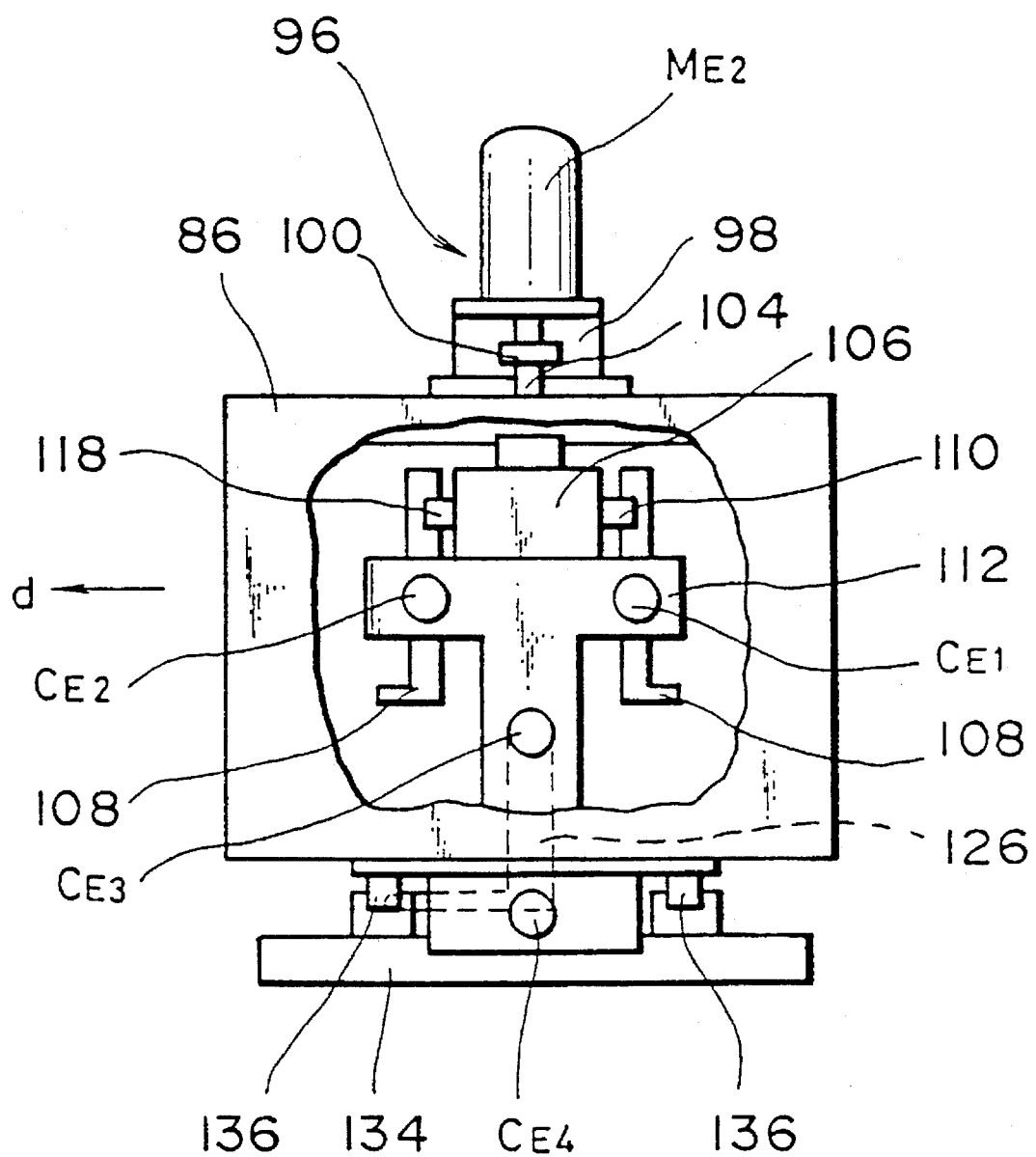
FIG. 11 is a front view showing an arrangement of the replacing mechanism in a partially cutaway state of the elevator body.
Figure 12:
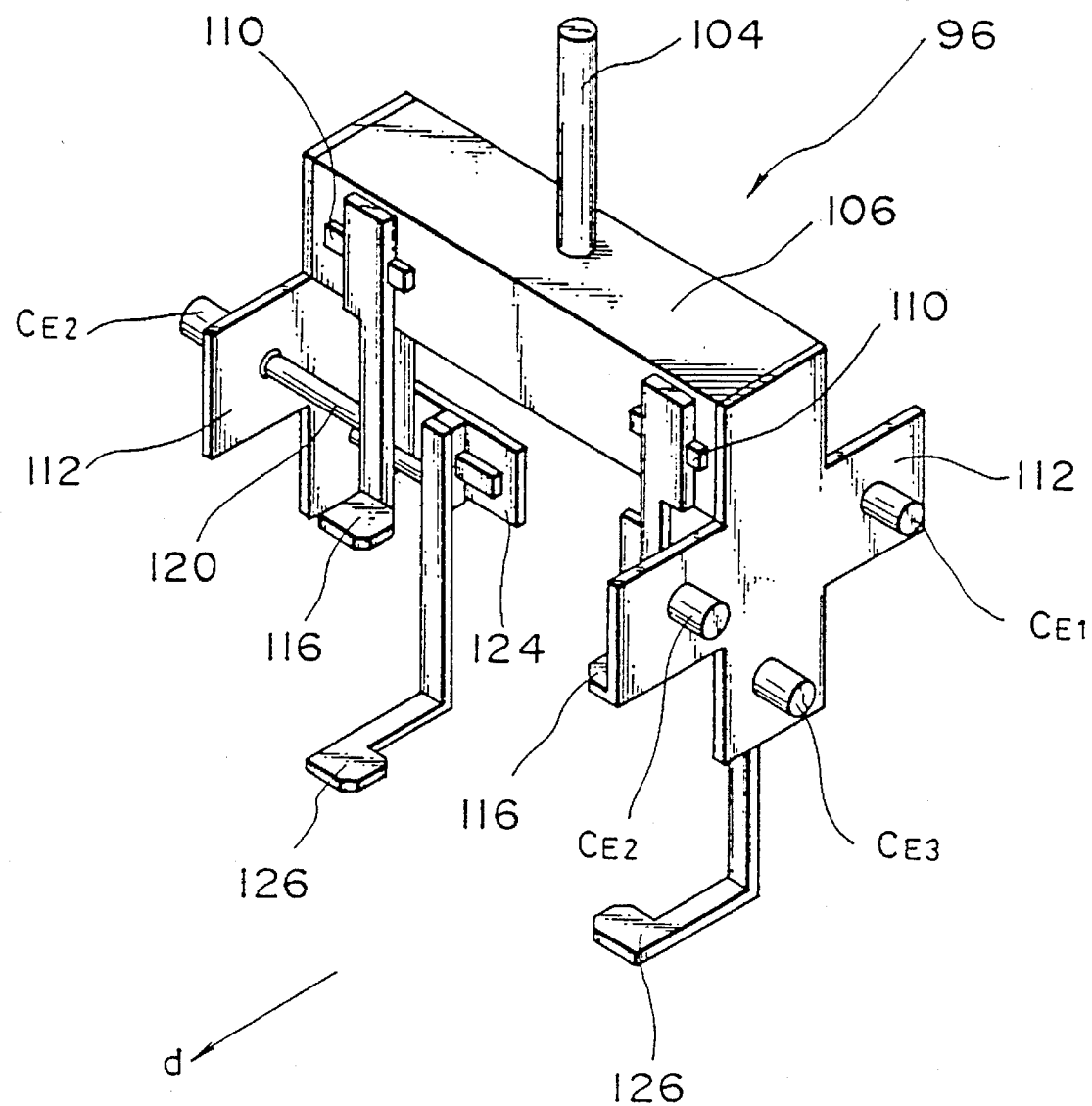
FIG. 12 is a perspective view of the replacing mechanism.

As shown in FIGS. 10 to 12, a slide plate 106 is fixed to the lower end of the guide pin 104 so as to be located in the elevator body 86. The slide plate 106 is attached to the guide pin 104 so as to extend along a direction perpendicular to the conveying direction d. First hooks 108 are mounted on both end portions of the side surface of the slide plate 106 through first hook slide members 110 so as to be slidable along the longitudinal direction of the slide plate 106, i.e., a direction perpendicular to the conveying direction d. The pair of first hooks 108 are formed into shapes capable of being engaged, from both sides, with the first notches 38a formed in the flanges 38 on the side of the elevator 26 of each of the pallets $p_1, p_2, p_3, \ldots$. More specifically, the distal end portion of each first hook 108 has an isosceles trapezoidal shape complementarily coinciding with that of the notch.

Air cylinder supporting plates 112 are respectively fixed to both ends of the slide plate 106 so as to extend along the conveying direction d. A first air cylinder $C_{E1}$ for reciprocating the corresponding first hook 108 is mounted at the end portion of each air cylinder supporting plate 112 on the side of the buffer 22. The distal end portion of a first piston 114 of each first air cylinder $C_{E1}$ is connected to the corresponding first hook 108. In this manner, upon driving of the first air cylinders $C_{E1}$, the first hooks 108 are reciprocated to be engaged with or disengaged from the first notches 38a of the flanges 38.

Second hooks 116 are mounted on both end portions of the side surface on the side of the stocker 24 of the slide plate 106 through second hook slide members 118 so as to be slidable along the longitudinal direction of the slide plate 106, i.e., a direction perpendicular to the conveying direction d. The pair of second hooks 116 are formed into shapes capable of being engaged from both sides with the second notches 38b formed in the flanges 38 on the side of the unmanned vehicle 20 of each of the pallets $p_1, p_2, p_3, \ldots$ Second air cylinders $C_{E2}$ for reciprocating the second hooks 116 are mounted on the end portions on the side of the stocker 24 of the air cylinder supporting plates 112 fixed to both ends of the slide plate 106. The distal end portion of a second piston 120 of each second air cylinder $C_{E2}$ is connected to the corresponding second hook 116 described above. In this manner, upon the driving of the second air cylinders $C_{E2}$, the second hooks 116 are reciprocated so as to be engaged with or disengaged from the second notches 38b of the flanges 38.

A pair of stationary slide guides 122 for slidably supporting the pallet p, engaged with first or second hooks 108 or 116 and drawn in/pushed out in accordance with the pivotal motion of the servo motor $M_{E2}$, are disposed on the lower surface of the elevator body 86. More specifically, the upper surfaces of the stationary slide guides 122 are slidable relative to the lower surplices of the flanges 38 at both sides of the drawn-in/pushed-out pallet p.

The height of the upper edge of each stationary slide guide 122 is set to slidably support the pallet $p_3$ having a height of 100 mm as a maximum height. The standby position of the elevator body 86 is set at the vertical position where the upper end faces of the stationary slide guides 122 can horizontally receive the pallet pa at the separation position.

Third hook mounting plates 124 are fixed to the lower portions of the air cylinder supporting plates 112 so as to extend along the extending direction of the slide plate 106. Third hooks 126 are mounted on both end portions of the side surfaces on the side of the stocker 24 of the mounting plates 124 through third hook slide members (not shown) along the longitudinal direction of the slide plate 106, i.e., a direction perpendicular to the conveying direction d. The pair of third hooks 126 are formed into shapes capable of being engaged, from both sides, with the second notches 38b of the flanges 38 of each of the empty pallets $p_1', p_2', p_3', \ldots$ in the stocker 24.

Third air cylinders $C_{E3}$ for reciprocating the third hooks 126 are attached to the lower end portions of the air cylinder supporting plates 112 fixed to both ends of the slide plate 106. The distal end portion of a third piston 130 of each third air cylinder $C_{E3}$ is connected to the corresponding third hook 126. In this manner, upon the driving of the third air cylinders $C_{E3}$, the third hooks 126 are reciprocated so as to be engaged with or disengaged from the second notches 38b of the flanges 38.

Note that the third hooks 126 extend below the elevator body 86 through guide grooves 132 (FIG. 9) formed in the lower surface of the elevator body 86 along the conveying direction d. A pair of movable slide guides 134 for slidably receiving the pallet p' taken out from the stocker 24 by the third hooks 126 are disposed on the lower surface of the elevator body 86.

The movable slide guides 134 are arranged to be movable along a direction perpendicular to the conveying direction d, i.e., to be separated from the empty pallet p' received therein, so as to stack the empty pallet p' received therein onto the unloading rollers 78 (see FIG. 6) of the unloading mechanism 76 described above. More specifically, as shown in FIGS. 10 and 11, the movable slide guides 134 are reciprocally mounted on the lower surface of the elevator body 86 through slide members 136. Air cylinder supporting plates 138 are fixed to both sides of the lower surface of the elevator body 86. Fourth air cylinders $C_{E4}$ for reciprocating the movable slide guides 134 are mounted on the air cylinder supporting plates 138, respectively. The distal end portion of a fourth piston 140 (not shown) of each fourth air cylinder $C_{E4}$ is connected to the corresponding movable slide guide 134 described above. In this manner, upon the driving of the fourth air cylinders $C_{E4}$, the movable slide guides 134 are reciprocated so as to be engaged with or disengaged from the flanges 38 of the empty pallet p'.

Operation of Replacing Mechanism

A replacing operation of the pallets p and p' in the replacing mechanism 96 with the above arrangement will be described hereinafter with reference to FIGS. 13A to 13G.

In the initial state, the vertical position of the elevator body 86 is set so that the upper end face of each stationary slide guide 122 has the same height as that of each second separation pawl 68 of the buffer 22. The initial condition of the replacing mechanism 96 is set such that the swingable arm 100 is located at the middle position of the guide groove 102, as shown in FIG. 9. No compressed air is supplied to the air cylinders $C_{E1}$, $C_{E2}$, $C_{E3}$, and $C_{E4}$. The corresponding hooks 108, 116, and 126, and the movable slide guides 134 are kept retracted at the corresponding retracted positions.

Take-in Operation from Buffer

When the initial state is set, an operation for separating a predetermined pallet pa in the buffer 22 is started based on a request from the robot 12, i.e., a request for replacing preparation when the count of remaining parts x in a predetermined pallet p in the stocker 24 has reached 1. Also, in the elevator 26, an operation for taking the pallet pa separated in the buffer 22 into the elevator body 86 is executed.

Figure 13A:
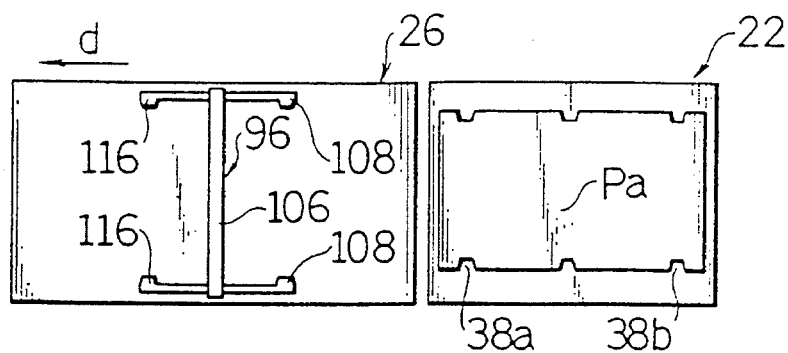
FIGS. 13A to 13G are front views showing a replacement operation in the elevator.
Figure 13B:
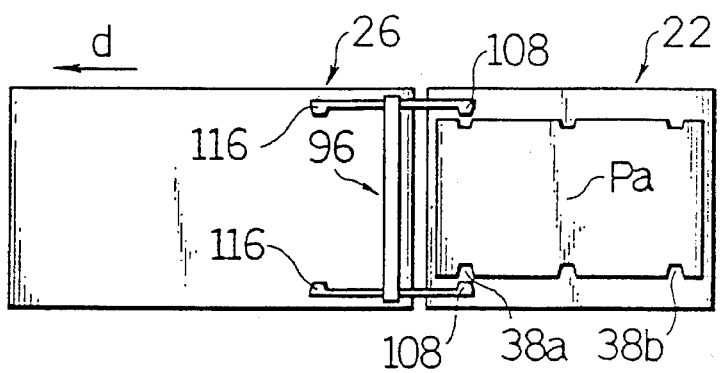

More specifically, when the above-mentioned request is issued from the robot 12, the servo motor $M_{E2}$ is rotated in a direction indicated by an arrow A in FIG. 9 from the state illustrated in FIG. 13A so as to cause the replacing mechanism 96 to move toward the buffer 22 in the elevator 26. Upon this movement, as shown in FIG. 13B, the first hooks 108 of the replacing mechanism 96 on the side of the buffer 22 are allowed to be engaged from both sides with the first notches 38a on the side of the elevator 26 formed in the flanges 38 of the pallet pa to be separated at the separation position in the buffer 22. Note that in the engaging state of the first hooks 108, the first hooks 108 are set not to interrupt the separation operation in the buffer 22.

In this state, the operation of the elevator 26 is set in a take-in standby state, and the take-in standby state is maintained until the separating operation in the buffer 22 is completed. Upon completion of the separation operation, i.e., when a separation completion signal is issued from the buffer 22, the replacing mechanism 96 starts the take-in operation of the separated pallet pa in response to the outputting of the separation completion signal.

Figure 13C:
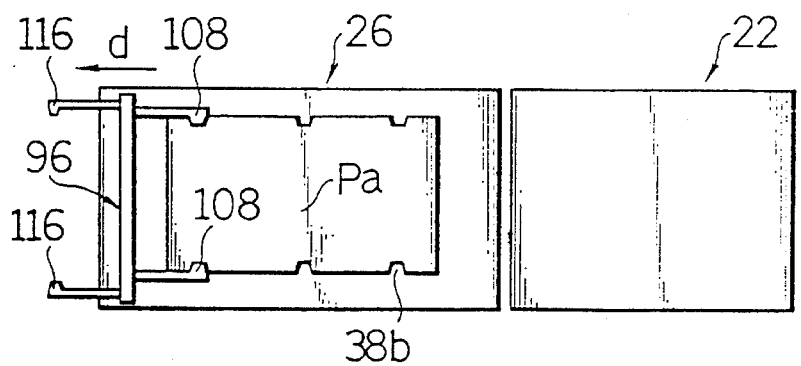

More specifically, compressed air is supplied to the first air cylinders $C_{E1}$, so that the first hooks 108 are engaged, from both sides, with the first notches 38a formed in the flanges 38 of the separated pallet pa. Thereafter, the servo motor $M_{E2}$ rotates the swing arm 100 in a direction indicated by an arrow B in FIG. 9, so as to take guide pin 104 of the replacing mechanism 96 in the elevator body 86 along the conveying direction d. As shown in FIG. 13C, in a state wherein the pallet pa has completely been taken in the elevator body 86, the operation of the servo motor $M_{E2}$ is stopped, and thereafter, the supply of the compressed air to the first air cylinders $C_{E1}$ are stopped, and then the first air cylinders $C_{E1}$ are operated so that the first hooks 108 are disengaged from the first notches 38a of the pallet pa.

Figure 13D:
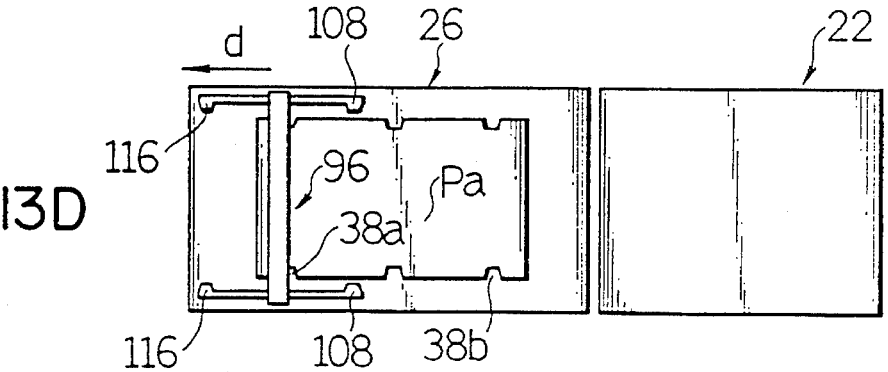

In this manner, the pallet pa separated in the buffer 22 is wholly taken into the elevator 26. In this take-in state, the replacing mechanism 96 is brought to a state wherein it partially extends from the elevator body 86 toward the stocker 24 as shown in FIG. 13C. The servo motor $M_{E2}$ is rotated in a direction indicated by the arrow A, so that the replacing mechanism 96 is returned to be completely stored in the elevator body 96, as shown in FIG. 13D.

Draw-in Operation of Empty Pallet

Thereafter, the servo motor $M_{E1}$ rotates, so that the elevator body 86 is moved downward to a position for drawing in an empty pallet p' retaining no parts x among pallets p stocked in the stocker 24. The elevator body 86 stands by at this draw-in position waiting for a replacing request of the empty pallet p' from the stocker 24.

Note that the draw-in position is defined as a position above a feed position of the pallet p to the robot 12 in the stocker 24 (to be described later) by a distance corresponding to one pallet which has completed feeding of parts to the robot 12. As described above, since pallets p having three different heights are prepared, three draw-in positions are defined in accordance with a difference in heights.

The standby position of the elevator body 86 is set to be a vertical position such that the third hooks 126 of the replacing mechanism 96 can be engaged with the second notches 38b of the flanges 38 of the pallet p' located at the draw-in position. In this manner, the draw-in standby position of the empty pallet p' in the elevator 26 is defined.

In the replacing mechanism 96 in the elevator body 86 brought to the draw-in standby position, as described above, the pallet pa retaining a complete set of parts x is held on the pair of stationary slide guides 122.

Figure 13E:
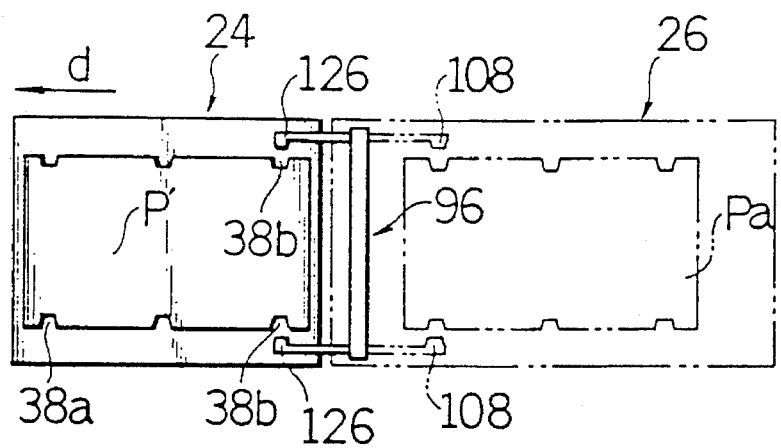

At this draw-in standby position, when the empty pallet p' is moved to the draw-in position in the stocker 24, the servo motor $M_{E2}$ rotates the swing arm 100 in the direction indicated by the arrow B. The third hooks 126 of the replacing mechanism 96 are thereby moved to positions capable of being engaged with the second notches 38b formed in the flanges 38 of the empty pallet p' at the draw-in position, as shown in FIG. 13E. Thereafter, compressed air is supplied to the third and fourth air cylinders $C_{E3}$ and $C_{E4}$, so that the third hooks 126 are engaged with the second notches 38b of the empty pallet p'. At the same time, the movable slide guides 134 are pushed out below the elevator body 86 so as to be capable of supporting the drawn-in empty pallet p'.

Figure 13F:
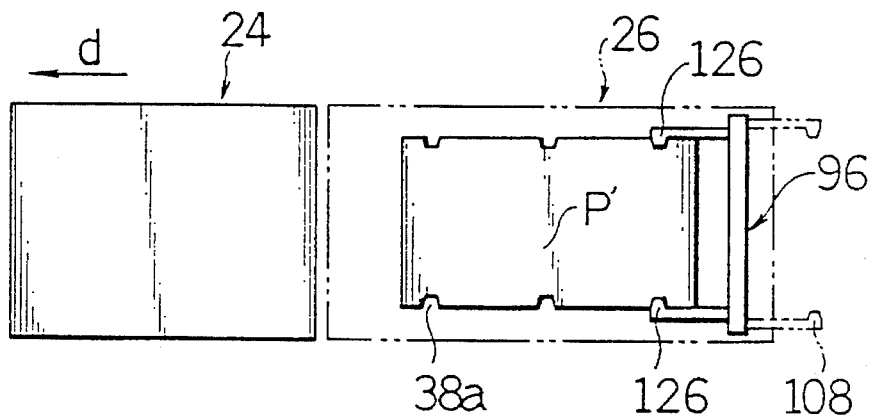

Thereafter, the servo motor $M_{E2}$ rotates the swing arm 100 in the direction indicated by the arrow A to draw the empty pallet p' in a portion below the elevator body 86. In this manner, the empty pallet p' is held below the elevator body 86 while being supported on the movable slide guides 134, as shown in FIG. 13F, thus completing the draw-in operation of the empty pallet p'. Then, the third air cylinders $C_{E3}$ are actuated to cause the third hooks 126 to be disengaged from the second notches 38b of the empty pallet p'.

Push-out Operation of Pallet

In the draw-in state of the empty pallet p', the second hooks 116 of the replacing mechanism 96 are allowed to be engaged with the second notches 38b of the pallet pa supported on the stationary slide guides 122. Therefore, compressed air is supplied to the second air cylinders $C_{E2}$ to cause the second hooks 116 to be engaged with the second notches 38b of the pallet pa.

Figure 13G:
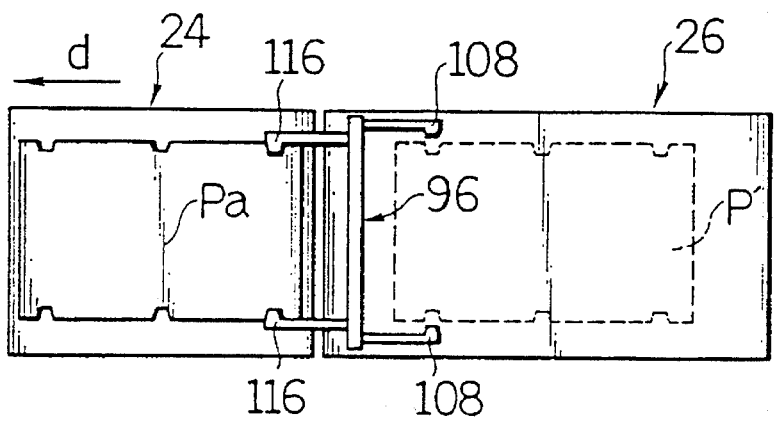

Simultaneous with the engaging operation of the second books described above, the servo motor $M_{E1}$ in the elevator 26 rotates to move the elevator body 86 downward, so that the pallet pa therein is brought to a position horizontally opposing the draw-in position in the stocker 24. The servo motor $M_{E2}$ rotates the swing arm 100 in the direction indicated by the arrow B to push out the pallet pa from the elevator body 86 to an available retaining position of the stocker 24, as shown in FIG. 13G. Thereafter, the second air cylinders $C_{E2}$ are operated to separate the second hooks 116 from the second notches 38b of the pallet p. Then the servo motor $M_{E2}$ rotates in the direction indicated by the arrow A, to draw the replacing mechanism 96 in the elevator body 86. In this manner, the push-out operation of the pallet p to the stocker 24 is completed.

Unloading Operation of Empty Pallet

After the empty pallet p' is replaced with the pallet pa filled with parts x, as described above, the drawn empty pallet p' is supported below the elevator body 86. Therefore, in order to stack the empty pallet p' on the unloading rollers 78 of the unloading mechanism 76, the pulse motor $M_{E1}$ is rotated to move the elevator body 86 downward. Thus, when no empty pallet p' is stacked on the unloading rollers 78, the empty pallet p' is moved to a position immediately above the unloading rollers 78. When the empty pallet p' (or pallets p') has already been stacked on the unloading rollers 78, the empty pallet p' to be stacked is moved to a position immediately above the already stacked pallet p' (or the uppermost pallet of stacked pallets p'). Thereafter, the fourth air cylinders $C_{E4}$ are actuated to retract the movable slide guides 134, so that the empty pallet p' supported by the elevator body 86 falls down and is stacked on the unloading rollers 78 (or on the uppermost pallet of stacked pallets p'γ.

When the number of empty pallets p' stacked on the unloading rollers 78 in this manner has reached a predetermined value, the unloading rollers 78 are rotated, so that the stack of the empty pallets p' is conveyed to a position below the buffer base 52. The stack is then unloaded onto the empty pallet table 34 of the unmanned vehicle 20. In this manner, a series of empty pallet unloading operations is completed.

In the elevator 26 after the empty pallet p' is discharged onto the unloading mechanism 76, the servo motor $M_{E1}$ is rotated so as to move the elevator body 86 upward to the above-mentioned initial position, i.e., a position horizontally opposing the separation position in the buffer 22. The elevator then wait for the next operation.

DESCRIPTION OF STOCKER

The arrangement of the stocker 24, arranged adjacent to the robot 12, for sequentially feeding parts $x_1$, $x_2$, $x_3$, . . . necessary for assembly to the robot 12 according to the assembly order will be described hereinafter with reference to FIGS. 14 to 16

Arrangement of Stocker

Figure 14:
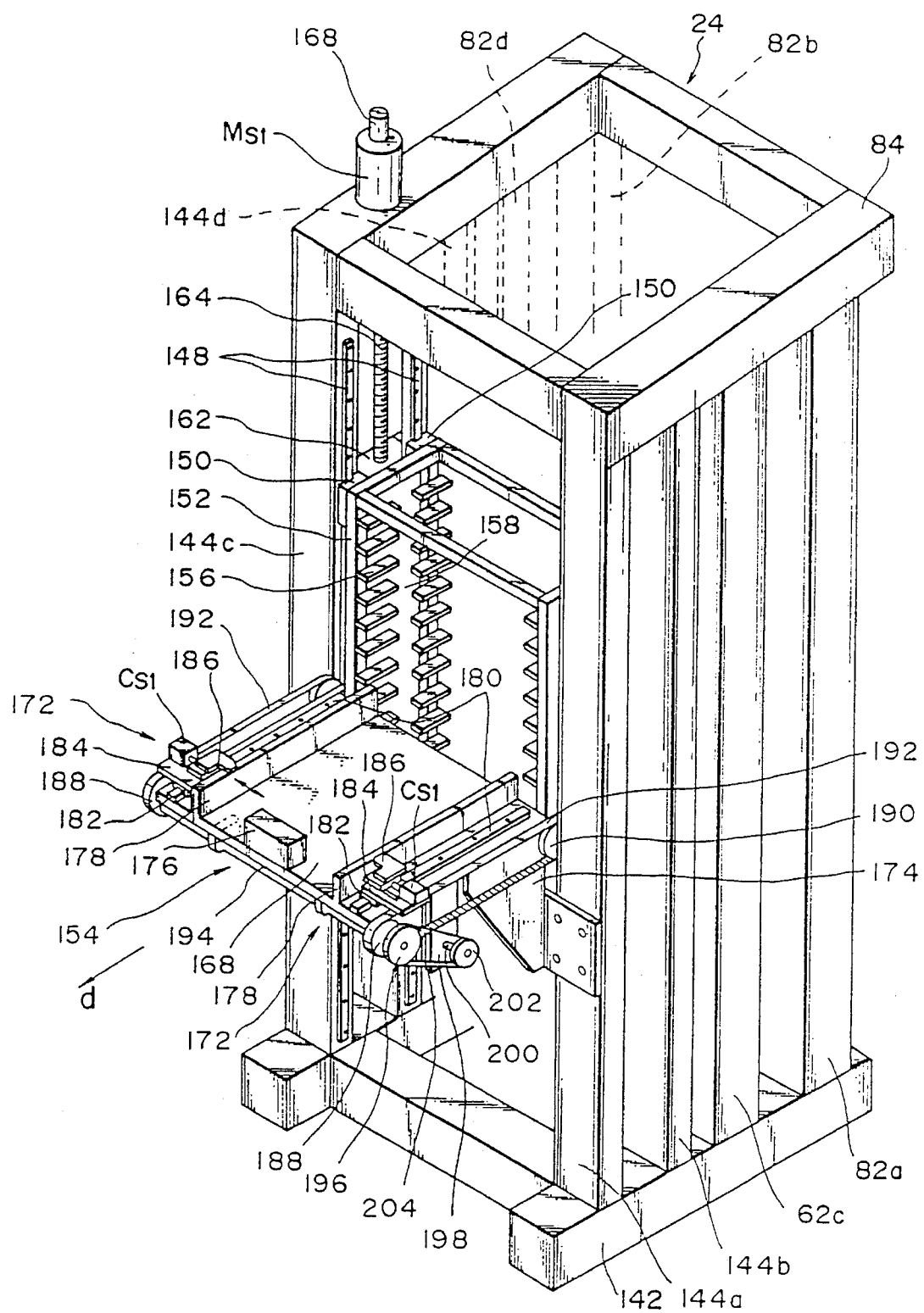
FIG. 14 is a perspective view showing an arrangement of a stocker.

The stocker 24 as shown in FIG. 14, comprises the base 142 fixed on a foundation (not shown), and common to the elevator 26 described above, columns 144a, 144b, 144c, and 144d standing at four corners of the base 142, and coupling frames 84 for coupling upper ends of these columns 144a, 144b, 144c, and 144d. Guide members 148 extending in the vertical direction are fixed to opposing surfaces of the pair of columns 144a and 144b on the side of the elevator 26 and the pair of columns 144c and 144d on the side of the robot 12. A slidable member 150 is vertically and movably attached to each guide member 148. An elevating frame 152 is mounted to be supported at four corners by these four slidable members 150.

The elevating frame 152 stocks a stack of a plurality of pallets p, which are pushed out from the elevator 26 and drawn out to a draw-out unit 154 (to be described later). The stocker 24 is constructed so as to be capable of drawing out the pallet one by one from the draw-out standby position (to be described later). A plurality of shelves 156 for hooking the flanges 38 of the pallets p are disposed on the inner surfaces of the elevating frame 152 along the conveying direction d. The shelves 156 extend horizontally, and are disposed at equal intervals of about 30 mm along the vertical direction.

As shown in FIG. 14, a notch 158 is formed at the central portion (in other words, a portion corresponding to the third notch 38c formed at the center of the flange 38 of the pallet p stacked on each shelf 156) of each shelf 156. More specifically, the notch 158 is formed so as to be capable of inserting therethrough a lifting arm 160 of an opening mechanism 170 (FIG. 15; to be described later) for opening the lid 40 of the pallet p to be drawn out to the draw-out unit 154.

A gap extending in the vertical direction is defined in a portion sandwiched between the far-side pair of columns 144c and 144d in FIG. 14. A projection 162 is integrally formed with the elevating frame 152 to extend into the gap.

A servo motor $M_{S1}$ for moving the elevating frame 152 in the vertical direction along the guide members 148 is disposed on a portion of the coupling frame 84 which couples the upper ends of the far-side pair of columns 144c and 144d. The servo motor $M_{S1}$ comprises a rotating shaft extending in the vertical direction. The rotating shaft is connected to rotate a ball screw 164 rotatably disposed between the columns 144c and 144d and extending along the vertical direction. A portion midway along the ball screw 164 is threadably engaged with the projection 162. In this manner, upon rotation of the rotating shaft of the servo motor $M_{S1}$, the ball screw 164 is rotated, thus moving the elevating frame 152 in the vertical direction. Note that the feed amount of the vertical movement of the elevating frame 152 is set to correspond to an integer multiple of 30 mm as a disposition pitch of the shelves 156.

An encoder 68 is attached to the servo motor $M_{S1}$ so as to detect its angular position, i.e., the vertical position of the elevating frame 152. With the above arrangement, the elevating frame 152 can be vertically moved to an arbitrary vertical position.

Arrangement of the Draw-out Unit

The arrangement of the draw-out unit 154 described above will be described below with reference to FIG. 14.

The draw-out unit 154 is provided to hold a pallet p retaining parts x used for assembly in the robot 12, which is received from the elevating frame 152. The basic draw-out unit 154 includes a draw-out base 168 fixed at a predetermined vertical position from the foundation (not shown), and a draw-out/draw-in mechanism 172, arranged on the draw-out base 168 for draw-out/draw-in the pallet p from which the lid 40 is removed by the lid opening mechanism 170 (to be described later; FIG. 15).

The draw-out base 168 is horizontally fixed through a pair of supporting stays 174 respectively fixed to the surfaces of the columns 144a and 144c on the side of the robot 12. A stopper 176 is attached to the distal end portion of the draw-out base 168 on the side of the robot 12. The drawn pallet p abuts against the stopper 176 to define the draw-out position of the pallet p. A pair of slide guides 178 extending along the conveying direction d are arranged at both sides of the draw-out base 168. The upper end faces, i.e., the slide supporting surfaces of these slide guides 178 are set to horizontally match the corresponding shelves 156 of the elevating frame 152 in a stopped state during an intermittent feed operation. Note that a pallet p which is supported by the shelves 156 horizontally matching the slide guides 178 is defined as a pallet located at the draw-out standby position.

The draw-out/draw-in mechanism 172 described above includes guide members 180 which are symmetrically disposed on both side portions of the draw-out base 168 and which extend on the side edges of the draw-out base 168 along the conveying direction d, slidable members 182 slidably attached to the corresponding guide members 180, and supporting plates 184 fixed to the upper surfaces of the corresponding slidable members 182. Hooks 186 which can be engaged with the first notches 38a formed in the flanges 38 of the pallet p located at the draw-out standby position in the elevating frame 152 are provided on the corresponding supporting plates 184 so as to be retractable in a direction perpendicular to the conveying direction d.

Air cylinders $C_{S1}$ for retractably driving the hooks 186 are mounted on the supporting plates 184 so as to be located outside the hooks 186. A piston of each air cylinder $C_{S1}$ is connected to the-corresponding hook 186. When compressed air is supplied to the air cylinders $C_{S1}$, the hooks 186 are pushed to positions for engaging with the notches 38a.

Driving rollers 188 are rotatably supported on the distal end portions of the side edges of the draw-out base 168 on the side of the robot 12, and idle rollers 90 are rotatably supported on the proximal end portions on the side of the elevator 26 thereof. An endless belt 92 is looped around the driving roller 188 and the idle roller 190 at each side edge. When the driving roller 188 is rotated, the endless belt 192 travels. The driving rollers 188 at both side edges are rotated together through a coupling shaft 194.

The supporting plate 184 at each side edge is fixed to the corresponding endless belt 192. Along with the travel of the endless belt 192, the supporting plate 184 is reciprocally moved on the draw-out base 168 along the conveying direction d. A driven roller 196 is coaxially fixed to the corresponding driving roller 188. A servo motor $M_{S2}$ (not shown) is attached below the central portion of the side edge of the draw-out base 168 through a stay 198. Driving rollers 202 are coaxially fixed to the driving shaft 200 of the servo motor $M_{S2}$. An endless belt 204 is looped around the driving roller 202 and the driven roller 196.

With the above arrangement, when the servo motor $M_{S2}$ is driven, the driving rollers 188 and 202 are rotated, and the endless belts 192 travel accordingly. Thus, the hooks 186 are reciprocally moved along the conveying direction d.

Arrangement of Lid Opening Mechanism

The lid opening mechanism 170 will be described below with reference to FIGS. 15 and 16. Prior to the operation of draw-out/draw-in mechanism 172 for drawing out the pallet p from the draw-out standby position in the elevating frame 152 to the draw-out position on the draw-out base 168, the lid opening mechanism 170 lifts up the lid 40 capped on only the pallet p. In other words, the pallet p, in which the parts x are retained, can be taken out by the robot 12 and drawn out to the draw-out position on the draw-out base 168.

Figure 15:
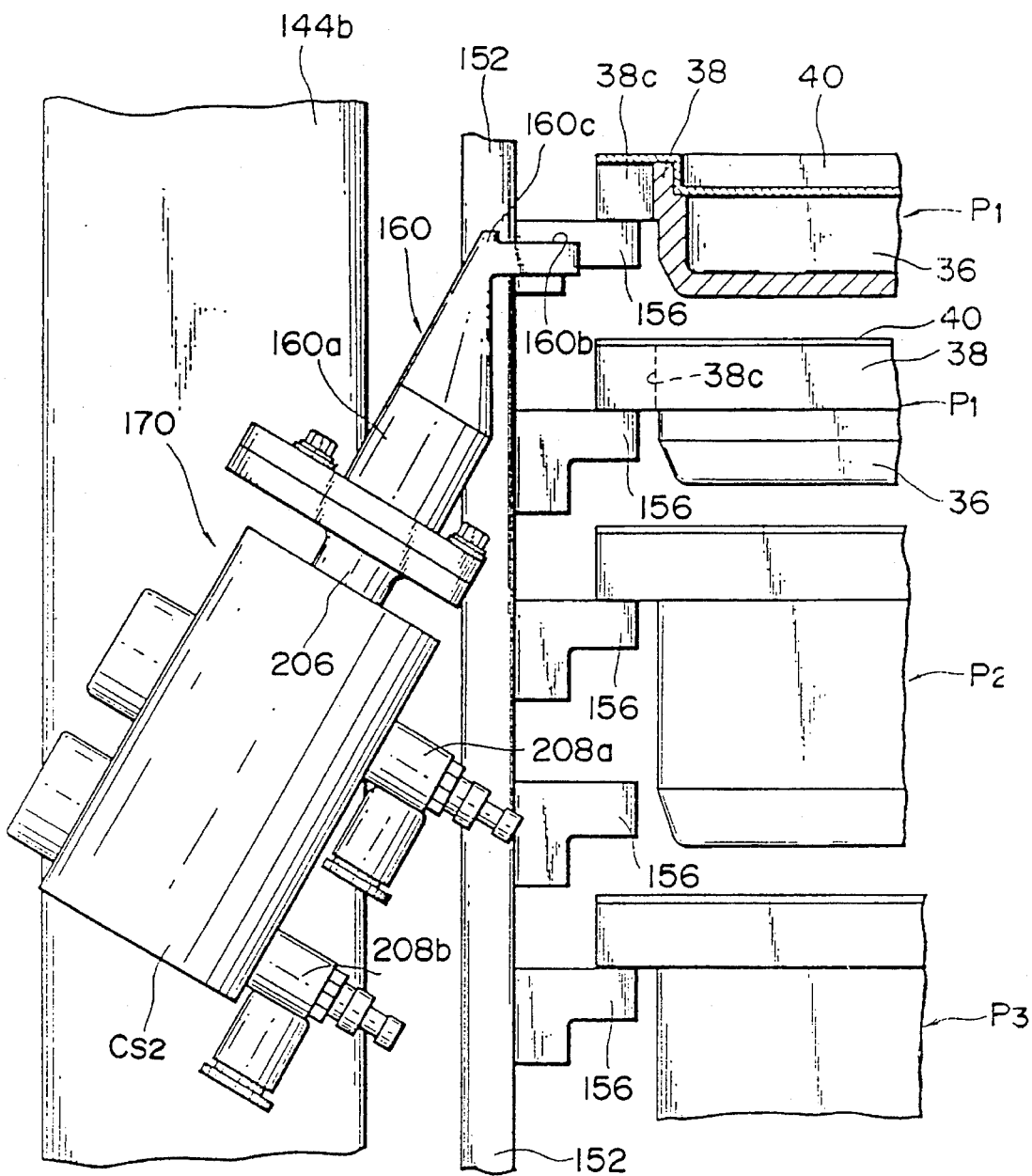
FIG. 15 is a side view showing an arrangement of a lid opening mechanism.

As shown in FIG. 15, the lid opening mechanism 170 includes air cylinders $C_{S2}$ mounted on the side surfaces (on the side of the elevator 26) of the pair of columns 144a and 144c on the side of the robot 12, and lift-up arms 160 attached to the distal ends of pistons 206 of the air cylinders $C_{S2}$. Each air cylinder $C_{S2}$ is obliquely mounted such that the sliding direction of its piston 206 is inclined upward at about 45 degrees from the horizontal direction toward the elevating frame 152.

The lift-up arm 160, attached to the distal end of each piston 206, is constituted by a body portion 160a and a projecting portion 160c. Body portion 160a is fixed to the piston 206 and extends along the extending direction of the piston 206. Projecting portion 160c is integrally formed with the distal end of the body portion 160a, has a horizontal upper surface 160b, and projects upward outside the upper surface 160b.

Each air cylinder $C_{S2}$ has two compressed air input terminals 208a and 208b. When compressed air is supplied to one input terminal 208a, the air cylinder $C_{S2}$ retracts the piston 206, so that the distal end of the lift-up arm 160 is deviated to a retracted position separated from the lid 40. When compressed air is supplied to the other input terminal 208b, the cylinder $C_{S2}$ pushes out the piston 206, so that the distal end of the lift-up arm 160 is deviated to a push-out position to be engaged with the lid 40.

The position, i.e., the vertical position, of the air cylinder $C_{S2}$ with the above arrangement is set such that the upper surface 160b at the distal end of the lift-up arm 160 at the push-out position can pass through the third notch 38c formed in the flange 38 of the pallet p at the draw-out standby position and can be engaged therewith from the lower side.

Operation of Lid Opening Mechanism

In the lid opening mechanism 170 with the above arrangement, when it is detected that the pallet p has reached the draw-out standby position in accordance with vertical movement of the elevating frame 152, the operation of the lid opening mechanism 170 is started for the pallet p. More specifically, compressed air is supplied to the second input terminals 208b of both the air cylinders $C_{S2}$, and the pistons 206 are pushed out obliquely upward.

As a result, the distal ends of the lift-up arms 160 connected to the distal ends of the pistons 206 pass through the third notches 38c formed at the center of the corresponding flanges 38 of the pallet p located at the draw-out standby position, and the upper surfaces 160b at the distal ends of the lift-up arms 160 respectively engage both side edges of the lid 40 from the lower side to lift up the lid 40 from the pallet p. In this manner, as shown in FIG. 16, the lid 40 is deviated to be separated upward from the pallet p located at the draw-out standby position. Therefore, this pallet p can be drawn out to the draw-out position.

On the other hand, when the take-out operation of part (or parts) x by the robot 12 is completed in the pallet p which is drawn out to the draw-out position, this pallet p is then returned (drawn-in) to the draw-out standby position. When the pallet p is returned to this position, compressed air is supplied to the first input terminals 208a of the air cylinders $C_{S2}$. In this manner, the lift-up arms 160 are pushed obliquely downward, and during the push-down operation, the lid 40 is capped on the pallet p to cover the upper surface of the pallet p returned to the draw-out standby position. In this manner, a series of lid opening operations are completed.

Operation of Draw-out Unit

A draw-out/draw-in operation for drawing out the pallet p, from which the lid 40 is removed by the lid opening mechanism 170, from the draw-out standby position to the draw-out position and then drawing-in (returning) the pallet p to the original draw-out standby position in the draw-out unit 154 will be described below.

In the initial state, the hooks 186 are moved in a direction opposite to the conveying direction d upon driving of the servo motor $M_{S2}$ so as to be brought to a position at which the hooks 186 can be engaged with the first notches 38a of the flanges 38 of the pallet p.

From this initial state, as soon as the push-up operation of the lid 40 is started, the air cylinders $C_{S1}$ are operated, so that the hooks 186 are engaged with the first notches 38a of the pallet p located at the draw-out standby position. Thereafter, upon completion of the push-up operation of the lid 40, the servo motor $M_{S2}$ is rotated in a direction opposite to that described above, and as a result, the hooks 186 are moved along the conveying direction d. More specifically, the pallet p with which the hooks 186 are engaged and which is located at the draw-out standby position is drawn out from the elevating frame 152 onto the draw-out base 168. The drawn pallet p slides along the pair of slide guides 178.

The pallet p sliding along the slide guides 178 and drawn out along the conveying direction d abuts against the stopper 176 and is then stopped. Driving of the servo motor $M_{S2}$ is also stopped. In this manner, the pallet p is held at the draw-out position.

Thereafter, the take-out operation of the part (or parts) x from the pallet p brought to the draw-out position is performed by the robot 12 (to be described later). Upon completion of the take-out operation, the servo motor $M_{S2}$ is again rotated in the reverse direction, so that the hooks 186 are moved in a direction opposite to the conveying direction d. In this manner, the pallet p is drawn-in (returned) and loaded onto the elevating frame 152. When the pallet p has completely been returned inside the elevating frame 152, driving of the servo motor $M_{S2}$ is stopped. Thus, the pallet p is held in the elevating frame 152.

Thereafter, the capping operation of the lid 40 in the above-mentioned lid opening mechanism 170 is executed, thus completing a series of draw-out/draw-in operations.

DESCRIPTION OF ROBOT

The arrangement of the robot 12 for receiving parts x fed from the parts feeding system 14 (equipped with the above-mentioned buffer 22, elevator 26, and stocker 24) and for assembling a predetermined product will be schematically described below with reference to FIGS. 1 and 2.

Arrangement of Robot

Figure 2:
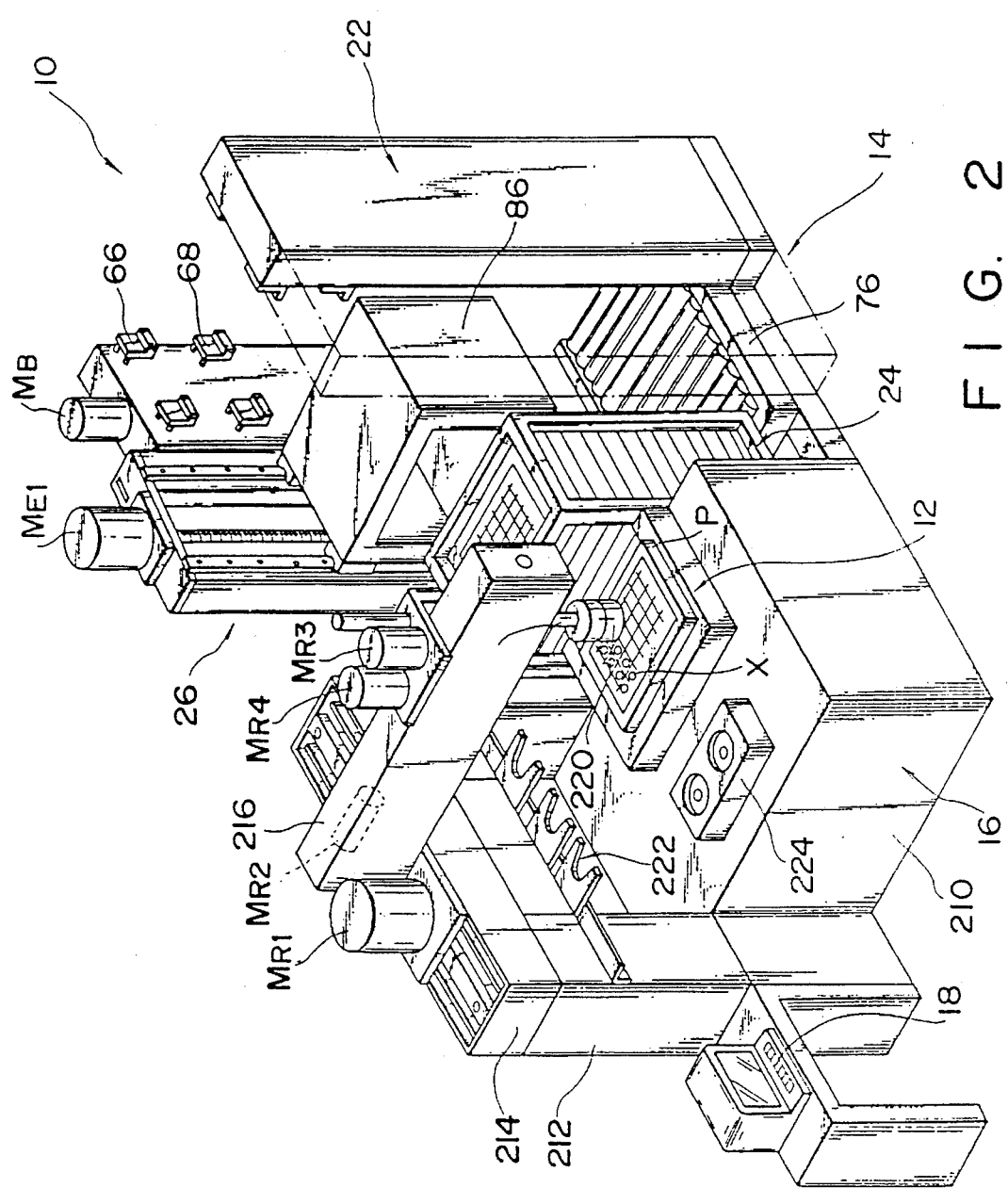
FIG. 2 is a schematic perspective view showing the overall arrangement of the FAC system shown in FIG. 1.

As shown in FIG. 2, the robot 12 includes a horizontal assembling stage 210 having a portion located below the draw-out unit 154 of the stocker 24. A pair of frames 212 stand at one side of the assembling stage 210. An X-axis robot arm 214 for defining the X-axis (an axis extending in a direction parallel to the conveying direction d) of the robot 12 is bridged on the frames 212. One end of a Y-axis robot arm 216 for defining the Y-axis (an axis extending in a direction perpendicular to the conveying direction d) of the robot 12 is supported on the X-axis robot arm 214 so as to be movable along the X-axis.

A robot arm (or hand) 218 for defining the Z-axis (axis extending along the vertical direction) of the robot 12 is provided to the side surface of the Y-axis robot arm 216 on the side of the feeding system. The robot hand 218 is movable along the vertical direction, i.e., the Z-axis, and is also movable along the Y-axis and rotatable along the Z-axis.

More specifically, a servo motor $M_{R1}$ for moving the Y-axis robot arm 214 along the X-axis (conveying direction d) is arranged on the X-axis robot arm 214. A servo motor $M_{R2}$ for moving the robot hand 218 along the Y-axis (in a direction perpendicular to the conveying direction d), a servo motor $M_{R3}$ for moving the hand 218 along the Z-axis (vertical direction), and a servo motor $M_{R4}$ for rotating the robot hand 218 along the Z-axis are arranged on the Y-axis robot arm 218.

A finger 220 corresponding to one of parts $x_1, x_2, x_3, \ldots$ is detachably mounted on the lower surface of the robot hand 218. The finger 220 is designed to grip the corresponding part x, and other fingers 220 corresponding to retaining parts $x_1, x_2, x_3, \ldots$ are interchangeably stocked in a finger station 222 provided to the frames 212. Note that an assembling base 224 for assembling the part x gripped by the finger 220 is provided on the assembling stage 210. The I/O device 18 is arranged adjacent to one frame 212.

Operation of Robot

The assembling operation of a product using parts x in the robot 12 with the above arrangement will be described below.

In an initial state, the robot hand 218 is positioned above the draw-out unit 154. From this initial state, when the pallet p retaining necessary parts x is drawn out from the stocker 24 to the draw-out position, the servo motor $M_{R3}$ is rotated from the time when it is detected that the pallet p is positioned at the draw-out position, so as to cause the robot hand 218 to be moved downward. Then, the gripping operation by the finger 220 is executed. Upon completion of the gripping operation of the part x, the servo motor $M_{R3}$ is rotated in the opposite direction to move the robot hand 218 upward, and the servo motors $M_{R1}$ and $M_{R2}$ are appropriately rotated to move the robot hand 218 above the assembling base 224.

The servo motor $M_{R3}$ is rotated again to move the robot hand 218 downward, and the assembling operation of the part x on the assembling base 224 is executed. Upon completion of the assembling operation, the gripping state of the part x by the robot finger 220 is released, and the servo motor $M_{R3}$ is rotated in the reverse direction to move the robot hand 218 upward. Thereafter, the servo motors $M_{R1}$ and $M_{R2}$ are rotated to return the robot hand 218 to the above-mentioned initial position. In this manner, a series of assembling operations regarding one of the parts x is completed.

During execution of the series of assembling operations, the pallet p subjected to the gripping operation of the parts x by the robot hand 218, i.e., the pallet p which has completed feeding of the parts x to the robot 12 is replaced with another pallet p which retains parts x necessary for the next assembling process, until the robot hand 218 is moved from the position above the pallet p to the assembling position, and is then returned to the position above the pallet p.

The time required for assembling one part x in the robot 12 is set to be 2.6 sec, i.e., a total of 0.3 sec for the downward movement toward the pallet p, 0.2 sec for the gripping operation of the part x, 0.3 sec for the upward movement from the pallet p, 0.5 sec for the movement to the position above the assembling base 224, 0.3 sec for the downward movement toward the assembling base 224, 0.2 sec for the assembling operation at the assembling base 224, 0.3 sec for the upward movement from the assembling base 224, and 0.5 sec for the upward movement to the position above the pallet p.

The draw-out/draw-in operation of the pallet p must be performed until the robot hand 218 starting from the position above the pallet p after it was moved upward from the pallet p is returned to the position above the pallet p during the operation time of the robot 12 described above. In other words, during a time interval wherein the robot hand 218 is moved downward from the standby position located above the pallet p, it grips the part x on the pallet p, and is then moved upward to the position above the pallet p; the draw-out/draw-in operation of the pallet p is therefore inhibited, and must be performed for a time interval other than the above-mentioned interval. For this reason, the maximum time allowed for the draw-out/draw-in operation of the pallet is defined as:

$$0.5+0.3+0.2+0.3+0.5=1.8 \text{ sec}$$

In other words, if the draw-out/draw-in operation of the pallet p is completed within 1.8 sec, the feeding operation of the next part x can be achieved without interrupting the assembling operation of the robot 12. For this reason, the operation time of the above-mentioned stocker 24 is set so that the draw-out/draw-in operation of the pallet p can be executed within 1.8 sec.

OPERATION OF SYSTEM

A method of controlling the operation of the FAC system according to this embodiment will be described hereinafter.

Arrangement of Control Unit

Figure 18:
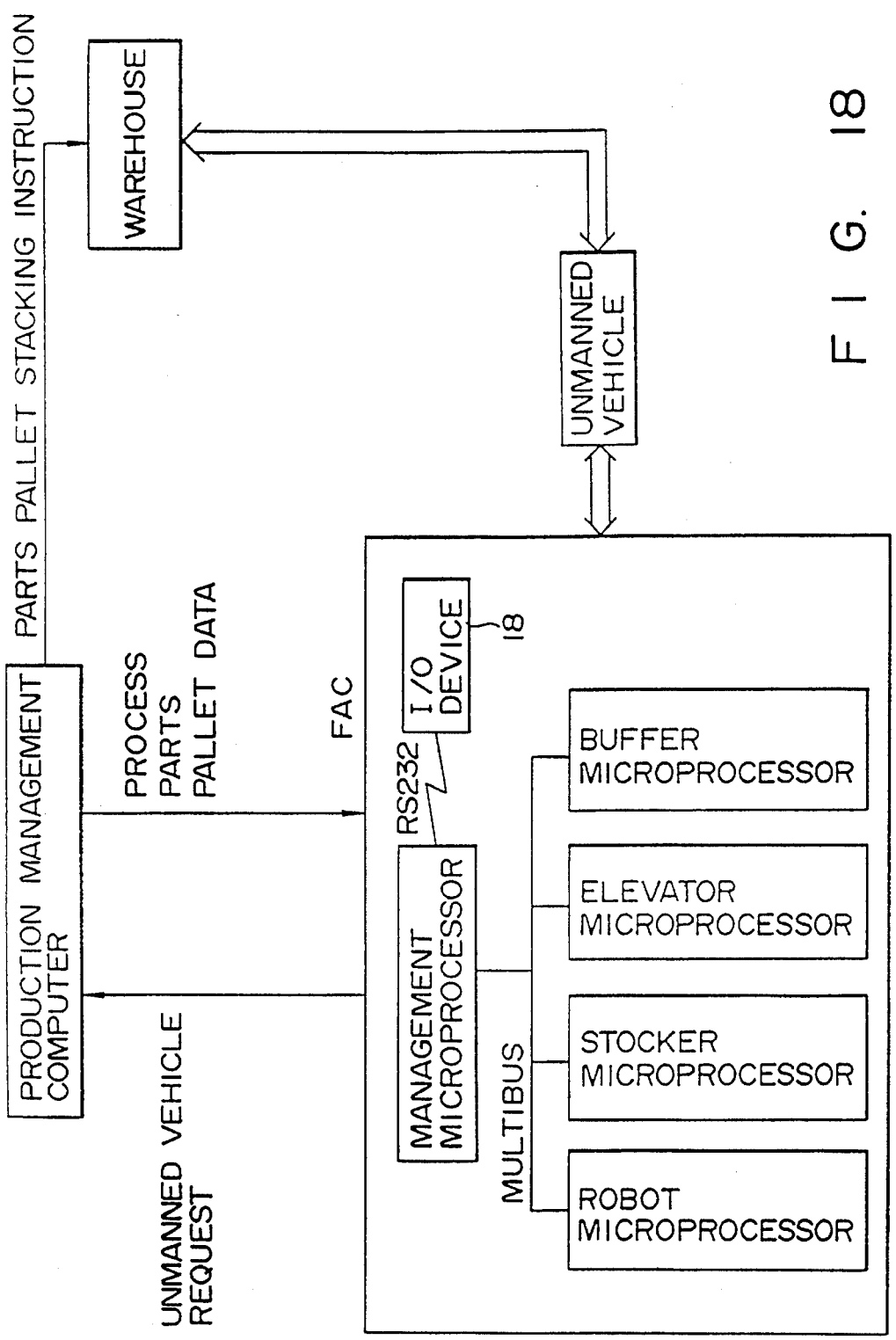
FIG. 18 is a view showing an arrangement of a control unit of the embodiment, and the connection relationship between the control unit and a production management computer.

FIG. 18 shows the arrangement of modules of the control unit 16 (FIG. 2) for controlling the FAC system of this embodiment. As described above, the FAC system of this embodiment includes the robot, stocker, elevator, and buffer as major components. The components are moduled not only in a structural sense but also in a control sense. More specifically, the control unit 16 has four microprocessor boards, i.e., a microprocessor board for controlling the robot, a microprocessor board for controlling the stocker, a microprocessor board for controlling the elevator, and a microprocessor board for controlling the buffer. These microprocessor boards are coupled through a known multi-bus interface. The four microprocessor boards are subjected to systematic management by a host management microprocessor board. The management microprocessor board is connected to the I/O device 18 shown in FIG. 2 through an RS232 interface. The management microprocessor board receives and designates assembling environments (e.g., designation of parts retained in a pallet, process order, and the like) from the I/O device 18 employing a normal personal computer.

Since the interior of the control unit 16 is moduled in units of control objects, as shown in FIG. 18, this FAC system can select from among the above-mentioned modules in consideration of various set conditions of environment, limitation, and the like. In addition, since the assembling environments are input from the I/O device 18, the setting can be desirably changed. This FAC system can reconstruct "flexible" system environments as its name implies. This will be understood from descriptions of the control unit program for the basic arrangement of the FAC system, modifications of various arrangements of equipment developed from the basic arrangement, and modifications of the program.

Inputting of Assembling Environment

The technical principle of this FAC system is not limited to manufacturing, but ultimately aims at selecting an article one by one from among a plurality of article groups (each article group includes articles of an identical means) in accordance with a predetermined order, and then "feeding" the selected article toward a given point. As the articles are fed toward the given point, the articles in each article group become short. Thus, the technical principle of this FAC system is summarized as a "feeding" of new articles toward the one given point without interruption of such feeding. An embodiment by which the technical principle of the present invention is applied includes automatic assembly by means of a robot. Such operation of the FAC is defined in a narrow sense and will be described below in detail. In the FAC system defined in the narrow sense, "feeding of articles" corresponds to "feeding of parts" to the robot by the stocker, and "supply of articles" corresponds to supply of new parts to the stacker by the buffer or elevator (including an unmanned vehicle, unmanned warehouse, and the like). "Assembling environments" in the FAC system in the narrow sense will be described below.

FIGS. 19A to 19C show display screens of the I/O device 18. The display screen is used when an operator inputs and changes various assembling environments at a keyboard, and is also used to display the present control conditions along with transition of control.

The assembling environments of this FAC system are, e.g., pallet data, i.e., a part name of a given part, a shelf position S of a pallet retaining the parts in the stacker, a total count T of parts which can be retained in the pallet, a thickness H of the pallet, a program number P for assembling and finishing the parts into a product by the robot, a bar code B printed on a predetermined location of a pallet, a number F of a finger which is attached to the robot hand so as to be used for the part, and the like. This FAC system employs standard-sized pallets as shown in FIG. 3. Therefore, if a part is determined, the assembling program P (e. g., screw fastening) of the part, and the specifications of a pallet retaining the part are determined. Determination of the pallet, e.g. the thickness H, is to depend upon the total count T of parts retained in the pallet, the height of the parts, and the like.

A table of parts to be used shown in FIG. 19A is prepared as follows. The operator inputs the total count T of the parts retained in a pallet, the thickness H of the pallet, the bar code B of the parts, the finger number F of the robot necessary for the assembly of the parts, and the program number P. The operator, observing the CRT display screen of the I/O device 18, functions independent of process orders. The process order G and the stocker shelf position S are automatically input and displayed by a management module program (FIG. 18) functioning in place of the operator when a process order table (to be described later) is input. Since the remaining parts count Z changes along with the progress of this process, the latest updated Z is continually displayed. During this process of inputting the parts table, an index number IDX is assigned to the parts. The parts can then be specified by the IDX number rather than direct part names. The order input process of this FAC system (FIG. 19B), thus further simplified.

In the case shown in FIG. 19A, for a pallet assigned with the parts index number IDX "1", a parts name of "screw", the total count of parts retained in the pallet of "38", the pallet thickness of 50 mm, and a program number of "100" are input. For a pallet assigned with the parts index number IDX "2", a parts name of "nut", the total count of parts retained in the pallet of "13", the pallet thickness of 25 mm, and a program number of "200" are input. For a pallet assigned with the parts index number IDX "3", a parts name of "washer", the total count of parts retained in the pallet of "54", the pallet thickness of 100 mm, and a program number of "300" are input, and so on.

All the assembling environment data input by the operator are uniquely determined if the parts are determined. Since the parts necessary for assembling a given product are predetermined, pallets retaining these necessary parts, programs, fingers, and the like can be uniquely determined. Therefore, these data can be supplied from a central production management computer system (FIG. 18) for simultaneously controlling a plurality of FAC systems.

Data associated with parts are not enough to assemble a product from the parts, and it is important to know assembling order of the parts. The operator of this FAC system lists all the parts necessary for assembling a variety of products in respective processes, and inputs them into the process order table (FIG. 19B) on the CRT The process order of "1", "2", "3", . . . is assigned in the input order during its input process, and its number is given as a variable G. The operator inputs the parts index number IDX to designate parts used in each process. The operator inputs, into the process order table, the shelf position S [G] of the stocker, on which a pallet retaining the corresponding parts is to be placed. More specifically, identical parts may be used in different processes, and the identical parts are retained in the same pallet. Therefore, the pallet on the same shelf is requested in the different processes. FIG. 19B shows the process order table input in this manner.

The table in FIG. 19B is a display of the input data for parts, chosen from among a plurality of parts, necessary in assembling a specific product. There are up to 64 process orders available, i.e., process Nos. 1 to 64 can be defined in this FAC system. The operator sequentially inputs the parts index numbers IDX and shelf positions S[G] in accordance with the process order while observing the display of the parts table shown in FIG. 19A. The program number P and parts name in the process order table are inserted by the management program. When the process numbers G and the parts index numbers IDX are associated with each other in this process order table, the process numbers G are associated with pallets used for the corresponding processes by the parts table (FIG. 19A).

If one part/one process/one shelf is given, the process order is identical to the shelf order S. If the parts are determined, the management program can detect the pallet thickness H based on the parts table. Thus, the management program, in place of the operator, calculates the shelf positions S [G] and can input the calculated positions to the table even if the operator does not input S [G]. When the process order is intensively determined such that identical parts are taken out from a pallet on the given shelf even in different processes, the operator must input S [G] regarding the pallet thickness H.

By another modification, the predetermined process order can be input from the central production management computer system to the FAC system through a communication line. This is possible because the process order for a given product is determined in advance by the production schedule, i.e., by the parts table input.

Variation Factors of Parts Feeding Efficiency

In the FAC system, the order of "feeding articles" (i.e., both the process order and the assembling order) has an extremely large influence on "article supply" efficiency. Factors influencing the parts feeding and supply efficiency include the pallet thickness H [G], and the shelf positions S [G] of pallets. The pallet thickness restricts the total number of pallets which can be stocked in the stocker 24. In this FAC system, a product is assembled from a maximum number of parts determined by the maximum number of pallets which can be stocked on the maximum number of shelves of the stocker. Therefore, when the number of pallets is restricted by the pallet thickness H, if identical parts are used in a plurality of processes in order to assemble a product, the identical parts must be taken out from the given pallet to suppress the total number of pallets. If parts in the given pallet are taken out in a plurality of different processes, the stocker 24 must be randomly moved upward or downward, and this leads to a decrease in a supply speed from the stocker 24 to the robot 12. In this manner, the process order G, the pallet thickness H, and the shelf position S [G] determine the efficiency of operation. Thus, the process order table must be carefully created in consideration of the above-mentioned factors. Since the total count T [G] is predetermined for each type of parts, generation frequency and generation order of empty pallets are influenced by the assembly and replacing efficiency of empty pallets. The operation efficiency of the elevator and the buffer is therefore also influenced.

Figure 17A:
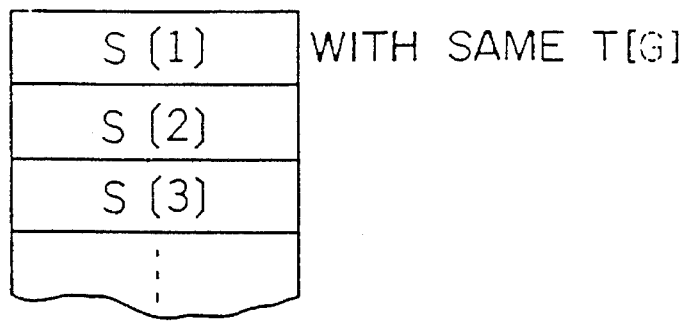
FIGS. 17A to 17E are views for explaining a change in movement of the stocker and the like depending on the processs order and shelf order.

FIGS. 17A to 17E explain the influence of the total count T [G] and the shelf position S [G] on efficiency assuming that the pallet thickness H remains constant. FIG. 17A shows the simplest case wherein pallets used in the respective processes have the same T for different parts, and are stacked on the shelves in the process order (i.e., S [G] is a forward order). In this case, the generation order of empty pallets corresponds to the process sequence order, and the stocker is uniformly moved upward.

Assuming that parts A and B are necessary for assembly, the assembling order must be A A B; 100 A parts can be retained in a pallet, and 50 B parts can be retained in a pallet.

Figure 17B:
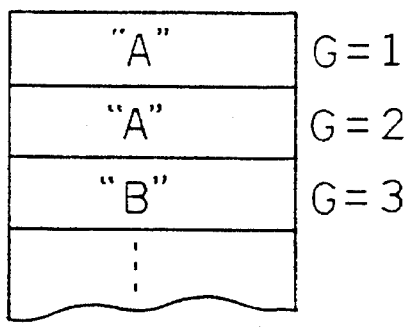

FIG. 17B shows a case wherein the parts A ⇨ A ⇨ B are taken out from pallets in processes 1 ⇨ 2 ⇨ 3. In this case, the stocker 24 is regularly moved upward, and the pallet replacing frequency is small. However, a large number of pallets are undesirably required.

Figure 17C:
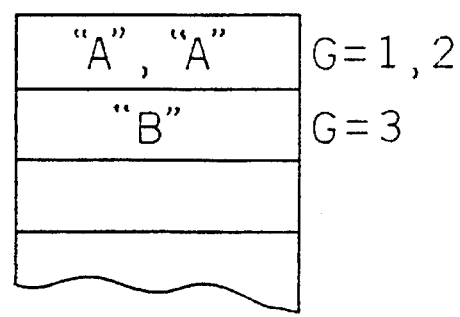

FIG. 17C shows a case wherein parts A retained in a given pallet are used in processes 1 and 2. In this case, the stocker is moved regularly, the pallet replacing frequency is low, and there is no waste of necessary pallets. This is an ideal case sufficiently considering the particular assembly, process order G, and pallet capacity T.

Figure 17D:
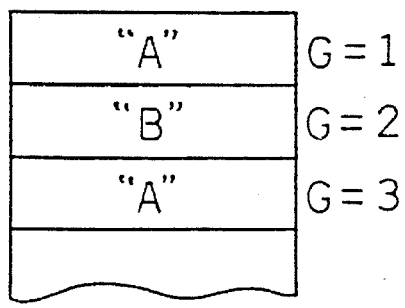
Figure 17E:
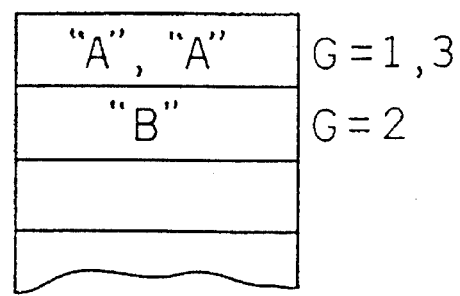

When the assembling order is A ⇨ B ⇨ A, if the process order and the shelf positions are determined as shown in FIG. 17D, the number of shelves is wasteful, but the stocker is moved regularly. In the case of FIG. 17E, there is no waste of the number of pallets, and replacement of pallets successively occurs. However, the stocker 24 is abruptly vibrated in the vertical direction.

The influence of the assembling order, the process order G, the total count T [G], and the shelf position S [G] on the parts feeding and supply efficiency has been described with reference to detailed samples. This FAC system does not analyze factors which influence efficiency in the manner of the above elements, nor provide optimal assembling orders and parts feeding schedules. When the assembling schedule and the process order are determined by an operator or the production management computer, the FAC system can be flexibly applied to any process order and schedule, and can most efficiently feed parts to the robot 12 and supply parts to the stocker 24 within the range of the predetermined schedule and order. More specifically, the process order G, the shelf position S [G], and the like are processed as variables, as shown in FIG. 21A, thus providing a flexible system.

As shown in the example of FIG. 17A, the process order table is input such that the pallet stacking order in the stocker corresponds to the process order, so that the FAC system achieves "flexibility" with respect to a change in the parts feeding efficiency to the robot. In other words, this FAC system aims at maintaining continual assembly by the robot 12. More specifically, the pallet stacking order in the stocker 24 is not always the process order, but can be an order of pallets in which parts are used up to zero and which must be replaced. In a control operation for feeding parts to the robot 12 without interfering with the operation of the robot 12 as the characteristic feature of this system, the pallet stacking order corresponds to the process order in this embodiment in consideration of the following facts. That is, the total number of parts retained in a pallet varies depending on parts and hence, pallet replacing timings do not always follow the stacking order in the stocker and cannot be easily predicted. A change in remaining parts count due to a parts picking error by the robot can be flexibly coped with, and inputting of the process order is ergonomically suitable, as shown in FIG. 19B, and so on. Therefore, the program can be easily corrected so that the robot, stocker, elevator, and the like are optimally controlled in consideration of a case wherein the pallet stacking order in the stocker does not correspond to the process order, as can be understood from the descriptions of control operations of the basic arrangement of the embodiment and arrangements of modifications.

Figure 20:
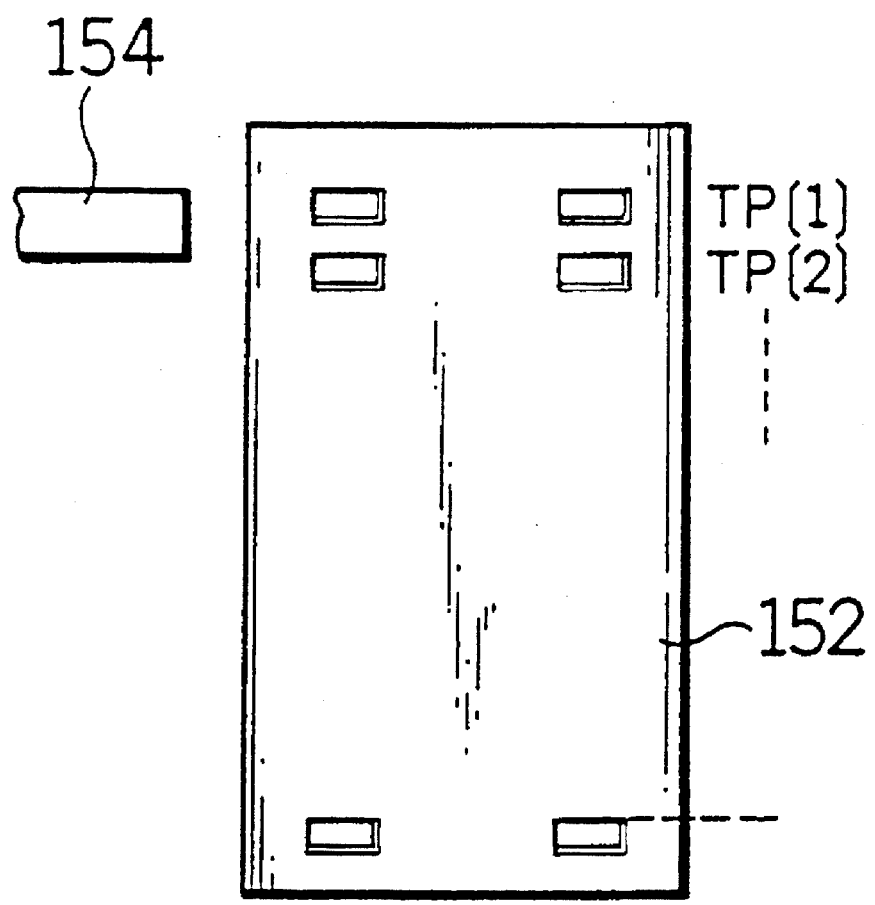
FIG. 20 is a view for explaining shelf position teaching of the stocker.

A total of 20 stages of the shelves 156 of the stocker shown in FIG. 14 are prepared in this embodiment, and are given as 1st, 2nd, . . . , 20th stages starting from the uppermost stage. As shown in FIGS. 14 and 20, the shelves are arranged at equal intervals (about 30 mm). Therefore, when pallets of three different thicknesses (25 mm, 50 mm, 100 mm) are stocked on the stocker, the 100-mm thick pallet occupies four shelves. In the case shown in FIG. 19A, a pallet retaining "screws" having the number IDX "1" in the first process is placed on the first shelf, a pallet retaining "washers" having the number IDX "3" is placed on the third shelf, and a pallet retaining "nuts" having the number IDX "2" in the third process is placed on the seventh shelf. The shelf positions of pallets (i.e., the stocker shelf position number S in FIG. 19A) are calculated and determined by the management program in consideration of the pallet thicknesses or determined and input by the operator in consideration of efficiency. These shelf positions are sequentially displayed in the table shown in FIG. 19A.

In this manner, when the operator inputs predetermined minimum data in the parts table and the process order table, the management program calculates and displays the process order, the stocker shelf position S, and the like in the parts table. Thus, complicated and various assembling environments can be set with high operability, and can be easily altered by only changing the input data. Thus, process alteration and parts alteration can be flexibly coped with.

Other Display Elements

FIG. 19C shows pictorial symbol keys on the display screen of the I/O device. A "CONTINUOUS" key is used for instructing a normal continuous assembling/parts feeding operation mode. When the "CONTINUOUS" key is depressed, a SINGLE flag in a memory (not shown) in the management microprocessor (FIG. 18) is set to be "0". When the continuous operation mode is set and a "START" key then depressed, the system is continuously operated until a "STOP" key is depressed or an abnormality occurs. A "SINGLE" key is used for designating a single operation mode. When the "SINGLE" key is depressed, the SINGLE flag is set to be "1", and a single operation (the range of single operation varies depending on modules) is executed each time the "START" key is depressed.

Variables Used in Control

FIG. 21A shows common variables (grobal variables) which can be commonly used (accessed) by the microprocessors of the respective modules. These variables are formatted in a two-dimensional array and indexed by an index number G (process number). A replacement flag I[G] is a flag indicating that a pallet of a process order G (S[G]th shelf in the stocker from the uppermost shelf) is empty. Most of other common variables are the same as those shown in FIGS. 19A and 19B, and a detailed description thereof will be omitted.

FIG. 21B shows save areas of process numbers ($E_1$, $E_2$, $D_1$, $D_2$) in order to queue preparation instructions of pallets to be replaced (issued to the elevator and buffer when the remaining parts count Z in each pallet becomes 1) sent from the robot 12 to the elevator 26 and buffer 22. As can be seen from FIG. 21B, the number of queues is 2. This is because, in consideration of the mechanical speed (e.g., motor speed) of modules used in this embodiment, three or more queues will not be generated even in the worst case. Of course, since the mechanical speed varies depending on devices to be used, the number of queues can be increased to be 3 or more. The use of queues in this embodiment will be described later.

Vertical Movement Ranges of Modules

Figure 22A:
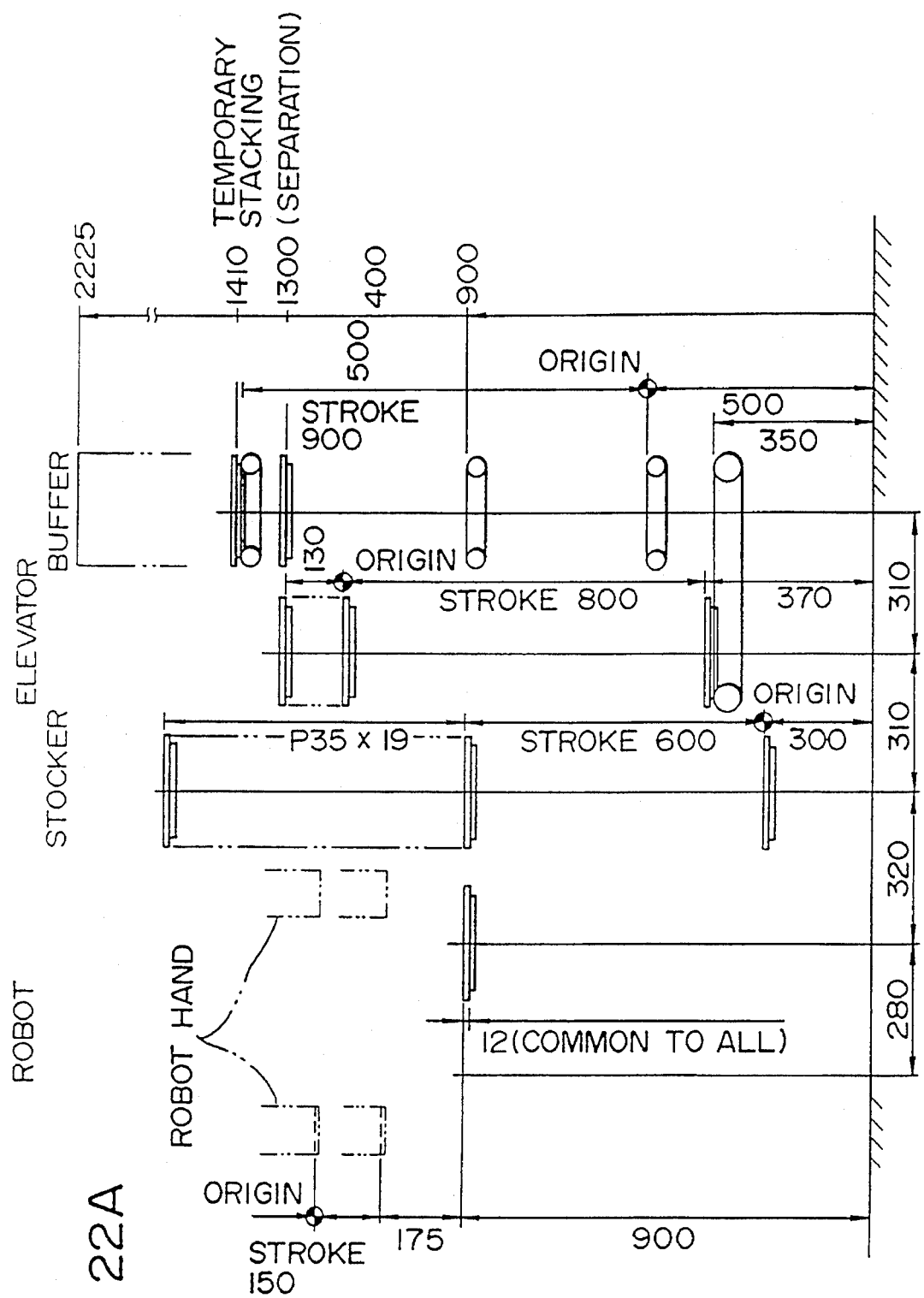
FIGS. 22A and 22B are views showing vertical positional relationship of module operations in the FAC system.

The vertical movement ranges of modules will be described with reference to FIG. 22.

Figure 25B:
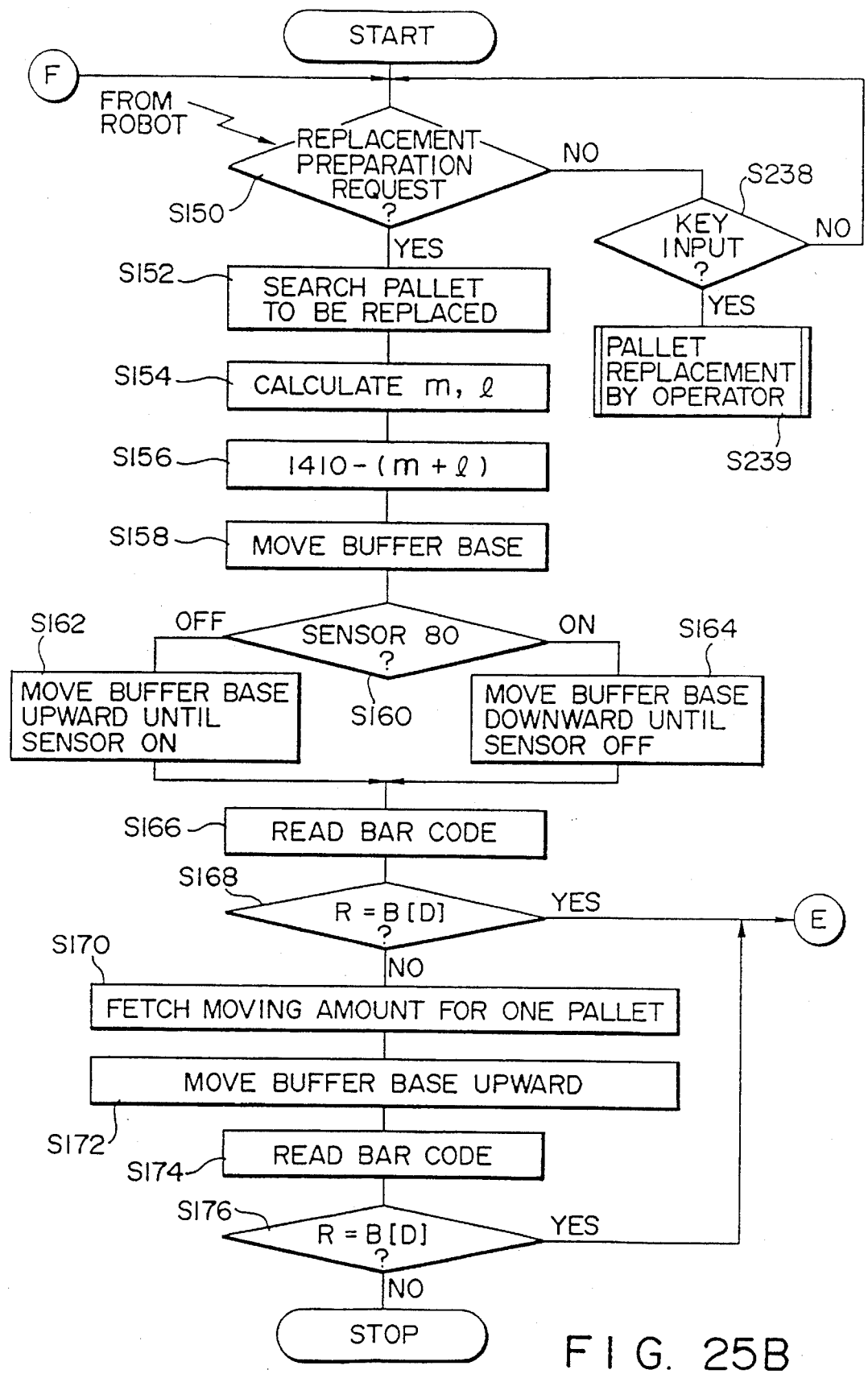
FIGS. 25B and 25C are flow charts of a buffer control program.

In the buffer, the buffer base 52 receives a stack of pallets from the unmanned vehicle 20 at a 900-mm high position above a floor. A position at which the first separation pawls hook a pallet stacked immediately above a pallet to be separated (to be referred to as a temporary storing position hereinafter) is 1,410 mm high above the floor. A position at which the second separation pawls hook the pallet to be separated (to be referred to as a "separation position" hereinafter) is 1,300 mm high above the floor. The temporary storing position and the separation position are nominal positions, and the thickness of a pallet has an allowance. Thus, vertical movement amount control of the buffer regarding the allowance is performed as will be described later (FIG. 25B). The lowermost position of the buffer base 52 is 500 mm high above the floor. This position is given as a teaching origin of buffer movement control. A maximum number of pallets to be stacked on the buffer base is set in consideration of pallet thickness and the like so that the uppermost pallet does not exceed a 2,225-mm high position from the floor when a plurality of pallets are stacked on the buffer base and the buffer base 52 is moved upward to the temporary storing position.

The unloading mechanism 76 is set at a 350-mm high position from the floor. As described above, the buffer base can be moved downward to a 500-mm high position from the floor as its lowermost position. The buffer base is moved upward during unloading so as not to interfere with unloading of empty pallets in a state wherein empty pallets are fully stacked on the unloading mechanism 76.

The vertical movement range of the elevator 26 will be described below. The uppermost position of the elevator 26 corresponds to the separation position at which the pallet filled with parts hooked by the second separation pawls matches the slide guides 122 (to be referred to as a "pallet take-out position"). The pallet take-out position is given as a teaching position of elevator control. With this setting, the stroke range of the elevator is 800 mm.

The movement range of the stocker 24 will be described below. As described above, the stocker has 20 stages of shelves at 30-mm intervals. Therefore, the height of the stocker 24 is 600 (=30×20) mm. The 20th shelf position when a pallet on the 1st shelf is drawn out to the draw-out unit 154 is the lowermost position of the stocker. This position is given as a teaching origin, and is set to be 300 mm high above the floor.

The origin of the vertical movement of robot teaching is 1,225 high (900+175+150) mm high above the floor. The finger of the robot hand grips one part from a pallet on the draw-out unit 154, moves the part upward, horizontally moves the part to the assembling position, and then moves the part downward.

Summary of Pallet Replacing Operation

Figure 22B:
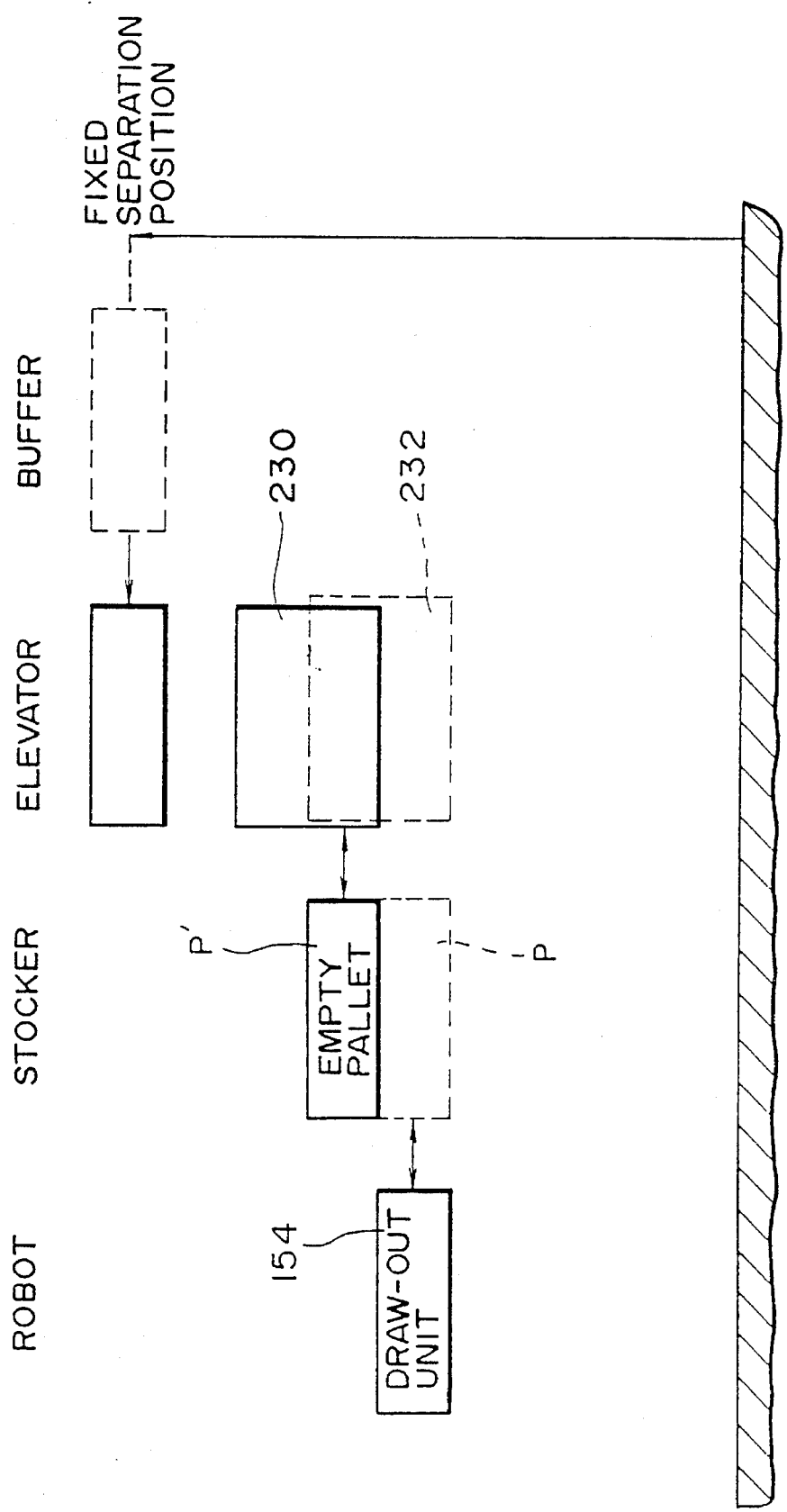

A state will be described with reference to FIG. 22B wherein one pallet filled with parts is taken out from, the buffer 22 by the elevator 26 and is replaced with an empty pallet in the stocker 24.

When the number of parts in a pallet is reduced to one, the robot 12 instructs the buffer 22 to prepare for separation from the pallet and instructs the elevator 26 to be moved to the separation position. The pallet separated at the separation position (this position is a fixed position) by the buffer 22 waits for the take-out operation by the elevator 26. When the elevator 26 is moved to the separation position (take-out position) and takes the pallet in the elevator body, the elevator is moved downward to a position to match with a pallet which will become empty soon (or has already become empty; a pallet which is normally located immediately above a pallet which is drawn out onto the draw-out unit 154 to the robot) in the stocker 24. The elevator 26 then waits for the next operation. This standby position varies depending on the process order and shelf position S [G]. However, when the pallets are aligned in the process order from the uppermost shelf, this standby position is a position indicated by a solid line 230, as shown in FIG. 22B. In this manner, the empty pallet replacement preparation of the elevator is completed.

After a pallet retaining only one part is drawn out again from the stocker body to the draw-out unit 154 and the last part is gripped by the robot 12, the remaining parts count in the pallet becomes "0". Then, pallet replacement between the stocker 24 and the elevator 26 is started. More specifically, the elevator draws the empty pallet in its lower portion in the standby position state 230 described above. Thereafter, the elevator is moved downward by one stage, and pushes out a pallet filled with parts to an empty stocker shelf. This push-out state position is indicated by a broken line 232 in FIG. 22B. Thereafter, the elevator is further moved downward, and stacks the empty pallet on she unloading mechanism 76. Thus, replacement of the empty pallet is completed.

Detailed Description of Each Module Control

The schematic operation of the modules of the FAC system has been described. A detailed control operation of the modules will be described with reference to FIG. 23A and subsequent drawings. Note that as has been described above, this control program has a complicated architecture since it can flexibly cope with cases illustrated in FIGS. 17A to 17E. The following description of the module operation will be made in consideration of a typical arrangement of assembling order, process order, and pallet stacking order. A detailed description of the initial state of each module under the control of the corresponding module in a transfer process will be described as needed. The initial state is as follows:

①: Pallets having the same thickness are stocked in all the shelves (i.e., 20 shelves) in the stocker, and the numbers of parts retained in pallets are different from each other.

②: The processes follow the shelf order, and one process uses one part in one pallet. More specifically the total number M of processes is equal to the total number of shelves of the stocker, i.e., 20.

③: Necessary supplementary pallets are stacked in advance on the buffer base 52.

The arrangement with the above initial state is called a "simplified arrangement" for the sake of simplicity. The operations of the modules starting from this "simplified arrangement" are as follows:

①: The robot 12 performs a one part/one process assembling operation from each pallet.

②: The stocker draws out a pallet to the draw-out unit 154 while being sequentially moved upward from the 1st shelf to the 20th shelf, and after a pallet on the 20th shelf is drawn out to the draw-out unit 154, the entire stocker is moved downward, so that a pallet on the 1st shelf is drawn out again.

③: In the elevator and buffer, since the remaining parts counts Z of pallets become 1 or 0 at different timings, the empty pallet replacing requests are not always generated in the same order as the shelf order of the stocker.

A description will be made beginning with the assembling operation by the robot.

CONTROL OF ROBOT AND STOCKER

Until Remaining Parts Count Becomes 1

Figure 23A:
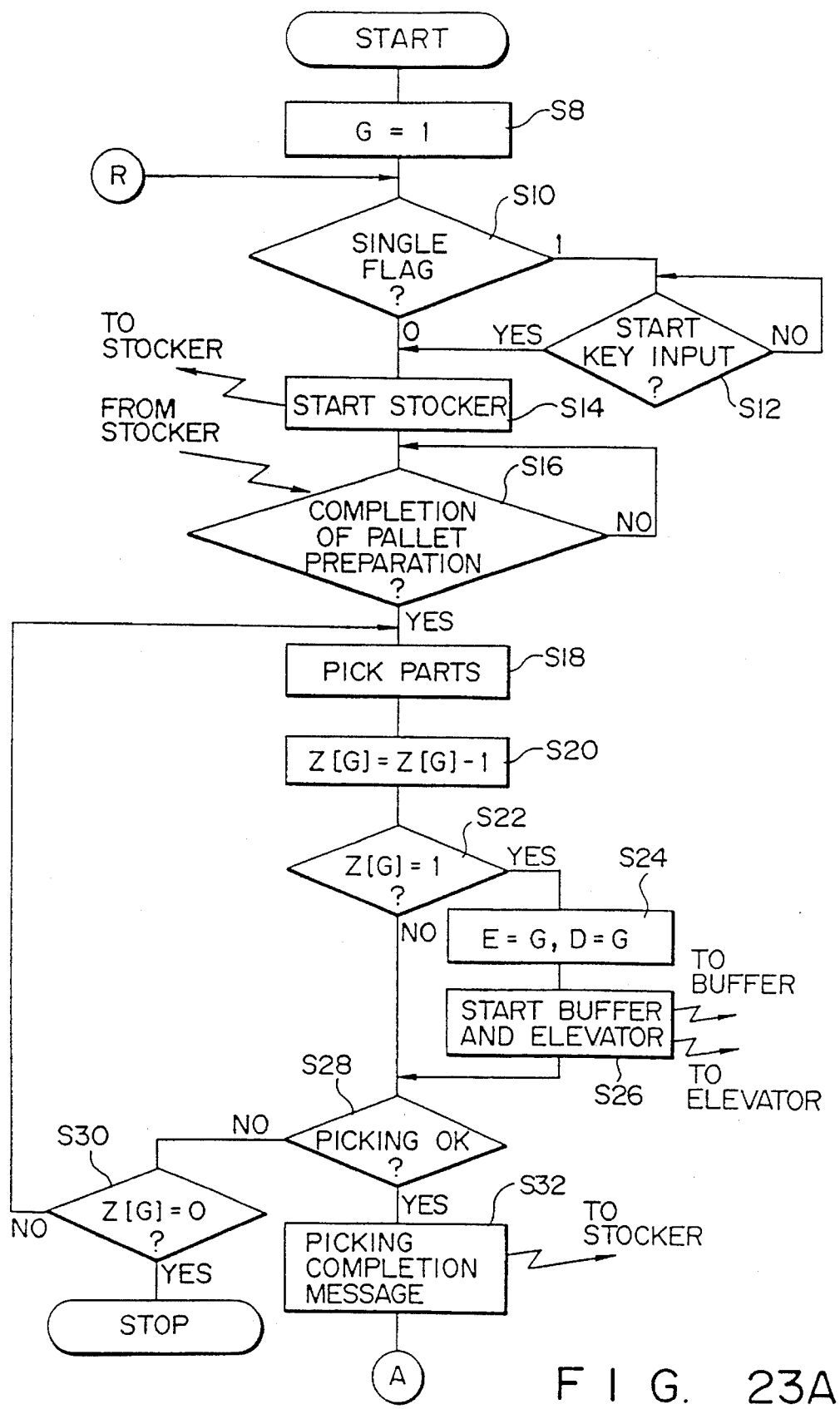
FIGS. 23A and 23B are flow charts of a robot control program.
Figure 23B:
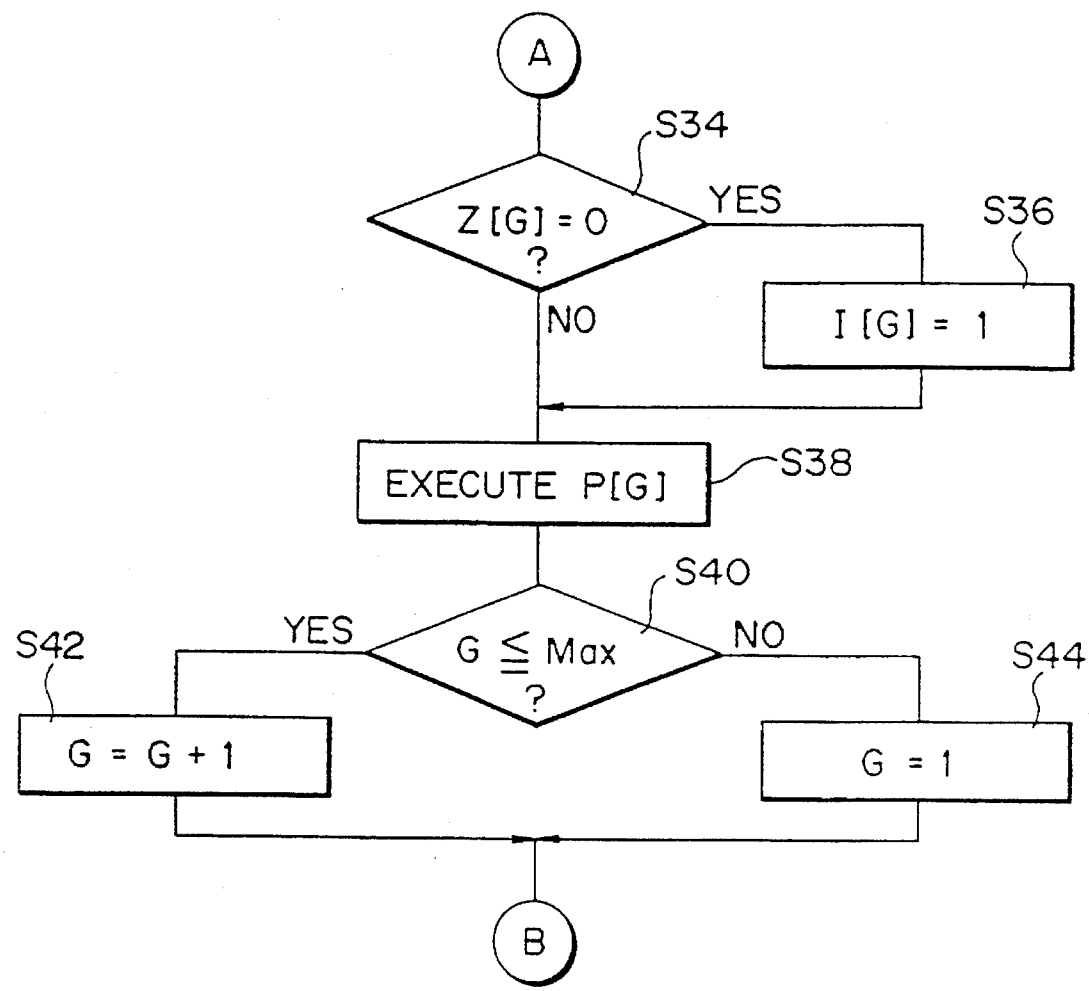

Robot control is made in accordance with a program shown in the flow charts of FIGS. 23A and 23B. Stocker control is made in accordance with a program shown in the flow charts of FIGS. 24A and 24B. Descriptions of these two modules are made together since the elevator, buffer, and the like are not operated until the remaining parts count Z in some pallet in the stocker becomes "1".

As has been described above, when the "START" key of the I/O device 18 is depressed, the program of the management microprocessor (See FIG. 18) starts programs of the modules. The microprocessor of the robot module initializes the process number index G to be "1" in step S8. The process number G="1" means that the robot requests a part having the process number "1", and hence means that a pallet on an S [1]st pallet of the stocker is requested to the stocker. In step S10, the state of the SINGLE flag (FIG. 19C) is checked. If the SINGLE mode is set, the flow advances from step S10 to step S12. Only when the "START" key is depressed, is the following control operation executed to perform a single operation. In the following, continuous operation will be described.

In step S14, the stocker is started. Instructions to other modules are issued through the above-mentioned multibus. After the stocker is started, the robot waits until the pallet of S [G] in the stocker is drawn out to the draw-out unit 154 (i.e., completion of pallet preparation).

Once the stocker in waiting detects a start instruction from the robot 12 in step S60, the flow advances to step S62 to check if some pallet has already been drawn out onto the draw-out unit 154. This check is made by a sensor (not shown) on the draw-out unit 154. The checking operation is performed both after the stocker is stopped and restarted for any reason, and in the SINGLE mode. Therefore, if the pallet has already been drawn out to the draw-out unit 154, the flow advances to step S64 to check if the drawn pallet (the type of pallet can be detected based on the variable L) is one having process number G=1 requested by the robot 12. If the pallet requested by the robot 12 is detected, since a pallet need not be drawn out, the flow advances to step S84, and a pallet preparation completion message is sent to the robot through the multibus. If it is determined in step S64 that the drawn pallet is not one for the process G (S [G]th shelf) requested by the robot, the pallet is returned to the stocker in step S66. The operations of the air cylinder $C_{S4}$ and the motor $M_{S2}$ for returning the pallet into the stocker have already been explained, and a detailed description thereof will be omitted.

If it is determined in step S62 that no pallet is drawn out or if the already drawn pallet is returned in step S66, the flow advances to step S68. The process number of the pallet requested by the robot is stored in the variable L. The variable G indicating the pallet requested by the robot is stored in the variable L by the stocker 24 since the robot and stocker can basically perform independent parallel operations while sometimes taking synchronization.

The flow advances to step S70 to calculate the rotating degree required by motor $M_{S1}$ for moving the stocker in the vertical direction to match the pallet requested by the robot with the draw-out unit 154. The module learns in advance the origin of the shelves of the stocker (300-mm high position from the floor in FIG. 22A), as shown in FIG. 20. Therefore, since the pallet for the process G (=L=1) is stocked in the shelf having the stocker shelf number S [L] indexed by the value of L, S [L] of L=1 is indexed from variables S [L] shown in FIG. 21A, and a teaching point TP [S [L]] having the indexed value as an index number is searched from the teaching points shown in FIG. 20. The detected value is given as a moving degree STP of the servo motor. That is, $$STP=TP[S[L]]$$

In step S72, the stocker is moved according to the moving degree. When the servo motor $M_{S1}$ is rotated to the STP position, the shelf storing the pallet requested by the robot 12 has reached the draw-out position. A CH flag in step S74 indicates that the replacing request from the robot has already been issued. If G=L=1, the CH flag is reset since a replacement necessary state is not yet generated. Thus, the flow advances to step S78. In steps S78 and S80, the lid of the corresponding pallet is opened, and the pallet with the open lid is drawn out to the draw-out unit 154 under the above-mentioned control. When the pallet abuts against the stopper 176 of the draw-out unit 154, a message indicating that the pallet has completed preparation of the draw-out unit 154 is issued to the robot 12 in step S84. The stocker waits for a predetermined message from the robot 12.

When the robot 12 which waits for the preparation completion message from the stocker 24 in step S16 (FIG. 23A) receives this message, the flow advances to step S18. In step S18, the robot 12 is moved to a position above a part in order to pick up the part in the pallet placed on the draw-out unit 154, and is then moved downward to pick the part. In step S20, the remaining parts count Z [G] of the parts for the process number G is decreased by one. It is then checked in step S22 if the remaining parts count Z has become "1". If the remaining parts count Z [G] is larger than 1, it is checked in step S28 if the finger of the robot can pick the part. Unsuccessful picking of the part occurs when a part is not inserted in the corresponding location in the pallet or in the case wherein the finger fails to grip the part. In this case, a re-picking operation is performed in step S18 until the desired part can be normally gripped or the remaining parts count becomes 1. If it is determined that the part can be normally picked, a picking completion message is sent back to the stocker 24 in step S32.

When the stocker 24 receives both a message indicating that the robot 12 is in operation and a message indicating picking completion, the flow advances in the order of steps S86, S88, and S90 to return the pallet on the draw-out unit 154 into the stocker. In step S92, the CH flag is checked. Since this flag is reset, the flow advances to step S100. In step S100, I [L] is a flag indicating that the remaining parts count Z in an Lth pallet detected by the robot becomes zero and a replacing request is issued from the robot. Thus, this flag is reset at this time. Therefore, the flow advances to step S118 to increase L by one. That is, $$L=L+1$$

Figure 24A:
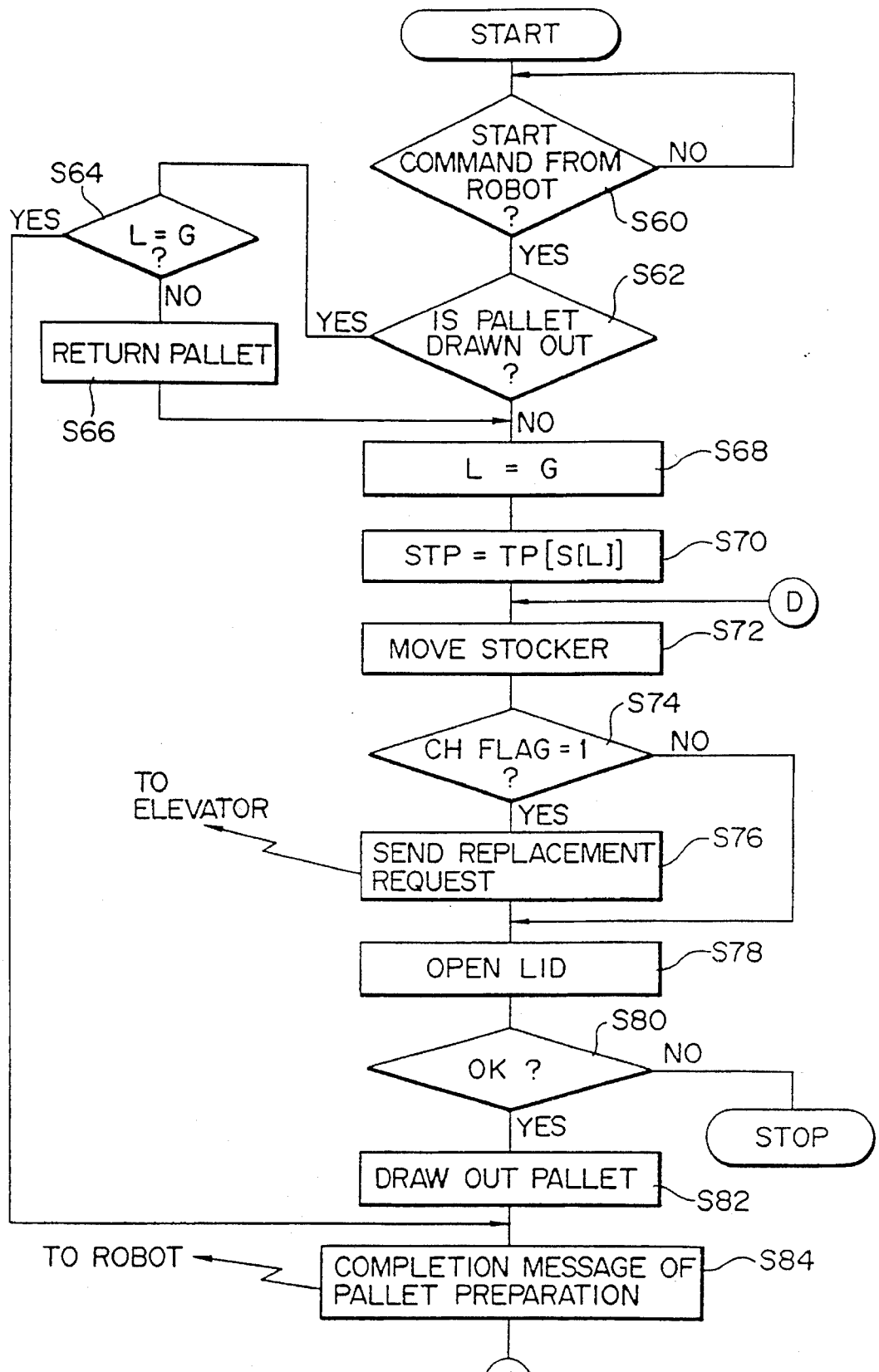
FIGS. 24A and 24B are flow charts of a stocker control program.
Figure 24B:
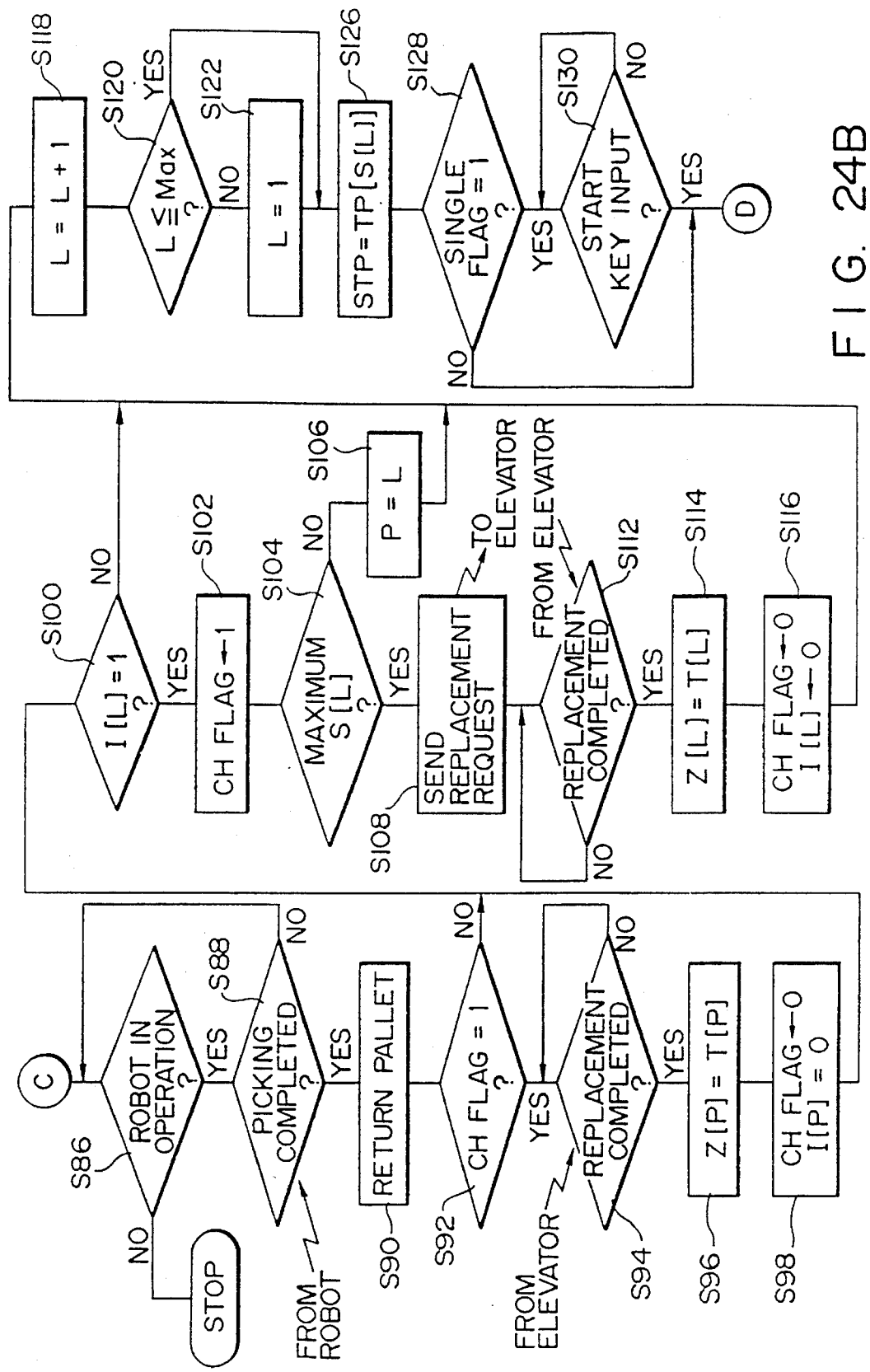

From step S118 to step S126, i.e., while the robot 12 assembles the part picked in step S18 (FIG. 23A), the stocker 24 prepares for the next pallet (part) on the draw-out unit 154. More specifically, it is checked in step S120 if present process is the final process. If it is determined in step S120 that the present process is not the final process (when L=20 since the total number of processes is 20 in the above-mentioned "simplified arrangement"), the flow advances to step S126 to calculate the degree of movement required to move a shelf (L has already been incremented by one in step S118) to the draw-out unit 154 position. The shelf to be moved is of a pallet next to the pallet from which the part was picked up by the robot. In control steps S128 and S130, every depression of the "START" key in the SINGLE mode results in movement of the stocker. The flow returns from step S130 to step S72 in FIG. 24A. Then, the data STP calculated in step S126 is sent to the motor $M_{S1}$ to match the next shelf with the draw-out unit 154 position. The above-mentioned control operations are repeated until the remaining parts count Z[G] in some pallet becomes 1. The stocker control program shown in FIG. 24B is programmed based on the assumption that all the processes of assembly require parts. However, in practice, some processes, e.g., a finger exchanging process, do not require parts. In this case, the shelf movement of the stocker (step S126) need not be performed. Thus, a flag for discriminating if a process requires parts (or parts indexes are represented by alphabets) can be set. Before step S126, the value of this flag is checked. If it is determined that the process does not require parts, the flow does not advance to step S126 but returns to step S118 so as to advance the process.

When Remaining Parts Count Has Reached 1

The remaining parts count Z[G] of the shelf S [G] then becomes 1 in a given process G. More specifically, When one part is picked up from the pallet having the remaining parts count of 2 in step S18, since the remaining parts count becomes 1, the flow advances from step S22 to step S24. The process number G is saved in the process number variables E and D to be used in the elevator and buffer control programs. In step S26, the elevator and buffer are instructed to start preparation of a new pallet since the empty pallet will soon be detected. The replacement preparation instruction is stored in the queue area described above. If the elevator and buffer are not busy in the previous replacement preparation operation, they extract the queue and start the replacement preparation operation.

After the replacement preparation instruction is issued to the buffer and elevator, the robot maintains the picking operation as long as a message indicating that the pallet is drawn out from the stocker to the draw-out unit 154 position is detected in step S16.

In the control operation of this embodiment, the stocker 24 stops its operation when the robot 12 detects that the remaining parts count Z of the pallet in a given process G (=L) becomes zero. A message indicating such is sent to the stocker (by means of I [L]). The stocker draws out a pallet for the next process G+1 (=L+1) to the draw-out unit 154. The robot picks up a part in the pallet of G+1. The replacing operation of the pallet whose remaining parts count is zero as detected in the process G, is not yet completed (step S94). More specifically, the stocker waits until the replacing operation is completed. Since a pallet for a process G+1 next to the process G in which the remaining parts count Z [G] becomes zero still retains parts, replacement of the empty pallet in the process L (=G) can be performed parallel to the parts assembly in the process (G+1) by the robot.

PALLET REPLACEMENT

Pallet Separation by Buffer

FIG. 25A shows variables used in the buffer control program. More specifically, these variables include a stage number of the uppermost pallet placed on the buffer base, a read data storage area B by the bar code reader, the pallet height data in units of stages, parts names, and the like. The stage number of the uppermost pallet is used to indicate a presently valid portion of these variables since the data of a taken-out pallet is deleted along with the take-out operation of pallets from the buffer by the elevator. As will be described later, when this FAC system requests a necessary pallet to the unmanned warehouse through the production management computer, and when the pallet is transferred from the unmanned vehicle to the buffer without a manual operation, these data are supplied from the system (the program of the management microprocessor shown in FIG. 18) to the buffer. In contrast, when the pallets are manually stacked on the buffer base 52, the above-mentioned data are input from the I/O device 18.

The robot issues a replacement preparation instruction to the buffer through a queue in step S26 (FIG. 23A). A process number corresponding to a pallet necessary for the replacement preparation is saved in the variable D in the queue in step S24. When the buffer receives the replacement preparation instruction in step S150, the flow advances to step S152, and the parts name (or parts index IDX) of the pallet to be replaced is searched from the variable table shown in FIG. 21A based on the process number D supplied from the robot. The parts name (parts index IDX) is then searched from the table shown in FIG. 25A to detect the position of the shelf on which the parts pallet to be replaced is stacked. In step S154 a distance (given by l) from the buffer base 52 to this pallet is calculated. The distance is obtained by summing the thicknesses (detected from the table shown in FIG. 25A) of all the pallets up to the pallet of this shelf, and a distance (given by m) from the floor to the lower end of the present position of the buffer base is then detected. A moving distance of the pallet to be replaced to the separation position is calculated based on the m and l using the following formula, in step S156:

$$\{1410-(m+l)\}mm$$

In step S158, the buffer base 52 is vertically moved by the calculated moving distance. The moving distance can be easily understood with reference to FIG. 7A wherein the third pallet from the uppermost pallet is to be replaced.

In step S160, the sensing state of the sensor 80 is checked. If the sensor 80 is OFF, the buffer base 52 is moved upward until the sensor 80 is turned on. If the sensor 80 is ON in step S160, the buffer base 52 is moved downward until this sensor is turned off. The reason why such control operation is performed in association with an allowance of the pallet thickness has already been described with reference to FIGS. 8A to 8E, and a detailed description thereof will be omitted.

When a desired pallet has reached the separation position, the bar code printed on the pallet is read by the bar code reader 74 for the purpose of confirmation. In step S168, the read data R is compared with B [D] in the variable table (FIG. 21A). If noncoincidence is found, the pallet moved to the separation position is immediately above the pallet to be replaced. Thus, the flow advances to step S170, and the thickness of the corresponding pallet is obtained from the table shown in FIG. 25A. In step S172, the buffer base 52 is moved upward by a distance corresponding to the obtained thickness, so that the desired pallet is moved to the separation position. In steps S174 and S176, the bar code reading operation is performed again to check the pallet. The flow advances from step S168 or S176 to step S178, and the first separation pawls 66 are biased. In step S180, the buffer base is moved downward by a predetermined distance $L_1$ (a distance larger than the maximum pallet thickness; 94 mm in FIG. 22A) to achieve a state shows in FIG. 7C. In step S182, the second separation pawls 68 are biased. In step S184, the buffer base is further moved downward by a predetermined distance $L_2$, thereby separating the pallet as shown in FIG. 7D. In step S186, a message indicating completion of the pallet separation is sent to the elevator 26. In step S188, control stands by until the elevator draws in the separated pallet in the elevator body.

Pallet Take-out Operation by Elevator

When an empty pallet need not be replaced, the elevator need not be operated. In the replacing operation, an operation for taking the pallet filled with parts separated by the buffer into the elevator body must first be performed. Therefore, assuming that the normal standby position of the elevator is a position matching the separation position of the buffer (origin of the elevator shown in FIG. 22A), when a pallet preparation instruction is issued from the robot and the separation operation is immediately completed in the buffer, the take-in operation of the pallet into the elevator body can be started without first requiring time for movement. In elevator control of this embodiment, as shown in step S200 of FIG. 26A, the elevator body standby position of the elevator coincides with the separation position of the buffer.

Independent of the operation of the buffer, the robot issues a replacement preparation instruction to the elevator through a queue (FIG. 21B) in step S26 (FIG. 23A). The process number G corresponding to the pallet necessary for this replacement preparation is saved in the variable E in the queue in step S24. When the elevator receives the replacement preparation instruction, the flow advances from step S204 to step S206, and the elevator waits for the pallet separation completion message at the separation position by the buffer.

As described above, the buffer has issued the separation completion message to the elevator in step S186, and thereafter, waits that the elevator takes in the pallet, in step S188.

The elevator receiving the message performs the pallet draw-out operation in step S208. In the draw-out operation, as described above with reference to FIGS. 13A to 13D, the motor $M_{E2}$ of the elevator is rotated in the direction of the arrow A to move the first hooks 108 to the position for hooking the pallet. Then, the air cylinders $C_{E1}$ are driven to cause the hooks 108 to be engaged with the pallet. The motor $M_{E2}$ is then rotated in the direction of the arrow B to take the pallet into the elevating frame from the buffer. Upon completion of the draw-out operation of the pallet from the buffer, a message so indicating is sent back to the buffer in step S210. The flow advances to step S212 and the subsequent steps.

Stacking of Upper and Lower Pallets by Buffer

The buffer having received the message releases the second separation pawls 68 in steps S188 to S190. In step S192, the buffer moves the buffer base 52 upward by a distance expressed as:

$$L_1+L_2+H[D]$$

Thus, the pallets which are vertically separated are stacked again. The first separation pawls 66 are retracted in step S196, and the flow returns to step S150 to wait for the next pallet preparation instruction from the robot. The instruction standby position from the robot in step S150 is not limited to a position attained by upward movement of ($L_1+L_2+H$ [D]) in step S192 but can be an origin (a 500-mm high position from the floor in FIG. 22A). If the numbers of parts retained in the pallets differ depending on pallets like in this embodiment, timings of detecting a remaining parts count=1 become random (although they can be predicted).

Elevator Replacement Standby Position

Prior to a description of movement control to the replacing position, a method of determining the replacing position will be described below. This FAC system aims at achieving supply of new parts without interrupting the robot operation and easy alteration of assembling procedures. From this point of view, the method of determining the replacing position is an important factor.

In the "simplified arrangement" described above, a pallet from which a part was picked up by the robot is moved upward. Regarding that the shelves of the stocker are always fed upward, assume that efficiency is to be improved by replacing a pallet with the remaining parts count Z=0 while the robot uses another pallet. In this case, in FIG. 27A, when the pallet is drawn out to the draw-out unit 154, the pallet replacement preparation instruction is issued to the elevator and buffer. Since the remaining parts count of the pallet becomes 1 when the corresponding pallet is drawn out to the draw-out unit 154 next, the pallet with the remaining parts count=0 is moved upward, and a new pallet can be mostly efficiently replaced with an empty pallet while the lower pallet is drawn out to the draw-out unit 154. More specifically, in FIG. 27A, the elevator need only replace pallets while the pallet with the remaining parts count=0 is located at the illustrated position. Thus, a downward movement distance of the elevator to the illustrated replacing position will be examined below.

In FIG. 27A, the vertical positions of the second separation pawls 68 of the buffer and the slide guides 122 of the elevator are matched with each other, thus allowing a smooth draw-out operation. Reference numeral 134 denotes a plate for drawing out an empty pallet from the shelf of the stocker to be slid therealong. A distance between the slide plates is fixed. Therefore, the position of each slide plate 134 when the separated pallet is taken into the frame has a fixed distance from the floor (see FIG. 22A). When the elevator is moved such that the empty pallet can be placed on the slide plates 134, since the shelf number S on which the pallet to be replaced is placed can be easily detected, a distance to the teaching position of that shelf corresponds to a moving distance of the elevator. Note that FIG. 27A illustrates a state wherein a pallet to be drawn out from the buffer by the elevator is apt to be replaced with a pallet with the remaining parts count= 0, for the sake of descriptive convenience. In the "simplified arrangement", when a pallet is to be drawn out from the buffer to the elevator, the pallet with the remaining parts count=0 should be one with the remaining parts count=1 as a cause of the replacement preparation instruction.

A case will be examined when the process order does not correspond to the shelf positions of the pallets. In this case, the processes G progress in an order of 1, 2, 3, . . . , and the stocker is vertically moved in accordance with S [G]. FIG. 27B illustrates a case wherein a pallet for a process L (=G) has Z [G]=1. The elevator then starts replacement preparation together with the buffer, receives a new pallet from the buffer at the separation position, and then is about to move to the standby position of the elevator. In this case, since the robot has already requested a pallet of the next process (L+1), the pallet of the process L+1 has already been drawn out onto the draw-out unit 154 of the stocker. In this case, the pallet of the process L has been moved to the position illustrated in FIG. 27C. It should be noted that when the process G is circulated from 1 to its maximum value, it changes again in the same order as that starting from 1. More specifically, the position of a pallet (placed on a shelf S [L]) whose remaining parts count became 1 in a process L in a given cycle when a pallet placed on a shelf S [L+1] is drawn out to the draw-out unit 154 in the next process L+1 is equal to the position, when the pallet placed on the shelf S [L+1] is drawn out to the draw-out unit 154 in the process L+1, of the pallet whose remaining parts count became zero from 1 when the processes were circulated and the process L returned in the next cycle. Therefore, the replacement standby position when the remaining parts count becomes zero can be predicted when the remaining parts count becomes 1, without any contradiction.

Figure 27D:
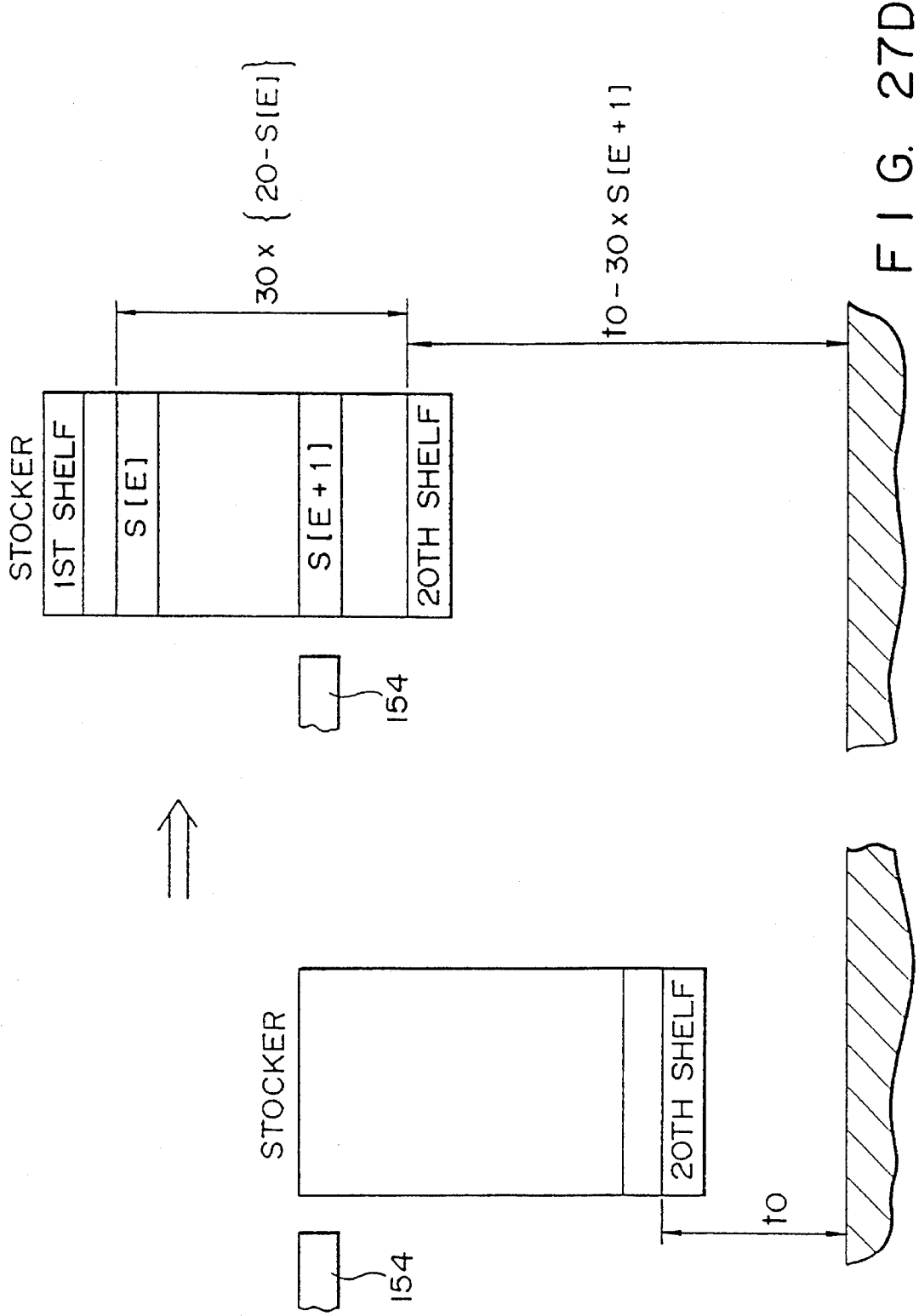

From this point of view, a calculation of the replacement standby position will be described with reference to FIG. 27D. The initial position of the crocker is illustrated in the left portion of FIG. 27D. More specifically, a distance $t_o$ from the floor of the 20th shelf at the draw-out position of the 1st shelf is 300 mm, as can be seen from FIG. 22A. When the remaining parts count of a pallet on a shelf S [L] becomes 1 in a given process L and a pallet on a shelf S [L+1] is drawn out to the draw-out unit 154 in a process L+1, the pallet of the process L has been moved to the position illustrated in FIG. 27D. When this state is viewed from the elevator, this is equivalent to calculation of the position of a pallet on a shelf S [E] when a pallet on a shelf S [E+1] is located at the draw-out position, as shown in FIG. 27D. More specifically, from FIG. 27D, in consideration of the intershelf distance=30 mm and the total number of shelves= 20, the replacement standby position is expressed as:

$$30\times\{20+S[E+1]-S[E]\}+t_o$$

In this manner, the replacement of the standby position by the elevator is determined.

In FIG. 27C, when a pallet of the process L+1 is drawn out to the draw-out unit 154 and the remaining parts count Z [L+1]=1 is detected, a second replacement preparation instruction is issued in step S26 of the robot control, and is queued, as has been described above.

Movement to Standby Position

In step S212 in the elevator control program, it is checked if a shelf position S [E] in the stocker of a pallet with the remaining parts count=1 of a process E is the last shelf on which a pallet is stacked in the stocker. If pallets are stacked on all the 20 shelves of the stocker of this embodiment, the last shelf is the 20th shelf. This decision must be made since any shelf is not present below the last shelf or if any, a pallet thereon may not belong to the process (i.e., no pallet is present). In this embodiment, an algorithm of determining a pallet replacement position is altered depending on the last shelf or not. This decision can be achieved as follows. That is, the value of S [E] is compared with all the values of shelf position data S (FIG. 21A) in the variable table to check if the S [E] has a maximum value.

A description of control when the last shelf is reached will be described later. If it is determined that S [E] does not corresponds to the last shelf, the flow advances to step S214, and the above-mentioned replacement position is calculated as follows:

$$30\times\{20+S\,[E+1]-S\,[E]\}+t_0$$

When the replacement position is determined as described above, the elevator is moved in step S216. The elevator waits for the replacement instruction from the stocker at this replacement standby position.

In other words, the robot detects a pallet with the remaining parts count=1 and sends the replacement preparation instruction to the buffer and elevator based on the detection result, the elevator receives a new pallet from the buffer in response to the instruction, and the elevator having the new pallet is moved to the replacement standby position.

Detection of Remaining Parts Count 0

When the robot successively detects pallets with the remaining parts count=1 in the successive processes, it can output up to two replacement preparation instructions, as has been described with reference to FIG. 21B. That is, before this detection, the robot sequentially picks up parts from the stocker to assemble a product independently of the operations of the buffer and elevator. In other words, until a new third pallet with the remaining parts count=1 is detected, at least the first pallet whose remaining parts count becomes 1 must use up parts first.

The remaining parts count=0 is detected in step S34 (FIG. 23A). If the remaining parts count=0 is detected, the flag I [G] is set to be 1 in step S36, and the next control operation is continued. More specifically, the robot expects that the corresponding pallet be replaced in the stocker by the elevator until the process requesting the same parts retained in the empty pallet comes after one cycle of the processes. When the pallet is not replaced in any event, the robot is interrupted to wait for the preparation completion instruction from the stocker in step S16.

Pallet Replacement

The stocker detects I [G]=1 set by the robot when step S100 (FIG. 24B) is reached. The state of the stocker in the above-mentioned "simplified arrangement" when this flag is detected will be described with reference to FIG. 24C.

FIG. 24C illustrates a state wherein 3, 2, 3, 4, and 5 parks are initially retained in pallets on five shelves of the stocker, respectively, from the uppermost pallet.

After a cycle of assembly (all the processes) by the robot from this state, the numbers of parts retained in the pallets are reduced to (2, 1, 2, 3, and 5), respectively. When the second pallet is drawn to the draw-out unit 154, the pallet replacement preparation instruction is sent to the elevator and buffer, as a matter of course. When a part is picked up from the first pallet in the next cycle, since the number of parts left in this pallet also becomes 1, this pallet preparation instruction is queued. When a part is picked up from the second pallet, the number of parts retained in this pallet becomes 0, and the I [G] flag for the second pallet is set to be 1 at this time.

This operation will be described in more detail. The stocker draws out the second pallet onto the draw-out unit 154 in order to pick up the last part from this pallet, in step S82 (FIG. 24A). The flow advances from step S82 ⇒ step S84, and a pallet draw-out completion message is sent to the robot. Upon reception of this message, the robot sets the I [G] flag in step S16 ⇒ step S18, . . . , ⇒ step S36.

In the stocker, the flow advances to step S84 ⇒ step S86 ⇒ step S88 ⇒ step S90 ⇒ step S92 ⇒ step S100, and I [L]=1 is detected. In other words, when the pallet with the remaining parts count=1 is drawn out to the draw-out unit 154, the robot picks up the last part therefrom, and the stocker returns the pallet with the remaining parts count=0 therein, the stocker detects I [L]=1.

When I [L]=1 is detected in step S100, the flow advances to step S102, and the CH flag is set to be "1". The reason why only the CH flag is set and the replacing operation is not immediately performed is as follows. At this time, a pallet with the remaining parts count z=0 is present on the stocker shelf at the draw-out position to the robot, and the parts are still retained in the pallet for the next process. Therefore, the stocker temporarily loads the pallet of the next process to the draw-out position to the robot so as not to interfere with the operation of the robot. Thereafter, the replacement request can be issued. The flow advances from step S102 to step S104, and it is checked if the S [L] has a maximum value, i.e., the stocker shelf of a pallet with the remaining parts count=0 is the last shelf in the stocker in accordance with the same reason as that in step S212 of the elevator described above.

If the last shelf is not detected, the flow advances to step S106, and the process number L having the remaining parts count=0 is temporarily saved in a register P. This is to hold the process number L with no parts in order to load a pallet of the next process (L+1) to the draw-out position for the robot so that the stocker does not interfere with the operation of the robot. Thereafter, the process number is incremented in steps S118 to S130, and in step S72, the stocker is moved to the shelf position of the next process. In step S74, since the CH flag has already been set, a replacement request of the empty pallet with a new pallet is sent to the elevator in step S76.

Figure 27E:
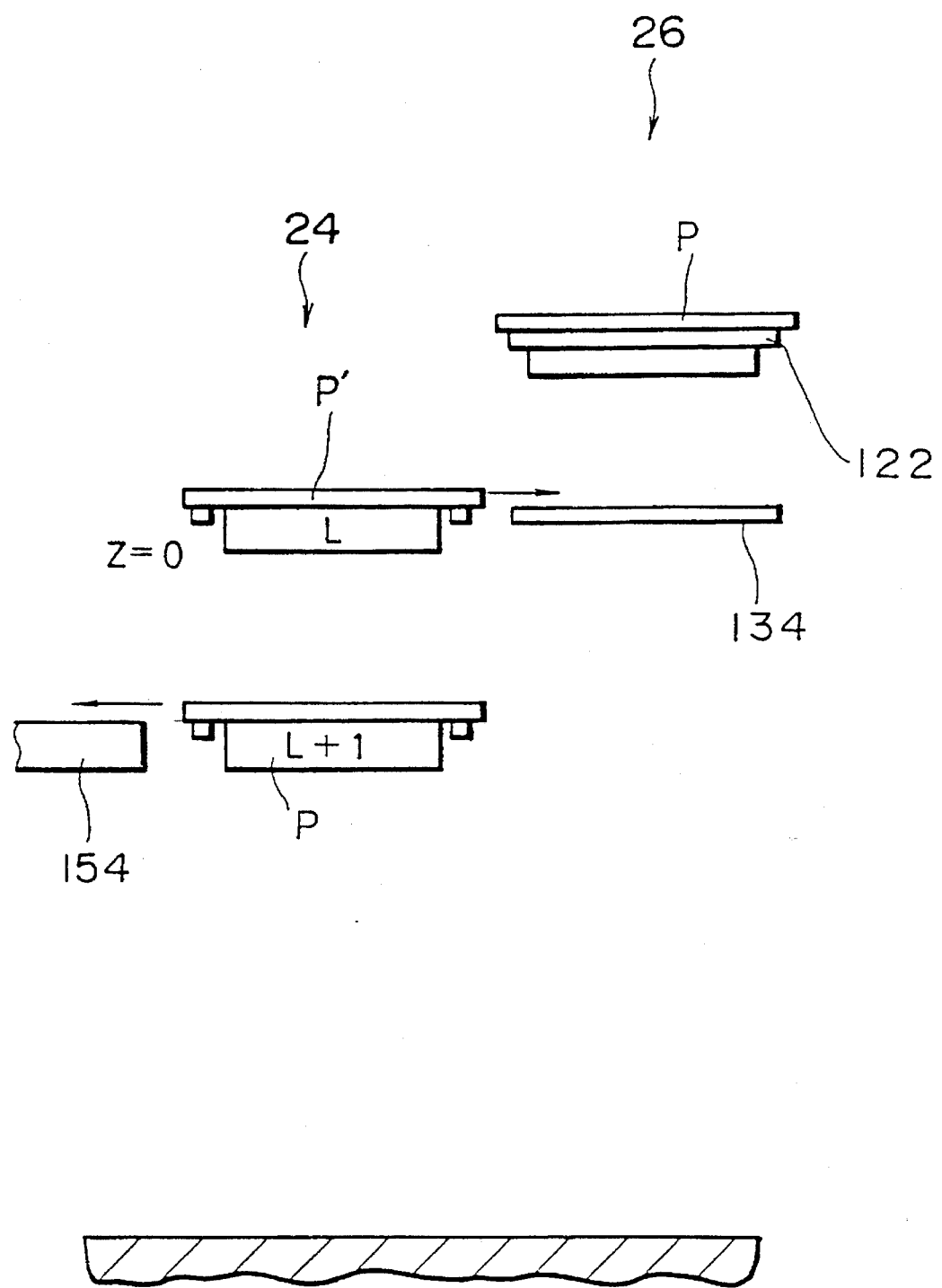

If the elevator having a new pallet has already reached the replacement standby position at this time, pallet replacement must be immediately started by the elevator independently of stocker control. As has been described above, pallet replacement preparation was started when the remaining parts count became 1. Therefore, when the replacement request is sent to the elevator in step S76, the elevator is expected to have reached the replacing position. Refer to FIG. 27E for this point.

After the replacement request is sent to the elevator, in the stocker control, a pallet of a process next to the pallet with the remaining parts count=0 is drawn out to the draw-out unit 154 in steps S78 to S82. In steps S84 to S92 ⇒ step S94, the robot is caused to assemble the part from the pallet of the next process. In step S94, the pallet replacement completion message is waited for. In this manner, empty pallet replacement is performed so as not to interfere with the robot operation as much as possible.

Figure 26B:
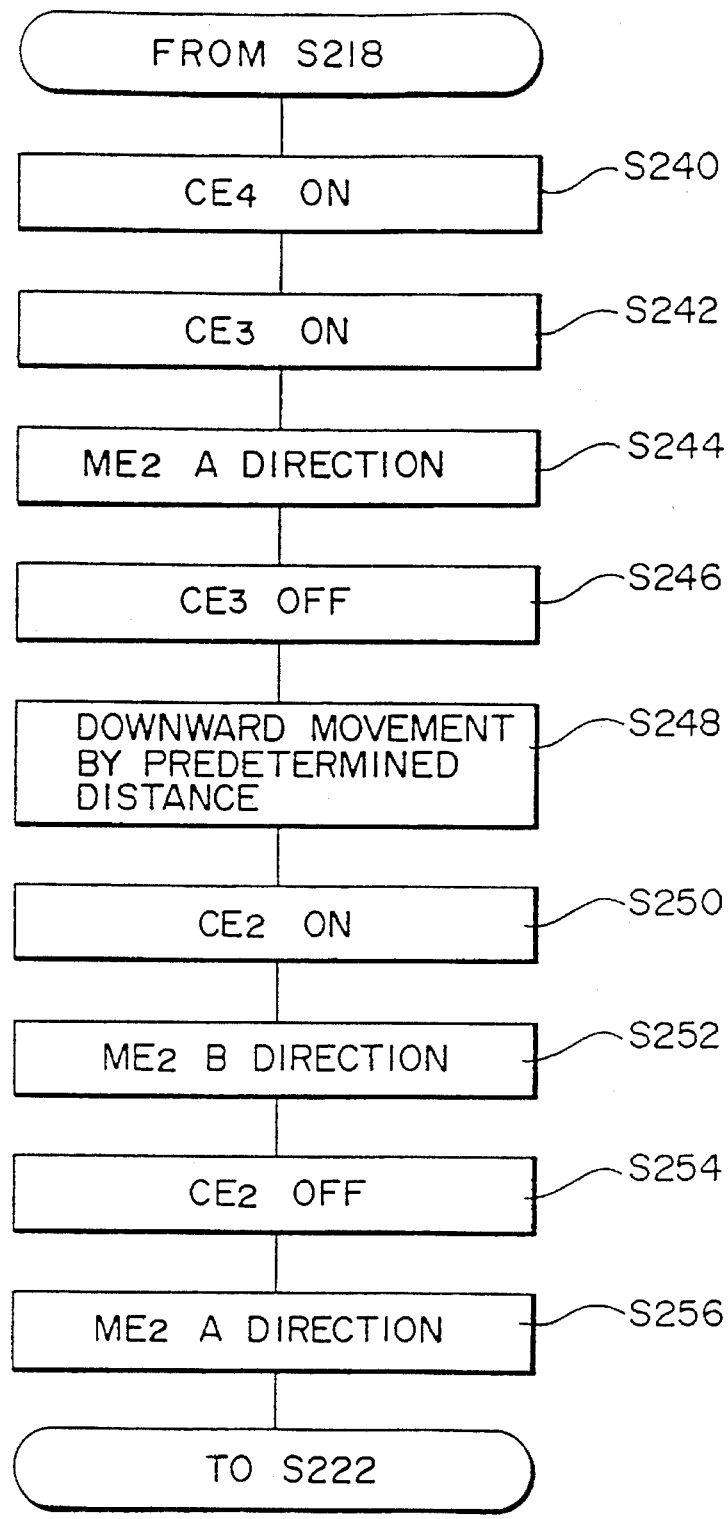
Figure 27F:
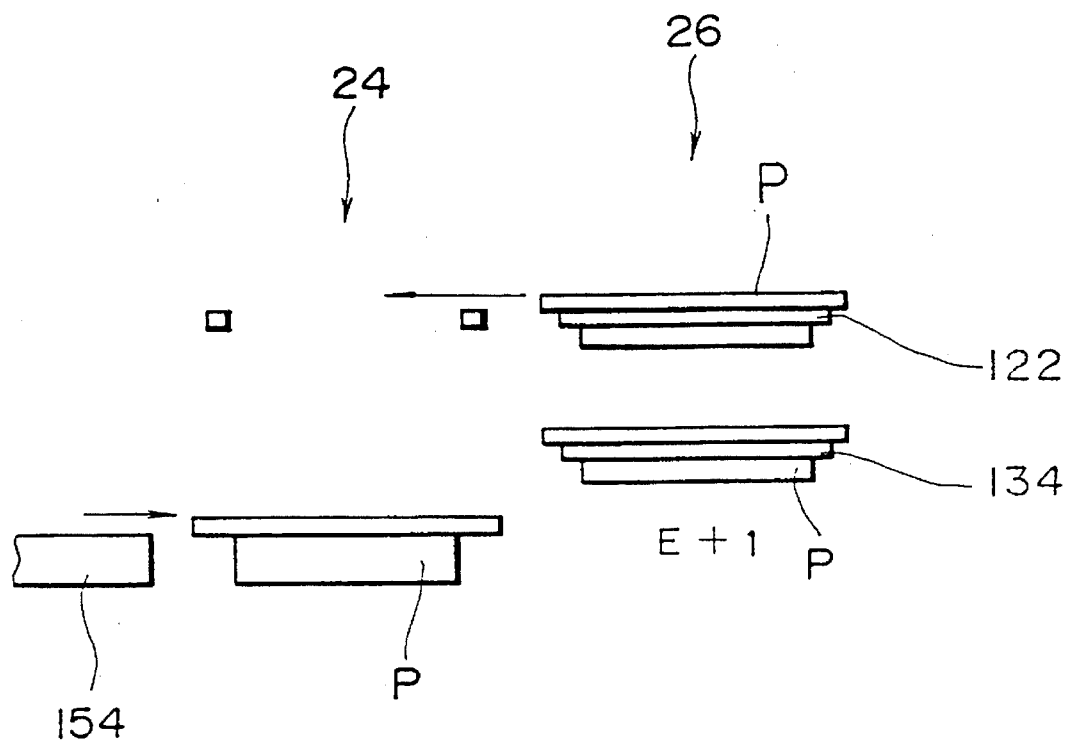

The description of the elevator control program will be made again. When the elevator which has been waiting for the replacement request from the stocker in step S218 receives the request, it performs the pallet replacing operation in step S220. The detailed control operation of step S220 is shown in steps S240 to S256 in FIG. 26B. However, since the operation sequence under this control follows FIGS. 13A to 13G, a description thereof will not be repeated. When FIGS. 27E and 27F are associated with the control operation shown in FIG. 26B, FIG. 27E corresponds to steps S240 to S246, and FIG. 27F corresponds to steps S248 to S256. Note that denotes a thickness of the flange 38 of the pallet shown in FIG. 4, and is 12 mm in this embodiment.

When the elevator completes pallet replacement, it sends a replacement completion message to the stocker (step S222). When the stocker receives this message, the flow advances from step S94 to step S96, and the remaining parts count of a pallet to be replaced of a process P is initialized. In step S98, the CH flag is reset, and the flag I [P] is also reset. The flow advances to step S100 ⇨ S118, and the next process L=L+1 is performed. The flow then returns to step S120 ⇨ ... ⇨ step S130 ⇨ step S72, and the above-mentioned operation is repeated.

Stacking of Empty Pallet

On the other hand, the elevator performs operation control for stacking the empty pallet held below the elevator on the unloading mechanism 76.

More specifically, in step S226, a value obtained by subtracting the edge $\beta$ of the pallet from the present pallet height H [E] is added to the previous stacking height Q of the empty pallets. More specifically, the downward movement position is expressed as:

$$Q+H[E]-\beta$$

Figure 28:
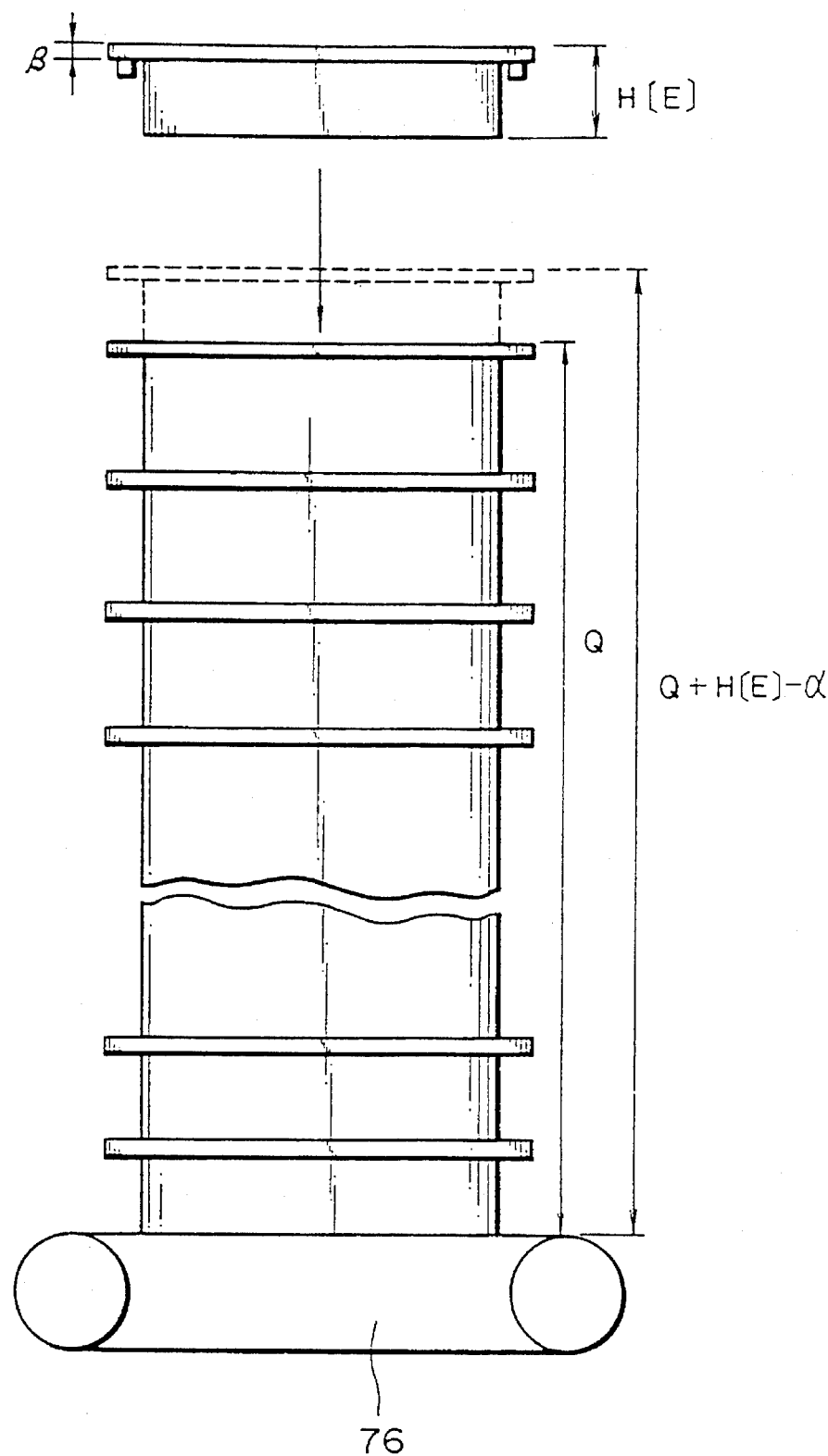
FIG. 28 is a view for explaining stacking of empty pallets onto an unloading mechanism.

This can be understood from FIG. 28. The elevator is moved to the downward movement position, and the air cylinders $C_{E4}$ are released to stack the empty pallet. After the empty pallet is stacked, since the pallet is lowered by an amount corresponding to a stacking margin $\alpha(=7$ mm$)$, the updated stacking position Q is expressed as:

$$Q=Q+H[E]-\alpha$$

It is then checked in step S234 if the stacked empty pallet has reached the position of the sensor $S_4$ (shown below the elevator in FIG. 1) for detecting interference with the elevator movement. If the empty pallet has reached the position, the unloading mechanism 76 is driven in step S236 to convey the empty pallets to the unmanned vehicle position.

In this manner, empty pallet replacement is completed, and the parts feeding operation to the robot and the parts supply operation to the stocker can be successively performed without interrupting the operation of the robot.

The basic operation control of this FAC system has been described. This control program is variously contrived to improve efficiency.

Replacement of Final Shelf

One technique of improving efficiency is alteration of a control sequence upon replacement of the final shelf. The stocker of this FAC system has a total number of shelves as 20. Therefore, when pallets are placed on the shelves in the process order starting from the uppermost shelf, no pallet is present below the 20th shelf. When all the pallets used for all the processes are placed on the shelves and do not fill the stocker, there is no pallet below the lowermost shelf. In this manner, when pallets are placed on the shelves in the process order starting from the uppermost shelf, if replacement of the final shelf is performed in accordance with determination of the replacement position described above, a shelf with no pallet is moved to the draw-out unit 154 position, and an empty pallet is replaced at the replacement position thereabove. However, the robot must interrupt assembly while waiting for draw-out completion in step S16 until pallet replacement is completed.

Figure 26A:
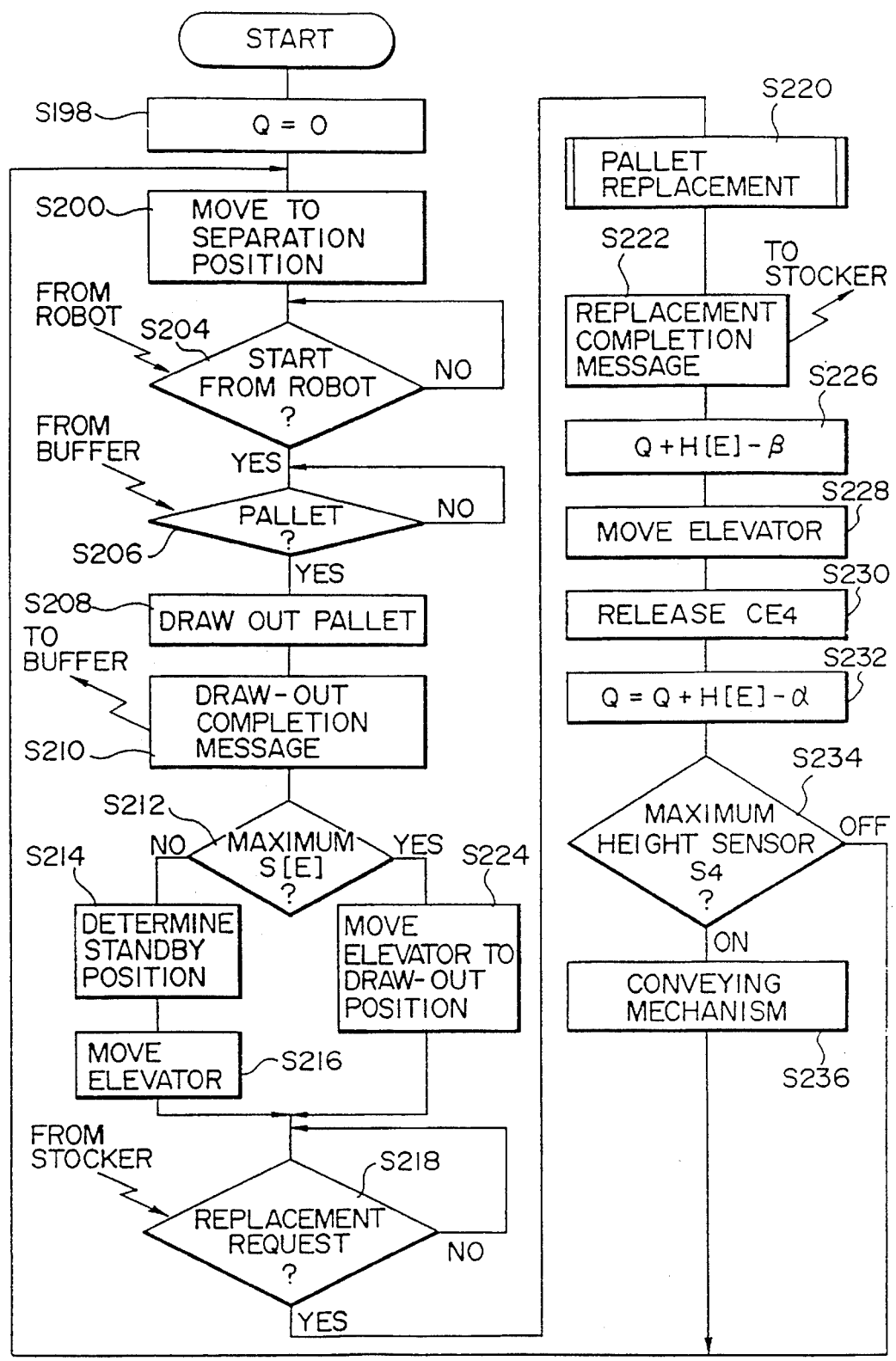
FIGS. 26A and 26B are flow charts of an elevator control program.

In order to eliminate this drawback, steps S104 to S116 in FIG. 24B, and steps S212 and S224 in FIG. 26A are provided. More specifically, if there is no need for pallet replacement at the final shelf position, replacement is performed at the draw-out position of the stocker (position of the slide plate 178 of the draw-out unit 154). In this case, as shown in FIG. 27G, the replacement standby position is expressed as:

$$30 \times S[E]+t_0$$

Therefore, in the elevator, the flow advances to step S212 ⇨ step S224, and the standby position is calculated based on the above formula. The elevator is then moved to the draw-out position to wait for the replacement request from the stocker in step S218.

In the stocker, if it is detected in step S100 that the replacement flag I [L] is set, the CH flag is set in step S102. Then, the flow advances to step S104 S108, and the stocker issues the replacement request to the elevator.

The subsequent control operation is the same as that in the replacement at a normal shelf position, and a detailed description thereof will be omitted.

When a pallet to be replaced is a final pallet, pallet replacement is performed at the draw-out position of the stocker to the robot. Therefore, an unnecessary wait time can be eliminated. This operation is particularly effective when pallets are placed on shelves in the process order starting from the uppermost shelf.

QUEUING OF REPLACEMENT PREPARATION INSTRUCTION

Another technique for improving efficiency is queuing. The queuing is necessary from the following background. More specifically, if the operating speeds of the modules (e.g., the motor speed) can be set so that a total time required for replacement preparation such as a time required for separating a pallet by the buffer, a movement time of the elevator to the replacement standby position, and the like becomes shorter than a time required for one process of assembly by the robot, a plurality of replacement preparation instructions (step S26) will not be issued from the robot to the buffer and elevator. However, the former total time may be longer than the latter. In this case, a plurality of instructions may be issued. In order to cope with this, the instructions must be queued. For example, when the total numbers of parts in the pallets are the same and the parts are used in the same manner in two successive processes, the replacement preparation instructions may sometimes be successively issued. In particular, in the two successive processes (these two processes are given by L and L+1 in the stocker), if shelf positions S [L] and S [L+1] are not succeeded, the stocker must be vertically moved, and it takes a long time to replace pallets. In this case, as shown in FIG. 21B, if the replacement preparation instructions are queued, the robot operation will not be interrupted. This is because after a pallet is separated to perform a single replacement operation in the buffer and the separated pallet is transferred to the elevator, the next queued instruction can be immediately fetched from the queue, and the next pallet separation operation can be performed. In this embodiment, the number of queues is set to be two, but may be increased as needed.

INITIAL OPERATING STATE SETTING

Figure 29:
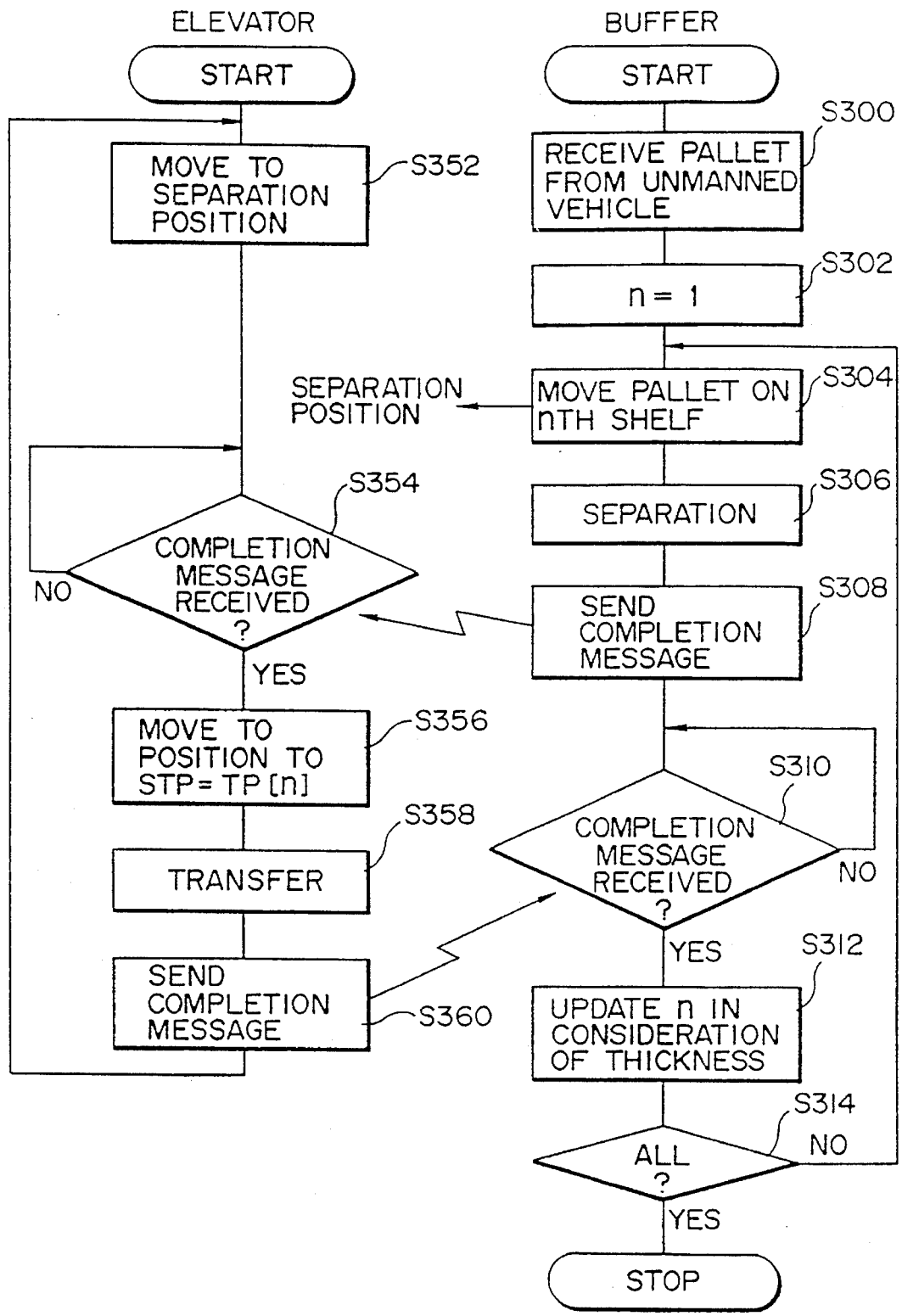
FIG. 29 is a flow chart of a control operation for setting the system in an initial operation state.

The description of the control operation will be made under the assumption that the pallets are placed in the stocker. Initialization control for inserting pallets to the stocker will be described with reference to FIG. 29. In this initialization, the robot and stocker are not operated, and the buffer and elevator insert pallets in the shelves of the stopped stocker.

In step S300, the buffer receives stacked pallets from the unmanned vehicle. In step S302, 1 is set in a counter n. In step S304, an nth pallet is moved to the separation position, and the pallet is separated in step S306. In step S308, a separation completion message is sent to the elevator. In step S310, the buffer waits for completion of the pallet draw-out operation by the elevator.

In step S352, the elevator is moved to the separation position as soon as the program is started. In step S354, the elevator waits for the separation completion message from the buffer. Upon reception of this message, the elevator calculates the shelf position of the stocker in accordance with the counter set by the buffer based on the following equation:

$$STP=TP\,[n]$$

The elevator is then moved to the calculated position. In step S358, the elevator pushes the pallet into the corresponding shelf. In step S360, a movement completion message is sent to the buffer, and the next pallet is waited for in step S352.

When the buffer receives this message, it updates the counter n in step S312. This updating operation is performed as follows. The necessary number of shelves of pallets presently placed on the stocker is calculated from the thickness data of the pallets transferred from the unmanned vehicle, in step S300, and a shelf count in which the next pallet is to be inserted is calculated. In step S314, it is checked if pallets are left on the buffer base. If some pallets are left on the base, the flow returns to step S300 to separate the next pallet.

In this manner, the initial operating state setting is completed.

DESCRIPTION OF MODIFICATIONS

The present invention is not limited to the arrangement of the above embodiment, and various changes and modifications may be made within the spirit and scope of the invention.

Modifications of the above-mentioned embodiment will be described hereinafter in detail. In the following description, the same reference numerals in the modifications denote the same parts as in the arrangement of the embodiment, and therefore, a detailed description thereof will be omitted.

Description of First Modification

In the buffer 22 of the above-mentioned embodiment, the rob&t 12 detects that the remaining parts count x in the pallet p becomes 1. Thereafter, when the last part x is used in the assembly and the corresponding pallet becomes empty, the empty pallet p' is replaced with a new pallet p filled with parts x without interfering with the operation of the robot 12. For this purpose, when the remaining parts count=1 is detected, the pallet p filled with the same parts x as those in the pallet with the remaining parts count=1 is separated from other pallets p in the buffer 22 through the separation mechanism 64 in order to be taken from the buffer 22.

However, the present invention is not limited to the above arrangement. In place of the separation mechanism 64, the buffer 22 may comprise a stack separating mechanism 250 for simultaneously separating a plurality of pallets $p_1$, $p_2$, $p_3$, . . . stacked on the buffer base 52, as shown in FIGS. 31 to 34 as a first modification.

Arrangement of Stack Separating Mechanism

Figure 31:
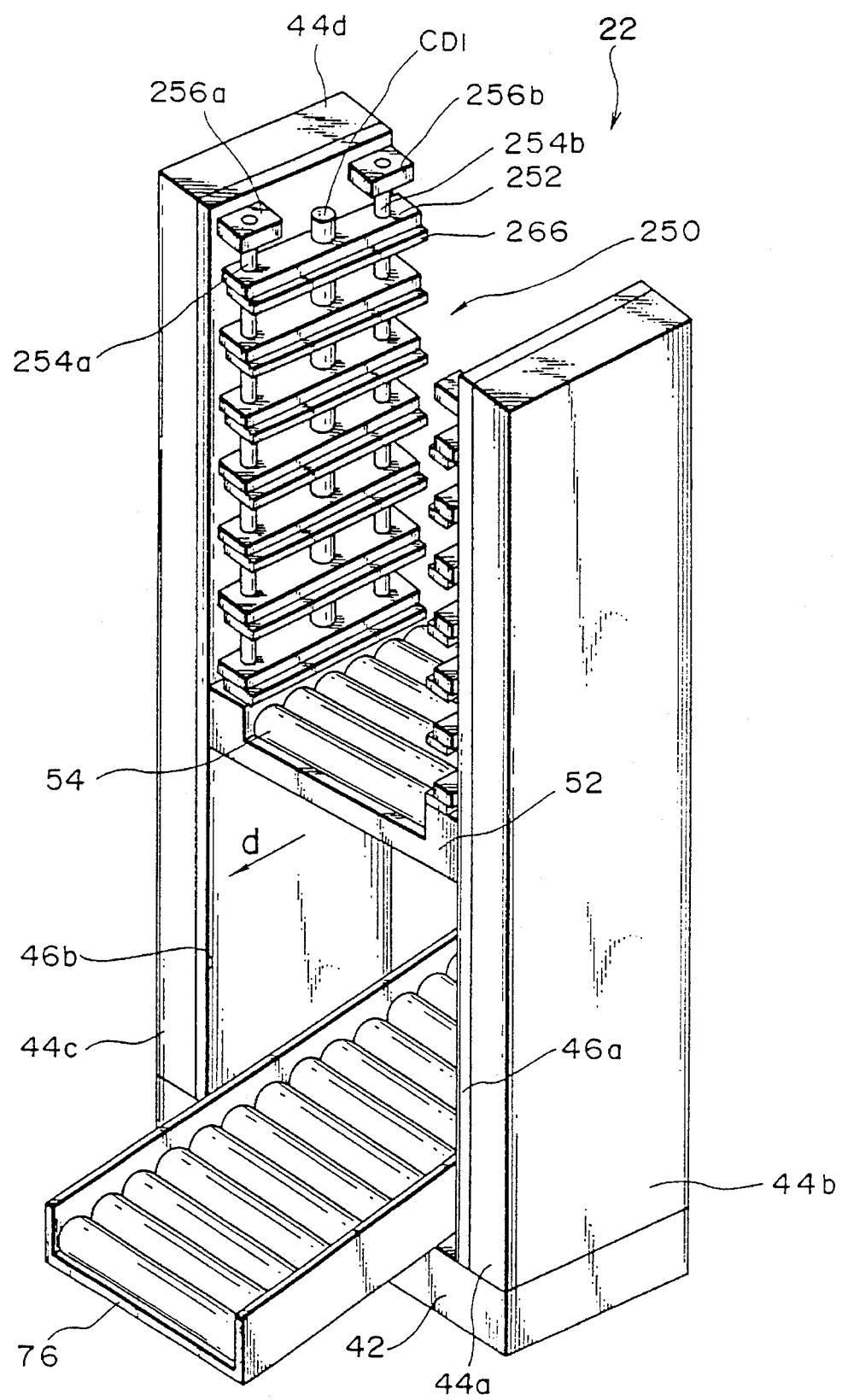
FIG. 31 is a schematic perspective view showing an arrangement of a buffer according to the first modification.

As shown in FIG. 31, the stack separating mechanism 250 has a plurality of separation pawl mounting plates 252 which extend along the conveying direction d and are disposed in the vertical direction on the opposing inner surfaces of standing plates 46a and 46b above the buffer base 52. A pair of opposing separation pawl mounting plates 252 are arranged so as not to become hooked with the flanges 38 of each pallet p in the vertical direction. In the first modification, the buffer base 52 is fixed at the same vertical position as that of the pallet table 32 of the unmanned vehicle 20 which is different from the above embodiment.

All the separation pawl mounting plates 252 on the standing plates 46a and 46b are supported so they can move vertically along guide shafts 254a and 254b which are fixed to the corresponding standing plates 46a and 46b to extend in the vertical direction. The upper ends of the guide shafts 254a and 254b are respectively fixed to the upper ends of the corresponding standing plates 46a and 46b through fixing members 256a and 256b, and lower ends thereof are-fixed to the buffer base 52.

As shown in FIG. 32, an air cylinder $C_{D1}$ is integrally mounted on the central portion of each separation pawl mounting plate 252. A piston 258 of each air cylinder $C_{D1}$ is arranged to extend downward. The lower end of the piston 258 is fixed to the upper end of each air cylinder $C_{D1}$ mounted on the corresponding separation pawl mounting plate 252 located immediately therebelow. Each air cylinder $C_{D1}$ comprises two input ends 260a and 260b. One input end 260a communicates with a cylinder chamber above the piston 258, and the other input end 260b communicates with a cylinder chamber below the piston 258.

One input end 260a of each of all of the air cylinders $C_{D1}$ is connected to one output end 264a of a switching valve 264 through one introduction pipe 262a. The other input end 260b is connected to the other output end 264b of the switching valve 264. An input end 264c of the switching valve 264 is connected to a compressor (not shown) through an introduction pipe 262c.

With the above arrangement, when the switching valve 264 is switched to output compressed air from one output end 264a, the compressed air is introduced into the cylinder chamber above the piston 258 of each air cylinder $C_{D1}$, and the corresponding piston is biased downward. In other words, when the compressed air is supplied to one input end 260a of each air cylinder $C_{D1}$, an interval between two adjacent separation pawl mounting plates 252 is increased, as shown in FIG. 32.

On the other hand, when the switching valve 264 is switched to output compressed air from the other output end 264b, the compressed air is introduced into the cylinder chamber below the piston 258 of each air cylinder $C_{D1}$ through the other introduction pipe 262b, and each piston 258 is biased upward. In other words, when the compressed air is supplied to the other input end of each air cylinder $C_{D1}$, an interval between two adjacent separation pawl mounting plates 252 is decreased as shown in FIG. 33.

In the narrowed state shown in FIG. 33, if pallets p are 25-mm thick pallets $p_1$, the disposition pitch of the separation pawl mounting plates 252 is set to be 25−7=18 mm. In the widened state shown in FIG. 32, since pallets must be free from the 7-mm fitting margin, the disposition pitch of the separation pawl mounting plates 252 is set to be, e.g., 30 mm larger than the 25 mm mentioned above. In other words, when the compressed air is supplied to one input end 260a of each cylinder $C_{D1}$ from the state illustrated in FIG. 33, each piston 258 is pushed downward by 12 mm, and the disposition pitch of the separation pawl mounting plates 252 is widened.

Figure 34:
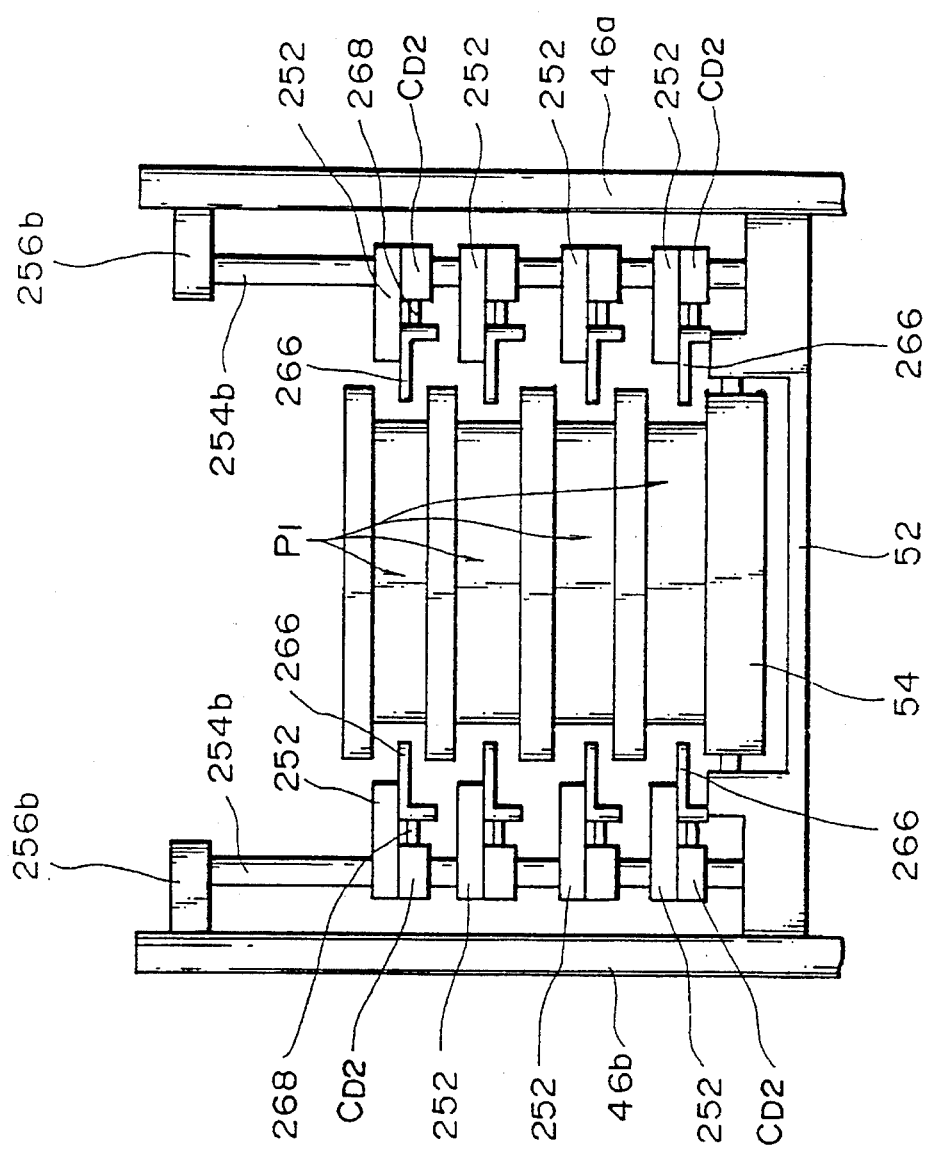
FIG. 34 is a side view showing an arrangement of the stack separating mechanism.

As shown in FIG. 34, the stack separating mechanism 250 comprises separation pawls 266 which are respectively mounted on the lower surfaces of the separation pawl mounting plates 252 to be retractable along a direction perpendicular to the conveying direction d. More specifically, a pair of opposing separation pawls 266 are retractably arranged between a projecting position in which each pawl is hooked by the corresponding flange 38 of each pallet p from the lower direction and a retracted position spaced apart from the corresponding flange 38. An air cylinder $C_{D2}$ for retractably driving each separation pawl 266 is attached to the lower surface of the separation pawl mounting plate 252 outside the corresponding separation pawl 266. A piston 268 of each air cylinder $C_{D2}$ is reciprocally moved in a direction perpendicular to the conveying direction d. The distal end of each piston 268 is connected to the corresponding separation pawl 266.

With the above arrangement, in a state wherein no compressed air is supplied to the air cylinders $C_{D2}$, the pistons 268 are biased to the retracted positions, and all the separation pawls 266 are separated from the flanges 38 of the corresponding pallets $p_1$. When the compressed air is supplied to the air cylinders $C_{D2}$, the separation pawls 266 project from the retracted positions to the projecting position, and the separation pawls 266 can be hooked with the flanges 38 of the corresponding pallets $p_1$ from the lower direction.

Operation of the Stack Separating Mechanism

The simultaneous stack separating operation in the slack separating mechanism 250 with the above arrangement will be described hereinafter.

When a stack of a plurality of pallets $p_1$ are conveyed onto the buffer 52, compressed air is supplied to the air cylinders $C_{D2}$, and the separation pawls 266 are deviated from their retracted positions to the projecting positions and can be hooked with the flanges 38 of the corresponding pallets $p_1$ from the lower direction. Thereafter, compressed air is supplied to the first input ends of the air cylinders $C_{D1}$, and the separation pawls 266 are deviated upward to widen the disposition pitch thereof. In this manner, the separation pawls 266 are hooked with the flanges 38 from the lower direction, and each pallet $p_1$ is set in a state wherein it can be drawn out sidewards from a pallet $p_1$ immediately therebelow.

As has been described above, according to the first modification, a plurality of pallets $p_1$ stacked on the buffer base 52 are simultaneously separated from each other by utilizing the stack separating mechanism 250, and can be set in a state wherein they can be drawn out sideways. For this reason, as described above, even if a pallet $p_1$ retains the same parts, the number of which is detected as 1 by the robot 12, is located at any vertical position on the buffer base 52, the pallet $p_1$ can be drawn out from that position to the elevator 26, and the operation time can be satisfactorily shortened as compared with a case using the separation mechanism 64 of the above embodiment.

In the control operation of the FAC system with such a buffer, the draw-out position of a pallet separated by the buffer to the elevator is fixed for each pallet. Therefore, the standby position in pallet replacement preparation of the elevator differs depending on the pallet to be drawn out from the buffer. For this purpose, if the elevator has data shown in FIG. 25A as in the buffer, it can detect the position of parts requested by the stocker in response to the replacement preparation instruction from the robot.

Description of the Second Modification

In the elevator 26 of the embodiment described above, the common servo motor $M_{E2}$ is used as a drive source for moving the three hooks 108, 116, and 126 of the replacing mechanism 96 in the conveying direction d. However, the present invention is not limited to this. As shown in FIGS. 35 to 39 as a second modification, a drive motor for driving the hooks 108 and 116 for moving a pallet p filled with parts x in the conveying direction d, and a drive motor for driving the hooks 126 for moving an empty pallet p' in the conveying direction d may be separately arranged.

Description of the Elevator

Figure 35:
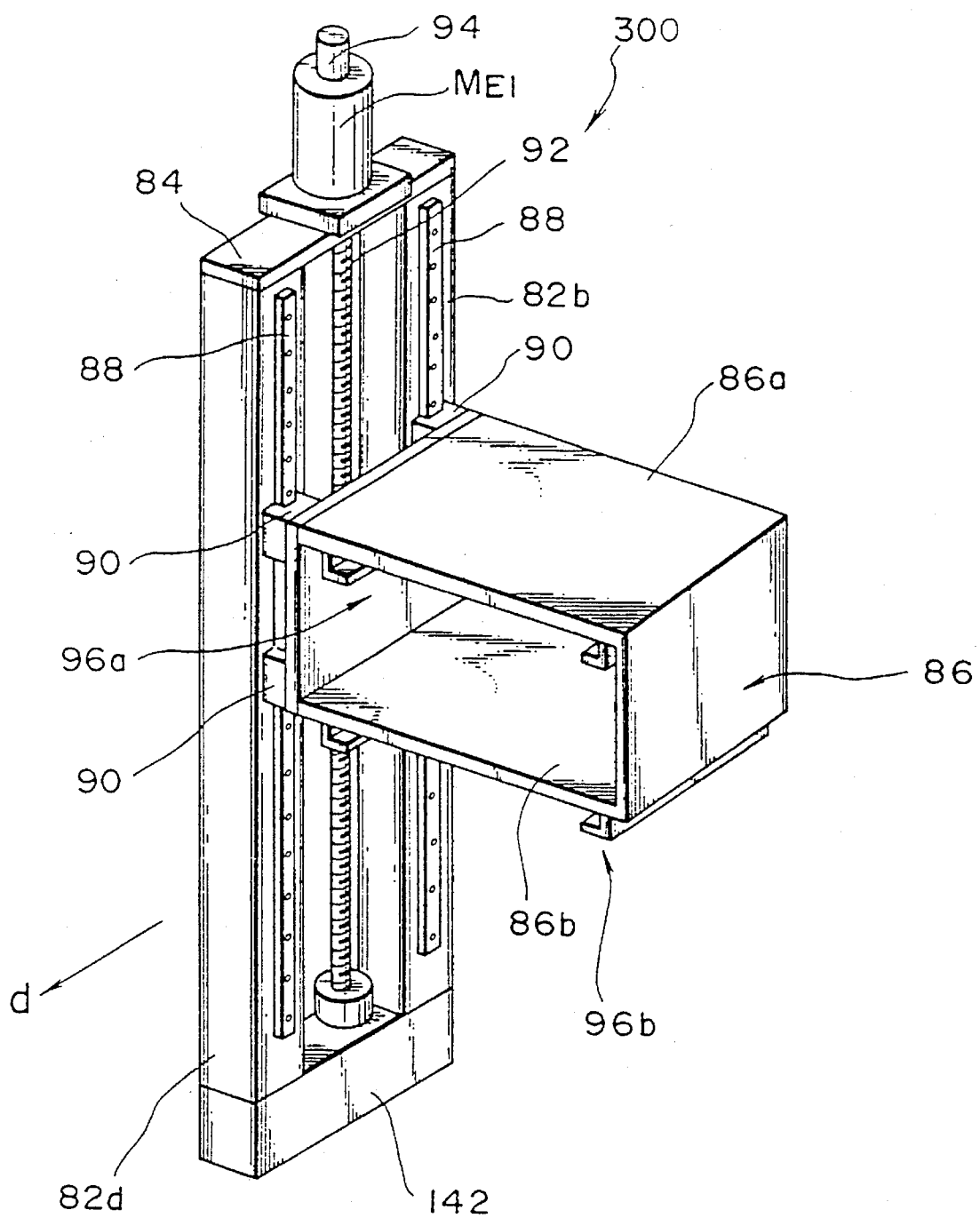
FIG. 35 is a schematic perspective view showing an arrangement of an elevator according to a second modification.

As shown in FIG. 35, elevator 300 according to the second modification has the same elevator body 86 as that of the above embodiment, except that guide grooves 102 and 132 are formed on its upper and lower surfaces. The replacing mechanism 96 comprises a full pallet replacing mechanism 96a, mounted on the lower surface of a top plate 86a of the elevator body 86, for replacing a pallet p filled with parts x, and an empty pallet replacing mechanism 96b, mounted on the lower surface of a bottom plate 86b of the elevator body 86, for replacing an empty pallet p'.

Figure 36:
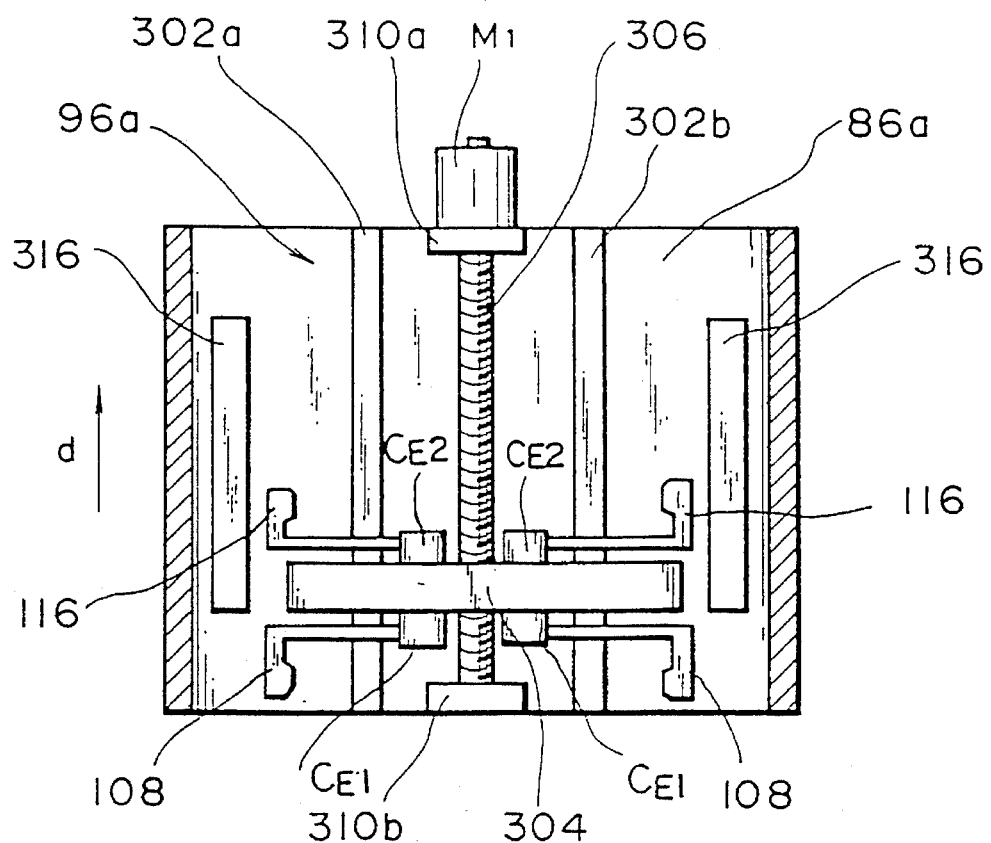
FIG. 36 is a bottom view showing an arrangement of a full pallet replacing mechanism in the elevator shown in FIG. 35.
Figure 37:
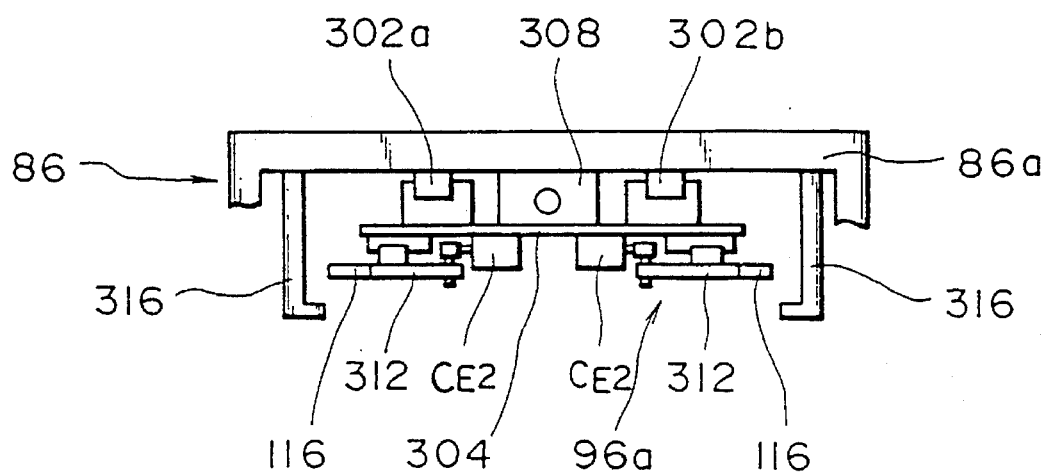
FIG. 37 is a side view showing the arrangement of the full pallet replacing mechanism shown in FIG. 36.

As shown in FIGS. 36 and 37, the full pallet replacing mechanism 96a comprises a pair of first guide members 302a and 302b extending in the conveying direction d on the lower surface of the top plate 86a of the elevator body 86. The first slide plate 304 is supported by the first guide members 302a and 302b to be reciprocal in the conveying direction d.

A projecting portion 308 threadably engaged with a first ball screw 306 (to be described later) is integrally formed at the central portion of the first slide plate 304. The front and rear ends of the first ball screw 306 are rotatably supported through a pair of first rotary supporting members 310a and 310b fixed to the lower surface of the top plate 86a. The first ball screw 306 is rotated by a first servo motor $M_1$. Upon rotation of the rotating shaft of the first servo motor $M_1$, the first ball screw 306 is rotated, so that the first slide plate 304 is reciprocally moved along the conveying direction d.

The first slide plate 304 is formed to extend in a direction perpendicular to the conveying direction d. The first hooks 108 are retractably formed at two ends of the first slide plate 304 through air cylinders $C_{E1}$ on the side of the buffer 22, and the second hooks 116 are retractably formed thereon through air cylinders $C_{E2}$ on the side of the stocker 24, in the same manner as in the above embodiment. The pairs of first and second hooks 108 and 116 are formed to have shapes capable of being engaged, from both sides, with the first notches 38a on the side of the elevator 26 and the second notches 38*b* on the side of the unmanned vehicle 20 formed in the flanges 38 of each of pallets $p_1, p_2, p_3, \ldots$ A pair of stationary slide guides 316 which are engaged with the first or second hooks 108 or 116 and slidably support a pallet p which is taken in/pushed out in accordance with the pivotal motion of the first servo motor $M_1$. The stationary slide guides 316 are arranged on the lower surface of the top plate 86*a* of the elevator body 86. Specifically, they are arranged to be slidable along the lower surfaces of the flanges 38 at both sides of a pallet p to be taken in/pushed out.

The vertical position of the upper edge of each stationary slide guide 316 is set high enough to slidably support a pallet $p_3$ having a maximum thickness of 100 mm.

The empty pallet replacing mechanism 96*b* comprises a pair of second guide members 322*a* and 322*b* extending in the conveying direction d on the lower surface of the bottom plate 86*b* of the elevator body 86. A second slide plate 324 is supported by the second guide members 322*a* and 322*b* to be reciprocal in the conveying direction d.

A projecting portion 328 threadably engaged with a second ball screw 326 (to be described later) is integrally formed on the central portion of the second slide plate 324. The front and rear ends of the second ball screw 326 are rotatably supported through a pair of second rotary supporting members 330*a* and 330*b* fixed on the lower surface of the bottom plate 86*b*. The second ball screw 326 is driven by a second servo motor $M_2$. In this manner, upon rotation of the rotating shaft of the second servo motor $M_2$, the second ball screw 326 is rotated, so that the second slide plate 324 is reciprocally moved in the conveying direction d.

The second slide guide 324 is formed to extend in a direction perpendicular to the conveying direction d. Hook members 332 integrally having third hooks 126 on the side of the stocker 24 are mounted on two ends of the lower surface of the second slide plate 324 to be slidable in a direction perpendicular to the conveying direction d. The third hooks 126 are formed into shapes capable of being engaged, from both sides, with the 10 second notches 38*b* formed in the flanges of each of the pallets $p_1, p_2, p_3, \ldots$ on the side of the unmanned vehicle 20.

Second air cylinders $C_2$ are mounted on both ends of the slide plate 324 to extend in a direction perpendicular to the conveying direction d. The hook member 332 is connected to the distal end portion of a second piston 334 of each second air cylinder $C_2$. In this manner, upon driving of the second air cylinders $C_2$, the third hooks 126 are reciprocally moved to be engaged with/disengaged from the second notches 38*b* of the flanges 38.

Figure 38:
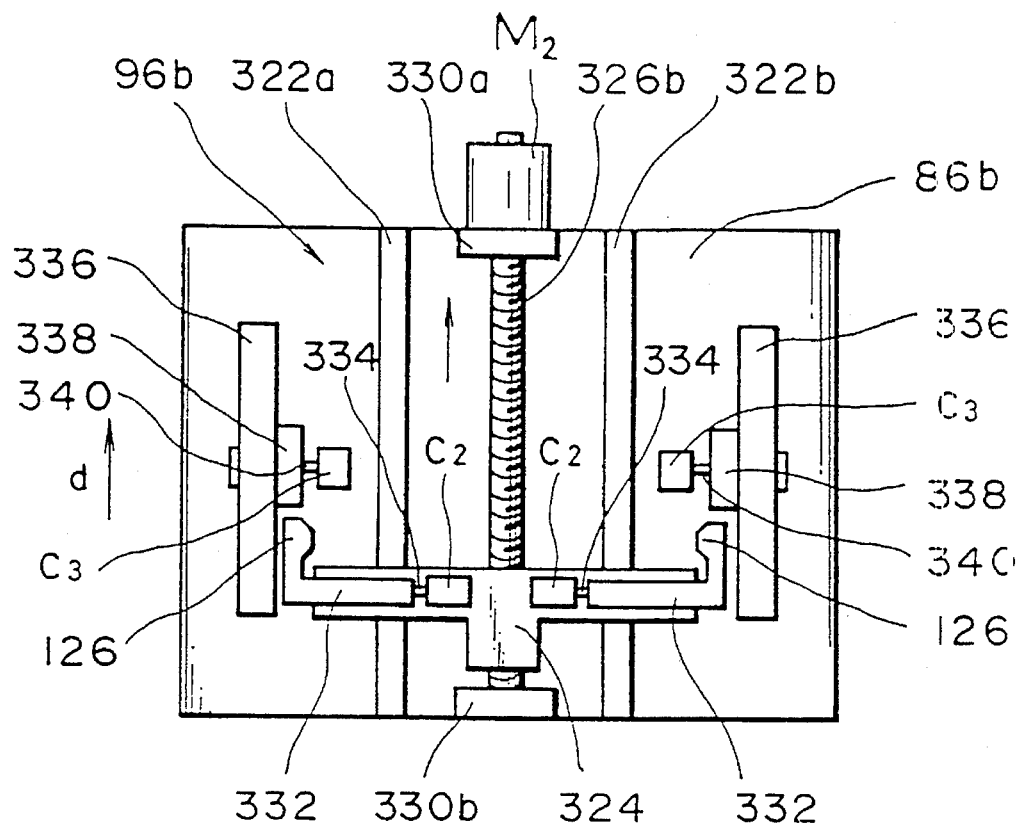
FIG. 38 is a bottom view showing an arrangement of an empty pallet replacing mechanism shown in FIG. 35.
Figure 39:
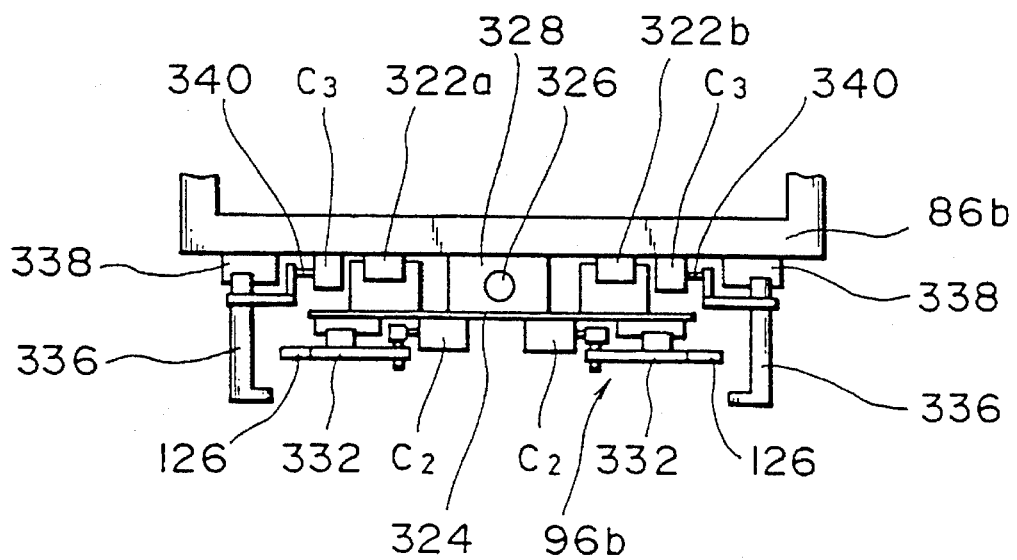
FIG. 39 is a side view showing the arrangement of the empty pallet replacing mechanism shown in FIG. 38.

A pair of movable slide guides 336 for slidably receiving an empty pallet p' taken out from the stocker 24 by the third hooks 126 are disposed on the lower surface of the bottom plate 86*b* of the elevator body 86. The movable slide guides 336 are slidably arranged in a direction perpendicular to the conveying direction d, i.e., to be separated from the received empty pallet p', in order to place the received empty pallet p' on the unloading rollers 78 of the unloading mechanism 76. More specifically, as shown in FIGS. 38 and 39, the movable slide guides 336 are slidably mounted on the lower surface of the bottom plate 86*b* of the elevator body 86 through slide members 338, respectively. Third air cylinders $C_3$ for reciprocating the movable slide guides 336 are mounted on both sides of the lower surface of the bottom plate 86*b*. The movable slide guide 336 is connected to the distal end portion of a third piston 340 of each third air cylinder $C_3$. In this manner, upon driving the third air cylinder $C_3$, the movable slide guides 336 are reciprocally moved to be engaged with/disengaged from the flanges 38 of an empty pallet p'.

In the replacing mechanism 96 having the full and empty pallet replacing mechanisms 96*a* and 96*b* with the above arrangements, the replacing operation of the pallets p and p' are the same as that of the replacing mechanism 96 in the above embodiment, except that the first and second hooks 108 and 116 are simultaneously driven, and therefore, a detailed description thereof will be omitted.

As described above, in the second modification, when a drive source for replacing a full pallet p and a drive source for replacing an empty pallet p' comprise the separate servo motors $M_1$ and $M_2$, the same effect as in the arrangement of the embodiment can be provided.

In the control operation associated with the second modification, the three hooks of the elevator are driven by two motors rather than the single motor in the above embodiment. Thus, a detailed description thereof will be omitted.

Description of Third Modification

Figure 40:
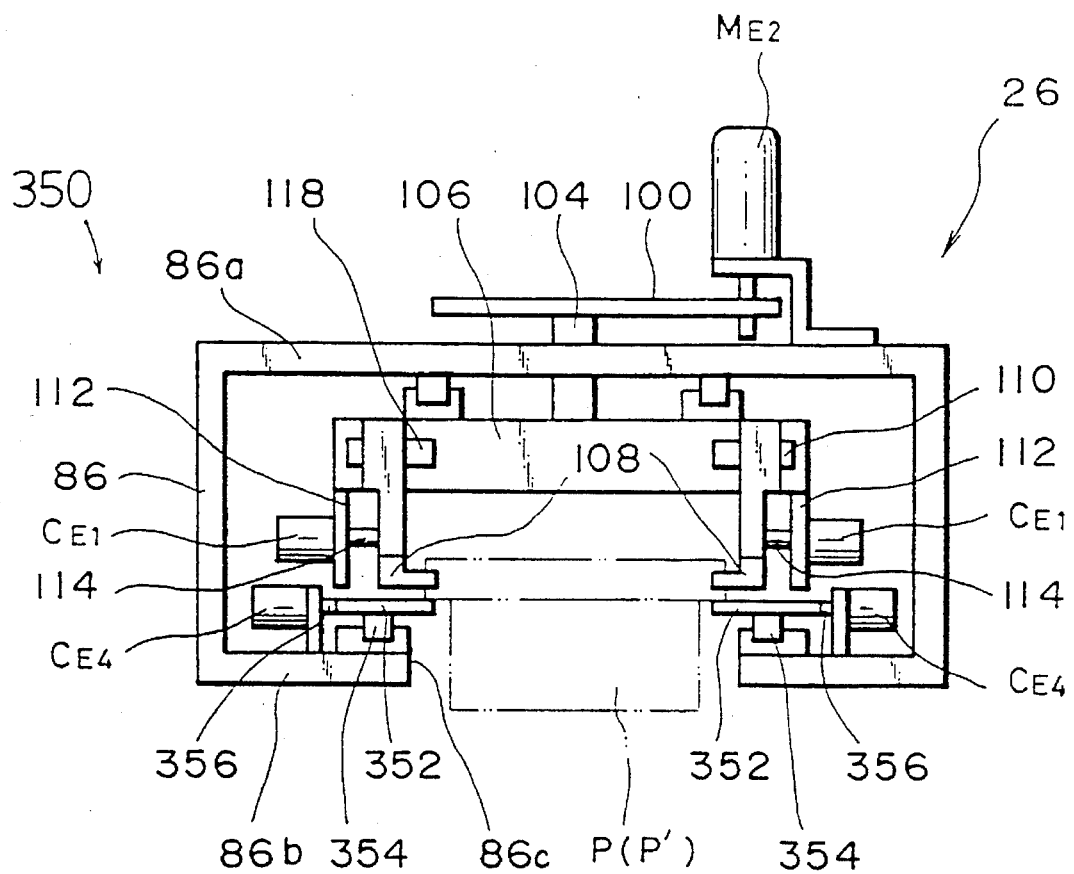
FIG. 40 is a side view showing an arrangement of a replacing mechanism according to a third modification.

In the elevator 26 of the embodiment described above, three hooks 108, 116, and 126 are provided for the replacing mechanism 96. The first and second hooks 108 and 116 are arranged at an upper stage to take in and push out a full pallet p, and the third hooks 126 are placed at a lower stage to draw in an empty pallet p'. However, the present invention is not limited to this. As shown in FIGS. 40 and 41 as a third modification, a replacing mechanism 350 can be comprised of only the first and second hooks 108 and 116 and not the third hooks.

Description of Replacing Mechanism

More specifically, as shown in FIG. 40, in elevator 26 a cut-off portion 86*c* is formed in the central portion of a bottom plate 86*b* of the elevator body 86 along the conveying direction d. A pallet p can pass in the conveying direction through the cut-off portion 86*c*.

The air cylinder supporting plates 112 extending in the conveying direction d are respectively fixed to both ends of the slide plate 106. A first air cylinder $C_{E1}$ for reciprocally moving the corresponding first hook 108 is attached to the end portion of each air cylinder supporting plate 112 on the side of the buffer 22. The first hook 108 is connected to the distal end portion of a first piston 114 of each first air cylinder $C_{E1}$. In this manner, upon driving the first air cylinders $C_{E1}$, the first hooks 108 are reciprocally moved to be engaged with/disengaged from the first notches 38*a* of the flanges 38.

The second hooks 116 are mounted on two end portions of the side surfaces, on the side of the stocker 24, of the slide plate 106 through second hook slide members 118 to be slidable along the longitudinal direction of the slide plate 106, i.e., in a direction perpendicular to the conveying direction d. The pair of second hooks 116 are formed to have shapes capable of being engaged, from two sides, with the second notches 38*b* formed in the flanges 38 of each of pallets $p_1, p_2, p_3 \ldots$ on the side of the unmanned vehicle 20.

Second air cylinders $C_{E2}$ for reciprocally driving the second hooks 116 are mounted on the end portions, on the side of the stocker 24, of the air cylinder supporting plates 112 fixed to the two ends of the slide plate 106. The second hooks 116 are connected to the distal end portions of second pistons 120 of the second air cylinders $C_{E2}$. In this manner, upon driving of the second air cylinders $C_{E2}$, the second hooks 116 are reciprocally moved to be engaged with/disengaged from the second notches 38*b* of the flanges 38.

A pair of movable slide guides 352 for slidably receiving a full pallet p taken in from the buffer 22 by the first hooks 108 and an empty pallet p' drawn in from the stocker 24 by the second hooks 116 are disposed on the bottom plate 86b of the elevator body 86.

The movable slide guides 352 are arranged to be slidable in a direction perpendicular to the conveying direction d, i.e., to be separated from an empty pallet p' received therein in order to place the empty pallet p' received therein on the unloading rollers 78 of the unloading mechanism 76. That is, slide members 354 are mounted on the bottom plate 86b of the elevator body 86 so as to slidably support the movable slide guides 352 in a direction perpendicular to the conveying direction d.

Fourth air cylinders $C_{E4}$ for reciprocally driving the movable slide guides 352 are mounted adjacent to the central portions of the two side edges along the conveying direction d of the cut-off portion 86c on the bottom plate 86b. The movable slide guides 352 are connected to the distal end portions of the fourth pistons 256 of the fourth air cylinders $C_{E4}$. In this manner, upon driving the fourth air cylinders $C_{E4}$, the movable slide guides 352 are reciprocally moved to be engaged with/disengaged from the flanges 38 of an empty pallet p'.

The replacing mechanism 350 according to the third modification is arranged as described above. Thus, after an empty pallet p' is temporarily taken in from the stocker 24 onto the movable slide guides 352, the empty pallet p' is temporarily placed on the unloading mechanism 76, and the unloading mechanism 76 is moved downward to remove the empty pallet from the replacing mechanism 350. In the state wherein the empty pallet p' is separated from the replacing mechanism 350 and the interior of the elevator body 86 becomes empty again, the replacing mechanism 350 is moved upward to a vertical position adjacent to the separation position so as to receive a full pallet p separated by the buffer 22. At this separation position, the replacing mechanism 350 receives the full pallet p from the buffer 22, and pushes out the full pallet p to the predetermined position of the stocker 24 which is empty since it took in an empty pallet p'.

In this manner, a series of pallet replacing operations are completed.

Control

Figure 25C:
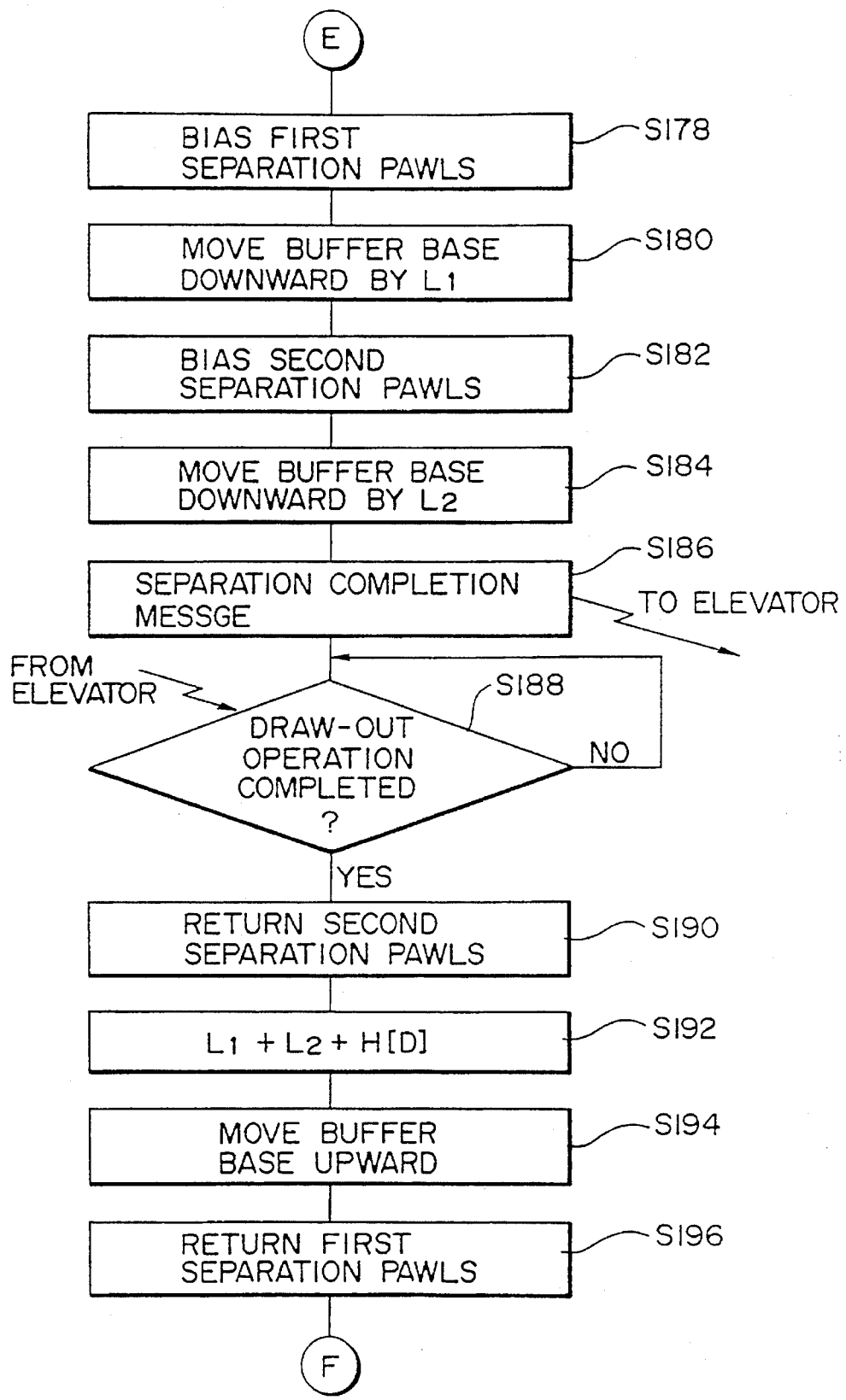

The operation of the elevator according to the third modification will be described hereinafter with reference to FIGS. 42A to 42H together with the movement of the stocker. In the control operation of this modification, control of the robot is given in step S26, and the basic control operation of the embodiment need not be modified. Therefore, robot control uses FIGS. 23A and 23B, stocker control uses FIGS. 24A and 24B, and buffer control uses FIGS. 25B and 25C. For the elevator, the control operation sequence will be explained with reference to FIGS. 42A to 42H. Since the empty pallet draw-out mechanism of the basic embodiment is removed from the lower portion, the elevator of this modification uses the sequence of drawing-out the empty pallet from the stocker ⇨ stacking the empty pallet ⇨ the insertion of a new pallet.

Figure 42A:
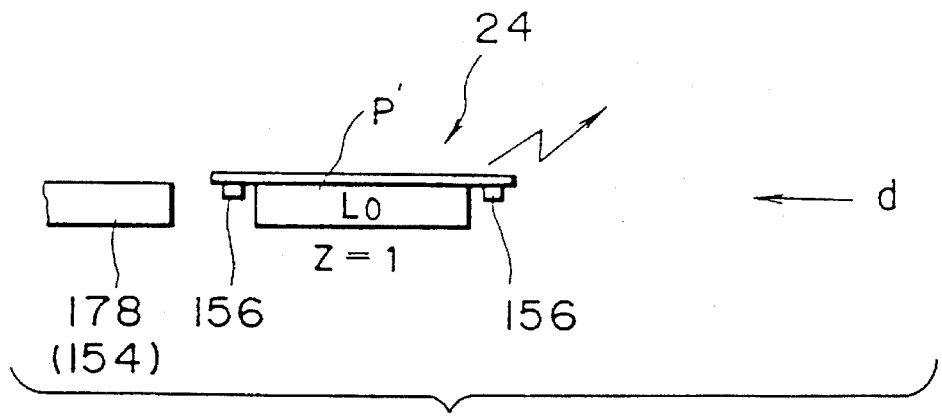
Figure 42B:
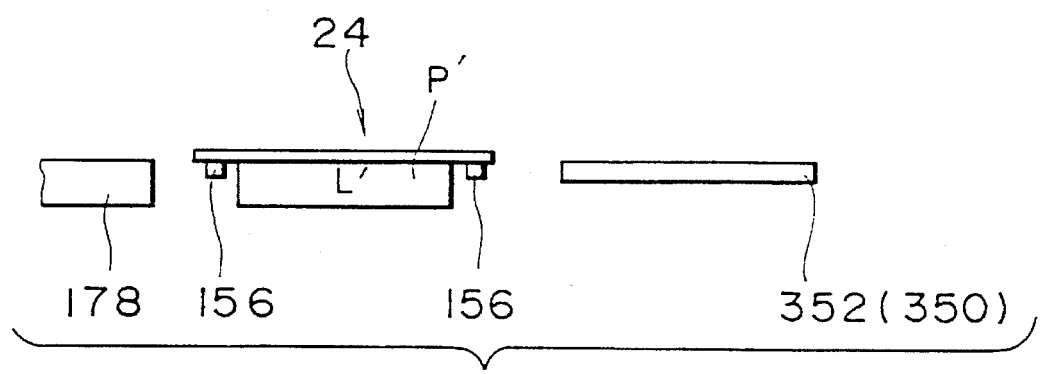
Figure 42C:
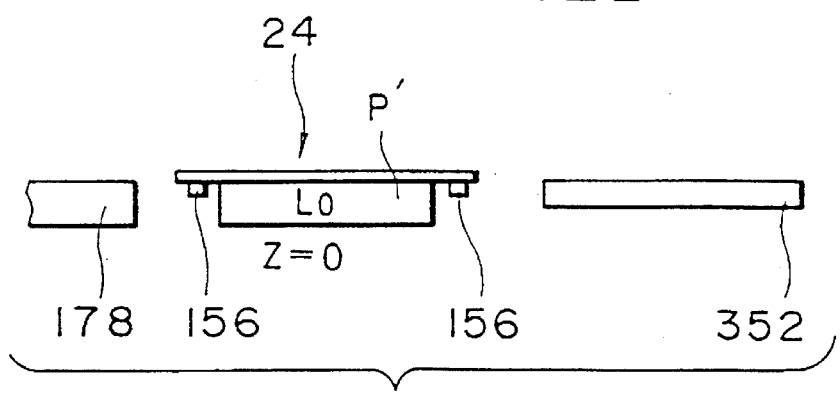

In FIG. 42A, if a remaining parts count Z [$L_0$] of a pallet of a process number $L_0$ (placed on a shelf S [$L_0$]) becomes 1, the robot issues a pallet replacement preparation Instruction to the buffer and the elevator. Upon reception of the preparation instruction, the buffer checks the position of a pallet to be placed on the buffer base 52 based upon the parts name and the like, corresponding to the process $L_0$ (=$D_0$) in accordance with the buffer control of the above-mentioned basic embodiment (FIG. 25A). The pallet is separated at the separation position. On the other hand, upon reception of the replacement preparation instruction, the modified elevator is moved to its replacement standby position. The standby position corresponds to the stocker position S [$L_0$] in the process $L_0$. When the elevator arrives at the standby position, the present process used by the stocker will shift to another process L'. After a cycle of the processes, the remaining parts count Z [$L_0$] of the pallet on the shelf S [$L_0$] becomes zero when it arrives at the draw-out base 154 position of the robot. In this case, the draw-out operation of the empty pallet from the stocker to the elevator is performed (FIGS. 42C and 42D). After the empty pallet is taken in, the elevator is moved downward to stack the empty pallet on the unloading mechanism 76 (FIG. 42E). In this case, the elevator holds no pallet.

Figure 42F:
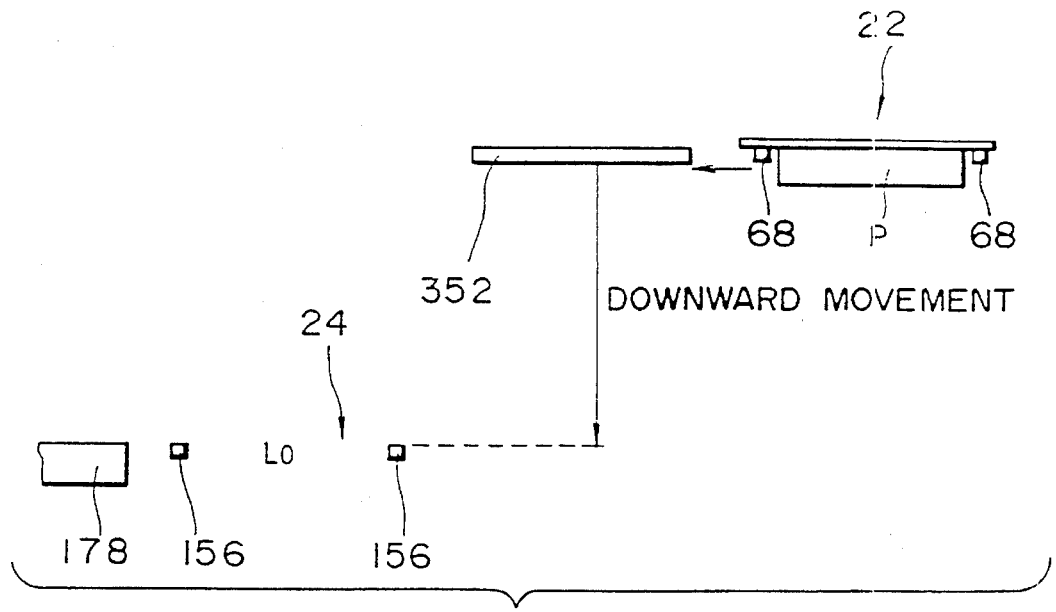
Figure 42G:
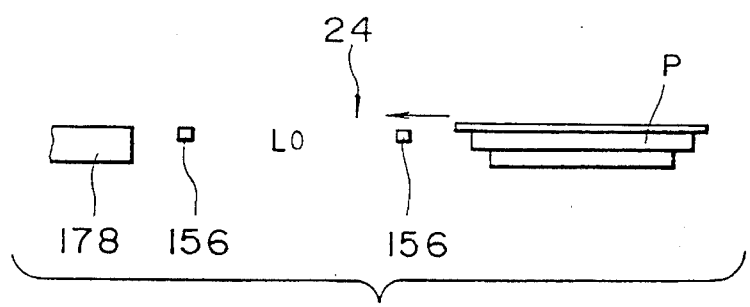
Figure 42H:
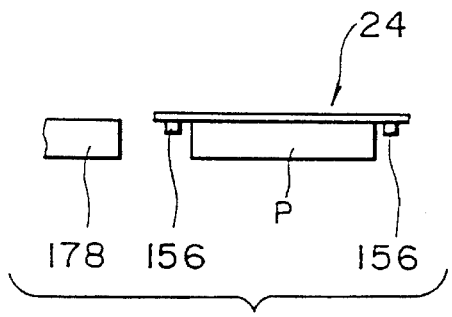

Thereafter, the elevator is moved upward to the separation position of the buffer, and takes a separated new pallet therein. After the take-in operation, the elevator issues a take-in completion message to the buffer, and is then moved downward to the standby position S [$L_0$] of the stocker in a stationary state (FIG. 42F). The elevator moves downward to the standby position of the stocker pushes a new pallet into the stocker (FIGS. 42G and 42H), and sends a replacement completion message to the stocker. Upon reception of this message, the stocker restarts feeding parts to the robot.

As described above, although according to the third modification, the replacement operation of the empty pallet p and the full pallet p takes slightly longer time than that in the above embodiment, the arrangement of the replacing mechanism 350 can be simplified, thus reducing cost.

Description of Fourth Modification

Arrangement

Figure 44:
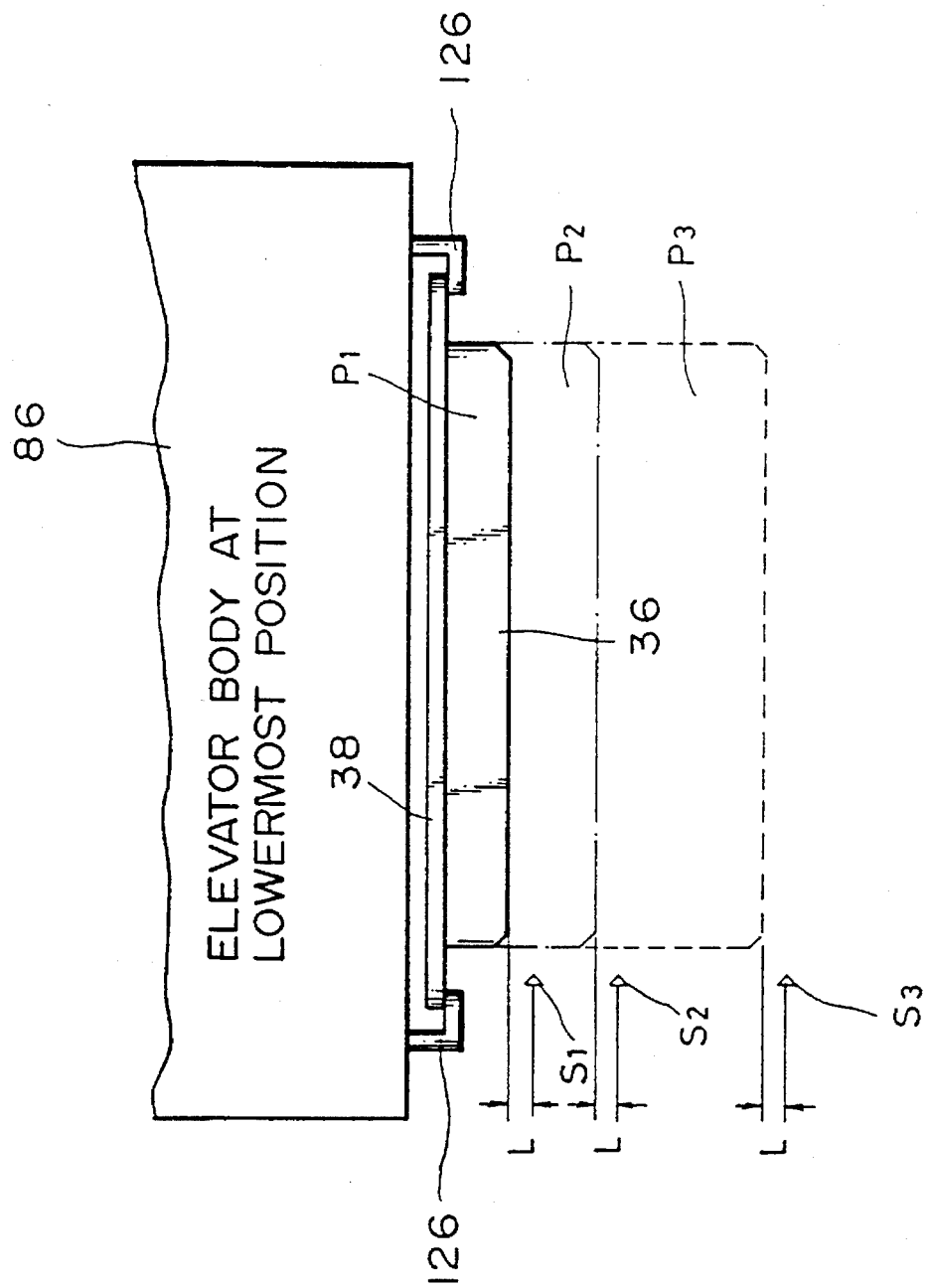
FIG. 44 is a side view showing positions of sensors shown in FIG. 43.

In the unloading mechanism 76 of the above-mentioned embodiment, empty pallets p' separated from the elevator 26 at a lower position are held in a stacked state. When the number of stacked empty pallets p' has reached a predetermined value, the unloading mechanism 76 is driven to unload the pallets to a position below the buffer base 52, i.e., a position adjacent to the empty pallet table of the unmanned vehicle 20. In particular, in the above description, the unloading mechanism 76 is fixed in the lower position (and cannot move vertically). However, the present invention is not limited to this. As shown in FIGS. 43 and 44 as a fourth modification, a portion of the unloading mechanism 76 located below the elevator 26 may move vertically, and may comprise a so-called lift mechanism.

More specifically, as shown in FIG. 43, the unloading mechanism 76 according to the fourth modification comprises a stationary convey mechanism 400 located below the buffer base 52, and a lift mechanism 402 located below the elevator 26. The stationary convey mechanism 400 has the same arrangement as that of the unloading mechanism 76 described in the above embodiment, and a detailed description thereof will be omitted.

In the lift mechanism 402 as shown in FIG. 43, other slidable members 404 are attached to guide members 88 mounted on columns 82a, 82b, 82c, and 82d constituting the elevator 26 so as to be located below slidable members 90 to which the elevator body 86 is attached. A lift base 406 is vertically movable and is supported at four corners by these four slidable members 404. Unloading rollers 78b are arranged on the lift base 406. When the lift base 406 is brought to its lowest position, the unloading rollers 78b horizontally match unloading rollers 78a constituting the stationary convey mechanism 400.

A projection 408 is integrally mounted on the side surface of the lift base 406 to extend in a gap between the far-side columns 82b and 82d in FIG. 43. An air cylinder mounting member 410 is provided so as to be bridged between the columns 82b and 82d and to extend horizontally. An air cylinder $C_L$ is mounted on the upper surface of the air cylinder mounting member 410 and extends downward. The lower end of a piston 412 of the air cylinder $C_L$ is fixed to the uppper surface of the projection 408.

Note that the air cylinder $C_L$ comprises a brake mechanism (not shown) capable of arbitrarily setting a projectable amount of the piston 412. In the normal state, the air cylinder $C_L$ is held in a state wherein the piston 412 projects to a maximum amount. When compressed air is supplied to the cylinder, the cylinder pulls up the piston 412, in other words, reduces the projecting amount in order to move the lift base 406 upward.

A sensor mounting member 414 is attached to the lower surface of the cylinder mounting member 410 and extends downward. Three sensors $S_1$, $S_2$, and $S_3$ are arrayed in the vertical direction on the sensor mounting member 414 and can oppose the lift base 406 which is vertically moved.

These sensors $S_1$, $S_2$, and $S_3$ are disposed so as to select one of three lift positions (uppermost standby positions) the uppermost one of the empty pallets p' is placed on the lift base 406 for the following reason, i.e., to select one of three positions at which the lift base 406 is moved upward and waits when an empty pallet p' is released from the elevator body 86 onto the lift base 406.

More specifically, as shown in FIG. 44, the height from the base to the bottom surface of an empty pallet $p_1'$, $p_2'$, or $p_3'$ changes depending on the height of the empty pallet $p_1'$, $p_2'$, or $p_3'$ held below the elevator body 86 at the lowermost position. For this reason, downward movement control of the elevator body 86 when the empty pallet $p_1'$, $p_2'$, or $p_3'$ held below the elevator body 86 is released onto the empty pallets p' on the lift base 406 becomes complicated, and it is difficult to determine the upward movement position of the lift base 406.

In other words, if the lift base 406 is moved upward to a predetermined standby position while the draw-in operation of the empty pallets $p_1'$, $p_2'$, and $p_3'$ is performed in the elevator 26, the downward movement time of the elevator body can be minimized, and the subsequent operations can be quickly performed. In this manner, these sensors $S_1$, $S_2$, and $S_3$ aim at simplifying downward movement control of the elevator body 86 and shortening the downward movement time, and cause the lift base 406 to wait at an upward standby position in accordance with the height of empty pallet $p_1'$, $p_2'$, or $p_3'$ to be stacked on the lift base 406.

Thus, the sensor $S_1$ at the uppermost position is positioned below the vertical position of the lower surface of the empty pallet $p_1'$ by a predetermined distance L when the elevator body 86 is located at the lowermost position and the height of the empty pallet p' held below the elevator body 86 is 25 mm.

The sensor $S_2$ at the second highest position is positioned 25 mm below the sensor $S_1$. More specifically, the second sensor $S_2$ is positioned below the vertical position of the lower surface of the empty pallet $p_2'$ by the predetermined distance L when the elevator body 86 is located at the lowermost position and the height of the empty pallet p' held below the elevator body 86 is 50 mm.

The sensor S3 at the third highest position is positioned 50 mm below the sensor $S_2$. More specifically, the second sensor $S_2$ is positioned below the vertical position of the lower surface of the empty pallet $p_3'$ by the predetermined distance L when the elevator body 86 is located at the lowermost position and the height of the empty pallet p' held below the elevator body 86 is 100 mm.

The predetermined distance L is set small enough to allow, when the empty pallet $p_1'$, $p_2'$, or $p_3'$ is released from the elevator body 86 onto the lift base 406 while keeping this distance, the released empty pallet $p_1'$, $p_2'$, or $p_3'$ to be stacked on the empty pallets p' on the lilt base 406.

In this manner, when the elevator body 86 transfers the empty pallet $p_1'$, $p_2'$, or $p_3'$ held thereon to the empty pallets stacked p' on the lift base 406, the uppermost position of the empty pallets p' stacked on the lift base 406 is brought in advance to an upward standby position corresponding to the lowermost position of the elevator body 86 and the height of the empty pallet $p_1'$, $p_2'$, or $p_3'$ held thereon. As a result, the elevator base 86 need only be moved downward to its lowermost position, thus simplifying the downward movement control and shortening the downward movement time.

Control

Operation control in the fourth modification with the above arrangement will be briefly described hereinafter with reference to FIG. 45. Control of this modification can be achieved by modifying steps S226 to S236 in FIG. 26A. More specifically, when the replacement request of the empty pallet p' is issued in step S76 or S108 in the stocker control operation, the elevator body performs the above-mentioned predetermined operation, and replaces the empty pallet p' with a new pallet p in step S220 (FIG. 26A).

Figure 45:
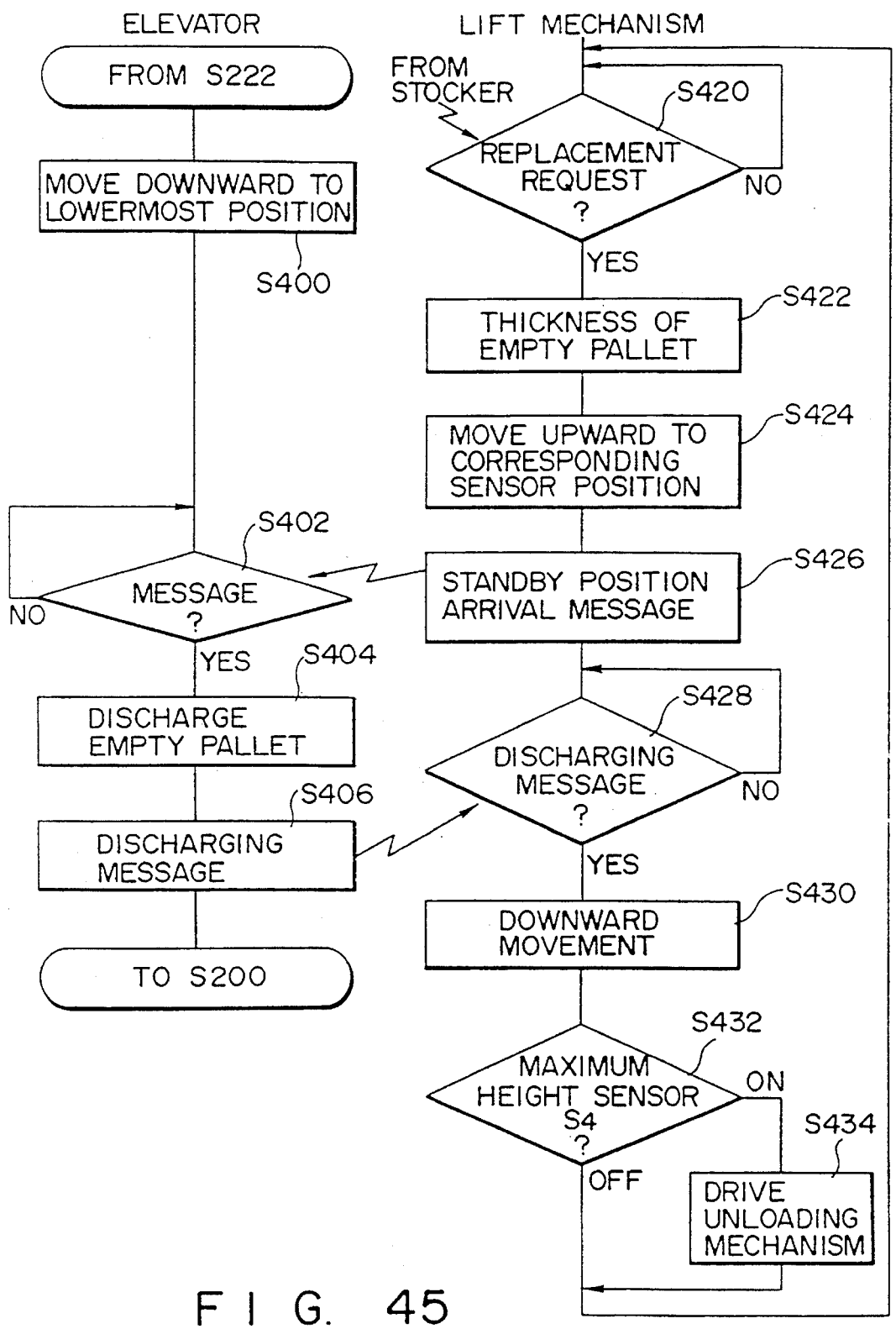
FIG. 45 is a control flow chart of the elevator and lift mechanism according to the fourth modification.

The lift mechanism waits for the replacement request in step S420 (FIG. 45). Upon reception of this request, the lift mechanism detects the thickness of the empty pallet held on the elevator in step S422. When the thickness is detected, the air cylinder $C_L$ is driven in step S424 to move the lift base 406 upward to one of the positions of the sensors $S_1$ to $S_3$ corresponding to the detected thickness. In step S426, the lift mechanism issues the standby position arrival message to the elevator, and waits for a release message of the empty pallet p' from the elevator.

The elevator which completed pallet replacement sends a message indicating this to the stocker in step S222 (FIG. 26A), and causes the elevator body to move downward to the position illustrated in FIG. 43 in step S400 (FIG. 45). At this position, the elevator waits for the standby position arrival message from the lift mechanism. When the message has been received from the lift mechanism, the distance between the empty pallet p' held below the elevator and the uppermost empty pallet p' on the lift base 406 almost becomes the distance L, as has been described above. In step S404, the empty pallet held below the elevator is released, and in step S406, a release message is sent to the lift mechanism.

Upon reception of the release message, the flow advances from step S428 to step S430, and the lift mechanism causes the lift base 406 to move downward to the floor position. At this time, it is checked if the the vertical position of the presently stacked empty pallet p' has reached the maximum height sensor position. If the maximum height position has been reached, this interfers with the vertical movement of the elevator. Therefore, in step S434, the stationary convey mechanism 400 is driven to unload the stacked empty pallets.

Under such control of the elevator and lift mechanism, the elevator body 86 need only be moved downward to its lowermost position. Thus, the downward movement control can be simplified, and the downward movement time can be shortened.

In the elevator control of the above-mentioned basic embodiment, the thickness of the empty pallet is given as H

[L]. If this thickness is erroneously detected, the elevator body may be damaged. For this reason, the following auxiliary mechanism may be arranged as a means for checking the thickness of the empty pallet. More specifically, although not shown, in order to detect the height of the empty pallet $p_1'$, $p_2'$, or $p_3'$ drawn below the elevator body 86, sensors for detecting the height of these empty pallets held below the elevator body 86 are provided on the lower portion of the elevator body 86 to collate the data H [L] with the thickness detected by the sensors (not shown).

The number of the above three sensors $S_1$ to $S_3$ can be reduced to one. In this case, one sensor can be commonly used as the maximum height sensor $S_4$. In this case, however, the empty pallet held below the elevator body and the stacked empty pallets take three different distances in accordance with the thicknesses of the pallets. Therefore, the elevator body must be further moved downward to shorten the distance so as to allow the elevator body to release the empty pallet.

ANOTHER EMBODIMENT

Arrangement

In the description of the previous embodiment, the parts feeding system 14 for feeding necessary parts x to the robot 12 comprises the buffer 22 for separately receiving parts from the unmanned vehicle 20 and temporarily retaining the received parts, the stocker 24, arranged adjacent to the robot 12, for sequentially feeding parts necessary for assembly to the robot 12 in accordance with the assembling order, and the elevator 26, disposed between the buffer 22 and the stocker 24, for transferring parts short in the stocker 24 from the buffer 22 to the stocker 24.

In particular, in the previous embodiment, a replacing position (at which an empty pallet whose remaining parts count becomes zero is replaced with a full pallet p filled with corresponding parts) is a position (in a process L+1) of an empty pallet which was located at a draw-out position of the robot 12 in the process L. In other words, the replacing position is defined by the process order L and the shelf position S [L] corresponding to the process. The replacing position may often be different from the separation position at the buffer 22. Therefore, the elevator 26 for transferring full pallets p from the buffer 22 to the stocker 24 is necessary between these positions.

However, the present invention is not limited to the arrangement of the previous embodiment, and may employ an arrangement of another embodiment, as shown in FIGS. 46 to 49.

In this embodiment, the separation position in the buffer 22 and the replacing position in the stocker 24 are set at an identical vertical position, and the separation position in the buffer 22 is set immediately above the buffer base 52. With this arrangement, the elevator 26 necessary in the previous embodiment can be omitted.

An arrangement of an FAC 10 according to this embodiment will be described hereinafter in detail. The same reference numerals in this embodiment denote the same parts as in the arrangement of the previous embodiment and its various modifications, and a detailed description thereof will be omitted.

Figure 46:
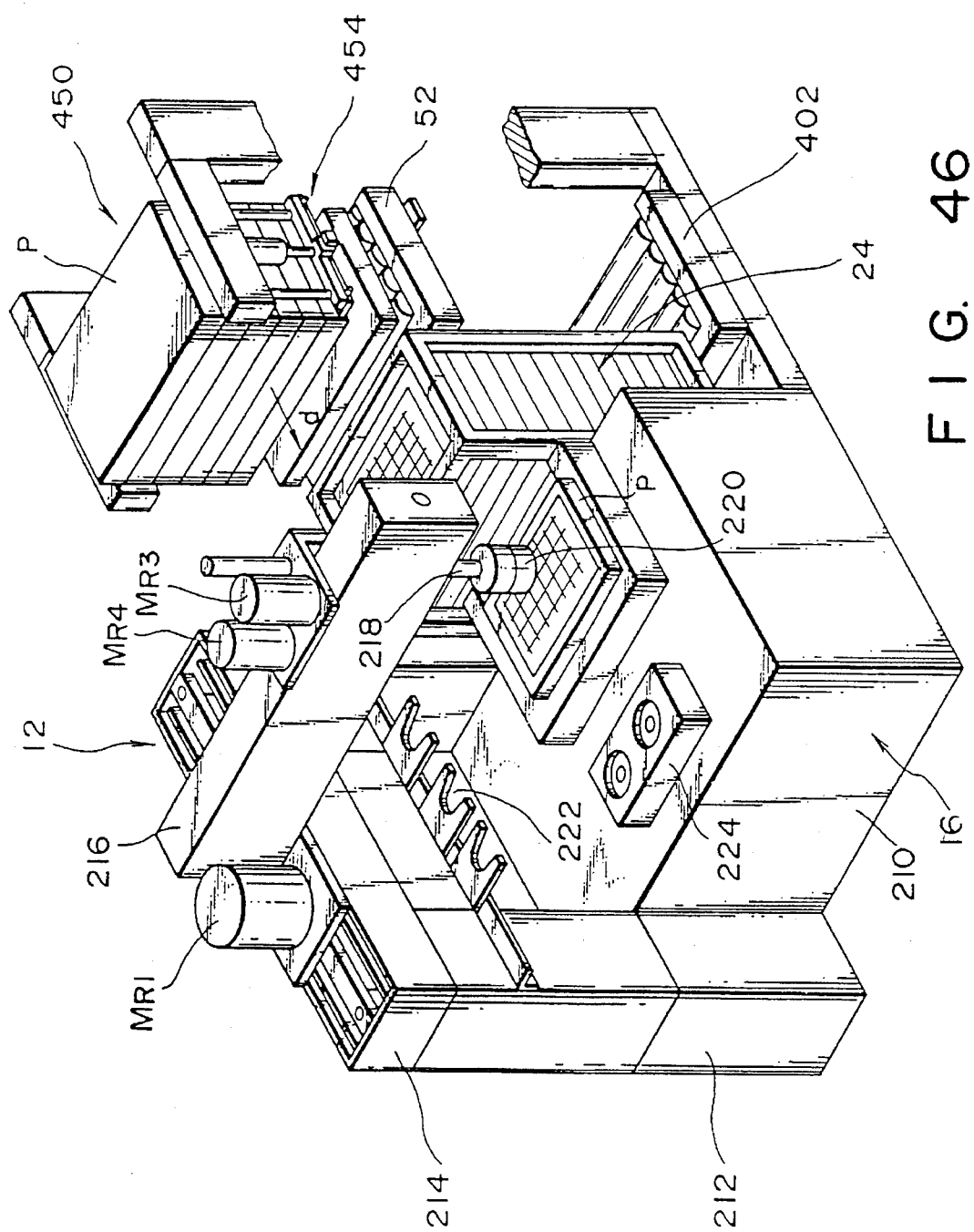
FIG. 46 is a perspective view showing a schematic arrangement of another embodiment according to the present invention.

As shown in FIG. 46, a parts feeding system 14 for feeding necessary parts to a robot 12 comprises a buffer 450 for receiving parts from an unmanned vehicle 20 and temporarily retaining the received parts, and a stocker 24, disposed between the buffer 450 and the robot 12, for sequentially feeding parts necessary for assembly to the robot 12 in accordance with the assembling order.

Unlike the buffer 22 in the previous embodiment, the buffer 450 has a function of temporarily receiving an empty pallet p' from the stocker 24 and pushing out a pallet separated therefrom to the replacing position of the stocker 24. In addition, pallets p are stacked in an order, starting from the lowermost pallet, such that the remaining parts count becomes zero in the stocker 24. A buffer base 52 is mounted while its vertical position is fixed.

Figure 47:
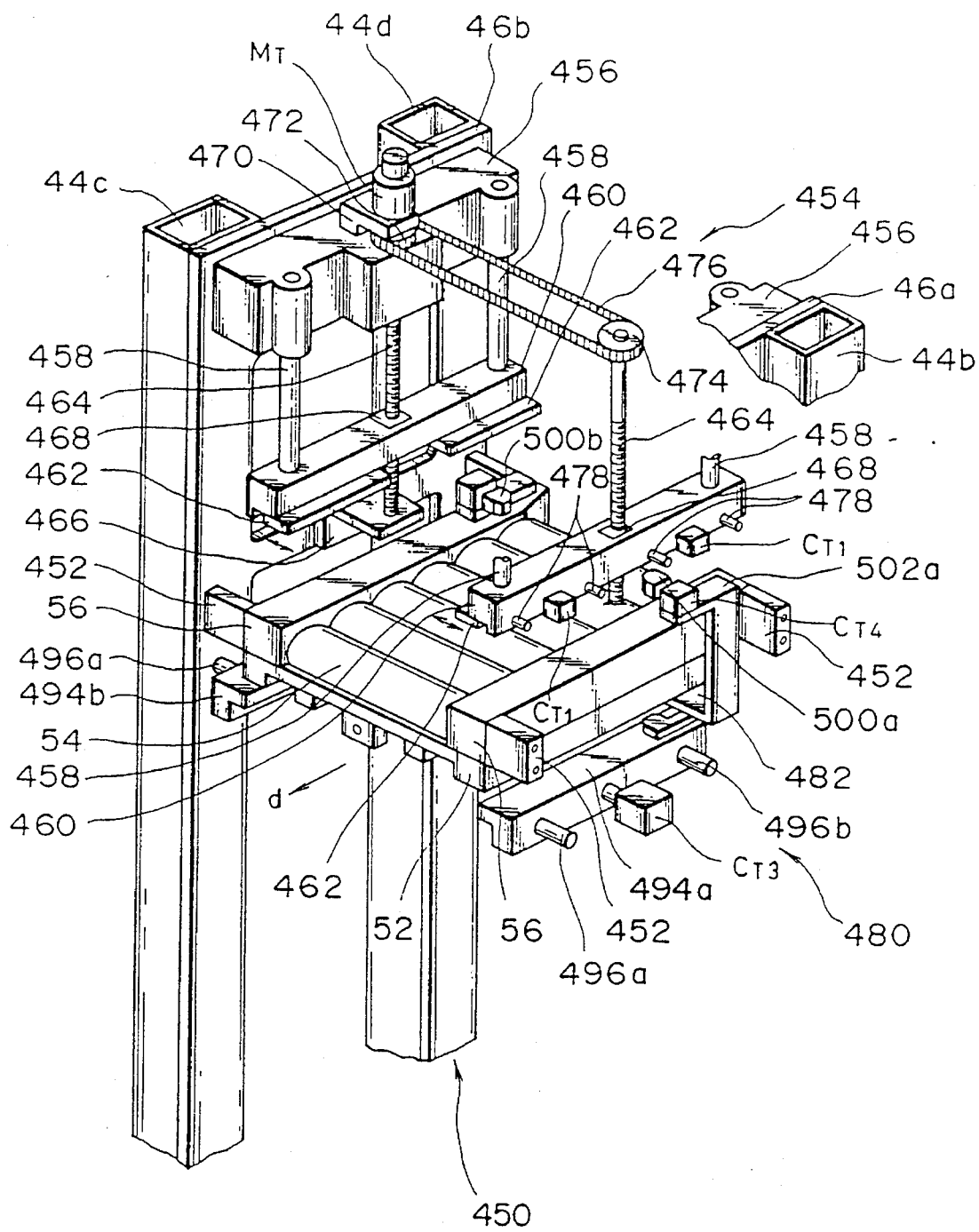
FIG. 47 is a perspective view showing an arrangement around a buffer base of a buffer shown in FIG. 46.

More specifically, the buffer 450 comprises the buffer base 52 fixed at the same vertical position as that of a pallet table 32 of the unmanned vehicle 20. Moreover, buffer 450 is sandwiched between standing plates 46a and 46b through spacer blocks 452, as shown in FIG. 47. In other words, the side surfaces of the buffer base 52 are separated from the corresponding standing plates 46a and 46b by the lengths of the spacer blocks 452.

A separation mechanism 454 for independently separating a pallet p directly placed on the buffer base 52 from the pallets located thereabove is provided above the buffer base 52.

The separation mechanism 454 comprises mounting members 456 respectively fixed on the upper ends of the standing plates 46a and 46b. Parallel guide shafts 458 extending downward are mounted on the two end portions of each mounting member 456 along the conveying direction d. A separation pawl mounting plate 460 is attached to the lower ends of each pair of guide shafts 458 along the conveying direction d. A pair of separation pawls 462 which can hook flanges 38 of a pallet p from the lower direction are mounted on the lower surface of each separation pawl mounting plate 460 to be retractable in a direction perpendicular to the conveying direction d.

A ball screw 464 extending in the vertical direction is rotatably supported at the central portion of each mounting member 456. The lower end of each ball screw 464 is rotatably supported by a supporting plate 466 fixed to the corresponding one of the standing plates 46a and 46b. A ball screw receiving portion 468 with which the central portion of each ball screw 464 engages is formed at the central portion of each separation pawl mounting plate 460.

A servo motor $M_T$ is mounted on the upper surface of the far-side mounting member 456 in FIG. 47 through a stay 470. The upper end of the ball screw 464 is connected to the driving shaft of the servo motor $M_T$. Upon rotation of the driving shaft, the ball screw 464 is rotated.

A driving pulley 472 is coaxially mounted on the driving shaft of the motor $M_T$. A driven pulley 472 is coaxially mounted on the upper end of the near-side ball screw 464 in FIG. 47. A timing belt 476 is looped between the driving pulley 472 and the driven pulley 474. In this manner, the pair of ball screws 464 are synchronously rotated. More specifically, both the separation pawl mounting plates 460, i.e., the separation pawls 462 are vertically moved while maintaining the same vertical positions.

In order to retractably drive the separation pawls 462 from the corresponding separation pawl mounting plates 460, air cylinders $C_{T1}$ are provided on the rear surface of each separation pawl mounting plate 460. The distal end of a piston (not shown) of each air cylinder $C_{T1}$ is connected to the corresponding separation pawl 462. Each separation pawl 462 is retractably supported through a pair of guide pins 478.

In a state wherein no compressed air is supplied, each air cylinder $C_{T1}$ biases the corresponding separation pawl 462 to the retracted position separated from the flange 38. In a state wherein the compressed air is supplied, each cylinder $C_{T1}$ biases the corresponding separation pawl 462 to the projecting position at which the pawl 462 can hook the flange 38.

With the above arrangement of the separation mechanism 454, when a lowermost pallet pa, i.e., a pallet pa which is directly stacked on the buffer base 52 and is next to be transferred to the stocker 24, is separated from the plurality of pallets p stacked on the buffer base 52, the separation pawls 462 are moved through the servo motor $M_T$ to positions immediately adjacent and below the flanges 38 of a second lowermost pallet pb while being biased to their retracted positions.

Thereafter, compressed air is supplied to the air cylinders $C_{T1}$ to bias the separation pawls 462 to their projecting positions. In this state, the separation pawls 462 can engage with the flanges 38 of the second lowermost pallet pb on the buffer base 52 from below. From this state, the servo motor $M_T$ is starts moving the separation pawl mounting plates 460, i.e., separation pawls 462 upward.

In this manner, the second lowermost pallet pb is moved upward together with the pallets p stacked thereon. In other words, the second lowermost pallet pb and the pallets p stacked thereon are lifted up while the lowermost pallet pa is left on the buffer base 52. Lowermost pallet pb and the pallets p stacked thereon are thus separated from the lowermost pallet pa. Therefore, the separated lowermost pallet pa, i.e., the pallet pa to next be transferred to the stocker 24, can be set in a state wherein it can be independently drawn out along the conveying direction d.

Figure 48:
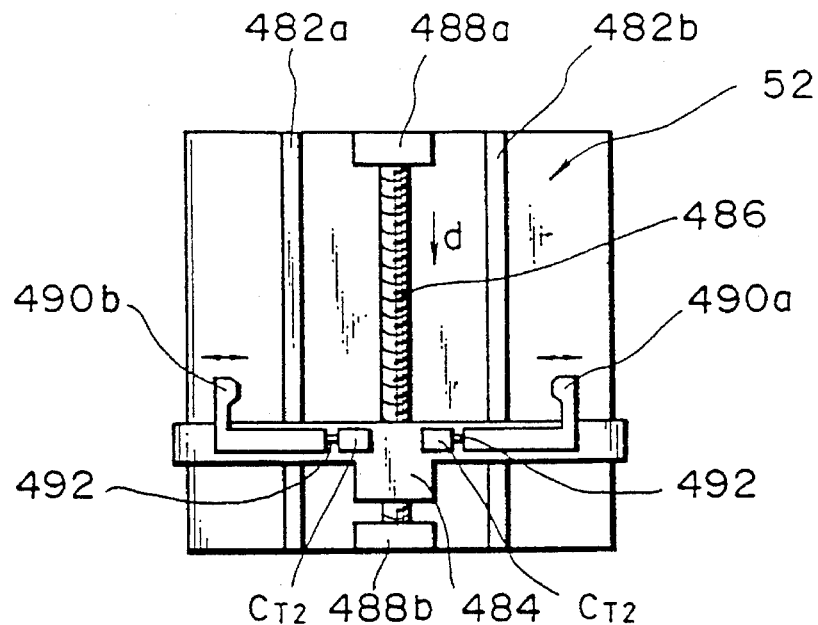
FIG. 48 is a bottom view showing a state of the lower surface of the buffer base shown in FIG. 47.
Figure 49:
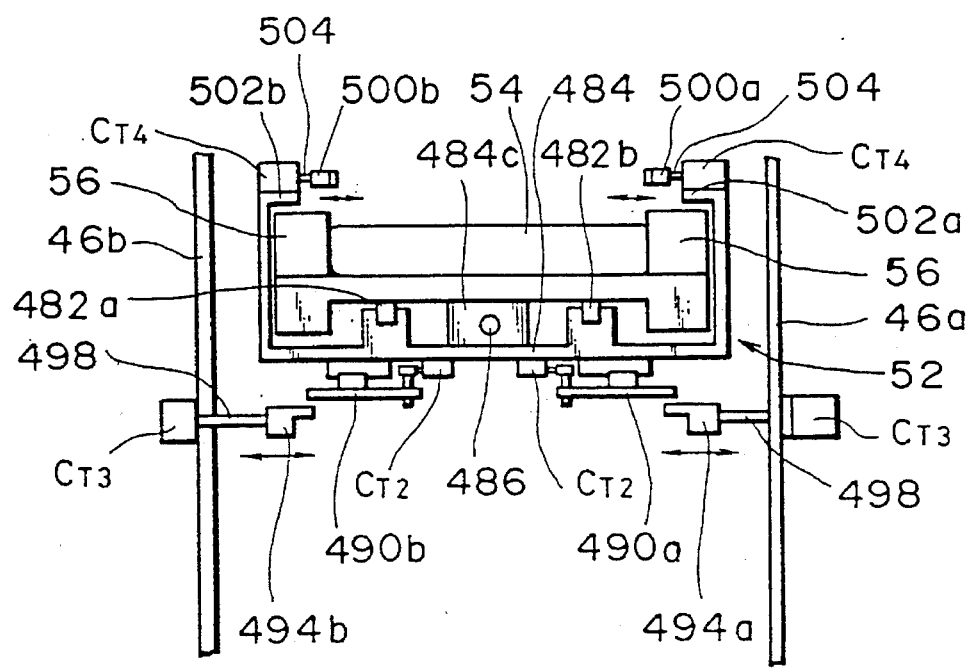
FIG. 49 is a side view showing an arrangement of a replacing mechanism arranged on the buffer base.

The buffer 450 comprises a replacing mechanism 480 of pallets p which are located around the buffer base 52. The replacing mechanism 480 comprises a horizontal slide plate 484 which is arranged below the buffer base 52 to be reciprocally movable in the conveying direction d through a pair of guide shafts 482a and 482b, as shown in FIGS. 48 and 49. A ball screw 486 is disposed along the conveying direction d at the central portion of the lower surface of the buffer base 52 such that two ends thereof are rotatably through supporting members 488a and 488b, as shown in FIG. 48. The slide plate 484 is arranged to be in rolling contact with the lower surface of the buffer base 52 through a pair of rollers 484a and 484b.

The ball screw 486 is threadably engaged with a threadably engaged portion 484c integrally formed at the central portion of the slide plate 484. Although not shown, the ball screw 486 is rotated by a servo motor. As a result, the slide plate 484 is reciprocally moved in the conveying direction d by threadable engagement between the ball screw 486 and the threadably engaged portion 484c.

A pair of first hooks 490a and 490b for drawing in an empty pallet p' from the stocker 24 and holding the drawn pallet below the buffer base 52 are mounted on the lower surface of the slide plate 484 to be retractably movable in a direction perpendicular to the conveying direction d. Air cylinders $C_{T2}$ for reciprocally driving the first hooks 490a and 490b, respectively, are attached to the lower surface of the slide plate 484. Pistons 492 of air cylinders $C_{T2}$ are connected to the first hooks 490a and 490b.

When compressed air is not supplied to the air cylinders $C_{T2}$, the air cylinders $C_{T2}$ are operated to bias the corresponding first hooks 490a and 490b to positions separated sidewards from the flanges 38 of the pallet p. When compressed air is supplied to the air cylinders $C_{T2}$, the cylinders $C_{T2}$ are operated to move the corresponding first hooks 490a and 490b so as to engage with second notches 380 of the flanges 38 of the pallet p.

The replacing mechanism 480 comprises movable slide guides 494a and 494b for receiving an empty pallet p' drawn from the stocker 24 by the first hooks 490a and 490b. The movable slide guides 494a and 494b are provided to the corresponding standing plates 46a and 46b through guide pins 496a and 496b to be retractable in a direction perpendicular to the conveying direction d. The movable slide guides 494a and 494b are mounted on the distal ends of pistons 498 of air cylinders $C_{T3}$ fixed to the corresponding standing plates 46a and 46b, respectively.

When compressed air is not supplied to the air cylinders $C_{T3}$, the air cylinders $C_{T3}$ bias the corresponding movable slide guides 494a and 494b to their projecting positions at which the guides hook the flanges 38 of a drawn empty pallet p'. When compressed air is supplied to the air cylinders $C_{T3}$, the air cylinders $C_{T3}$ bias the corresponding movable slide guides 494a and 494b to their retracted positions separated sidewards from the flanges 38 of the drawn empty pallet p'.

The replacing mechanism 480 comprises a pair of second hooks 500a and 500b for pushing a full pallet p into the stocker 24 while being located at side portions above the buffer base 52. The second hooks 500a and 500b can be engaged with the second notches 38b of the flanges 38 of the full pallet p from two sides thereof. The second hooks 500a and 500b are mounted on the distal ends of pistons 504 of air cylinders $C_{T4}$ fixed on the upper surfaces of supporting stays 502a and 502b which are integrally connected to the slide plate 484.

When compressed air is not supplied to the air cylinders $C_{T4}$, the air cylinders $C_{T4}$ bias the corresponding second hooks 500a and 500b to their retracted positions separated sidewards from the flanges 38. When compressed air is supplied to the air cylinders $C_{T4}$, the air cylinders $C_{T4}$ bias the corresponding second hooks 500a and 500b to their projecting positions at which the hooks engage with the second notches 38b of the flanges 38.

As described above, in this embodiment comprising the above-mentioned buffer 450, the stocker 24 has the same arrangement as that of the previous embodiment, but its operation is slightly different from the previous embodiment. More specifically, the stocker 24 in the previous embodiment is operated such that the draw-out position of each pallet p in the elevating frame 152 is vertically moved within a range wherein the draw-out position can oppose the draw-out base 168. The stocker 24 in this embodiment is operated such that the draw-out position pallet p in the elevating frame 152 can oppose the separation position of the buffer 450 while executing the above-mentioned operation.

In this embodiment, in order to place an empty pallet p' received by the lower portion of the buffer base 52 onto an unloading mechanism 76, the unloading mechanism 76 comprises a lift mechanism 402 having the same arrangement as that described in the fourth modification of the previous embodiment in a portion 10 below the buffer base 52.

Control

The control operation of the stocker 24 and the buffer 450 according to this embodiment with the above arrangement will be described below with reference to FIGS. 50A and 50B. Note that general control for the robot uses the program shown in FIGS. 24A and 24B. The main features of the control operation are as follows. Since there is no elevator like in the previous embodiment, even if a pallet replacement preparation request is issued from the robot, only the buffer performs the preparation operation. When the stocker 24 detects from the robot that the remaining parts count in the pallet becomes zero (the replacement request flag I [L]=1), it temporarily interrupts parts feeding to the robot (i.e., does not enter the next process), and moves the elevating frame 152 to the pallet separation position by the buffer described above. Replacement of empty and full pallets is performed at this separation position. Thereafter, the stocker is moved according to the original process order such that a pallet placed on a shelf position of the corresponding process matches with the draw-out position of the draw-out unit 154, and parts feeding to the robot is resumed.

Figure 50A:
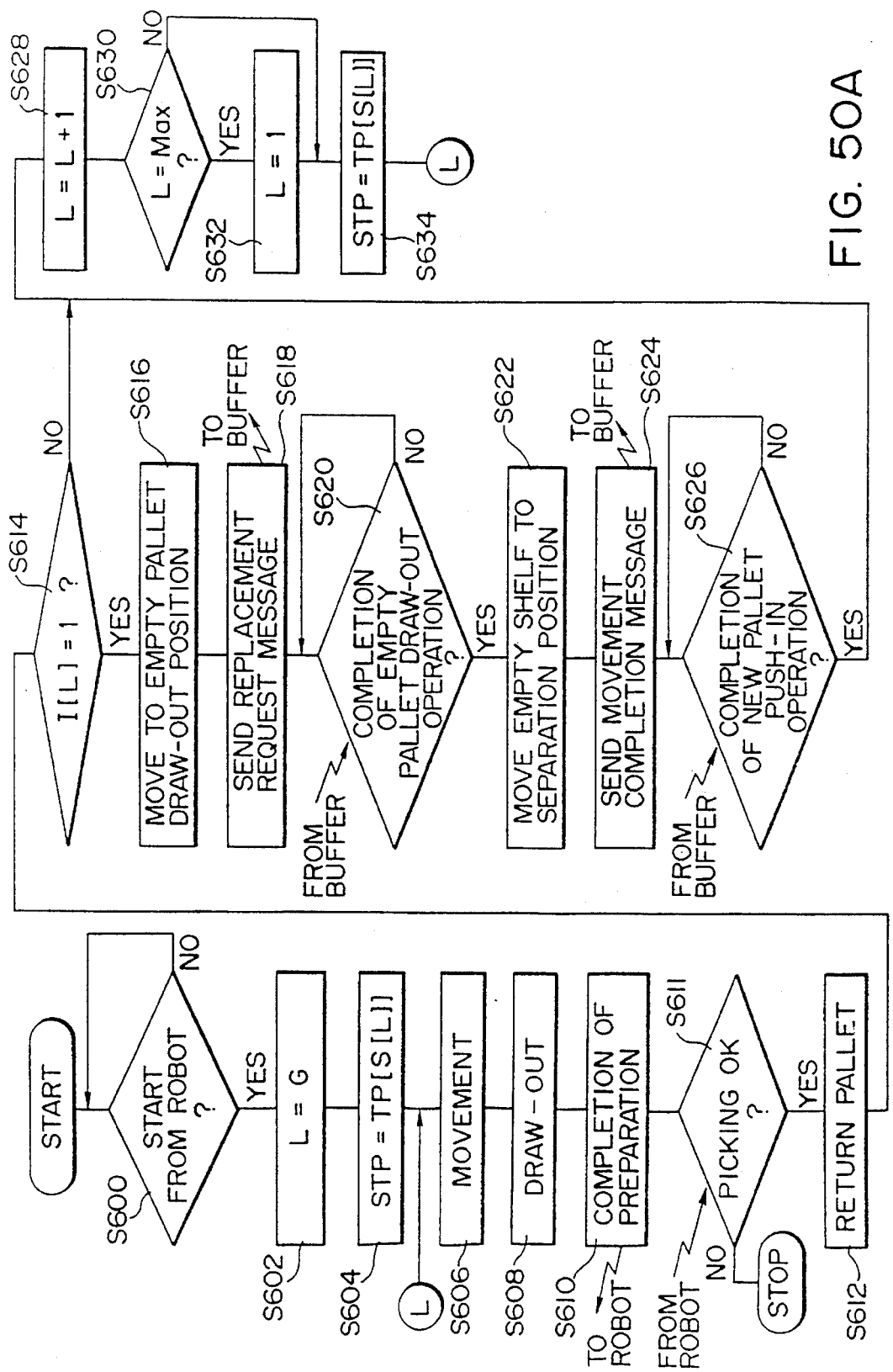
FIGS. 50A and 50B are flow charts of a control program according to the embodiment of FIG. 47.

FIG. 50A is a flow chart of the control program for the stocker according to this embodiment. Step S600 ⇨ step S608 show control until the elevating frame 152 of the stocker 24 is vertically moved such that a pallet, at a shelf position corresponding to a process number G (=L) received from the robot, is moved to the draw-out position of the draw-out unit 154 and is drawn out at the position of the draw-out unit 154. The pallet draw-out preparation completion message is sent to the robot in step S610. In step 611, a parts pick completion message from the robot is waited for. If the pick completion message is received, the flow advances from step S611 to step S612, and the pallet on the draw-out unit 154 is returned into the elevating frame 152. In step S614, it is checked if the replacement request flag I [L] is set to be "1" by the robot.

If the flag is not set, steps S628 to S634 are executed, and the flow then returns to step S606. The above-mentioned control is repeated until the replacement request flag I [L] is set to be "1".

During the repetition of these steps, if the robot detects a pallet whose remaining parts count has become 1 (step S22 in FIG. 23A), a replacement preparation operation instruction must be issued to the buffer in step S26 (FIG. 23A).

Figure 50B:
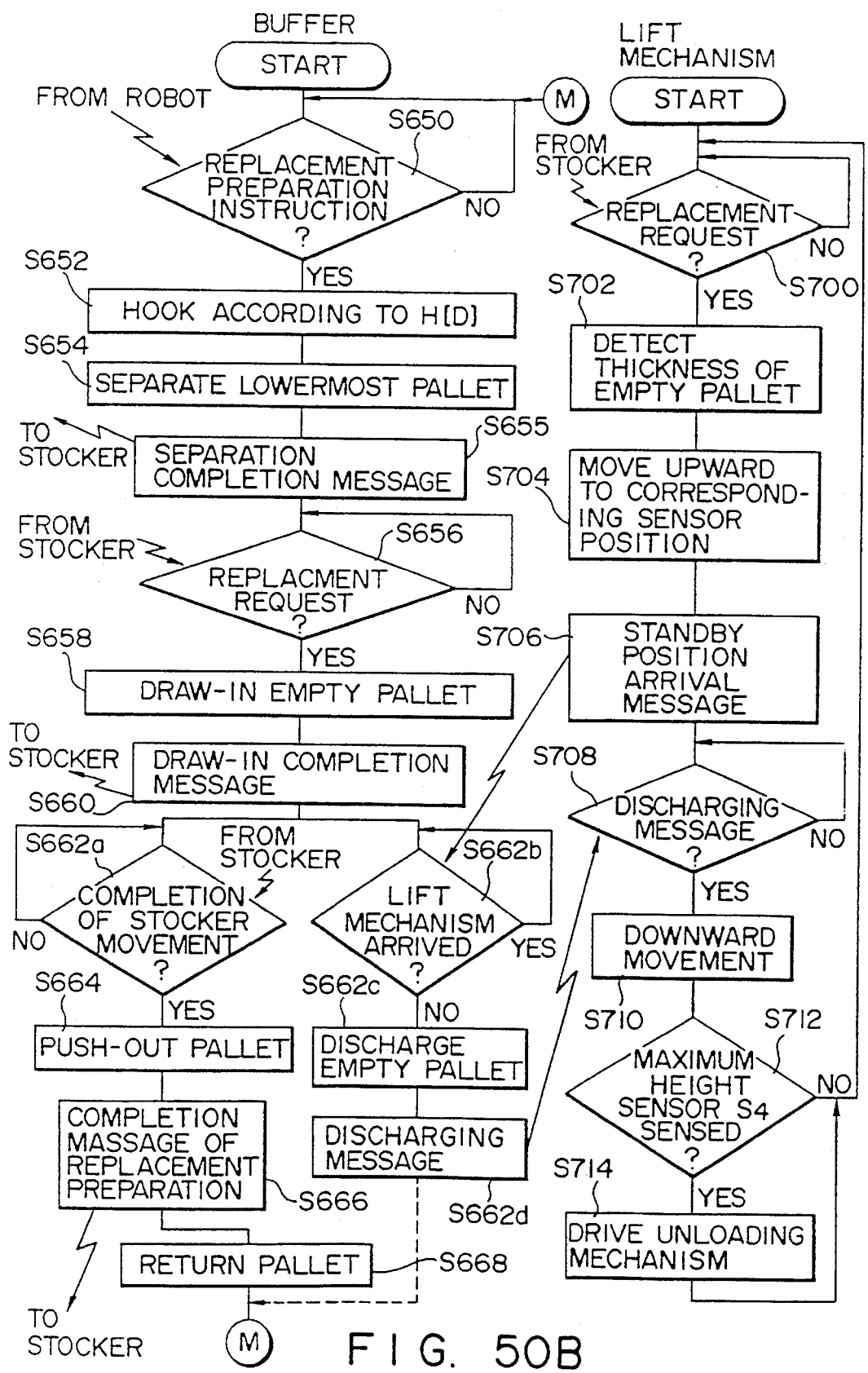

When the replacement preparation instruction is issued, the flow advances from step S650 in the buffer control program shown in FIG. 50B to step S652, and the thickness H [D] of a new pallet is obtained based on the process number D (D=G in step S24 in FIG. 23A) by searching a corresponding variable in the variable table (FIG. 21A). In step S654, the pallet at the lowermost position is separated. More specifically, the motor $M_T$ is rotated until H[D] moves the separation pawls 462 upward. At this time, the air cylinders $C_{T1}$ are driven to hook a pallet on a stage immediately above or higher than that of the full pallet to be separated by the separation pawls 462. After hooking, the motor $M_{T1}$ is further rotated to move the pallet on a stage immediately above or higher than that of the full pallet to be separated, thereby separating the pallet to be separated. In this manner, after the full pallet is separated from other pallets, a separation completion message is sent to the stocker in step S655, and the replacement request instruction is waited for in step S656.

If the stocker detects in step S614 that the robot has set the flag I [L] to "1", the flow advances to step S616 and an empty pallet in the process L placed on a shelf S [L] is moved upward to the empty pallet draw-out position shown in FIG. 50C. More specifically, after the upward movement, the position from the floor of the shelf on which the empty pallet is placed is a position matching the slide guides 494a (or 494b). In step S618, the empty pallet replacement request message is sent to the buffer. In step S620, control waits until the draw-out mechanism below the buffer draws out the empty pallet.

Upon reception of the replacement request, the buffer performs the draw-in operation of the empty pallet in step S658. That is, the air cylinders $C_{T3}$ are driven to bias the slide guides 494a. Then, the motor (not shown) is rotated so that the first hooks 490a and 490b are slid in the stocker without being biased. The air cylinders $C_{T2}$ are driven to bias the hooks 490a and 490b to hook the empty pallet with these hooks. Then, the motor (not shown) is rotated in the reverse direction to draw the empty pallet into the lower portion of the buffer. The flow advances to step S660, and an empty pallet draw-out completion message is sent to the stocker. Then, the stocker is moved to a push-in position of a full pallet.

At this time, the buffer control operation is divided into two parallel control operations. That is, the buffer waits for the push-out position movement completion message from the stocker in step S662a, and further waits until the lift mechanism is moved upward to a position high enough to allow an empty pallet release operation from the buffer in step S662b.

The control operation of the lift mechanism 402 will be described below. The lift mechanism 402 has an arrangement equivalent to that of the fourth modification described above. Since the empty pallet draw-out mechanism of the buffer of this embodiment is of a fixed type, a lift position must be accurately detected, as shown in FIGS. 43 and 44. Therefore, the control operation of the lift mechanism shown in FIG. 50B is almost the same as that shown in FIG. 45. More specifically, when the lift mechanism 402 receives the replacement request message from the stocker in step S700, the flow advances to step S702 to check the thickness of an empty pallet in the stocker. In step S704, the lift base 406 is moved upward to the sensor position ($S_1$, $S_2$, $S_3$ in FIG. 43) corresponding to the detected thickness. When the lift base 406 has reached the standby position, a message indicating this is sent to the buffer in step S706, and an empty pallet release message from the buffer is waited for in step S708.

Assuming that the lift mechanism arrives at the standby position earlier, the flow advances from step S662b to step S662c, and the buffer releases the empty pallet. More specifically, the air cylinders $C_{T3}$ are returned to the release hooking position of the empty pallet. In step S662d, a message indicating this is sent to the lift mechanism 402. Upon reception of this message, the flow advances to step S710, and the lift mechanism 402 causes the lift base 406 to move downward to the floor position. It is then checked in steps S712 and S714 if the empty pallets are stacked on the lift base up to the maximum vertical position.

When the stocker receives an empty pallet draw-out message from the buffer in step S620, it causes an empty shelf to move upward to the push-in position of a full pallet, as shown in FIG. 50D. When the corresponding shelf reaches this position, the stocker sends a movement completion message to the buffer in step S624, and waits for a completion message indicating a push-in operation of a new pallet into the stocker from the buffer.

When the buffer receives the movement completion message in step S662a, it starts a push-out operation of the full pallet into the stocker in step S664. More specifically, the air cylinders $C_{T4}$ bias the hooks 500a and 500b to engage with the flanges of the pallet. Then, the motor (not shown) is rotated to push the full pallet into the shelf (FIG. 50D). The air cylinders $C_{T4}$ are returned, the motor is rotated in the reverse direction, and the push-in mechanism is returned into the buffer. In step S666, a replacement completion message is sent to the stocker. In step S668, the motor $M_T$ is rotated in the reverse direction to return onto rollers 54 the pallet which was lifted up by the guides 460 and 462. The air cylinders $C_T$ are returned to be disengaged from the separation pawls 462.

In this manner, the draw-out control operation of an empty pallet at a fixed position and a push-in control operation of a full pallet at a fixed separation position are completed.

In the control program shown in FIG. 50B, the lift mechanism 402 begins to move upward in response to the replacement request (remaining parts count=0), but may perform upward movement when the remaining parts count in a pallet becomes 1.

Modification of Another Embodiment

In the arrangement of the above embodiment, pallets p are stacked on the buffer base 52 in the replacement request generation order in the stocker 24, starting from the lowermost pallet. A pallet which is separated on the buffer base 52 to be transferred to the stocker 24 in this manner is always a pallet p directly placed on the buffer base 52, i.e., a pallet p at the lowermost position. For this reason, the elevator 26 described in the previous embodiment is not necessary, and the separation mechanism 454 and the replacing mechanism 480 need only be arranged near the buffer base 52.

Figure 51:
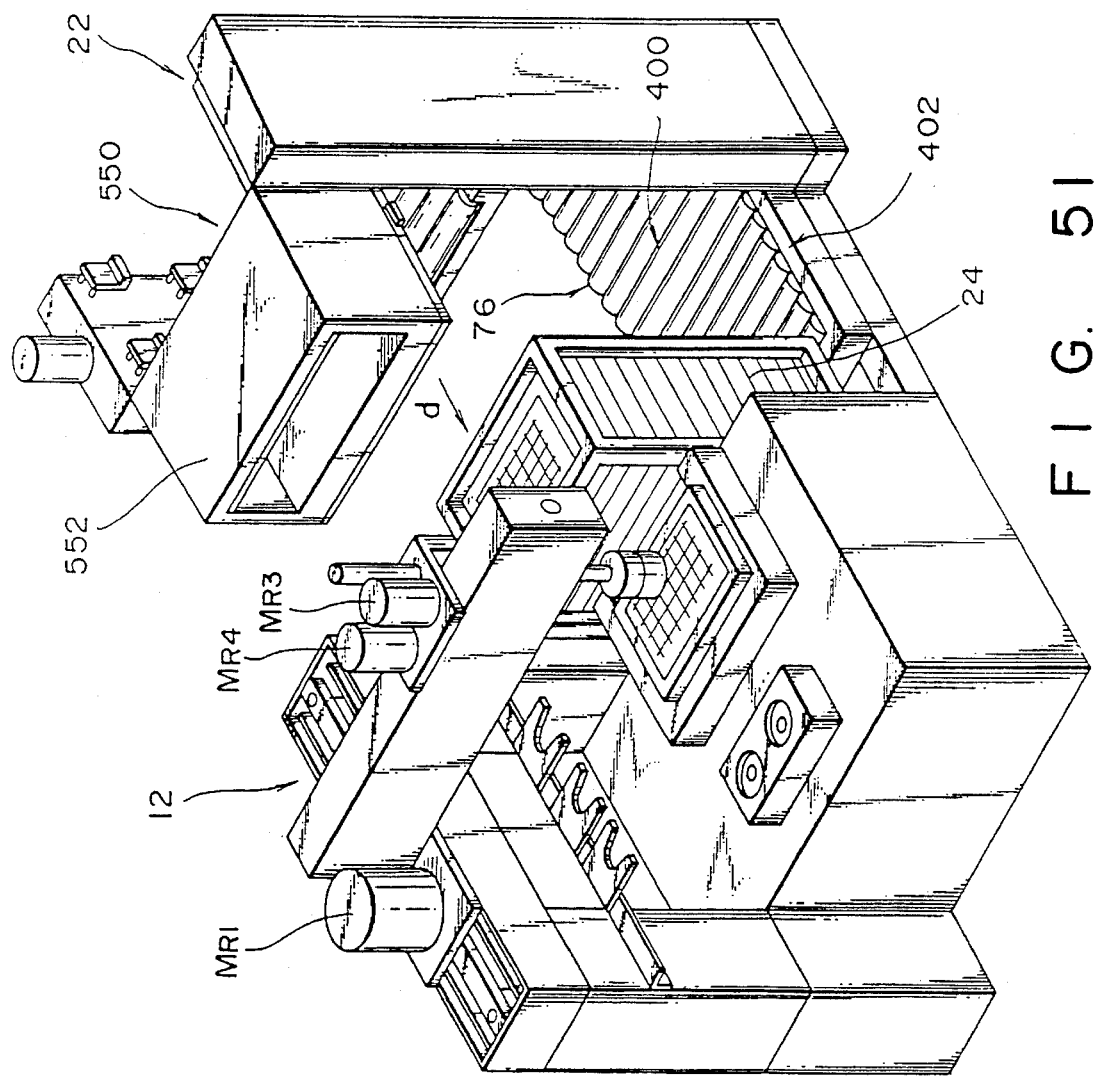
FIG. 51 is a schematic perspective view showing an arrangement of a modification of the embodiment of FIG. 47.

However, the present invention is not limited to the arrangement of the above embodiment. As shown in FIG. 51, as a modification of this embodiment a variety of pallets p may be stacked on the buffer base 52 in an arbitrary order.

As shown in FIG. 51, the modification of this embodiment comprises a buffer 22 having the same arrangement as that described in the previous embodiment. Therefore, in this modification, a predetermined pallet p is separated by second separation pawls 68 of the buffer 22 from a plurality of pallets p arbitrarily stacked on a buffer base 52.

This modification comprises a transfer 550, as another mode of a transfer means, for transferring a pallet p separated at the buffer 22 to the stocker which was moved upward to the same level as the separation position while being adjacent to the separation position of the buffer 22.

The transfer 550 comprises an elevator body 86 which is arranged adjacent to the separation position of the buffer 22 and is fixed in position in the elevator mechanism in the arrangement of the previous embodiment. More specifically, the transfer 550 comprises the elevator body 86 fixed to four columns 82a to 82d as a transfer body 552. The transfer body 552 comprises a replacing mechanism 96 having the same arrangement as that in the previous embodiment.

In other words, in this modification, unlike in the above embodiment wherein the buffer 450 comprises the replacing mechanism 480, the transfer 550 comprises the replacing mechanism 96 independent of the buffer 22.

When this modification is arranged as described above, even if pallets p are stacked on the buffer base 52 in an arbitrary order, a pallet p requested by the buffer 22 is separated, and then, a pallet p filled with parts can be supplied to a predetermined replacing position of the stocker 24 moved upward to the same level as the separation position through the transfer 550.

An unloading mechanism 76 is used to place empty pallet p' drawn from the stocker 24 into the lower portion of the transfer 550. This unloading mechanism 76 comprises the lift mechanism 402 described in the fourth modification of the previous embodiment.

In the above description, the replacing mechanism 96 employs the same arrangement as that in the previous embodiment. However, the present invention is not limited to this. For example, an arrangement separately comprising a full pallet replacing mechanism 96a and an empty pallet replacing mechanism 96b as described in the second modification of the previous embodiment may be employed.

Control according to this modification is basically similar to that shown in FIG. 50A since the empty pallet replacing position is fixed. Movement to that position is performed by the stocker because no elevator is arranged. Since the buffer is the same as that shown in FIG. 6, the operation control of the buffer can use the control programs shown in FIGS. 25A to 25C.

OTHERS

Locking of Pallet in Stocker

In the above two embodiments and their various modifications, pallets p hooked by the shelves 156 are simply supported at their flanges 38 by the shelves 156 from the lower direction. For this reason, when the stocker 24 is vertically moved to feed a pallet p to the robot 12, the supporting positions of the pallets p supported on the shelves 156 may be shifted. If the supporting positions of the pallets p are shifted, the hooks 186 of the draw-out/draw-in mechanism 172 in the draw-out unit may fail to engage with the first notches 38a of the pallet p supported by the shelves 156 at the draw-out position. As shown in FIGS. 52 to 54, a lock mechanism 600 for locking the pallets p at their supporting positions can be provided in the stocker 24, resulting in practical advantages. In order to effect the lock mechanism 600, as shown in FIG. 52, an engaging hole 38d, locked by the lock mechanism 600, is formed in the rear end portion (i.e., an opposite end portion with respect to the conveying direction d and in which the second notch 38b is formed) of the lower surface of each flange 38 of a pallet p.

As shown in FIGS. 53 and 54, the lock mechanism 600 comprises a lock rod 602 attached to and extending vertically behind the elevating frame 152. The upper and lower ends of the lock rod 602 are disposed through guide members 604a and 604b attached at the upper and lower ends of the rear portion of the elevating frame 152 so as to be vertically reciprocal.

In order to vertically reciprocate the lock rod 602, an air cylinder $C_R$ is fixed at the lower end of the rear portion of the elevating frame 152 through an air cylinder mounting plate 606. The upper end of a piston 608 of the air cylinder $C_R$ is connected to the lower end of the lock rod 602. When compressed air is not supplied to the air cylinder $C_R$, the piston 608 is biased to the retracted position. When compressed air is supplied to the air cylinder $C_R$, the piston 608 is biased to the projecting position.

Lock members 610 are attached to the lock rod 602 (vertically moved as described above) at the same pitch as the shelves 156 in correspondence with pallets p. Each lock member 610 is constituted by a mounting piece 610a fixed to the lock rod 602, and a lock pin 610b integrally formed on and projecting upward from the upper surface of the distal end of the mounting piece 610a. The lock pin 610b is formed to be inserted in the engaging hole 38d formed in the lower surface of the rear end of each flange 38 of the pallet p.

Each lock pin 610b is regulated at an unlock position separated and below each pallet p, as shown in FIGS. 53 and 54, while the air cylinder $C_R$ biases the piston 608 to the retracted position. When the air cylinder $C_R$ biases the piston 608 to the projecting position, each lock pin 610b is regulated at a lock position at which the pin 610b is inserted in the corresponding engaging hole 38d of each pallet p from the lower direction.

The air cylinder $C_R$ is arranged to be operated from the lock position to the unlock position since supply of compressed air is stopped prior to the draw-out operation of a pallet p from the elevating frame 152 of the stocker 24 onto the draw-out base 168.

Since the lock mechanism 600 is arranged as described above, while the elevating frame 152 is vertically moved in the stocker 24, compressed air is kept supplied to the air cylinder $C_R$ of the lock mechanism 600. For this reason, each lock pin 610b of the lock mechanism 600 is inserted in the engaging hole 38d of each pallet p. As a result, all the pallets p are locked in a supported state on the shelves 156 by the lock mechanism 600.

Therefore, even if the elevating frame 152 is vertically moved, the supporting positions of the pallets p are satisfactorily fixed by the lock mechanism 600. That is, when a pallet p is drawn out, it can be reliably engaged with the hooks.

When the elevating frame 152 is stopped to draw out the pallet p, supply of compressed air to the air cylinder $C_R$ is stopped. Each lock pin 610b is disengaged from the corresponding engaging hole 38d, and each pallet p is set to be slidable along the conveying direction d on the shelf 156.

In this manner, with the lock mechanism 600, shift in supporting position due to the vertical movement of the elevating frame can be prevented. The hooks 186 of the draw-out/draw-in mechanism 172 in the draw-out unit 154 can always be reliably engaged with the first notches 38a of a pallet p supported on the shelf 156 at the draw-out position.

In the control operation of the stocker with the lock mechanism, the following points need only be added. More specifically, when the target shelf is moved to the draw-out position of the draw-out unit 154 in the stocker, if a pallet has a lid 40, the air cylinder $C_{S2}$ (FIG. 16) for opening the lid is driven to open the lid, and the air cylinder $C_R$ is driven to disengage the lock pin 610b from the hole 38d. Thereafter, the draw-out operation of the pallet to the draw-out unit 154 in step S82 (FIG. 24A) is started.

The vertical movement of the elevating frame of the stocker is started after the air cylinder $C_{S2}$ (FIG. 16) is returned to close the lid and the air cylinder $C_R$ is returned to set the lock pin 610b in the lock state.

Parts Replenishment to FAC

The FAC system of the basic embodiments achieves an efficient feeding of parts from the stocker to the robot and an efficient supply of parts from the buffer to the stocker. However, the FAC system cannot solely perform parts feeding to the robot and parts supply to the stocker. Therefore, parts replenishment from an external unit to the FAC system in a certain form is necessary. Parts supply to the FAC system includes an automatic replenishment by an unmanned vehicle and a production management computer, as well as manual replenishment. It cannot be uniquely determined which replenishment means is better for both means have different merits and demerits.

Cases for externally replenishing the FAC system with parts are:

①: a case wherein since a new pallet is fed to the stocker, a pallet retaining the parts is used up although pallets retaining other parts still remain; and ②: a case wherein empty pallets stacked on the unloading mechanism 76 interfere with the vertical movement of the elevator.

When these two cases occur, they directly cause an interruption of the robot. Therefore, the pallets must be immediately replenished to the buffer.

Another condition of replenishing pallets to the buffer is:

③: Each time an empty pallet is formed in the stocker, a pallet retaining the corresponding parts is replenished using an unmanned vehicle. However, this requires frequent reciprocal operations of the unmanned vehicle between the FAC and the warehouse or cumbersome manual replacement of empty pallets.

The robot detects the remaining parts count zero in step S36 or S30 in robot control (FIG. 23A). Simultaneously with detection, a robot issues a replenishment request for instructing the replenishment of a new pallet. The destination of the replenishment request is a central production management computer for causing an unmanned vehicle to perform the replenishment as one mode. Another mode is a warning lamp for informing an operator of an empty pallet. The former mode is automatic replenishment, and the latter mode is manual replenishment.

Replenishment of a new pallet to the buffer includes a buffer stop operation for adding a new pallet to existing pallets on the buffer base, and an operation for transferring an empty pallet stacked on the unloading mechanism 76 to the buffer. Therefore, a pallet replenishment preparation timing and a pallet replenishment timing to the buffer are important in terms of the efficient operation of the robot.

Replenishment by Unmanned Vehicle

New pallet replenishment by the unmanned vehicle will be described hereinafter with reference to FIGS. 55A and 55B.

FIG. 55A schematically shows a pallet supply system including the central production management computer, the unmanned vehicle, and the like. In step S770, the FAC sends the above-mentioned replenishment request to the production management computer in the assembling processes. If no replenishment preparation instruction is sent back from the production management computer, the flow advances from step S772 to step S776 to check if unloading of an empty pallet by the unloading mechanism 76 of the elevator in the FAC is started. If it is not started, the flow returns to step S770, and assembly is continued.

In step S750, the replenishment request from the robot is counted and recorded. Since the production management computer grasps the production management schedule, even if parts in a pallet in one stocker are used up, the same parts may be retained in other pallets on the buffer. The production management computer recognizes and manages this fact. Therefore, if the replenishment request is sent from the robot, replenishment by the unmanned vehicle is not immediately performed in response to the request. Instead, in step S752, traced recorded data associated with pallets stacked on the buffer, which is stored in the production management computer, is checked in step S752. A vehicle start instruction is issued to the unmanned vehicle as needed, in step S754.

When the replenishment request from the robot is received in step S750, the unmanned vehicle is not immediately started. However, the requested pallet unloaded from the warehouse is stacked on the unmanned vehicle to prepare for the starting. Each time a pallet is stacked in the unmanned vehicle, the warehouse supplies data associated with the pallet (FIG. 25A) to the unmanned vehicle.

Another factor in the predetermined condition in step S752 is the following case. That is, parts in a pallet are used earlier than the production schedule, and empty pallets are stacked on the unloading mechanism 76 which is enough to interfere with the vertical movement of the elevator earlier than the prediction of the production management computer.

When the predetermined condition occurs, the vehicle start instruction is supplied to the unmanned vehicle in step S754, and in step S755 ⇨ S756, the lapse of a predetermined period of time is monitored. The predetermined period of time is slightly shorter than the time required for the unmanned vehicle to reach the FAC. After the lapse of this time period, in step S758, a pallet replenishment preparation operation start instruction is supplied to the FAC. If a plurality of FACs are equipped, the production management computer detects in advance times required for movement of the unmanned vehicle to the FACs. If the replenishment preparation at the FAC is completed slightly before the unmanned vehicle arrives at the FAC, replenishment from the unmanned vehicle can be immediately started as soon as the unmanned vehicle arrives. More specifically, since the replenishment preparation is not performed in the FAC for the predetermined period of time, assembly by the robot can be continued, resulting in practical merits.

In step S762, the unmanned vehicle is traveling toward the FAC upon reception of the vehicle start instruction from the production management computer.

When the FAC system receives the replenishment preparation start instruction from the production management computer in step S772, it starts the preparation operation in step S774. FIG. 55B shows the preparation operation in detail. If the FAC system itself detects the necessity of replenishment preparation operation, the flow advances to step S776 S778, and the preparation operation is started. Upon completion of the preparation operation, arrival of the unmanned vehicle is waited for in step S780. The standby time must be at a minimum for the above-mentioned reason. When the unmanned vehicle has arrived, pallet replenishment from the unmanned vehicle to the buffer is performed in step S782, and data associated with a new pallet is additionally stored in the memory area shown in FIG. 25A.

The replenishment preparation operation will be described below with reference to FIG. 55B. FIG. 55B shows portions associated with pallet replenishment of control programs of the management microprocessor of the FAC system, the microprocessor of the elevator for controlling the unloading mechanism 76, and the microprocessor for controlling the buffer.

When the management microprocessor receives the replenishment preparation instruction from the production management computer in step S800, it stops the operation of the elevator and the like in step S802. In step S804, the management microprocessor supplies an upward movement start instruction of the buffer base to the buffer. In step S806, the management microprocessor waits for the upward movement completion message from the buffer.

The buffer which has received the upward movement instruction in step S840 moves the buffer base upward in step S842. After the buffer base is moved upward, if a pallet which has already been separated at that time is hooked on the separation pawls 68, the buffer releases hooking to stack the separated pallet. In step S846, the buffer causes the separation pawls 68 to hook the lowermost pallet on the buffer base. After the pallet is hooked, if the buffer base is moved downward in step S848, the pallet is hooked on the separation pawls 68, and no pallet is present on the buffer base. In step S850, the buffer sends the buffer preparation completion message to the unloading mechanism 76.

Upon reception of this message in step S822, the unloading mechanism 76 rotates the rollers in step S824 to start the transfer of an empty pallet towards the buffer. In step S826, the mechanism 76 sends a message indicating this to the buffer. 20 When the buffer receives this message, the flow advances to step S852 ⇨ step S854, and it waits for arrival of the unmanned vehicle. As described above, the unmanned vehicle must arrive soon after.

When the unmanned vehicle has arrived, the buffer transfers the empty pallets to the unmanned vehicle, and at the same time, receives new pallets therefrom by driving the corresponding rollers. In step S857, the buffer base is moved upward together with the new pallet to add the new pallet to the existing pallets hooked on the separation pawls 68. The buffer receives data associated with the newly added pallet from the unmanned vehicle in step S858, and updates the memory content in step S860 shown in FIG. 25A.

The replenishment preparation operation of a new pallet is performed immediately before the unmanned vehicle arrives, so that the stop time of the unmanned vehicle can be minimized.

Manual Replenishment

Manual pallet replenishment is summarized as follows. Upon every reception of a replenishment request from the robot, the warning lamp is turned on. An operator who sees indication of the warning lamp manually discharges an empty pallet, stacks a new pallet, and inputs pallet data at the I/O device 18.

FIG. 56A shows an input display screen on the I/O device 18, FIG. 56B shows an arrangement of input keys, and FIG. 56C shows a general replenishment operation sequence. The input keys include a "pallet replenishment key" and a "preparation completion key", as shown in FIG. 56B The replenishment operation will be briefly described with reference to FIG. 56C.

When the replenishment request is input from the robot, the warning lamp or the like is turned on in step S900. The operator who sees this confirms the requested pallet in step S902, and turns on the "pallet replenishment key" in step S904.

Thus, the buffer moves the buffer base to the replacement position (the position of the separation pawls 68) in step S906 to hook the existing pallets on the pawls. The unloading mechanism 76 discharges empty pallets thereon in step S908.

At this time, the operator takes out the empty pallet in step S910, and places the requested pallet on the buffer base in step S912.

In step S916, the operator inputs the data as shown in FIG. 56A at the I/O device 18. Each time the data is input, the data shown in FIG. 25A is updated in step S918, and the updated pallet order is displayed on the CRT screen of the I/O device. The routine consisting of steps S916 to S918 is repeated a number of times corresponding to the number of required pallets.

In step S922, the operator turns on the "preparation completion key".

In this manner, the buffer calculates a stroke from the position of the separation pawls 68 to the uppermost pallet placed on the buffer base in step S924, and starts the downward movement corresponding to the calculated stroke in step S926, thus adding a new pallet to the existing pallets. Then, the FAC system restarts its operation.

As described above, the manual pallet replenishment operation is completed.

In the above two embodiments and thief various modifications (to be referred to as the embodiments and the like), the elevator body 86 and the elevating frame 152 which are vertically movable are slidably supported at four corners, in other words, are slidable while being supported from two sides. However, the present invention is not limited to this arrangement. For example, the elevator body 86 and the elevating frame 152 may be slidably supported on a corresponding pair of columns, i.e., slidably supported in a cantilever manner.

In the above-mentioned embodiments and the like, a plurality of common parts x are retained in one pallet p However the present invention is not limited to this. For example, a plurality of types of parts $x_1$ and $x_2$ can be retained in one pallet p.

In the above-mentioned embodiments and the like, a plurality of pallets p are stacked on the buffer base 52 of the buffer 22. However, the present invention is not limited to this. For example, a plurality of standing pallets p may be held in a lateral direction.

In the above-mentioned embodiments and the like, when one of pallets stacked on the buffer base 52 is separated by the separation pawls, the separation position is adjusted to absorb a manufacturing error, such that the positions of the separation pawls are fixed, and the buffer base 52 is vertically moved. However, the present invention is not limited to this. For example, the buffer base 52 may be fixed in position, and the separation pawls may be vertically moved. When a plurality of pallets retaining the same type of parts are stacked on the buffer, a previously stacked pallet (or an upper pallet) may be separated first.

EFFECTS OF EMBODIMENTS

The above-mentioned embodiments can provide the following effects.

A: Effects obtained in the FAC system

The FAC 10 basically comprises the stocker 24 which stocks a plurality of shelf-like pallets each retaining a plurality of parts x in a lateral plane, and performs vertical movement to extract the desired one of these pallets to a fixed draw-out position, and the robot 12 for taking out the parts x from the pallet drawn out to the draw-out position and assembling the parts into a product. For this reason, the robot 12 can quickly receive parts from the pallet p drawn out to the predetermined draw-out position.

More specifically, in order to feed parts to the robot 12, the following three operations need only be performed: (1) a pallet p is drawn out to the draw-out unit, and the robot performs a take-out operation of the parts in the draw-out unit; (2) the pallet is drawn into the stocker 24; and (3) the elevating frame of the stocker 24 is moved vertically until the stock position of a pallet retaining parts to be fed next corresponds to the draw-out position. In this manner, the assembly operation time required for assembling one part in the robot 12 can be reduced, and the assembling operation control can be simplified.

In article feeding apparatuses associated with Japanese Patent Application Nos. 61-200949 and 61-200905 described in the prior art, the stocker is fixed in position, and the draw-out unit is vertically movable. For this reason, in order to feed a pallet from the stocker to the robot, the following five operations must be performed: (1) a pallet p is drawn out to the draw-out unit; (2) the draw-out unit is moved vertically to a parts take-out position by the robot and at the parts take-out position, the draw-out unit is subjected to the parts take-out operation by the robot; (3) the draw-out unit is moved vertically so as to be returned to the position at which the pallet was drawn out; (4) the pallet is drawn into the stocker 24; and (5) the draw-out unit is moved vertically to the stock position of a pallet retaining parts to be fed next.

Note that with the above arrangement, the parts can be efficiently fed from the stocker 24 to the robot 12.

A-1: Efficient Parts Feeding to Robot

A-1-①: Pallets $p_1$, $p_2$, and $p_3$ respectively having three different thicknesses can be stocked in an arbitrary combination as long as the capacity of the stocker 24 permits. In this manner, a pallet p corresponding to the size of parts x can be selected. For example, an inefficient retaining state wherein only a layer of low-profile parts is stocked in a deep pallet, can be prevented.

The flanges 38 are integrally formed on the upper side edges of a pallet p. The flanges 38 are provided to be hooked on the shelves in the stocker 24. However, the flanges 38 not only have this single function, but also have notches used for moving the pallet in the conveying direction d. Movement of the pallet p is executed in a mechanically engaged state by engaging the hooks with the notches. Therefore, the pallet movement can be reliably executed. In addition, its stop position can be accurately determined.

In particular, in the arrangement of the previous embodiment, the first and second notches 38*a* and 38*b* and the corresponding hooks 108, 116, and 126 are formed into an isosceles trapezoidal shape, so that they can be complementarily engaged with each other. In this manner, even if the position of the pallet p is slightly shifted, the hooks can be reliably engaged with the notches. This engaged state is maintained such that the inclined surface of the trapezoidal hook abuts against that of the trapezoidal notch. More specifically, in a state wherein the hooks are engaged with the notches, no gap is formed between the hooks and the notches. In this manner, when the hooks are moved along the conveying direction d to convey the pallet, the movement of the hooks can be directly transmitted to the pallet, and the pallet can be smoothly conveyed without receiving any shock.

A-1-②: Parts necessary for product assembly, the process order required for the assembly, and selection of pallet p (shelf) for each process can be arbitrarily selected and altered. For example, the parts can be retained in accordance with a process order starting from the uppermost pallet in the form of one pallet/one type of parts. For example, the same type of parts x can be taken out from the same pallet p in a plurality of different processes. In this manner, factors associated with assembly can be flexibly set.

A-1-③: Since the process order can be set manually or automatically by the host computer, a variety of process orders can be set in accordance with the sizes of factories and the like. The process order can be conveniently altered in correspondence with the specifications of a product even in the field such as factory.

A-1-④: The robot manages the remaining parts count Z in each pallet stocked in the stocker. Thus, a pallet replacement preparation operation start timing and an empty pallet replacement operation start timing can be managed by the robot itself. More specifically, since the robot as the assembling body manages the operation start timings, it can select optimal start timings so as not to interfere with assembly.

A-2: Efficient Parts Supply

The basic arrangement also comprises the buffer 22 for supplying parts to the stocker 24 in addition to the stocker 24. When necessary parts x are supplied from the buffer 22 to the stocker 24, a pallet which has fed the parts to the robot and become empty is drawn out and unloaded by the stocker 24. A full pallet drawn out from the buffer is alternately stocked at the empty stock position after the above-mentioned draw-out operation. Thus, a state wherein the stocker 24 can always be filled with parts can be realized.

In particular, necessity (remaining parts count= 1) is predicted to replace a given pallet p which will become empty since parts x retained therein will be used up soon. If it is determined that the replacement is necessary, a new pallet is prepared in place of the pallet which will become empty (replacement preparation), thus improving parts feeding efficiency.

The efficiency can be basically improved by the buffer 22 in which a plurality of supplementary pallets are prepared, and which selects and separates a pallet p retaining the same type of parts as the parts x which are used up from these pallets. When the replacement preparation instruction is sent to the buffer, the buffer selects and separates a pallet p. In this manner, if the remaining parts count in the pallet p becomes zero, the replacement preparation has been completed at that time, and the replacement operation can be immediately performed. Thus, a total replacement time of the pallet p can be reduced, and the robot 12 can be prevented from being stopped or if stopped, the stop time can be minimized. The above effect is clarified by the following modes.

A-2-①: The following effect can be achieved in association with the separation position of the buffer. That is, A-2-①-1: When the separation position is fixed at a predetermined position, only a pallet p to be separated is separated at the separation position. For this reason, after the pallet is separated, the separated state is recovered so that the remaining pallets can be set in a stacked state again. Thereafter, a pallet at an arbitrary vertical position can be separated.

Note that the separation position is set to be one of the following two types of predetermined positions. That is, A-2-①-1-a: When the separation position is set at an arbitrary vertical position above the buffer base 52, an arbitrary pallet is selected and separated from pallets p stacked on the buffer base 52.

Since each of the pallets stacked on the buffer base 52 has a manufacturing error, the height of a pallet to be separated at the separation position cannot be accurately defined. For this reason, in this embodiment, since the sensor 80 for accurately defining the separation position is arranged, even if the manufacturing errors are accumulated, a desired pallet p can be reliably separated.

A-2-①-1-b: When the separation position is defined to separate a pallet directly placed on the buffer base 52, pallets p are stacked on the buffer base 52 in the generation order of the replacement requests in the stocker 24, from the lower position. With this arrangement, as will be described later, the buffer 22 itself can comprise the replacement function, and the elevator 26 can be omitted.

A-2-①-2: When the separation position is set for all the pallets p stacked on the buffer base 52, all the pallets are simultaneously separated upon the separation operation. In this manner, an arbitrary pallet can be drawn out and replaced with an empty pallet, thus simplifying the replacement operation.

A-2-②: When the replacement preparation operation is performed between the buffer 22 having the separation function of A-2 and the stocker 24, the pallet separation position in the buffer 22 must match with the shelf position of an empty pallet in the stocker 24. The matching modes are as follows.

A-2-②-1: When the stocker 24 has the movement (vertical movement) function and the separation position of a pallet p is fixed in buffer 22, the stocker 24 is moved to a position adjacent to the separation position so that the separation position in the buffer 22 matches with the shelf position of an empty pallet p' in the stocker 24. Since the stocker 24 itself is moved to receive the full pallet, the replacement time of an empty pallet can be shortened.

A-2-②-2: The replacement preparation operation can be performed in a combination of the buffer 22 having the separation function described in A-2, and the elevator 26 which is reciprocally moved between the separation position of the buffer 22 and the replacement position of the stocker 24 to convey the separated pallet to the stocker 24. In this case, as described in A-2-②-1, since the stocker 24 itself is not moved to receive the full pallet, the draw-out operation of a pallet to the robot 12 in the stocker 24 can be prevented from being interrupted.

A-2-③: The same effect as described above can be obtained by combining the buffer 22 having the separation function described in A-2, the transfer 550 having a replacement function that the transfer is fixed in the separation position to be adjacent to the buffer 22, and the stocker 24 which is vertically moved to a position adjacent to the transfer 550.

A-2-④: When identification data associated with the pallets stacked on the buffer base are stored in the memory, a supply operation from the buffer to the stocker can be easily and reliably performed. That is, the order of necessity of the new pallets from the buffer is not related to the stacking order of pallets on the buffer base. Therefore, when the pallets are replenished to the buffer base, identification data of individual pallets to be replenished need only be supplied to the buffer, and the stacking order of the pallets to be replenished need not be taken into consideration. As a result, the stacking order of pallets to be replaced in the unmanned warehouse, manual stacking order of pallets to be replenished onto the buffer base, and the like need not be taken into consideration, resulting in an efficient operation.

In contrast to this, without the memory data, if the full pallets are stacked on the buffer base in the known generation order of empty pallets, no problem occurs.

A-3: Efficient Replacement Operation of Empty and Full Pallets

After the replacement preparation operation is performed, the actual replacement operation of an empty pallet p' and a new pallet p is performed, thus achieving an efficient replacement operation. In order to execute the replacement operation, the following three modes can be employed.

A-3-①: The above-mentioned effect can be achieved by the arrangement comprising the stocker 24, the vertically movable elevator 26, and the buffer 22 having the separation function of pallets p stacked in an arbitrary order, the elevator 26 comprising the replacing mechanism 96.

A-3-②: The above-mentioned effect can be achieved by the arrangement comprising the stocker 24, the buffer 22 having the separation function of separating, at a fixed separation position, pallets p stacked in an arbitrary order, and the transfer 550 arranged adjacent to the fixed separation position, the transfer 550 comprising the replacing mechanism 96.

A-3-③: The above-mentioned effect can be achieved by the arrangement comprising the stocker 24, and the buffer 22 for separating, at a fixed separation position, pallets p stacked in a predetermined take-out order, the buffer 22 comprising the replacing mechanism 480.

A-3-④: The replacing mechanism 96 is arranged to move pallets p in a state wherein the mechanism 96 is mechanically engaged with the notches 38a and 38b of a pallet p using the hooks 108, 116, and 126. In this manner, in the replacement operation, the pallet p can be reliably moved, and its stop position can be accurately defined. Thus, the replacement operation can be reliably executed.

There are two modes according to the number of hooks. That is,

A-3-④-1: In the arrangement comprising the three types of hooks, i.e., the first hooks 108 which are engaged with the first notches 38a of a pallet p to take out the pallet p from the buffer 22, the second hooks 116 which are engaged with the second notches 38b of the pallet p to push out the pallet p to the stocker 24, and the third hooks 126 for drawing in an empty pallet p' from the stocker 24, the third hooks 126 are positioned immediately below the second hooks 116 to be moved together. Thus, the movement stroke of the first hooks 108 is set to be equal to that of the second hooks 116. As a result, the arrangement of the replacing mechanism 96 can be simplified and the replacement operation control can be facilitated.

As a hook drive source, the following two modes are employed. That is,

A-3-④-1-a: The three types of hooks are mounted on the common slide plate 106, and the slide plate 106 is reciprocally driven by a single drive motor, so that the three types of hooks are driven by a single drive source, thus achieving simple control.

A-3-④-1-b: The two types of hooks as the first and second hooks 108 and 116 are reciprocally driven by a first drive motor, and the third hooks 126 are reciprocally driven by a second drive motor. With this arrangement, the number of drive motors is increased as compared to the case of A-3-④-1-a. However, the arrangement for driving the hooks can be simplified.

A-3-④-2: In the arrangement comprising the two types of hooks, i.e., the first hooks 108 which are engaged with the first notches 38a of a pallet p to take out the pallet p from the buffer 22 and second hooks 116 which are engaged with the second notches 38b of the pallet tp to push out the pallet p toward the stocker 24, the replacing mechanism 96 can properly function. In this case, since the second hooks 116 must perform two different operations, the operation time is prolonged as compared to the case of A-3-④-1. However, a simple, inexpensive arrangement can be manufactured.

A-4: Efficient Unloading Operation of Empty Pallet

When the replacement operation is executed such that an empty pallet p' is drawn out from the stocker 24 and a full pallet p is pushed into the corresponding position, the empty pallet p' is produced in the FAC system 10. In this embodiment, since the unloading mechanism 76 for the empty pallet p' is arranged, a predetermined number or less of empty pallets p' can be satisfactorily unloaded. As a result, the empty pallets p' can be prevented from being stacked in a predetermined number or more to interfere with the next replacement operation.

During the unloading operation, when the empty pallet p' is stacked on the unloading mechanism, the following various modes can be employed.

A-4-①: The elevator body 86 of the elevator 26 is moved downward to a position immediately above the unloading mechanism 76 or immediately above empty pallets p' already stacked on the unloading mechanism 76, so as to stack an empty pallet p' held below the elevator body 86 onto the unloading mechanism 76. With this arrangement, empty pallets p' can be stacked in principle on the unloading mechanism 76 without interfering with the replacement operation of the pallets.

A-4-②: The unloading mechanism 76 comprises the lift mechanism 402, and the lift mechanism 402 is moved upward to stack an empty pallet p' held on the replacing mechanism 96 onto the unloading mechanism 76. As compared to the case of A-4-①, the possibility of interfering with the replacement operation can be reduced.

Note that in the arrangement comprising the lift mechanism 402, the following two modes can be employed.

A-4-②-1: When the lift mechanism 402 is arranged below the elevator body 86, the lift mechanism 402 is moved upward to a predetermined position and can wait at that position until an empty pallet p' is drawn in the elevator body 86. The downward movement time of the elevator body 86 can be shortened. In this manner, the time required for unloading the empty pallet p' can be reduced, so that the next replacement operation can be prevented from being delayed.

A-4-②-2: When the lift mechanism 402 is not arranged below the elevator body 86, the following two modes can be employed. That is, A-4-②-2-a: When the lift mechanism 402 is arranged below the transfer 550 provided at a fixed position to be adjacent to the separation position of the buffer 22, the transfer body 552 of the transfer 550 on which a drawn empty pallet p' is held is fixed in position. Thus, in order to stack the empty pallet p' on the unloading mechanism 76, the lift mechanism 402 is a necessary component.

A-4-②-2-b: In a state wherein the buffer 22 comprises the replacement function, when the lift mechanism 402 is arranged below the buffer base 52, the buffer base 52 on which the drawn empty pallet p' is held is fixed in position. Therefore, in order to stack the empty pallet p' on the unloading mechanism 76, the lift mechanism 402 is a necessary component.

A-4-③: As described in A-4-②, when the lift mechanism 402 is arranged, the sensors $S_1$, $S_2$, and $S_3$ are arranged, so that the following two effects can be achieved. That is, A-4-③-1: When the sensors $S_1$, $S_2$, and $S_3$ are used to define the upward movement position of the lift mechanism 402, the upward movement position changes depending on the height of empty pallets p' stacked on the lift mechanism 402. More specifically, if the predetermined upward movement position is defined to allow stacking of pallets $p_3$ having a maximum thickness regardless of the height of the pallets p', when pallets $p_1$ having a minimum height are stacked, a considerably large gap is formed between the bottom surface of the pallet $p_1$ having the minimum height and the uppermost position of the lift mechanism 402 or the pallets stacked thereon. For this reason, if an empty pallet $p_1'$ is to be stacked through this gap, the position of the empty pallet p' is shifted, and cannot be satisfactorily stacked.

However, since the sensors $S_1$, $S_2$, and $S_3$ can define the optimal upward movement position in accordance with the height of each pallet, the above-mentioned problem will not occur, and the empty pallet p' can be reliably stacked on the lift mechanism 402.

A-4-③-2: When the sensors $S_1$, $S_2$, and $S_3$ are used to define the upward movement position of the lift mechanism 402 and the lift mechanism 402 is arranged below the elevator body 86, the sensors $S_1$, $S_2$, and $S_3$ define the upward movement position of the lift mechanism 402 so that an empty pallet p' is received at the lowermost position of the elevator body 86. Thus, the downward movement time of the elevator body 86 necessary for transferring the empty pallet p' from the elevator body 86 to the unloading mechanism 76 can be minimized. In this manner, the time necessary for transferring the empty pallet p' to the unloading mechanism 76 can be shortened, and the possibility of delaying the next replacement operation can be reduced.

A-5: Effect Obtained by Capping Lid 40 on Pallet

In order to take out parts x retained in a pallet, when a pallet p with an open upper surface is used to convey the parts x, a lid 40 is provided to each pallet p in order to protect the retained parts from being contaminated with dust or the like during conveyance or in a stock state in the buffer 22 and the stocker 24. The lid 40 closes the open upper surface while, at the same time, is capable of being opened. Since the lid 40 is attached to each pallet p, the parts x retained in the pallet can be reliably prevented from being contaminated with dust or the like.

A-5-①: The lid 40 covers the pallet p for the total period excluding an interval for which the pallet p is brought to the draw-out position to the robot 12 in the stocker 24. A period for which the upper surface of the pallet p is "open" is limited to a draw-out period as an open period necessary for taking out parts x therefrom. Thus, entrance of dust or the like into the pallet p can be minimized, and the parts x can be prevented from being contaminated with dust or the like as much as possible.

A-5-②: When the lid 40 is removed from the pallet p, the lift-up arm 160 in the lid opening mechanism 170 is linearly moved obliquely upward from oblique lower direction, and engages with the side edge of the lid 40 through the corresponding third notch 38c of the pallet p from the lower direction, thereby lifting up the lid 40. The linear movement of the lift-up arm 160 allows for the use of a single drive source therefor. In addition, the lift-up operation time can be shortened, and cost can be reduced.

Note that the lift-up arm 160 passing through the corresponding third notch 38c of the pallet p is arranged so as not to interfere with movement of the pallet p in the conveying direction d while it lifts up the lid 40.

A-6: Locking of Pallet in Stocker

In the stocker 24, each pallet p is supported on the corresponding shelf 156 of the vertically movable elevating frame 152. In a state wherein the pallet p is supported on the shelf 156, the movement of the pallet p in the conveying direction is locked by the lock mechanism 600. In this manner, even if each pallet p receives a moving force along the conveying direction due to vibration caused by vertical movement of the elevating frame, since it is locked by the lock mechanism 600, the pallet p can be reliably locked at a predetermined position on the shelf 156.

As a result, in a state wherein the elevating frame 152 is stopped and locked by the lock mechanism 600 is released, each pallet p is always brought to a predetermined position. The pallet draw-out operation to the robot and the draw-in operation of an empty pallet can be reliably executed.

B: Effect of Easy Process Alteration

The effects of the embodiment of the FAC described above are those mainly concerning hardware and a control program for controlling the hardware when the robot, stocker, elevator, buffer, lift mechanism, and the like are variously combined. Since software such as a control program must have a feature of easy alteration, effects in terms of alteration flexibility of the control program used in this FAC will be discussed below.

In the embodiments, parts used in a given process are related using a variable G as a process. A pallet and a shelf position for stocking the pallet are related using a variable S, and the shelf position variables S are arrayed (S [G]) based on the processes G. In this manner, the relationship of processes Δ→ shelf positions Δ→ pallets Δ→ parts is clarified. Therefore, if this array is changed, the processes are reordered, and if the processes are reordered, the shelf positions stocking the pallets need not be changed. In addition, the control program need not be altered.

Since the array is displayed on the CRT screen of the I/O device, the processes and the like can be easily altered.

C: Effect of Efficient Replenishment from External Equipment to FAC

In this FAC system, the parts feeding operation from the stocker to the robot at a fixed position and the parts supply operation from the buffer to the stocker are fundamental operations. The supply operation is performed in units of pallets. Therefore, if parts are used up in the FAC system, a new pallet filled with parts must be replenished from external equipment.

In this FAC system, the parts feeding process and the parts supply process by means of pallets are independently performed. Since these two processes are independently performed, parts feeding from the stocker to the robot is not immediately stopped even if the parts supply to the stocker is disabled. Parts replenishment is divided into a preparation process in the FAC (including a process for hooking all the existing pallets on the buffer base at upper positions, and a process for unloading empty pallets stacked below the elevator), and an actual replenishment process in which the FAC and external equipment (unmanned vehicle) for feeding parts to the FAC are cooperated. Thus, the parts supply process coincides with the preparation process of the pallet replenishment. Therefore, the total time of parts replenishment can be shortened, and as a result, a stop time of the unmanned vehicle can be reduced. In manual replenishment, although it is cumbersome, data associated with pallets on the buffer base, the number of which is increased since new pallets are replenished, can be easily updated in addition to the effect described in B.

As many apparently widely different embodiments of the present invention can be made without departing from the spirit and scope thereof, it is to be understood that the invention is not limited to the specific embodiments thereof except as defined in the appended claims.

What is claimed is:

1. A method for feeding articles to a robot from a stocker retaining plural kinds of containers, each container containing a predetermined kind of articles, said method comprising the steps of:

temporarily storing a stack of containers each retaining a predetermined kind of articles in a temporary storer including a vertically moveable table on which the containers are stacked and a separator for separating one container from the others;

memorizing information of a stacking position of each container stacked on the moveable table;

sending an article request command for requested articles to the stocker in accordance with a pre-programmed feeding order to select a container stocked in the stocker containing the requested articles;

feeding articles from the selected container in the stocker to the robot while detecting any containers in the stocker which are about to be emptied;

sending, when a container is detected to be emptied, a container separation request to the temporary storer to separate a full container containing the same kind of articles that are about to be emptied from the container from other containers in the temporary storer using the separator on the basis of memorized information of the stocking position of the containers on the moveable table; and replacing only the container detected to be emptied in the stocker with the full container from the temporary storer while articles are being supplied from another container in the stocker to the robot.

2. A method for feeding articles to a robot as set forth in claim 1, further comprising the step of disposing the containers in a stacked relationship on the table so that they can be supplied to the stocker one-by-one from a bottom-most container in the stack.

3. A method for feeding articles to a robot as set forth in claim 1, further comprising the step of engaging an empty container in the stocker and removing it therefrom.

4. A method for feeding articles to a robot as set forth in claim 3, further comprising the steps of:

supporting the containers independently in the stocker on a frame having a plurality of shelves; and vertically moving the frame from a position in which an uppermost shelf opposes the separator and a position in which the lowermost shelf opposes the separator.

5. A method for feeding articles to a robot, comprising the steps of:

temporarily storing a stack of containers, each retaining a predetermined kind of article, in a temporary storer including a vertically moveable table on which the containers are stacked, and a separator for separating one container from the others;

memorizing information of a stacking position of each of the containers stacked on the moveable table;

feeding articles from a selected one of a plurality of containers stocked in a stocker to the robot;

separating a designated container full of articles from other containers in the temporary storer when a container in the stocker is emptied by vertically moving the table and making the separator engage the designated container, as articles are being fed to the robot from other containers in the stocker, wherein said separating step takes place based on memorized information of the stacking position of the designated container;

removing the designated container from the temporary storer;

replacing the empty container in the stocker with the designated container;

restoring the remaining containers in the temporary storer into a stacked condition by disengaging the separator and moving the table; and updating the information of the stacking positions of the remaining containers on the table in response to the removal of the designated container.

6. A method for feeding articles to a robot as set forth in claim 5, further comprising the steps of:

discharging the empty container from the stocker.

* * * * *

UNITED STATES PATENT AND TRADEMARK OFFICE
CERTIFICATE OF CORRECTION

PATENT NO. : 5,503,516  
DATED : April 2, 1996  
INVENTOR(S) : Kasai et al.

Page 1 of 3

It is certified that error appears in the above-indentified patent and that said Letters Patent is hereby corrected as shown below:

COLUMN 1:

Line 36, "meant" should read --means--.

COLUMN 2:

Line 39, "U.S. Ser. No. 903,412" should read --U.S. Patent No. 4,932,828--.
Line 40, "(now U.S. Patent No 4,932,828, date" should read --(Date--.

COLUMN 11:

Line 22, "avertical" should read --a vertical--.

COLUMN 17:

Line 7, "50" should read --20--.
Line 36, "p'in" should read --p' in--.

COLUMN 19:

Line 50, "surplices" should read --surfaces--.

COLUMN 24:

Line 63, "belt 92" should read --belt 192--.

UNITED STATES PATENT AND TRADEMARK OFFICE
CERTIFICATE OF CORRECTION

PATENT NO. : 5,503,516        Page 2 of 3
DATED : April 2, 1996
INVENTOR(S) : Kasai et al.

It is certified that error appears in the above-indentified patent and that said Letters Patent is hereby corrected as shown below:

COLUMN 28:

Line 8, "stale" should read --state--.

COLUMN 43:

Line 54, "parks" should read --parts--.

COLUMN 44:

Line 23, "z=0" should read --Z=0--.

COLUMN 46:

Line 30, "step S104 S108," should read --step S104 to S108,--.

COLUMN 47:

Line 66, "rob&t" should read --robot--.

COLUMN 59:

Line 40, "rotatably" should read --rotatably supported--.

COLUMN 60:

Line 2, "380" should read --38b--.
  Line 58, "10" should be deleted.

COLUMN 67:

Line 31, "step S776 S778" should read --step

UNITED STATES PATENT AND TRADEMARK OFFICE
CERTIFICATE OF CORRECTION

PATENT NO. : 5,503,516                                        Page 3 of 3
DATED      : April 2, 1996
INVENTOR(S): Kasai et al.

It is certified that error appears in the above-indentified patent and that said Letters Patent is hereby corrected as shown below:

S776 to S778,--.

COLUMN 68:

Line 3, "buffer. 20 When" should read --buffer. ¶ When--.
   Line 64, "thief" should read --their--.

COLUMN 73:

Line 32, "tp" should read --p--.

COLUMN 75:

Line 58, "processes ∆—> shelf positions ∆—> pallets ∆—> parts" should read --processes <—> shelf positions <—> pallets <—> parts--.

Signed and Sealed this

Twenty-fourth Day of June, 1997

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO.  : 5,503,516
DATED       : April 2, 1996
INVENTOR(S) : Kasai et al.

It is certified that error appears in the above-indentified patent and that said Letters Patent is hereby corrected as shown below:

On the title page item [75]:

"Yamamoto, Kawasaki" should read --Yamamoto, Yokohama--.
"Inaba, Kawasaki" should read --Inaba, Yokohama--.
"Arai, Chichibu" should read --Arai, Kawasaki--.

Signed and Sealed this

Fourth Day of November, 1997

Attest:

BRUCE LEHMAN

*Attesting Officer*    *Commissioner of Patents and Trademarks*